US006978937B2

(12) United States Patent
Iwaguchi et al.

(10) Patent No.: US 6,978,937 B2
(45) Date of Patent: Dec. 27, 2005

(54) METHOD OF READING INFORMATION AND APPARATUS THEREFOR, METHOD OF ACQUIRING SIGNAL FOR USE WITH INFORMATION READING APPARATUS, METHOD OF PROCESSING BAND LIMITATION, METHOD OF EXTRACTING TIMING POINT AMPLITUDE AND METHOD OF PROCESSING SIGNAL THEREOF, READ SIGNAL PROCESSING UNIT, AND METHOD OF PROCESSING READ SIGNAL AND PROCESSING APPARATUS THEREOF

(75) Inventors: Isao Iwaguchi, Kawasaki (JP); Takashi Kaku, Kawasaki (JP); Hiroyasu Murata, Kawasaki (JP); Kozo Yamazaki, Kawasaki (JP); Masanori Ohkawa, Kawasaki (JP); Mitsuo Watanabe, Kawasaki (JP); Hideo Miyazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 49 days.

(21) Appl. No.: 10/622,469

(22) Filed: Jul. 21, 2003

(65) Prior Publication Data

US 2004/0129784 A1 Jul. 8, 2004

Related U.S. Application Data

(63) Continuation of application No. PCT/JP02/00533, filed on Jan. 25, 2002.

(30) Foreign Application Priority Data

Jan. 26, 2001 (JP) ........................................ 2001-019271

(51) Int. Cl.[7] ........................... G06K 19/06; G06K 7/10
(52) U.S. Cl. ........................... 235/462.16; 235/462.19; 235/462.22; 235/462.27; 235/462.01

(58) Field of Search ........................ 235/462.16, 462.24, 235/462.19, 462.01, 462.22, 462.27; 250/271, 566; 382/191, 183

(56) References Cited

U.S. PATENT DOCUMENTS 4,329,599 A     5/1982   Gregorian et al. ........... 307/520
5,061,843 A * 10/1991   Sato et al. .............. 235/462.27

(Continued)

FOREIGN PATENT DOCUMENTS

| JP | SHO 57-501105 | 6/1982 |
|----|---------------|--------|
| JP | HEI 57-132416 | 8/1982 |

(Continued)

OTHER PUBLICATIONS

English translation of PCT International Preliminary Examination Report, dated Feb. 5, 2003, for International Application PCT/JP02/00533.

Primary Examiner—Daniel Stcyr
Assistant Examiner—Daniel Walsh
(74) Attorney, Agent, or Firm—Staas & Halsey LLP

(57) ABSTRACT

A method of reading information which makes it possible to suppress the size of hardware and a price thereof and to improve an S/N ratio of a reading signal and reading resolution, wherein even if depth of field for reading is enlarged or a concave/convex portion or a blurred portion is left on the reading face, reading precision can be improved. The method includes steps of acquiring from a medium 1, a signal containing binary digit information having a predetermined information length and a one-dimensional arrangement, extracting information concerning an elemental unit length of the information length of the binary digit information from the acquired signal, and reading a ratio of the binary digit information to the information length based on the extracted elemental unit length information.

9 Claims, 71 Drawing Sheets

U.S. PATENT DOCUMENTS

| | | | | |
|---|---|---|---|---|
| 5,463,211 A | * | 10/1995 | Arends et al. | 235/462.27 |
| 5,608,201 A | * | 3/1997 | Coleman, Jr. | 235/462.08 |
| 5,633,488 A | * | 5/1997 | Spitz | 235/462.27 |
| 5,798,513 A | * | 8/1998 | Ackley | 235/462.16 |
| 6,000,616 A | * | 12/1999 | Spitz | 235/462.16 |
| 6,328,212 B1 | * | 12/2001 | Metlitasky et al. | 235/462.16 |
| 6,382,511 B1 | * | 5/2002 | Tang et al. | 235/462.25 |
| 2002/0023958 A1 | * | 2/2002 | He et al. | 235/462.01 |
| 2003/0066891 A1 | * | 4/2003 | Madej et al. | 235/462.25 |
| 2004/0164155 A1 | * | 8/2004 | Iwaguchi et al. | 235/462.08 |
| 2004/0164158 A1 | * | 8/2004 | Miyazawa et al. | 235/462.16 |
| 2004/0164159 A1 | * | 8/2004 | Iwaguchi et al. | 235/462.16 |
| 2004/0164160 A1 | * | 8/2004 | Miyazawa et al. | 235/462.16 |
| 2004/0164161 A1 | * | 8/2004 | Iwaguchi et al. | 235/462.16 |

FOREIGN PATENT DOCUMENTS

| | | |
|---|---|---|
| JP | HEI 2-44484 | 2/1990 |
| JP | HEI 4-362796 | 12/1992 |
| JP | HEI 6-348879 | 12/1994 |
| JP | HEI 8-46555 | 2/1996 |
| JP | HEI 8-147402 | 6/1996 |
| JP | 2000-4122 | 1/2000 |
| JP | 2000-194840 | 7/2000 |

* cited by examiner

WHEN T<1MOD

WHEN T=1MOD

WHEN T>1MOD

—— : INPUT(x)
----- : OUTPUT(y)

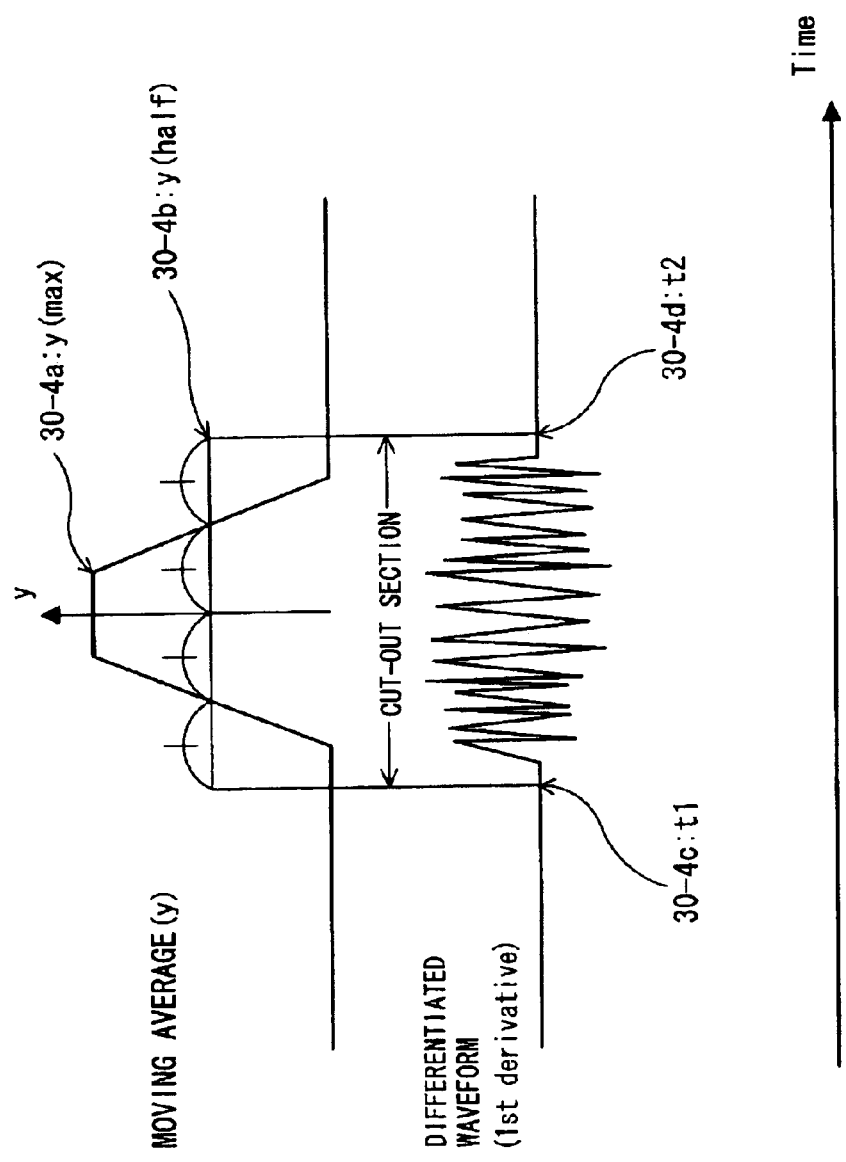

$$Ym = \frac{Xm+1 - Xm}{ts/2} td + Xm$$

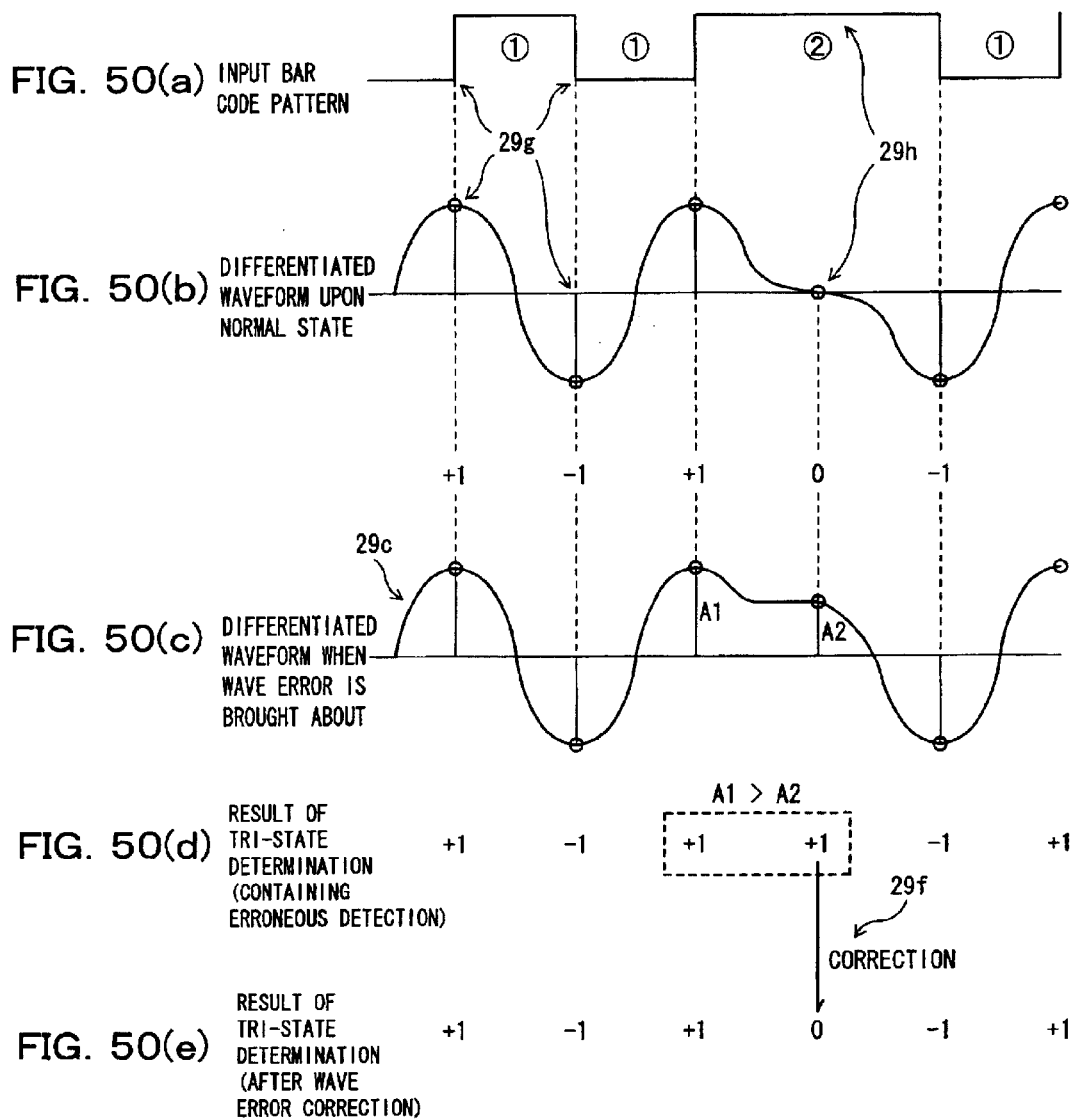

FIG. 54(a)

fmod [kHz]

| fs/fmod | | v[m/s] | | | | | | | |
|---|---|---|---|---|---|---|---|---|---|
| mag | bar[μs] | 200 | 300 | 400 | 500 | 600 | 700 | 800 | 900 |
| 0.6 | 198 | 505 | 758 | 1010 | 1263 | 1515 | 1768 | 2020 | 2273 |
| 0.5 | 165 | 606 | 909 | 1212 | 1515 | 1818 | 2121 | 2424 | 2727 |
| 0.4 | 132 | 758 | 1136 | 1515 | 1894 | 2273 | 2652 | 3030 | 3409 |
| 0.3 | 99 | 1010 | 1515 | 2020 | 2525 | 3030 | 3535 | 4040 | 4545 |

FIG. 54(b)

fs=5MHz

| fs/fmod | | v[m/s] | | | | | | | |
|---|---|---|---|---|---|---|---|---|---|
| mag | bar[μs] | 200 | 300 | 400 | 500 | 600 | 700 | 800 | 900 |
| 0.6 | 198 | 9 | 6 | 4 | 3 | 3 | 2 | 2 | 2 |
| 0.5 | 165 | 8 | 5 | 4 | 3 | 2 | 2 | 2 | 1 |
| 0.4 | 132 | 6 | 4 | 3 | 2 | 2 | 1 | 1 | 1 |
| 0.3 | 99 | 4 | 3 | 2 | 1 | 1 | 1 | 1 | 1 |

FIG. 54(c)

fs=10MHz

| fs/fmod | | v[m/s] | | | | | | | |
|---|---|---|---|---|---|---|---|---|---|
| mag | bar[μs] | 200 | 300 | 400 | 500 | 600 | 700 | 800 | 900 |
| 0.6 | 198 | 19 | 13 | 9 | 7 | 6 | 5 | 4 | 4 |
| 0.5 | 165 | 16 | 11 | 8 | 6 | 5 | 4 | 4 | 3 |
| 0.4 | 132 | 13 | 8 | 6 | 5 | 4 | 3 | 3 | 2 |
| 0.3 | 99 | 9 | 6 | 4 | 3 | 3 | 2 | 2 | 2 |

FIG. 54(d)

fs=20MHz

| fs/fmod | | v[m/s] | | | | | | | |
|---|---|---|---|---|---|---|---|---|---|
| mag | bar[μs] | 200 | 300 | 400 | 500 | 600 | 700 | 800 | 900 |
| 0.6 | 198 | 39 | 26 | 19 | 15 | 13 | 11 | 9 | 8 |
| 0.5 | 165 | 33 | 22 | 16 | 13 | 11 | 9 | 8 | 7 |
| 0.4 | 132 | 26 | 17 | 13 | 10 | 8 | 7 | 6 | 5 |
| 0.3 | 99 | 19 | 13 | 9 | 7 | 6 | 5 | 4 | 4 |

FIG. 54(e)

fs=40MHz

| fs/fmod | | v[m/s] | | | | | | | |
|---|---|---|---|---|---|---|---|---|---|
| mag | bar[μs] | 200 | 300 | 400 | 500 | 600 | 700 | 800 | 900 |
| 0.6 | 198 | 79 | 52 | 38 | 31 | 28 | 22 | 19 | 17 |
| 0.5 | 165 | 66 | 44 | 33 | 26 | 22 | 18 | 16 | 14 |
| 0.4 | 132 | 62 | 35 | 26 | 21 | 17 | 15 | 13 | 11 |
| 0.3 | 99 | 39 | 26 | 19 | 15 | 13 | 11 | 9 | 8 |

FIG. 61
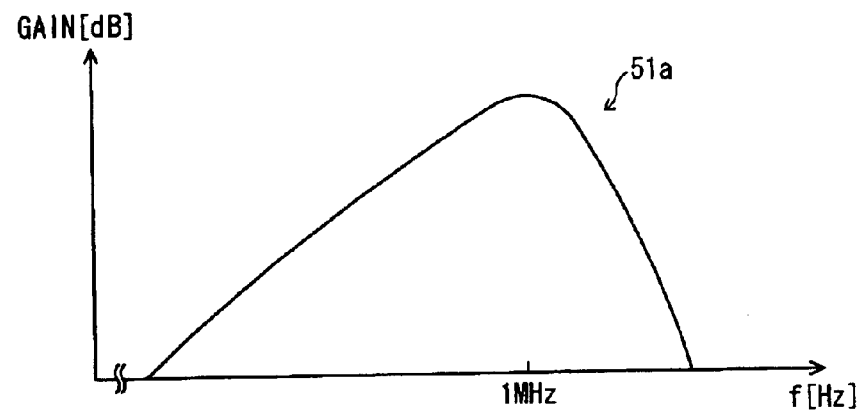
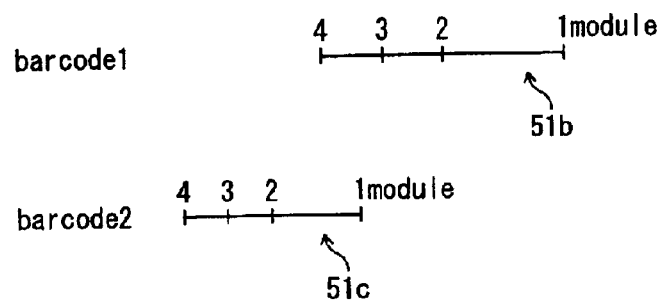
FIG. 62
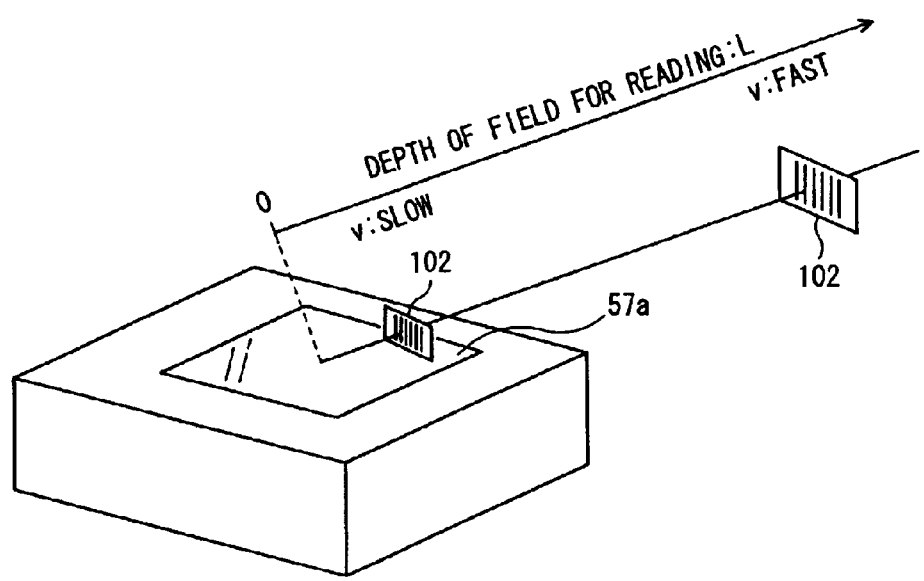

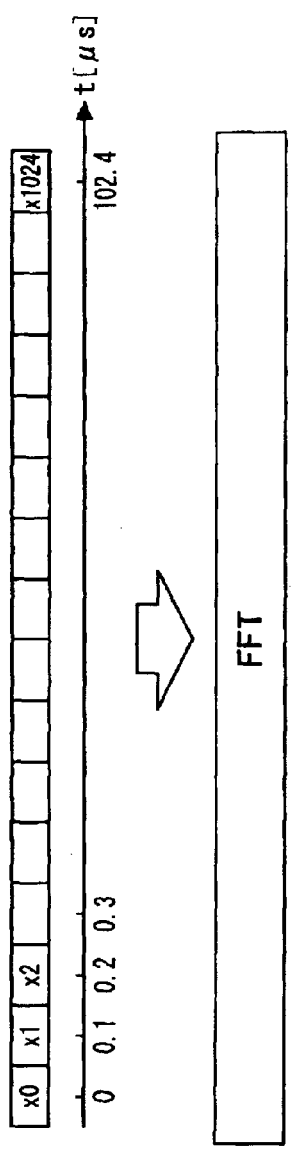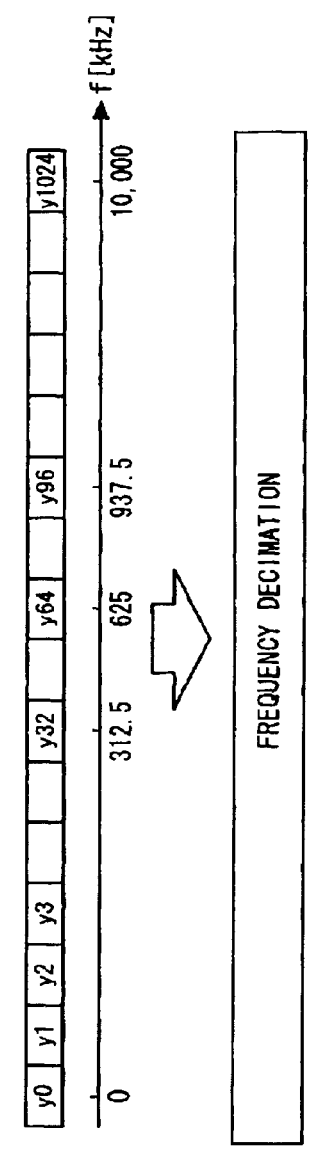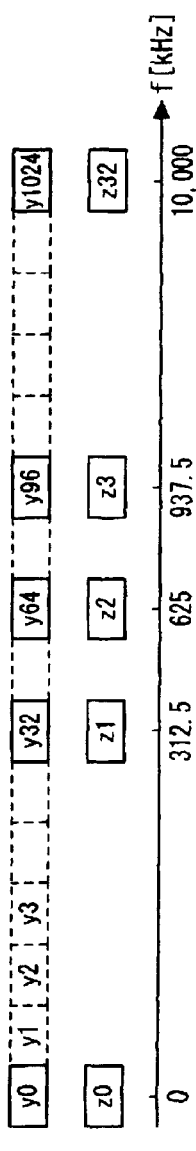

METHOD OF READING INFORMATION AND APPARATUS THEREFOR, METHOD OF ACQUIRING SIGNAL FOR USE WITH INFORMATION READING APPARATUS, METHOD OF PROCESSING BAND LIMITATION, METHOD OF EXTRACTING TIMING POINT AMPLITUDE AND METHOD OF PROCESSING SIGNAL THEREOF, READ SIGNAL PROCESSING UNIT, AND METHOD OF PROCESSING READ SIGNAL AND PROCESSING APPARATUS THEREOF

This application is a Continuation of PCT/JP02/00533 filed Jan. 25, 2002.

TECHNICAL FIELD

The present invention relates to a method of reading information and an apparatus therefor, a method of acquiring a signal for use in an information reading apparatus, a method of processing band limitation, a method of extracting a timing point amplitude and a method of processing a signal thereof, a read signal processing unit, and a method of processing the read signal and a processing unit thereof, which are useful in a case when information contained in a bar code or the like is read with a bar code scanner, signal acquisition is made on a signal containing binary digit information deriving from information elements having a predetermined information length and arrayed one-dimensionally on a medium, and width information represented by binary digit amplitude information contained in the acquired signal is read in a form of integer number ratio.

BACKGROUND ART

A manner of information registration has been conventionally employed in a field of merchandise distribution in which bar codes are attached to commodities and these bar codes are read by a bar code reading apparatus (bar code scanner) so that information concerning the commodity such as a price or name thereof is registered in a register.

The bar codes attached to the commodities are arranged in such a manner that the information concerning the ordinary commodities are coded and the coded information can be represented by an array of width information of respective black bars or white bars constituting the bar code (an integer number ratio of a width of respective white and black bars constituting the bar code). In the bar code reading apparatus, as for example shown in FIG. 70(a), a bar code 200 attached to such a commodity is exposed under an irradiation of a beam of light 201 such as a Gaussian beam, and an intensity variation signal 202 of the beam of light (see FIG. 70(c)) reflected on the surface of the barcode is received so as to read data represented by the variation of intensity contained in the intensity variation signal. The amplitude value of the intensity variation signal 202 is dependent of a color of respective bars constituting the bar code.

The bar code reading apparatus as described above may have an outward appearance shown in FIG. 57. The bar code reading apparatus is classified into several types in one of which a beam of light generated by an LD (Laser Diode) or the like scans the bar code and a reflected ray of light thereof is examined to detect the white-black pattern of the bar code. Another type of the bar code reading apparatus is that an external ray of light generated by a CCD (Charge Coupled Device) or the like is irradiated on the bar code to detect the white-black pattern of the bar code. In a conventional bar code reading apparatus, whichever types the apparatus belongs to, a ratio of width of the white bar and black bar constituting the bar code (module ratio) is calculated in accordance with the following procedure (of [1] to [4]).

[1] To receive the ray of light reflected on the bar code by an light receiving element so that the light receiving element generates an electric signal having an amplitude corresponding to the intensity of the ray of light.

[2] To extract from the amplitude variation of the light-received signal a boundary signal (edge signal) representing a boundary of transition from the white bar to the black bar or a boundary of transition from the black bar to the white bar which constitute the bar code.

[3] To measure the extracted edge signal distance by using a clock having a resolution of several tens times to several hundreds times the bar width as a bar width count representing the edge signal distance.

[4] To determine the width of respective bars constituting the bar code based on the measured count, thereby to calculate a width ratio of the white-black bars.

FIGS. 58 and 59 are block diagrams showing a conventional bar code reading apparatus, for example. As shown in FIG. 58, a bar code reading apparatus (see U.S. Pat. No. 5,061,843) is an apparatus for reading bar code information by carrying out a signal processing mainly composed of analog processing, and arranged to include an optical scanning section 102A, and analog processing unit 102B and a digital processing unit 102C.

According to the bar code reading apparatus shown in FIG. 58, a beam of light generated by an LD 102a-1 of the optical scanning section 102A is led to a polygon mirror 102a-2, and with the rotation of the mirror the beam of light is made to scan the bar code 102 in a direction from the left end to the right end thereof (in the figure, direction from a to b), for example, with the result that respective black bars or white bars are exposed under the beam of light.

The beam of light scanning the bar code 102 on the surface thereof is reflected with an intensity which corresponds to the width of the black and white bars constituting a pattern of the bar code. The intensity of the reflected light beam is dependent of the color of the respective bars of the bar code. That is, if the light beam reflects on a white bar then the light beam comes to have a relatively large intensity while if the light beam reflects on a black bar then the light beam comes to have a relatively small intensity.

That is, when the laser beam is made to scan the bar code 102, the returning light comes to have a signal waveform which is characterized by having a small amount of luminous energy upon scanning a black bar while having a large amount of luminous energy upon scanning a white bar (see Sig 10, 50e, 50f in FIG. 60).

As for example shown in FIG. 60, the bar code reading apparatus introduces into the apparatus, an electric signal (see Sig 11) having an amplitude value which derives from detection on the above-described intensity variation of the reflected light beam (represented by reading of the signal Sig 10 on ordinate of FIG. 60), and thereafter the apparatus carries out a signal processing on the electric signal, whereby the bar code information can be read. The above-described signal processing is carried out in the following steps of (1) to (4).

(1) A laser light beam generated from the LD 102a-1 is made to scan the bar code 102 and the reflected light beam thereof is photo-electrically converted into an electric signal.

(2) In an analog processing section 102B, an amplifying unit 102c effects a necessary amplifying processing on the electric signal deriving from the photoelectric conversion, and thereafter the amplified electric signal is subjected to a differentiation processing in a one-time differentiating unit 102d. That is, the photoelectric converted signal is differentiated to obtain a differentiated signal waveform 50j (signal Sig 12) having a peak at a boundary between a white bar and a black bar. This signal is added with a minute time delay to create another signal 50k (signal Sig 13).

This differentiated signal (signal Sig 12) and the signal having added with a delay by the delaying processing unit 102e (signal Sig 13) are compared with each other to form the differentiated signal into an edge signal having an edge at a point corresponding to the peak in the differentiated signal. Then, the edge signal is converted into a digital signal. That is, a positive peak of the differentiated signal corresponds to an edge signal deriving from a change from a black bar to a white bar (WEG, see a signal Sig 14) while a negative peak of the differentiated signal corresponds to an edge signal deriving from change from a white bar to a black bar (BEG, see a signal Sig 15).

In other words, when the signal 50j (Sig 12) and the signal 50k (Sig 13) are compared with each other by the comparator 102f, the edge signal WEG generated upon change from the black to the white and the edge signal BEG generated upon change from the white to the black can be obtained.

Meanwhile, in order to prevent an undesirable edge generation at a portion 50s in which no differentiating response is present, there is provided a circuit gating an edge signal which is created when the differentiated signal 50j stays within a constant rate level 501 of the differentiated signal 50j itself.

(3) In a width measuring unit 102g of a digital processing section 102C, edge signal distances of a bar image signal (i.e., a distance between a BEG and a WEG sequel to the BEG and a distance between a WEG and a BEG sequel to the WEG) are measured by a count of a clock 102h or the like (see signal Sig 16). The clock 102h for measuring the time distance between the pair of edge signals shall have a sufficient resolution.

(4) In a module calculating unit 102i, a module number expressed as respective bar width data is calculated as a proportional calculation based on the count delivered by the width measuring unit 102g (see signal Sig 17).

Ordinarily, code information expressed as a width information on a bar code is composed of integer number ratio data having a predetermined length known as a module as an unit. Each of the bar has a width of an integer multiple of the above-described module. In this case, the integer number ratio is obtained based on the bar width value by the width measuring unit 102g so as to find the module ratio.

Further, as shown in FIG. 59, an AD (Analog-Digital) converter 103d is provided to convert the acquired electric signal in the form of analog signal into a digital signal. The above-described signal processing shown in FIG. 58 can be carried out in the following steps of (1) to (5). According to the arrangement of the bar code reading apparatus shown in FIG. 59, signal processing is carried out in a digital manner in blocks corresponding to the blocks (see blocks identified by reference numerals 102d, 102e and 102f) of the aforesaid bar code reading apparatus shown in FIG. 58 in which the signal processing is effected in an analog manner.

(1) Similarly to the case of the bar code reading apparatus of FIG. 58, a laser light beam generated from an LD 103a-1 is utilized for scanning a bar code 103 by using the rotation of a polygon mirror 103a-2, whereby a reflected light beam from the bar code 103 is received by a light receiving unit 103b and an optical signal is photoelectric-converted into an electric signal.

(2) An amplifying unit 103c effects a necessary amplification processing on the electric signal supplied from the light receiving unit 103b, and thereafter the resulting signal is sampled in a digital manner by the A/D converter 103d or the like.

(3) A digital signal from the A/D converter 103d having added with a time delay difference by delaying units 103e and 103f is subjected to a differential processing in differential processing units 103h and 103i.

That is, the differential processing unit 103h compares a signal from the A/D converter 103d and added with a delay time of t2 and the same signal added with a delay time of t1 with each other, and outputs a result as a compared result signal A. Further, the differential processing unit 103d compares a signal from the A/D converter 103d and added with a delay time of t1 and the same signal added with no delay time t0 with each other, and outputs a result as a compared result signal B.

(4) A comparator 103i compares difference signals supplied from the differential processing units 103g and 103h with each other so as to detect a point at which the largest variation is brought about and the output polarity is changed, and this point is outputted as an edge point.

(5) Similarly to the case of the width measuring unit 102g of aforesaid FIG. 58, a width measuring unit 103j counts a distance between edge points by using a clock 103k.

As described above, the code information expressed as width information on the bar code is composed of integer number ratio data made of a predetermined length unit known as a module. In both of the bar code reading apparatus shown in FIGS. 58 and 59 based on the conventional technology, measurement is made on the integer number ratio data by counting the edge signal distance by using a clock.

In the conventional bar code reading apparatus shown in FIG. 58, however, if the bar code 102 has a blurred portion in printing, a concave-convex portion on the sheet of paper thereof (see portion shown at reference 50c in FIG. 60) or the like, for example, such portion will cause a distortion in a waveform representing the luminous energy of the returning light beam (see reference 50g), with the result that even in the differentiated signal two peaks having a positive value are created continuously (see reference 50h and 50i).

If the edge signal is created from the differentiating signal, two edge signals of the same kind will be created continuously. Therefore, when the bar width is counted in a final step, it follows that the count is made by using a false edge. Consequently, the count indicating the bar width will have an error (50q, 50r) relative to the inherent true value (see reference 50o, 50p).

If calculation is made to obtain the integer number from the bar width value and the error is equal to or more than 0.5 module (in this example, the error is just equal to 0.5 module), erroneous recognition will be caused in the result of reading the bar code information.

This erroneous recognition in the result of reading the bar code information due to the blur or the like on the bar code is mainly caused by the wide band characteristic of a circuit section including the light receiving unit 102b, amplifying unit and the differentiating unit, and the laser beam diameter. That is, as shown in FIG. 62, the arrangement of the bar code reading apparatus tends to have a characteristic that the scanning speed v is made slow to attain proper laser scanning at a window 57a while the depth of field for reading is made deep (L→large) to make the beam scanning speed v fast.

That is, when a bar code is brought close to the window 57a to carry out reading operation, then a distance between the LD 102a-1 or the polygon mirror 102a-2 and the bar code will become relatively short and the depth of field for reading will become shallow (L→small). However, if the reading operation is carried out with the bar code remote from the window 57a, then the distance between the LD 102a-1 or the polygon mirror 102a-2 and the bar code will become relatively long and the depth of field for reading will become deep (L→large).

Accordingly, as shown in FIG. 61, it is requested for the circuit characteristic to have a wide band characteristic capable of covering from a low signal band (see reference 51b) in which the beam scanning speed is slow and the bar code to be read is large to a high signal band (see reference 51c) in which the beam scanning speed is fast and the bar code to be read is small.

As a consequence, when a bar code having a relatively large magnitude is made to scan near the window surface, a minute laser beam will pickup the aforesaid printing blur or an abrasion to yield an erroneous recognition.

Moreover, as an influence from the beam diameter, for example, a light beam generated from the LD 102a-1 will be scattered as the depth of field for reading becomes deep. Thus, it becomes difficult for the light beam having a large diameter to accurately detect the reading bar code width with the reflected light beam thereof.

What described above will be summarized as follows. That is, the above-described bar code reading apparatus shown in 58 encounters difficulties of (1) to (4) listed as follows.

(1) In order to make the apparatus capable of processing a bar code signal deriving from a reading operation effected at a depth of field for reading L which can extend from a shallow point to a deep point, a circuit on the receiving side is requested to have a wide band frequency characteristic. Therefore, the amount of noise will be increased as the band is set to be wide, which fact will cause a problem that a signal to noise ratio (S/N) will be deteriorated.

(2) Since the apparatus is requested to read a fine bar code, the laser beam is also requested to have a thin diameter. In this case, if the bar code has a concave/convex portion on the sheet of paper thereof or a blurred portion or the like on the bar thereof, this concave/convex portion will be picked up and the signal will reflect the concave/convex portion. As a consequence, a boundary signal representing the boundary between a white bar and a black bar can be generated at a point other than the desired point. This fact can cause an erroneous recognition of an edge between the white bar and the black bar.

(3) Since the scanning is made by a laser light beam, deeper the depth of field for reading becomes, wider the beam diameter. Thus, the laser light beam cannot provide high resolution, and hence there can be a case that to read a label of a fine bar code becomes difficult.

(4) When an edge signal is extracted, the signal will function as a bar image signal representing white or black of the bar code. In order to measure the width time of the bar image signal, the clock for counting the width time must have a time period short enough with respect to the bar width time. For this reason, a hardware operating at a high clock rate can become expensive and it might be requested to take a counter measure against an EMI (electromagnetic interference).

Also the above-described bar code reading apparatus shown in FIG. 59 will encounter problems similar to those of (4) and (5) which are described with the aforesaid bar code reading apparatus shown in FIG. 58. In addition, the same bar code reading apparatus will encounter problems of (1) and (2) which will be described in the following.

(1) In order to keep a bar width accuracy, the A/D converter is requested to have a high sampling frequency (equal to or more than about ten times the minimum reading bar width). For this reason, the signal frequency band is increased and the reading system of the apparatus will become more sensitive to a noise caused by the above problem or a noise deriving from a circuit thereof. Thus, an edge between the white and black portions of the bar width can be erroneously recognized.

(2) As described above, the data shall be sampled at a high rate. When the resulting data is utilized up to the final step, a processor is requested to have a high performance capable of processing a large quantity of sampled data. Moreover, a larger memory is also requested to store the large quantity of sampled data.

The present invention is made in view of the above aspect. Therefore, it is an object of the present invention to provide a method of reading information and an apparatus therefor, a method of acquiring a signal for use in an information reading apparatus, a method of processing band limitation, a method of extracting a timing point amplitude and a method of processing a signal thereof, a read signal processing unit, and a method of processing the read signal and a processing unit thereof, which makes it possible to suppress the size of hardware and a price thereof and to improve an S/N ratio of a reading signal and reading resolution, wherein even if depth of field for reading is enlarged or a concave/convex portion or a blurred portion is left on the reading face, reading precision can be improved.

DISCLOSURE OF THE INVENTION

According to the present invention, in order to attain the above objects, there is proposed a method of reading information characterized by including steps of acquiring from a medium, a signal containing binary digit information having a predetermined information length and a one-dimensional arrangement, extracting information concerning an elemental unit length of the information length of the binary digit information from the acquired signal, and reading a ratio of the binary digit information to the information length based on the extracted elemental unit length information.

According to the present invention, there is also proposed a method of reading information characterized by including a step of acquiring a value from a signal containing binary digit information having a predetermined information length and deriving from information elements arrayed one-dimensionally on a medium at every equal time interval, wherein when an elemental unit length of the information length of the binary digit information is extracted from the acquired signal, the portion of the signal for extracting the state of the binary digit information from the medium information has a band narrower than that of the characteristic for differentiation based on the equal time interval.

According to the present invention, there is also proposed a method of reading information from a medium having a mark recorded thereon, the mark representing a data group composed of a predetermined number of information element pairs each composed of a white region and a black region each having a width length and disposed alternately on the mark for representing the data group, the method of reading information achieving information reading by acquiring the data group information as an integer number ratio between the width length data of each information element pair, the method characterized by including steps of scanning a ray of light on the mark at a predetermined velocity to cause a reflected ray of light, detecting a signal having a variation corresponding to an intensity variation of the reflected ray of light deriving from the scanning in the scanning direction, thereby acquiring a signal containing binary digit information corresponding to the intensity variation of the reflected ray of light, extracting an elemental frequency corresponding to an elemental width time of the width data from the acquired signal, effecting band limitation on the acquired signal to obtain an optimum signal band based on the extracted elemental frequency, and reading integer number ratio between the data widths of each information element pair from the acquired signal having undergone the band limitation based on the elemental frequency.

According to the present invention, there is also proposed a method of reading information from a medium having a mark recorded thereon, the mark representing a data group composed of a predetermined number of information element pairs each composed of a white region and a black region each having a width length and disposed alternately on the mark for representing the data group, the method of reading information achieving information reading by acquiring the data group information as an integer number ratio between the width length data of each information element pair, the method characterized by including steps of scanning a ray of light on the mark at a predetermined velocity to cause a reflected ray of light, detecting a signal having a variation corresponding to an intensity variation of the reflected ray of light deriving from the scanning in the scanning direction, thereby acquiring a signal containing binary digit information corresponding to the intensity variation of the reflected ray of light, extracting a timing point containing the width data from the acquired signal, and reading the integer number ratio between the data widths of each information element pair from the mark in accordance with the extracted timing point.

According to the present invention, there is also proposed a method of reading information from a medium having a mark recorded thereon, the mark representing a data group composed of a predetermined number of information element pairs each composed of a white region and a black region each having a width length and disposed alternately on the mark for representing the data group, the method of reading information achieving information reading by acquiring the data group information as an integer number ratio between the width length data of each information element pair, the method characterized by including steps of scanning the mark with a ray of light running at a predetermined velocity, receiving a ray of light coming from the outside and outputting an intensity variation detecting signal representing the intensity variation of the received ray of light, and determining whether or not the received ray of light is one having scanned the mark and reflected therefrom based on the intensity variation detecting signal, wherein in accordance with the result of determination, a signal reflected on the mark coming from an intensity variation detecting width information medium is acquired as a signal for reading information of the data group as an integer number ratio between the width length data of each information element pair, while any component of the intensity variation state detecting signal other than the component of the ray of light reflected on the mark is excluded from an object of the signal to be acquired.

Further, according to the present invention, there is provided a read signal processing unit including means for acquiring a signal containing binary digit information having a predetermined information length and deriving from information elements arrayed one-dimensionally on a medium and extracting an elemental frequency corresponding to the elemental unit length of the information length of the binary digit information from the acquired signal, and means for effecting a band limiting processing on the acquired signal based on the extracted elemental frequency signal and thereafter extracting boundary information of the binary digit information.

According to the present invention, there is also provided a read signal processing unit including means for acquiring a signal containing binary digit information having a predetermined information length and deriving from information elements arrayed one-dimensionally on a medium and extracting an elemental frequency corresponding to the elemental unit length of the information length of the binary digit information from the acquired signal, and means for effecting a band limiting processing on the acquired signal based on the extracted elemental frequency signal and thereafter extracting a ratio of the information length of the binary digit information.

Further, according to the present invention, there is provided an information reading apparatus characterized by including a signal acquiring unit, an elemental frequency extracting unit for extracting an elemental frequency corresponding to an elemental unit length of the binary digit information of the information length from the acquired signal, a band limiting unit for limiting a frequency band of the acquired signal based on the extracted elemental frequency information, a timing point extracting unit for extracting a timing point which is in synchronism with the acquired signal and has the elemental frequency based on the acquired signal and the elemental frequency information, an amplitude extracting unit for extracting an amplitude value of a signal from the band limiting unit in accordance with the timing point extracted by the timing point extracting unit, a tri-state value generating unit for generating tri-state value data from the amplitude values extracted by the amplitude extracting unit in accordance with the timing point, and a reading unit for reading a ratio of the binary digit information to the information length by calculating the tri-state value data generated by the tri-state value generating unit.

According to the present invention, there is also provided an information reading apparatus for reading information from a medium having a mark representing a data group composed of a predetermined number of pairs of information elements, each of the information elements being composed of a white region and a black region disposed alternately with a certain width arranged to have an association with coded data, the information reading apparatus acquiring the data group information as an integer number ratio between the data widths of each information element pair. In this case, the information reading apparatus may be arranged to include a signal acquiring unit for detecting an analog signal having a variation corresponding to an intensity variation of a reflected ray of light which is caused by scanning the mark on the medium with a ray of light running at a predetermined velocity in the scanning direction, and effecting a sampling operation on the continuous signal at a predetermined sampling frequency to acquire the data group information represented by the mark recorded on the medium in a form of digital signal, an elemental frequency extracting unit for extracting an elemental frequency corresponding to an elemental unit length of the width of the while region and the black region from the acquired signal in the form of digital signal, a band limiting unit for limiting a frequency band of the acquired signal based on the extracted elemental frequency information, a timing point extracting unit for extracting a timing point which is in synchronism with the acquired signal and has the elemental frequency based on the acquired signal and the elemental frequency information, an amplitude extracting unit for extracting an amplitude value of a signal from the band limiting unit in accordance with the timing point extracted by the timing point extracting unit, a tri-state value generating unit for generating tri-state value data from the amplitude values extracted by the amplitude extracting unit in accordance with the timing point, and a reading unit for reading a ratio of the binary digit information to the information length by calculating the tri-state value data generated by the tri-state value generating unit, wherein relationship among a width, bar[$\mu$m] of the white region or the black region representing the elemental unit length of the binary digit information, the scanning velocity, vmax[m/s] of the scanning ray of light, and the sampling frequency, fs[MHz] can be expressed by an equation of $2<fs/(2*bar/vmax) \leq 10$.

In addition, according to the present invention, there is also provided an information reading apparatus composed of a signal acquiring unit for acquiring a signal containing binary digit information having a predetermined information length and deriving from information elements arrayed one-dimensionally on a medium and a reading processing unit comprising an elemental frequency extracting unit for extracting elemental frequency information corresponding to the elemental unit length of the information length of the binary digit information from the acquired signal supplied from the signal acquiring unit and an information length ratio extracting unit for effecting a band limiting processing on the acquired signal based on the elemental frequency signal extracted by the elemental frequency extracting unit and thereafter extracting a ratio of the information length of the binary digit information, the elemental frequency extracting unit including a differentiation processing unit for effecting a differentiating processing on the signal acquired from the medium in such a manner that the gain peak frequency is set to a value equal to or larger than the maximum frequency of the acquired signal in a signal acquisition allowable region, a squaring processing unit for effecting a squaring processing on a signal having undergone the differentiation processing in the differentiation processing unit, a frequency spectrum analyzing unit for analyzing the result deriving from the squaring processing effected by the squaring processing unit based on frequency spectrums, an inverse characteristic data calculating unit for calculating a characteristic data having a property inverse to an approximated characteristic data on the result of the frequency spectrum analysis supplied from the frequency spectrum analyzing unit, an analyzed result correcting unit for correcting the result of the frequency spectrum analysis by using the inverse characteristic data obtained by the calculation by the inverse characteristic data calculating unit, and an extracting unit for extracting a significant certain frequency except for 0 Hz as the elemental frequency based on the result of the frequency spectrums analysis corrected by the analyzed result correcting unit.

According to the present invention, there is proposed a method of acquiring a signal for use with an information reading apparatus having a signal acquiring unit for acquiring a signal containing binary digit information recorded on a medium so as to have a predetermined information length, the information reading apparatus being arranged to extract information regarding an elemental unit length of the information length of the binary digit information from the acquired signal, thereby to read a ratio of the binary digit information to the information length based on the extracted elemental unit length information, the method of acquiring a signal for use with the information reading apparatus characterized in that the signal acquiring unit acquires a signal containing the signal component and also a component other than one deriving from the medium having the binary digit information recorded thereon upon detecting a signal from the medium, determination is made on the acquired signal so as to identify a signal portion deriving from the medium having the binary digit information recorded thereon by using an amplitude averaging calculation processing, and the signal component deriving from the medium is cut out in accordance with the result of determination, and the cut-out portion is acquired as a signal containing the binary digit information. With this method, it becomes possible to exclude a signal portion containing no binary digit information from targets of acquisition.

Further, according to the present invention, there is proposed a method of effecting a band limiting processing for use with an information reading apparatus, characterized in that as a preprocessing for reading the ratio data of the binary digit information to the information length, an elemental frequency corresponding to the elemental unit length is extracted from the acquired signal, and the frequency band of the acquired signal is limited based on the extracted elemental frequency.

Furthermore, according to the present invention, there is proposed a method of extracting a timing point amplitude for use with an information reading apparatus, characterized in that as a preprocessing for reading the ratio data of the binary digit information to the information length, a timing point in synchronism with the acquired signal and having the elemental frequency is extracted based on the acquired signal and the elemental frequency information, an amplitude value of a signal from the band limiting unit is extracted in accordance with the extracted timing point, and tri-state value data is generated from the extracted amplitude values in accordance with the timing point.

Further, according to the present invention, there is proposed a method of processing a read signal comprising steps of acquiring a signal containing binary digit information having a predetermined information length and deriving from information elements arrayed one-dimensionally on a medium, extracting an elemental frequency information corresponding to the elemental unit length of the information length of the binary digit information from the acquired signal, effecting a band limiting processing on the acquired signal based on the extracted elemental frequency signal, and thereafter extracting a ratio of the information length of the binary digit information, the method of processing a read signal carrying out further procedure upon extracting the elemental frequency, the further procedure including steps of effecting a differentiation processing on the signal acquired from the medium in such a manner that the gain peak frequency is set to a value equal to or larger than the maximum frequency of the acquired signal in a signal acquisition allowable region, effecting a squaring processing on a signal having undergone the differentiating processing, analyzing the result deriving from the squaring processing based on frequency spectrums, calculating a characteristic data having a property inverse to an approximated characteristic data on the result of the frequency spectrum analysis, correcting the result of the frequency spectrum analysis by using the inverse characteristic data obtained by the calculation, and extracting a significant certain frequency except for 0 Hz as the elemental frequency based on the result of analysis using the frequency spectrums.

Further, according to the present invention, there is proposed a method of processing a read signal for use with an information reading apparatus including a signal acquiring unit for acquiring a signal containing binary digit information having a predetermined information length and deriving from information elements arrayed one-dimensionally on a medium, and a read signal processing unit for extracting an elemental frequency information corresponding to the elemental unit length of the information length of the binary digit information from the acquired signal, effecting a band limiting processing on the acquired signal based on the extracted elemental frequency signal, and thereafter reading a ratio of the information length of the binary digit information, the method of processing a read signal for use with the information reading apparatus carrying out further procedure upon extracting the elemental frequency by the read signal processing unit, the further procedure including steps of effecting a differentiation processing on the signal acquired by the signal acquiring unit in such a manner that the gain peak frequency is set to a value equal to or larger than the maximum frequency of the acquired signal in a signal acquisition allowable region, effecting a squaring processing on a signal having undergone the differentiation processing, analyzing the result deriving from the squaring processing based on frequency spectrums, calculating a characteristic data having a property inverse to an approximated characteristic data on the result of the frequency spectrum analysis, correcting the result of the frequency spectrum analysis by using the inverse characteristic data obtained by the calculation, and extracting a significant certain frequency except for 0 Hz as the elemental frequency based on the result of the frequency spectrums analysis corrected.

Further, according to the present invention, there is provided a read signal processing apparatus including an elemental frequency extracting unit for acquiring a signal containing binary digit information having a predetermined information length and deriving from information elements arrayed one-dimensionally on a medium and extracting elemental frequency information corresponding to the elemental unit length of the information length of the binary digit information from the acquired signal, and an information length ratio extracting unit for effecting a band limiting processing on the acquired signal based on the elemental frequency signal extracted by the elemental frequency extracting unit and thereafter extracting a ratio of the information length of the binary digit information, the elemental frequency extracting unit including a differentiation processing unit for effecting a differentiation processing on the signal acquired from the medium in such a manner that the gain peak frequency is set to a value equal to or larger than the maximum frequency of the acquired signal in a signal acquisition allowable region, a squaring processing unit for effecting a squaring processing on a signal having undergone the differentiation processing in the differentiation processing unit, a frequency spectrum analyzing unit for analyzing the result deriving from the squaring processing effected by the squaring processing unit based on frequency spectrums, an inverse characteristic data calculating unit for calculating a characteristic data having a property inverse to an approximated characteristic data which results from the frequency spectrum analysis supplied from the frequency spectrum analyzing unit, an analyzed result correcting unit for correcting the result of the frequency spectrum analysis by using the inverse characteristic data obtained by the calculation by the inverse characteristic data calculating unit, and an extracting unit for extracting a significant certain frequency except for 0 Hz as the elemental frequency based on the result of the frequency spectrum analysis corrected by the analyzed result correcting unit.

According to the method of reading information of the present invention, information concerning the elemental unit length of the information length of the binary digit information can be extracted from the acquired signal, and the ratio of the information length of the binary digit information can be read based on the extracted elemental unit length information. Therefore, it becomes possible to suppress a size of hardware and a price thereof and to improve the S/N ratio of the reading signal and reading resolution. Moreover, even if the depth of field for reading is enlarged or a concave/convex portion or a blurred portion is left on the reading face, reading precision can be improved.

Further, according to the method of reading information of the present invention, when the elemental unit length of the information length of the binary digit information is extracted from the acquired signal, the signal portion in which the state of the binary digit information is extracted from the medium information can take a band narrower than that of the characteristic for differentiation of the equal time interval. Therefore, when at least the information length of the binary digit information is read, it becomes possible to carry out differentiation processing for limiting the band to the optimum one.

Furthermore, according to the read signal processing unit of the present invention, the arrangement thereof includes the means for extracting the elemental frequency and the means for extracting the boundary information of the binary digit information. Therefore, at least the process of band limiting and the tri-state value generation effected on the acquired signal can be independently shared by a group of function units which are provided separately with respect to another function unit. Therefore, the function units serving as the read signal processing unit can be incorporated into another information processing system for the processing or the like. Thus, it becomes possible to diversify the variation of the system arrangement while keeping the general-use nature of the system.

In addition, according to the information reading apparatus of the present invention, the band limiting unit limits the frequency band of the acquired signal and the ratio of the information length of the binary digit information can be read from the acquired signal in the optimum band. Therefore, the reading apparatus is not requested to have a circuit capable of handling a wide band characteristic on the receiving side thereof. Moreover, if the signal-to-noise ratio (S/N) is improved, the reading area can be enlarged, the reading resolution can be improved and the reading accuracy can be improved even when the medium itself contains a cause of reading noise. Furthermore, the reading apparatus can be free from being equipped with a clock operated at a high rate in order for measuring the elemental unit length of the information length of the binary digit information. Therefore, even if the sampling accuracy is lowered, the reading accuracy of the binary digit information can be kept high, and cost performance in hardware constituting the apparatus will be improved while the performance of the apparatus is enhanced.

Furthermore, according to the method of acquiring a signal for use in the information reading apparatus of the present invention, when the signal acquiring section and units acquire a signal from the medium having the binary digit information recorded thereon, these section and units are supplied with a signal containing a signal component other than one deriving from the medium. Of the signals supplied thereto, a portion of the signal deriving from the medium having the bar code information recorded thereon is subjected to the amplitude averaging calculation processing to carry out determination. Then, the portion of the signal deriving from the medium is cut out in accordance with the result of determination, and the cut-out portion is acquired as a signal containing the binary digit information. Accordingly, a signal portion other than one necessary for acquiring the binary digit information can be excluded from a target of subsequent signal processing in the information reading apparatus, and hence the processing load imposed on the apparatus can be decreased.

Furthermore, according to the method of processing band limitation for use in the information reading apparatus of the present invention, as a preprocessing for reading the ratio data of the information length of the binary digit information, the elemental frequency corresponding to the elemental unit length is extracted from the acquired signal, and the frequency band of the acquired signal can be limited based on the extracted elemental frequency. Therefore, information concerning the elemental unit length of the information length of the binary digit can be extracted from the acquired signal, and on the basis of the extracted elemental unit length information, the ratio of the information length of the binary digit information can be read. Therefore, it becomes possible to suppress a size of hardware and a price thereof and to improve the S/N ratio of the reading signal and reading resolution. Moreover, even if the depth of field for reading is enlarged or a concave/convex portion or a blurred portion is left on the reading face, reading precision can be improved.

Therefore, according to the present invention, as a preprocessing for reading the ratio of the information length of the binary digit information, extraction is made on the timing point synchronous with the acquired signal and having the elemental frequency based on the acquired signal and the elemental frequency information, extraction is also made on the amplitude value of the signal supplied from the band limiting unit in accordance with the extracted timing point, and the amplitude value can be led as the tri-state value data in accordance with the extracted timing point. Therefore, it becomes possible to improve the resolution in reading information together with the S/N ratio of the read signal. Furthermore, even if the depth of field for reading is enlarged or a concave/convex portions or a blurred portion are left on the reading face, the reading accuracy can be improved. In particular, if the signal acquisition is made on the photoelectric converted signal deriving from the reflected ray of light of a Gaussian beam, it becomes possible to correct distortion caused by delay of a group of circuits together with the distortion caused by inter symbol interference due to the Gaussian beam or the like. Therefore, the above-described reading resolution can be remarkably improved. Furthermore, since the module length is counted, it becomes unnecessary to carry out high rate sampling on the acquired signal, with the result that the cost for constructing the apparatus can be remarkably reduced.

In addition, according to the present invention, information concerning the elemental unit length of the information length of the binary digit information can be extracted from the acquired signal, and the ratio of the information length of the binary digit information can be read based on the extracted elemental unit length information. Therefore, it becomes possible to suppress a size of hardware and a price thereof and to improve the S/N ratio of the reading signal and reading resolution. Moreover, even if the depth of field for reading is enlarged or a concave/convex portion or a blurred portion is left on the reading face, reading precision can be improved. Moreover, when the elemental frequency as the information concerning the elemental unit length is extracted, the result of the frequency spectrum analysis can be corrected. Therefore, it becomes possible to expand the allowance of received light ray condition of the light ray which is necessary for reading the information length of the binary digit information. That is, when acquisition is made on an intensity variation signal of the reflected ray of the Gaussian beam which is irradiated on the medium, the binary digit information can be read regardless of the fact that the reflected ray of the Gaussian beam suffers from substantial degree of deterioration. Furthermore, the ray of light is received by a CCD, it becomes possible to expand the allowance of resolution of the CCD which is obliged to read the binary digit information.

Further, if the present invention is applied for reading a bar code, even if the bar code reading operation is effected on a bar code composed of small width bars or the beam diameter of the Gaussian beam irradiated on the bar code is relatively large as compared with the bar width due to the condition of the operator's reading action, or the result of frequency spectrum analysis is deteriorated due to the CCD resolution under the condition that the bar code reading is carried out by using the bar code reading apparatus employing the CCD, the elemental frequency can be extracted accurately by correcting the deterioration with an easy processing. Therefore, the following advantages can be obtained.

i) It becomes possible to expand the range of bar code that can be read by the bar code reading apparatus. In more concretely, the depth of field for reading can be varied depending on how the reading action is made by the operator. However, it becomes possible to enlarge the extent of conditions that allow the bar code reading apparatus to read the bar code.

ii) A readable bar code width can be made narrower.

iii) If the resolution of the CCD is low, the spectrum peak can be extracted by an easy processing at a high accuracy. Therefore, the reading accuracy can be improved.

Moreover, owing to the optimum characteristic extracting unit or the median filter, in particular, when a spectrum peak frequency point to be extracted by the extracting unit is left, the gain of the spectrum peak frequency point can be prevented from influencing upon the inverse characteristic data calculated by the reciprocal number data calculating unit and the interpolating unit. Accordingly, the spectrum peak frequency can be extracted by way of simple comparison among the spectrum intensities, with the result that it becomes possible to simplify the steps of extracting the module frequency and remarkably improve the accuracy of the steps of extraction.

BRIEF DESCRIPTION OF THE DRAWINGS

FIG. 7 is a block diagram for explaining an operation of the cut-out unit of the present embodiment;

FIGS. 10 to 21 are all diagrams for explaining an adaptive-type band limiting differentiation introduced into the present embodiment;

FIGS. 49, 50(a) to 50(e) and 51(a) and 51(b) are diagrams each for explaining the operation of the every module point amplitude extracting unit of the present embodiment;

FIGS. 52, 53 and 54(a) to 54(e) are diagrams each for explaining an advantage of the bar code reading apparatus of the present embodiment;

FIGS. 60 to 62 are diagrams each for explaining an operation of the conventional bar code reading apparatus;

FIG. 64(a) to 64(d) are diagram each for explaining an operation of the module frequency extracting unit as the second modification of the adaptive-type band limiting differentiating unit of the present embodiment;

BEST MODE FOR CARRYING OUT THE INVENTION

Embodiments of the present invention will be hereinafter described with reference to drawings.

(A-1) Explanation of Overall Construction of Bar Code Reading Apparatus to Which One Embodiment of the Present Invention is Applied Initially, an overall construction of a bar code reading apparatus according to the present embodiment will be described.

Figure 1:
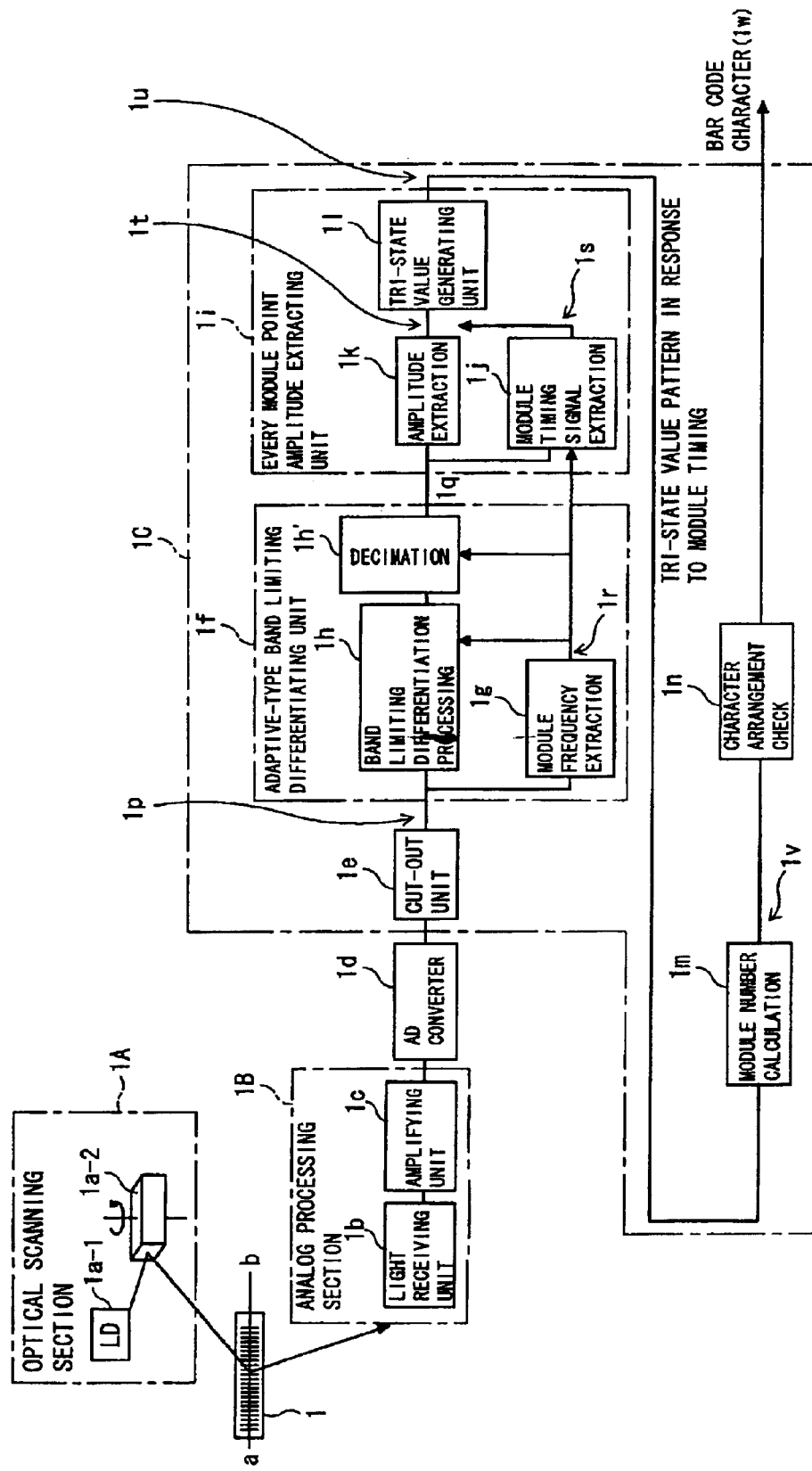
FIG. 1 is a block diagram showing a bar code reading apparatus according to the present embodiment.
Figure 57:
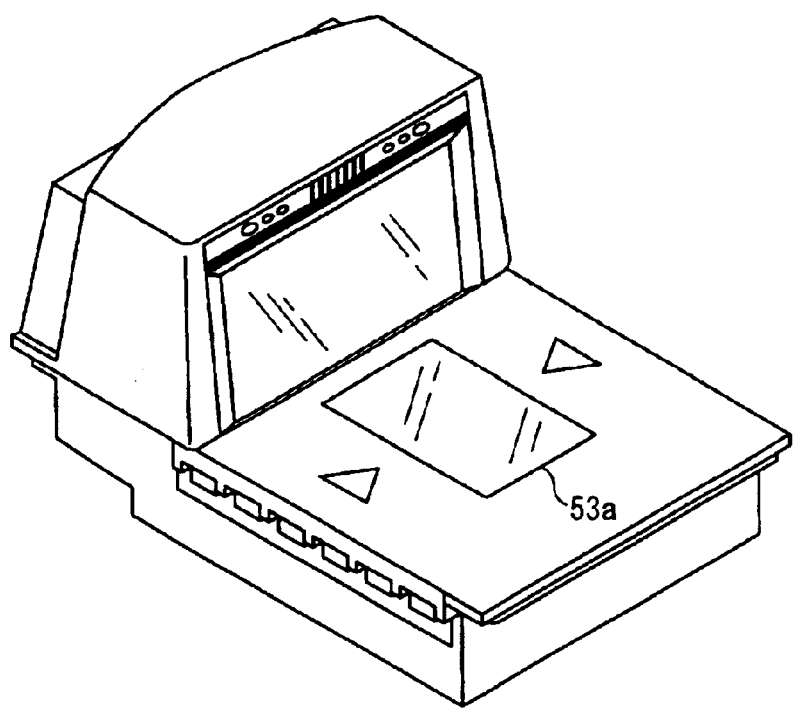
FIG. 57 is a diagram showing an outward appearance of the bar code reading apparatus.
Figure 58:
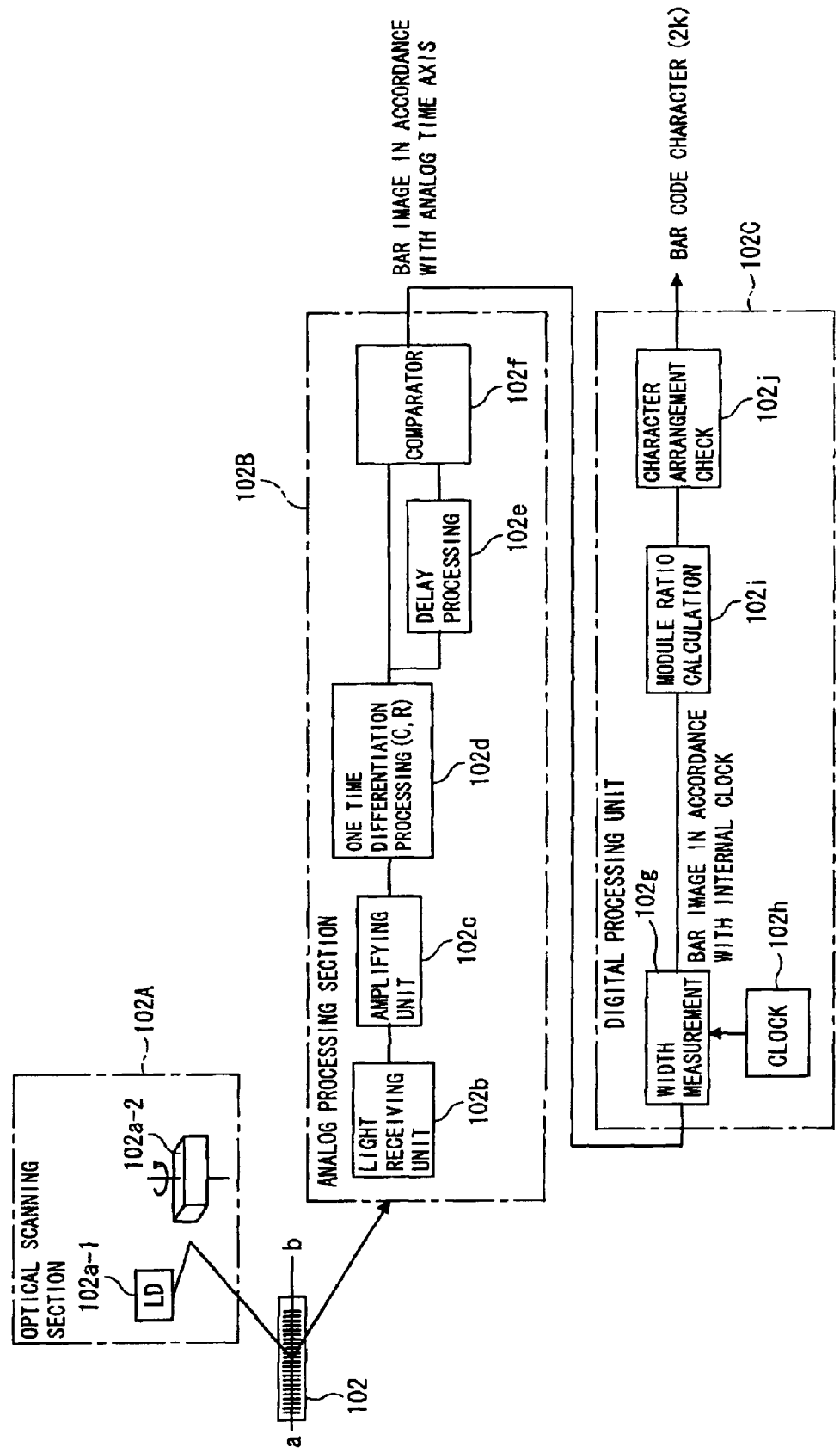
FIGS. 58 and 59 are block diagrams each showing a conventional bar code reading apparatus.

FIG. 1 is a block diagram showing the overall construction of the bar code reading apparatus according to one embodiment of the present invention. The bar code reading apparatus shown in FIG. 1 also has an outward appearance similar to that shown in FIG. 57. The bar code reading apparatus can read a bar code as a mark recorded on a medium. Also, the bar code reading apparatus is arranged to include an optical scanning section 1A, an analog processing unit 1B, an AD converter 1d and a reading processing section 1C.

In other words, the bar code reading apparatus of the present embodiment is arranged to acquire a signal containing binary digit information (width-length data represented by white regions and black regions constituting the bar code) disposed on the medium so as to have a predetermined information length. Further, the bar code reading apparatus is arranged to extract information concerning an elemental unit length (module) of the information length of the binary digit information from the acquired signal, and read a ratio of information length of the binary digit information (bar code information) based on the extracted elemental unit length information.

The optical scanning section 1A is arranged to include an LD1a-1 emitting a light beam and a polygon mirror 1a-2 composed of a mirror face body reflecting the light beam from the LD1a-1. The polygon mirror 1a-2 is rotated by a rotating driving force given by a motor, although not shown. The polygon mirror can provide a plural kinds of scanning patterns by varying the orientation of the reflected light beam. If the polygon mirror is employed in a bar code reader having a system shown in FIG. 57, the polygon mirror is provided near the inside of a reading window face 53a.

The light beam emitted from the LD1a-1 is led to the outside (of the housing) through the reading window 53a owing to the rotation of the polygon mirror 1a-2. On the outside of the reading window 53a, a bar code 1 is held so that the bar code can be irradiated with the aforesaid light beam, whereby respective black bars or white bars of the bar code can be scanned by the light beam shifting in a direction from the left end to the right end thereof, for example.

An analog processing section 1B is composed of a light receiving unit 1b and an amplifying unit 1c. The light receiving unit 1b receives a ray of light containing the reflected light beam irradiated on the aforesaid bar code 1 and entering from the outside through the reading window 53a. The light receiving unit also converts the ray of light into an electric signal in a photoelectric manner so that the amplitude value thereof corresponds to the intensity variation of the ray of light. The amplifying unit 1c is a unit for effecting a necessary amplifying processing on the photoelectric converted signal supplied from the light receiving unit 1b.

The AD converter 1d is a unit for carrying out digital sampling on the photoelectric converted signal as an analog signal supplied from the amplifying unit 1c and outputting the resultant signal as a digital signal. The present embodiment may have a variation in which the AD converter 1d is obviated and an analog filter is provided so as to effect a band limiting differentiation processing to be effected at the downstream stage of the reading processing unit.

Figure 59:
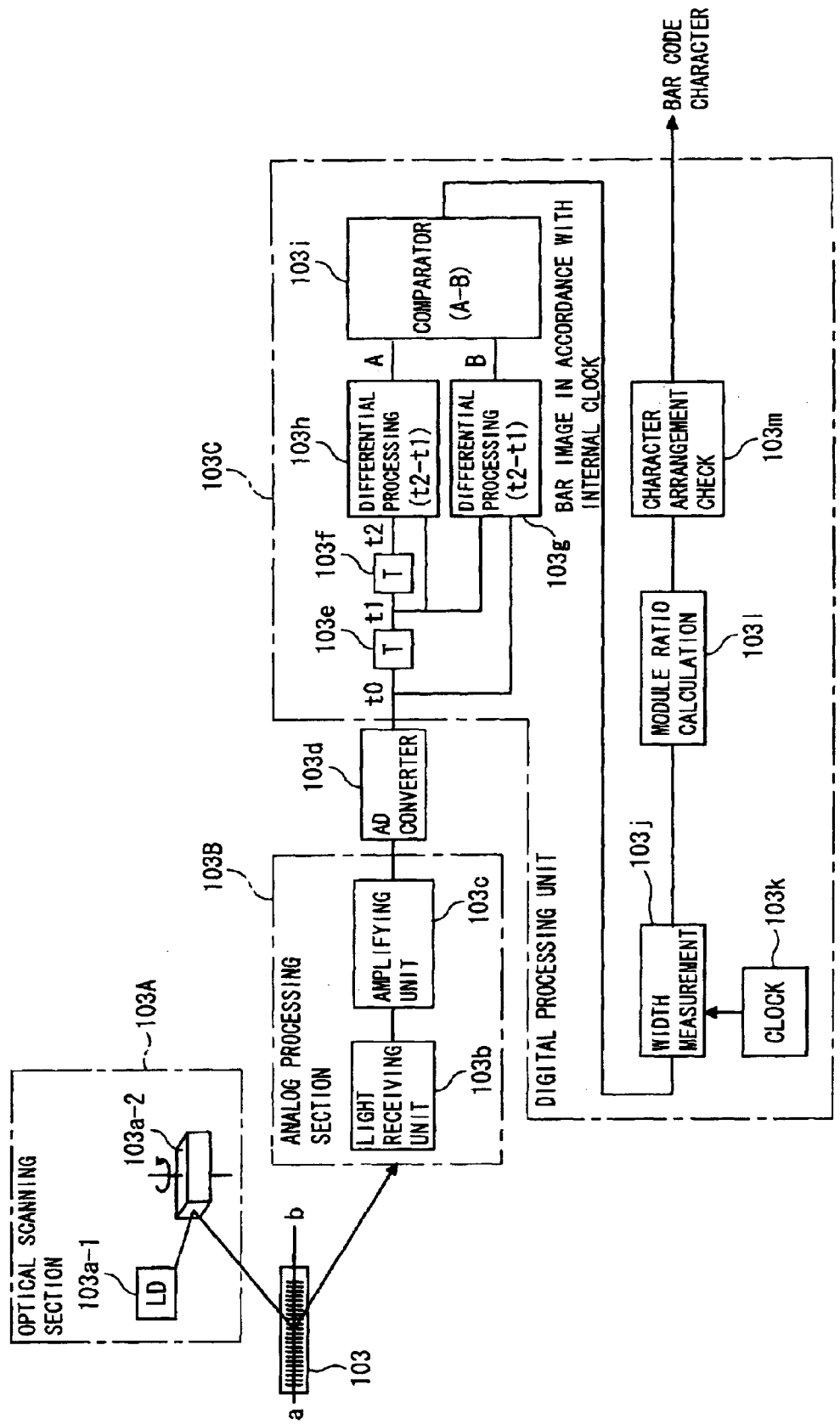
Figure 60:
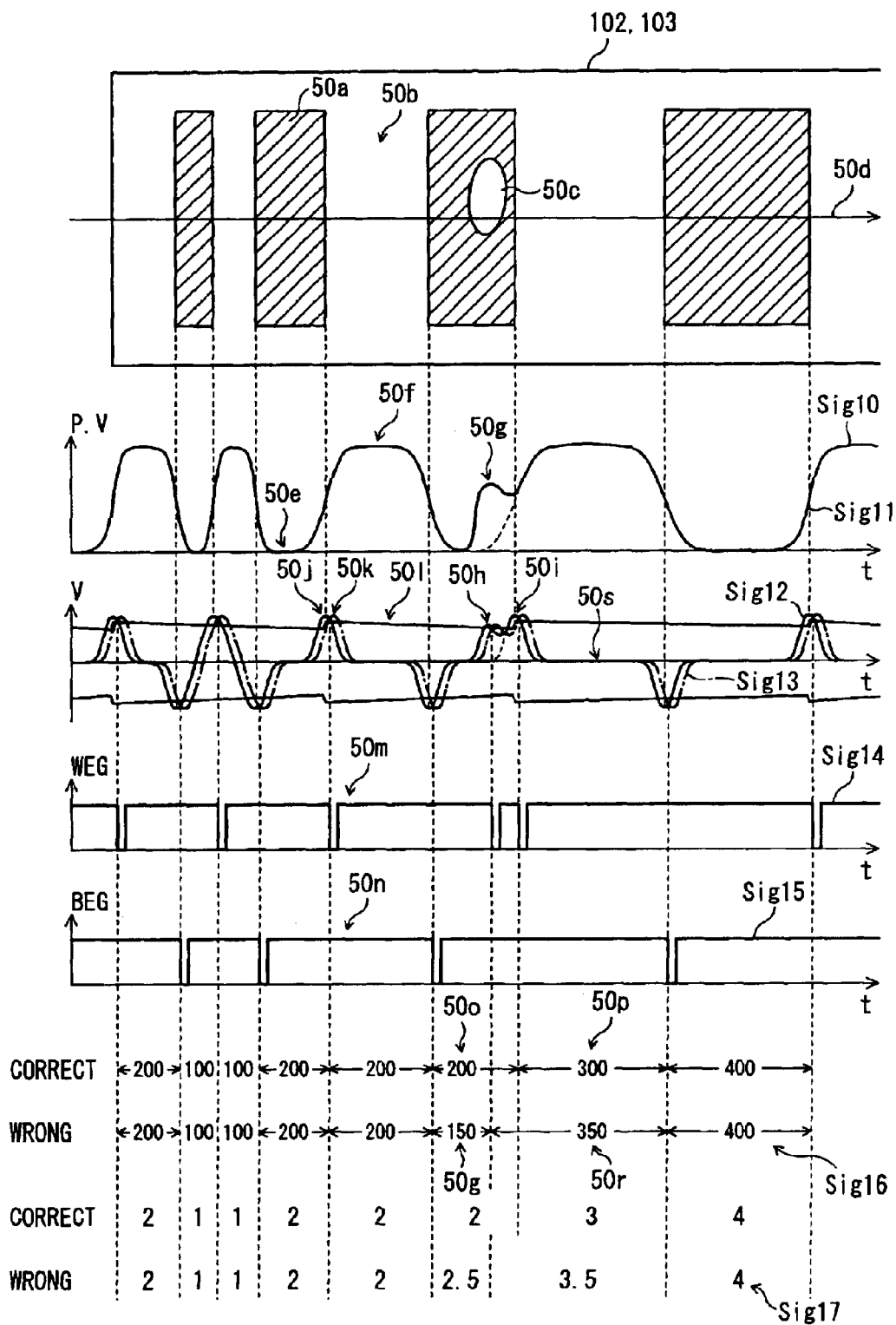

The optical scanning section 1A, the analog processing section 1B and the AD converter 1d are substantially similar to those shown in FIG. 59 (see references 103A, 103B, 103d).

The optical scanning section 1A, the analog processing section 1B, the AD converter 1d and a cut-out unit 1e function as a signal acquiring unit for acquiring a signal containing binary digit information having a predetermined information length deriving from the bar code disposed on the medium.

The reading processing section 1C is arranged to include the cut-out unit 1e, an adaptive-type band limiting differentiating unit 1f, an every module point amplitude extracting unit 1i, a module number calculating unit 1m and a character arrangement checking unit 1n.

The cut-out unit 1e is a unit for extracting from the photoelectric converted signal, a signal which is presumably one deriving from the bar code, in order to reduce a load imposed on the processing to be effected in the downstream stage. That is, as will be described later on, the cut-out unit 1e examines each portion of a signal inputted thereto from the aforesaid AD converter 1d and determines whether the portion of the signal is a portion of the photoelectric converted signal deriving from the lay of light reflected on the bar code. If it is determined that the portion of the photoelectric converted signal is one deriving from the lay of light reflected on the bar code, this portion is cut out and acquired for respective steps of signal processing carried out in the downstream stage.

The adaptive-type band limiting differentiating unit 1f is arranged to include a module frequency extracting unit 1g for extracting a frequency corresponding to an elemental module of the bar code signal, a band limiting differentiation processing unit 1h for limiting a frequency band of a signal supplied from the cut-out unit 1e based on the frequency extracted by the module frequency extracting unit 1g, and a decimation processing unit 1h' for effecting decimation to reduce the data amount of a signal supplied from the band limiting differentiation processing unit 1h. The arrangement of the adaptive-type band limiting differentiating unit 1f will be described in detail later on.

The module frequency extracting unit 1g has a function as an elemental frequency extracting unit for extracting an elemental frequency corresponding to an elemental unit length of the information length of the binary digit information from the acquired signal. The band limiting differentiation processing unit 1h has a function as a band limiting unit for limiting the frequency band of the acquired signal based on the extracted elemental frequency information. The every module point amplitude extracting unit 1i is arranged to include a module timing signal extracting unit 1j for extracting a timing signal of the module in accordance with a frequency corresponding to the elemental module extracted by the aforesaid adaptive-type band limiting differentiating unit 1f, an amplitude extracting unit 1k for extracting an amplitude value of a differentiated signal by using the timing signal, and a tri-state value generating unit 1l for forming the amplitude value extracted by the amplitude extracting unit 1i into an edge signal composed of tri-state data which can take any of three values of "+1", "0" and "−1".

The aforesaid timing signal extracting unit 1j has a function as a timing point extracting unit for extracting a timing point synchronized with the acquired signal and having the elemental frequency, based on the acquired signal and the elemental frequency information which are supplied from the adaptive-type frequency band limiting differentiating unit 1f. The amplitude extracting unit 1k has a function for extracting an amplitude value from a signal supplied from the band limiting unit (the adaptive-type frequency band limiting differentiating unit 1f) in accordance with the timing point extracted by the timing point extracting unit. The tri-state value generating unit 1l has a function as a tri-state value generating unit for leading an amplitude value as the tri-state data in accordance with the timing point extracted by the amplitude extracting unit.

The module number calculating unit 1m is a unit for reading the bar code information expressed as a width length of respective bars constituting the bar code based on the tri-state data supplied from the every module point amplitude extracting unit 1i.

The character arrangement checking unit 1n is a unit for demodulating a bar code character of the data arrangement pattern of the bar code information read by the aforesaid module calculating unit 1m with reference to the bar code standard.

As described above, according to the bar code reading apparatus of the present embodiment, the mark (bar code) is composed of white regions and black regions as information elements with width length data, and the white regions and the black regions are alternately disposed to represent a data group having a predetermined set of information elements, and the bar code reading apparatus acquires information from the bar code attached on a medium by reading the data group information as an integer number ratio between each pair of width length data.

Then, the optical scanning section 1A makes a ray of light scan the upper surface of the bar code at a predetermined speed, the analog processing section 1B receives a reflected ray of light deriving from the scanned ray of light reflected on the mark and detects intensity variation information corresponding to the scanning in the aforesaid direction as a signal, whereby the analog processing section acquires a signal containing binary digit information corresponding the intensity variation of the reflected ray of light.

Further, the module frequency extracting unit 1g extracts the elemental frequency corresponding to the elemental width time of the width length data from the acquired signal, the band limiting differentiating unit 1h limits the signal band of the acquired signal so that the acquired signal has an optimum signal band, based on the extracted elemental frequency, and the every module point amplitude extracting unit 1i, the module number calculating unit 1m and the character arrangement checking unit 1n reads the integer number ratio between each pair of width length data from the acquired signal having undergone the band limitation, based on the elemental frequency.

In more concretely, the optical scanning section 1A generates a plural patterns of laser scanning patterns. When one of the generated patterns scans the bar code, that is, the laser beam scans the bar code, the luminous energy variation of the reflected ray of light from the bar code 1 is collected and the light receiving unit 1b converts the luminous energy into an electric signal.

The bar code reflects the ray of light with different amount of luminous energy depending on on which of the white bar and the black bar the reflection is brought about. Therefore, the reflected ray of light comes to have a luminous energy variation depending on the white portion and the black portion. The luminous energy variation is subjected to a proper amplifying processing in the light receiving element amplifier 1c made up of pin photodiodes or the like. Thereafter, the resulting signal is subjected to a sampling process in the AD converter 1d (to carry out analog-to-digital conversion).

The cut-out unit 1e extracts from the output series from the AD converter 1d, a signal portion (see signal 1p) having a feature presumably deriving from the bar code 1. The cut-out unit prevents the rest of the signal portions from being supplied to the next stage. Thus, the processing blocks of the downstream stage can be relieved from a lot of processing load.

The adaptive-type band limiting differentiating unit 1f removes undesirable noise components from the signal portion 1p which is cut out by the cut-out unit 1e so as to have the feature presumably deriving from the bar code. Thus, the signal portion is subjected to the band limiting processing so that the signal portion has an optimum signal band and secures only a component necessary for extracting the module.

In order to realize the above arrangement, initially, the module frequency extracting unit 1g extracts a frequency component corresponding to one module (elemental module) of the bar code (see signal 1r) from the input signal 1p. In response to the result 1r thereof, a filter serving as the band limiting differentiation processing unit 1h is provided and this input signal 1p is inputted into the filter 1h. The band limited differentiation signal is reliably given information necessary for extracting the module and has been limited to have the narrowest band. Therefore, this signal has the smallest noise level.

In other words, the filter serving as the band limiting differentiation processing unit 1h is arranged in accordance with the frequency extracted by the module frequency extracting unit 1g. This filter removes high frequency noise causing deterioration in the width information extracting accuracy, and also this filter allows only a minimum band necessary for extracting the width information to pass therethrough.

A signal passing through the filter 1h is subjected to a decimation processing for carrying out decimation to reduce the amount of data. The resulting signal is supplied to the every module point amplitude extracting unit 1i as a signal 1q.

The module timing signal extracting unit 1j extracts a timing signal 1s corresponding to a module from the signal 1q which has been subjected to the band limiting processing in the adaptive-type band limiting differentiation unit 1f. In accordance with the timing signal is, an amplitude value of the signal 1q is extracted (see signal 1t). Since the signal 1t generates information indicative of whether or not an edge point is present at every module timing, it becomes unnecessary to count a bar width by using an excessively high rate clock. Also, it becomes unnecessary to calculate the ratio of the module.

In other words, the every module point amplitude extracting unit 1i finds a point 1s corresponding to a timing of the module from the signal 1q which has passed through the adaptive-type band limiting differentiating unit 1f. In accordance with the timing, an amplitude value of the differentiated signal 1q having undergone the band limiting operation is extracted and the amplitude value is supplied to the subsequent tri-state value generating unit 1t (signal 1t). At this time, deviation between the real module timing point and the module timing point determined by the sampling is detected and this deviation is corrected, whereby the timing accuracy is secured.

The tri-state value generating unit 1l generates a series of tri-state values composed of any of "+1", "0", "−1" based on the aforesaid signal 1t, and supplies the resultant signal to the subsequent module number calculating unit 1m (see signal 1u). At this time, if the scanner is a type in which laser beam is utilized for the scanning, decrease in resolution due to the Gaussian beam (inter symbol interference) is corrected.

Further, when the tri-state value generating unit 1l carries out tri-state value allocation to the amplitude value of every module timing point, automatic equalizing processing is effected based on the least-squares method. When a laser beam is employed for reading a bar code held in a reading area remote from the apparatus, the beam diameter will be expanded. But owing to the automatic equalizing processing based on the least-squares method, the inter symbol interference can be prevented from being brought about.

The module number calculating unit 1m calculates the bar code information as a module pattern expressed by the white-black level bar code, based on the aforesaid tri-state value data, and outputs the result of calculation to the character arrangement checking unit 1n (see signal 1v). The character arrangement checking unit 1n examines the calculated module pattern with reference to the bar code standard. Thus, the bar code character can be demodulated (1w).

As described above, according to the bar code reading apparatus of the present embodiment, the adaptive-type band limiting differentiating unit if limits the frequency band of the acquired signal. Therefore, the subsequent every module point amplitude extracting unit 1i and the module number calculating unit 1m can carry out signal processing for reading the information length ratio of the binary digit information from the acquired signal in an optimum band. Accordingly, the receiving side circuit need not handle a wide area of frequency band, the signal to noise ratio (S/N) can be improved, a reading area thereof can be expanded, and reading resolution can be also improved. Moreover, if the medium itself contains a cause of reading noise, the reading accuracy is also improved.

Further, when the elemental unit length of the information length of the binary digit information is measured, it becomes unnecessary to prepare a high rate clock. Thus, even if the sampling accuracy is set to not very high level, the level of accuracy in reading the binary digit information can be kept high. Therefore, even a clock driving at a relatively low rate can manage the generation of the sampling frequency. Accordingly, the cost of hardware for constructing the apparatus arrangement can be remarkably decreased.

Furthermore, according to the present embodiment, it is possible to extract from the acquired signal, the module frequency corresponding to the module length time in the bar width length data, limit the signal band of the acquired signal so as to make the acquired signal have an optimum signal band based on the extracted module frequency, and read the integer number ratio between respective bar width length data from the acquired signal having undergone the band limitation based on the module frequency. Therefore, the receiving side circuit need not handle a wide area of frequency band, the signal to noise ratio (S/N) can be improved, with the result that advantage similar to those of the above case can be obtained.

Figure 3:
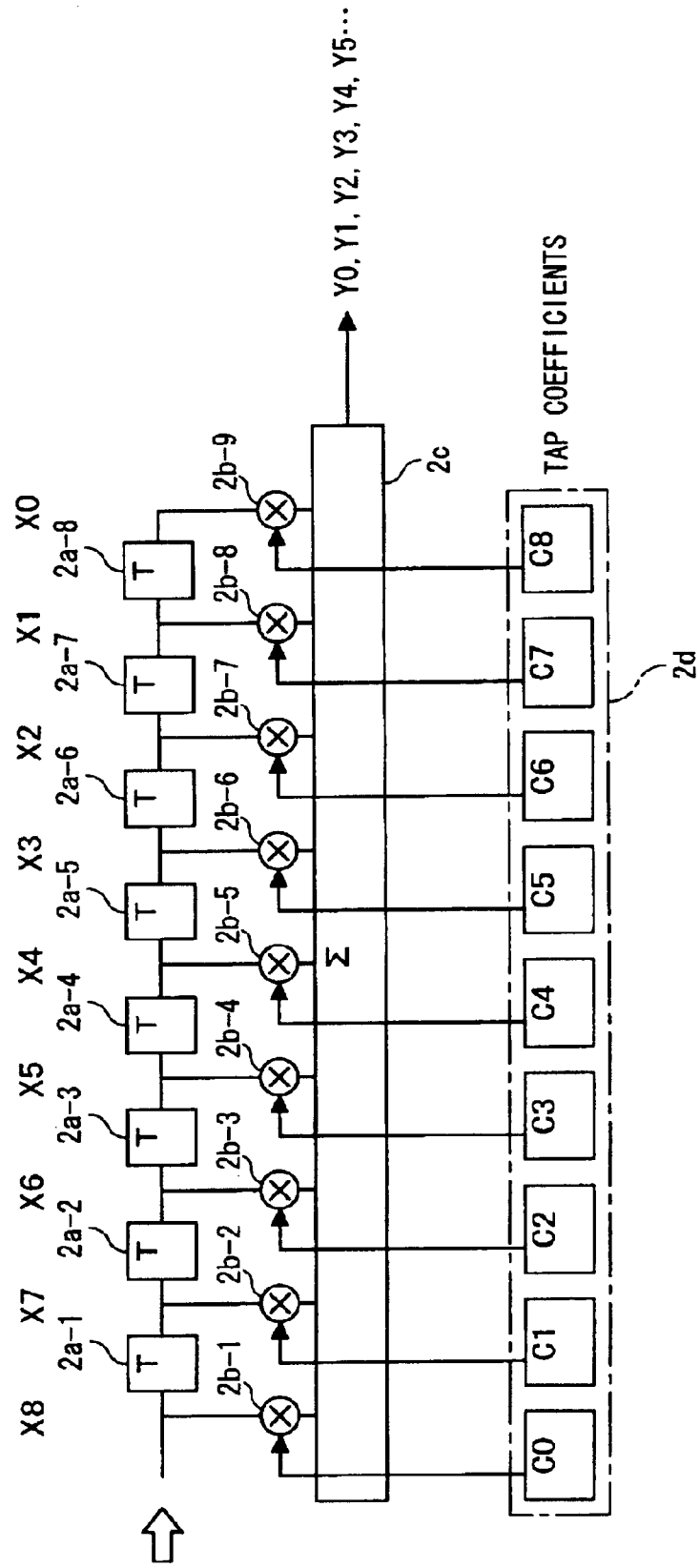
FIG. 3 is a diagram showing the transversal filter employed in the bar code reading apparatus of the present embodiment.

(A-2) Description of Transversal Filter Employed in Main Portion of Present Embodiment FIG. 3 is a block diagram showing a transversal filter employed in a main portion of the present embodiment. A transversal filter is a digital filter in which tap coefficients are set to obtain a filter characteristic. This transversal filter is arranged to include delaying units 2a-1 to 2a-8, multipliers 2b-1 to 2b-9, a total sum arithmetic operator 2c, and a tap coefficient holding unit 2d for holding therein nine tap coefficients.

Figure 2:
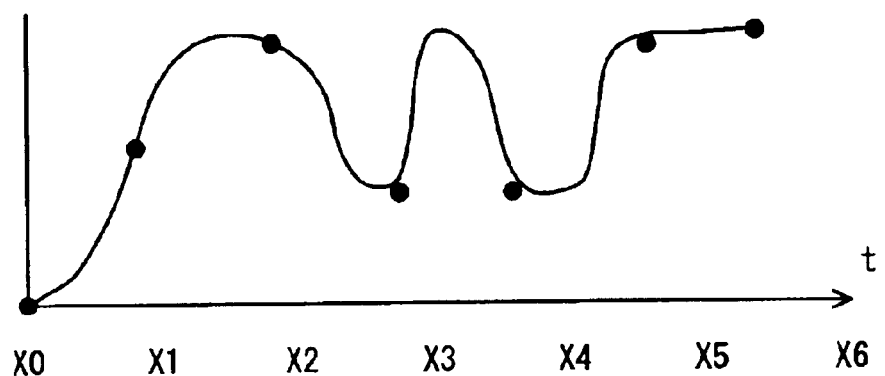
FIG. 2 is a diagram for explaining a transversal filter employed in the bar code reading apparatus of the present embodiment.

When sampling is effected on an analog waveform such as one shown in FIG. 2 to obtain finite set of digital data X0, . . . , and this finite set of digital data is subjected to the transversal filter, then an output signal Y0, . . . , of which coefficient values are dependent of the following equation (1) can be obtained.

$$Y_n = \Sigma C_i X_{n-1} \tag{1}$$

The transversal filter employed in the main portion of the bar code reading apparatus according to the present embodiment is arranged to have a necessary number of steps for obtaining a desired characteristic.

(A-3) Band Limitation for Signal to be Processed by Reading Processing Unit

According to the present embodiment, the bar code reading apparatus acquires a signal containing the binary digit information having a predetermined information length deriving from a ray of light reflected on information elements which are arrayed in a one-dimensional manner on the medium (signal for detecting the intensity variation of a ray of light reflected on the bar code). Information regarding the elemental unit length (bar code module length) of the information length of the binary digit information is extracted from the acquired signal 1p, and a ratio of the information length of the binary digit information (bar code information) is extracted based on the extracted elemental unit length information.

FIGS. 4(a) to 4(d) are diagrams each for explaining a band limiting characteristic for the signal in the reading processing section 1C of the present embodiment.

Figure 4A:
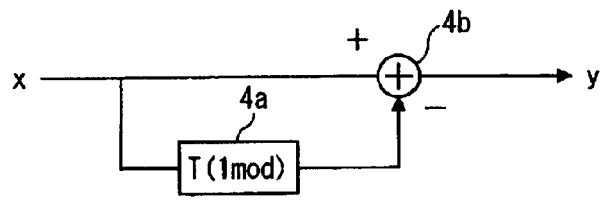
FIGS. 4(a) to 4(d) are diagrams each for explaining the bar code reading apparatus according to one embodiment of the present invention.
Figure 4B:
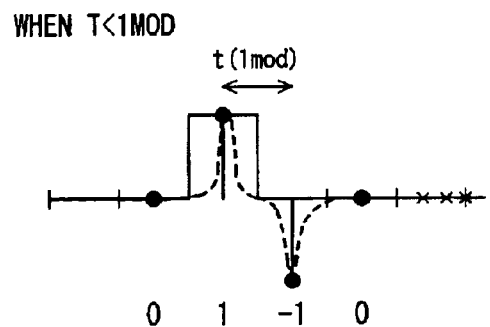
Figure 4C:
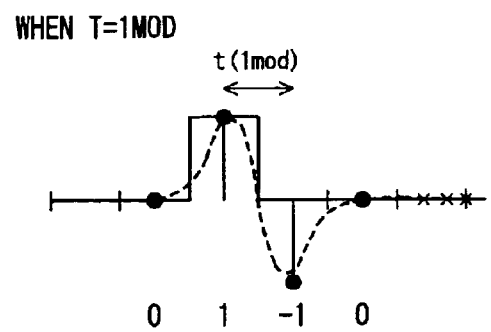

As for example shown in FIG. 4(c), if the reading processing section is supplied with an input signal (x) composed of sequential digits of "0", "0", "1", "0", "0" having a rectangular pattern (see a solid line waveform in the diagram), this signal can be differentiated by using a differentiating circuit including a delaying unit 4a and an adding unit 4b shown in FIG. 4(a). Thus, the signal will be converted into a signal composed of sequential digits of "0", "1", "−1", "0" (output signal (y); see a dot line waveform in the same diagram). In this way, it becomes possible to extract an edge at which the input signal changes its status from "0" to "1" or an edge at which the input signal changes its status from "1" to "0".

Figure 4D:
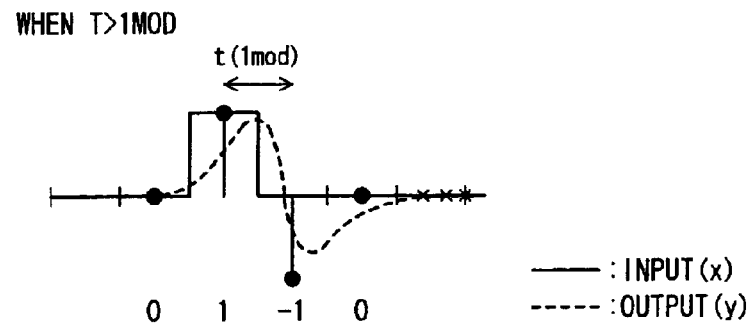

The differentiating circuit shown in FIG. 4(a) employs a time interval of differentiation which is equivalent to the elemental module of the bar code (T=1 module). If the differentiating processing is effected at an interval shorter than that interval, the response waveform will become sharp as shown in FIG. 4(b) while if the differentiating processing is effected at an interval longer than that interval, the response waveform will become blunt as shown in FIG. 4(d).

As a manner of band processing effected in the reading processing section 1C of the present embodiment, it is recommendable for the time interval to be set to one corresponding to the elemental module of the bar code so as to attain an optimum signal processing. However, if the signal processing is effected at the time interval set to one shorter than the elemental module, an excessive noise sensitivity can be caused in the reading processing section. Conversely, if the signal processing is effected at the time interval set to one longer than that time interval, then as shown in FIG. 4(d), an inter symbol interference is brought about due to the input pattern, leading to a waveform distortion, with the result that it becomes difficult to find an expected edge.

Accordingly, as for the band limiting characteristic of the reading processing section 1C of the present embodiment, arrangement is made to provide a differential processing characteristic of a time interval to respective steps of processing stemming from one at which the intensity variation detecting signal is acquired from the aforesaid reflected ray of light to one at which the integer number ratio between each pair of width length data pieces can be read. That is, the respective steps of processing come to have a differential processing characteristic of a time interval which is substantially equivalent to a time (elemental width time) corresponding to the elemental unit length (module length) or a time interval slightly smaller than that time interval.

As described above, according to the present embodiment, information regarding the module length of the information length of the bar code information is extracted from the acquired signal, and the bar code information can be read based on the extracted module length information. Therefore, it becomes possible to suppress the size of hardware and a price thereof and to improve the S/N ratio of the reading signal and reading resolution. Moreover, even if the depth of field for reading is enlarged or a concave/convex portion or a blurred portion is left on the reading face, reading precision can be improved.

(B-1) Description of Cut-out Unit of Bar Code Reading Apparatus According to Present Embodiment Subsequently, an arrangement of the cut-out unit 1e of the bar code reading apparatus according to the present embodiment will be hereinafter described with reference to FIGS. 5 to 7.

Figure 5:
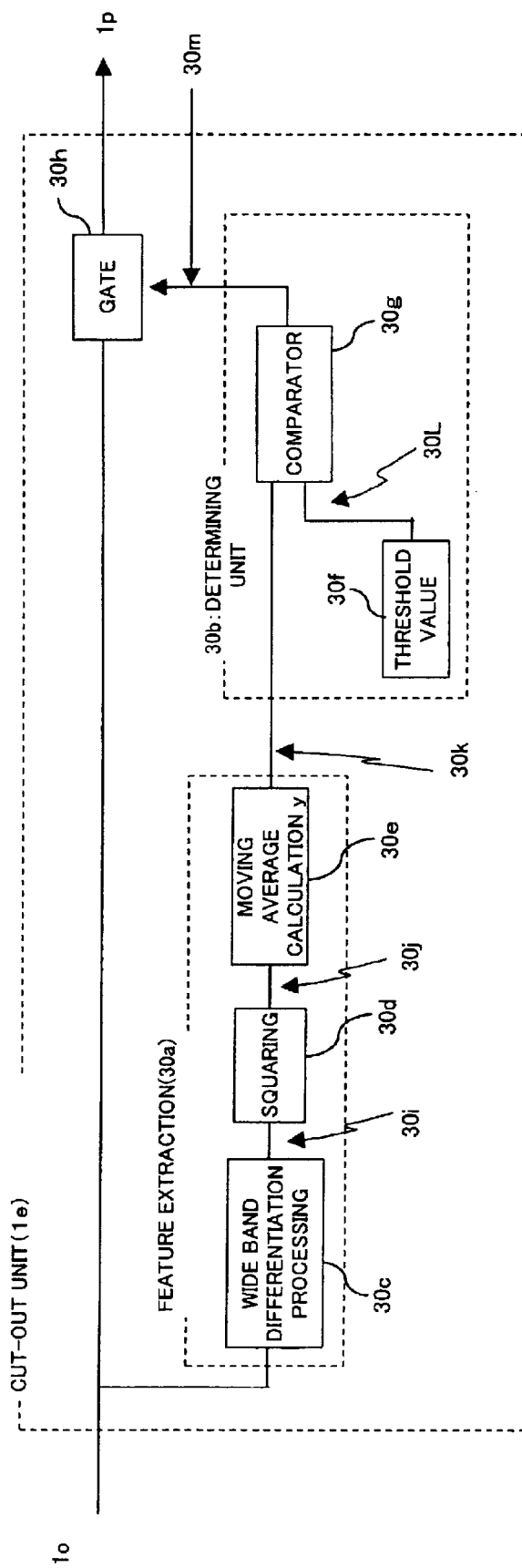
FIG. 5 is a block diagram showing a cut-out unit of the present embodiment.

FIG. 5 is a block diagram showing in detail the cut-out unit 1e of the bar code reading apparatus according to the present embodiment. As shown in FIG. 5, the cut-out unit 1e is arranged to include a feature extracting unit 30a, a determining unit 30b and a gate 30h.

The feature extracting unit 30a is a unit for extracting a feature of the photoelectric converted signal of the digital signal supplied from the AD converter 1d. This unit is arranged to include a wide band differentiation processing unit 30c, a squaring processing unit 30d and a moving average calculating unit 30e.

The wide band differentiation processing unit 30c is a unit for effecting wide band differentiation processing on a photoelectric converted signal of the digital signal supplied from the AD converter 1d so as to remove noise therefrom. The squaring processing unit 30d is a unit for carrying out squaring calculation processing at every sampling data on the photoelectric converted signal having undergone the wide band differentiation processing in order to facilitate the subsequent operation of comparing amplitude values with each other. The moving average unit 30e is a unit for calculating moving average on the digital signal having undergone the squaring calculating processing in the squaring processing unit 30d.

Figure 6A:
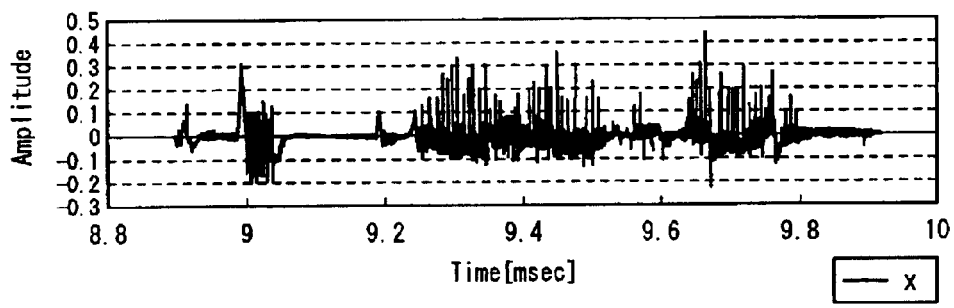
FIGS. 6(a) to 6(c) are diagrams each for explaining the cut-out unit of the present embodiment.
Figure 6B:
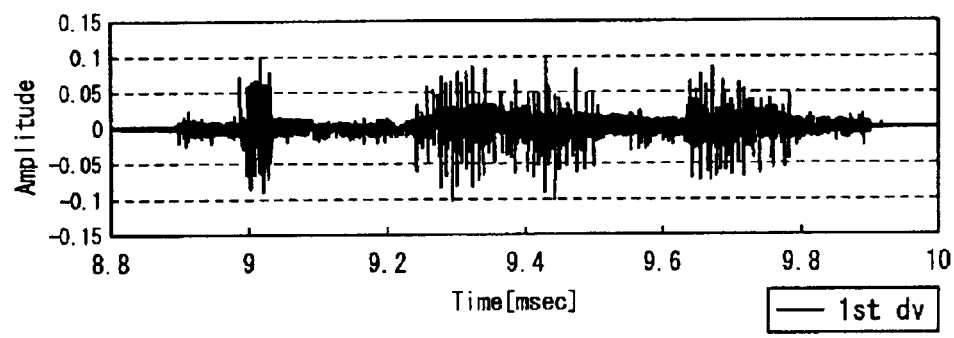
Figure 6C:
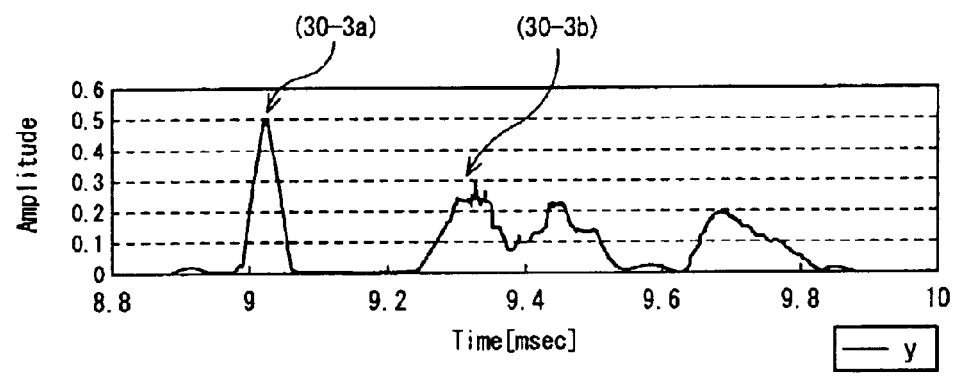

For example, the AD converter 1d converts an analog waveform (x) such as one shown in FIG. 6(a) into a digital signal, and this digital signal is supplied to the wide band differentiation processing unit 30c in which the digital signal is subjected to the wide band differentiation processing. Thus, a digital signal corresponding to an analog waveform shown in FIG. 6(b) is obtained. Further, this signal is subjected to the squaring calculation processing in the squaring processing unit 30d, and thereafter the moving average unit 30e calculates a moving average of 300 taps, for example. Thus, a digital signal corresponding to an analog waveform (y) shown in FIG. 6(c) can be obtained.

Further, the determining unit 30b has a threshold value holding unit 30f and a comparing unit 30g. When the determining unit is supplied with a result of moving average calculated by the aforesaid feature extracting unit 30a, the comparing unit 30g compares the value as the result of calculation with a predetermined threshold value held in the threshold value holding unit 30f. In this way, it is determined whether the supplied photoelectric converted signal is a signal deriving from the ray of light reflected on the bar code or not.

In more concretely, the comparing unit 30g examines whether or not the value is larger than the predetermined threshold value. If it is determined that the value exceeds the threshold value, then a signal falling in a section in which the moving average calculation is effected is a bar code signal. On the other hand, if the value does not exceed the threshold value, then it is determined that the signal is any other signal than the bar code signal. That is, since the squaring processing unit 30d squares the amplitude data, the value of the signal having undergone the moving average processing will be enlarged, with the result that it becomes easier to determine whether the signal derives from the ray of light reflected on the bar code or not based on the magnitude of the amplitude value.

In other words, the above-described feature extracting unit 30a and the determining unit 30b function as a determining unit for determining whether or not the electric signal supplied from the light receiving unit 1b is created by converting a ray of light reflected on the bar code as a medium into the electric signal.

The gate unit 30h is supplied with a signal of the result of comparing determination from the comparing unit 30g. If it is determined that the input signal is an electric signal deriving from the conversion on the ray of light reflected on the bar code, then a component of the input signal is acquired in order for the subsequent signal processing. Conversely, if it is determined that the input signal is an electric signal deriving from the conversion on any other ray of light than one reflected on the bar code, then the component of the input signal is excluded from a target to be acquired for the subsequent signal processing.

Meanwhile, the aforesaid threshold value holding unit 30f may be arranged to hold a half value (y(half)) of a value (y(max)) acquired as the maximum value of the moving-averaged value as a threshold value. When the aforesaid comparing unit 30g and the gate unit 30h carries out the cut-out processing on the input signal, as for example shown in FIG. 7, the cut-out section may be set to data (t1 to t2) corresponding to twice the time period in which the moving-averaged value exceeds the threshold value.

With the above arrangement, when a signal is acquired, the cut-out unit 1e is supplied with a bar code signal containing a signal other than one deriving from the medium (bar code) having binary digit information recorded thereon. The feature extracting unit 30a and the determining unit 30b effects the amplitude averaging calculation processing on a portion of the signal taken out of the input signal which derives from the medium having the binary digit information recorded thereon. Thus, determination is carried out. The gate unit 30h cuts out the portion of the signal from the bar code in accordance with the result of determination provided by the determining unit 30b. Then, the cut-out portion is acquired as a signal containing the binary digit information.

As described above, according to the present embodiment, the feature extracting unit 30a and the determining unit 30b can examine whether or not the electric signal supplied from the photoelectric converting unit 1b derives from conversion on a ray of light reflected on the medium into the electric signal, and the gate unit 30h responds to the result of determination in such a manner that a signal component determined as one deriving from conversion on the reflected ray of light is acquired as an acquired signal while a signal component determined as one deriving from conversion on any other ray of light than the reflected ray of light is excluded from a target to be acquired as an acquired signal. Accordingly, a signal portion other than one necessary for acquiring the binary digit information can be excluded from a target of subsequent signal processing in the information reading apparatus, and hence the processing load imposed on the apparatus can be decreased.

Furthermore, according to the present invention, when the signal acquiring section and units 1B, 1d and 1e acquire a signal from the medium having the bar code information recorded thereon, these section and units are supplied with a signal containing a signal component other than one deriving from the medium. Of the signals supplied thereto, a portion of the signal deriving from the medium having the bar code information recorded thereon is subjected to the amplitude averaging calculation processing to carry out determination. Then, the portion of the signal deriving from the medium is cut out in accordance with the result of determination, and the cut-out portion is acquired as a signal containing the binary digit information. Accordingly, a signal portion other than one necessary for acquiring the binary digit information can be excluded from a target of subsequent signal processing in the information reading apparatus, and hence the processing load imposed on the apparatus can be decreased.

Figure 8:
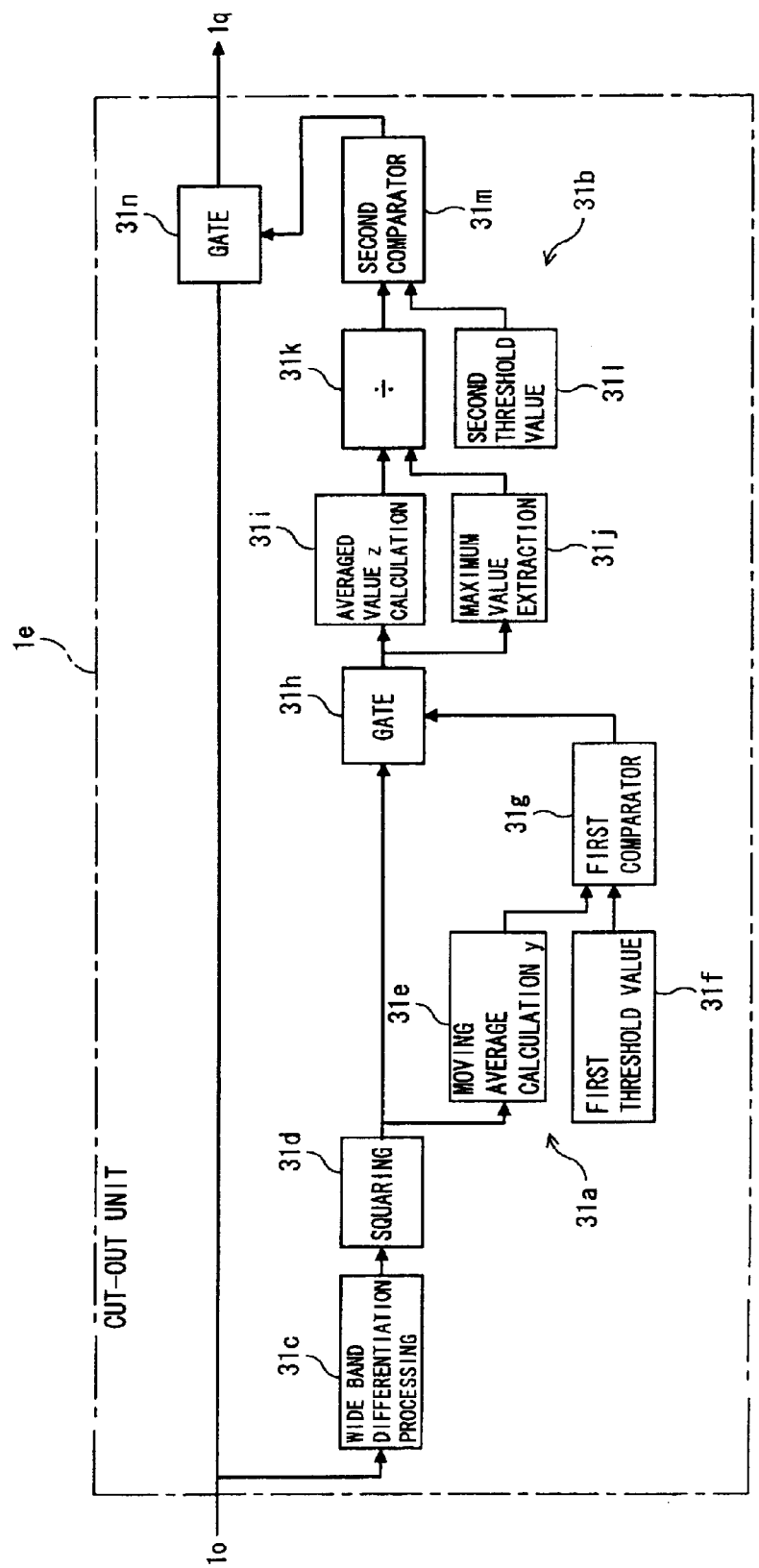
FIG. 8 is a block diagram showing a modification of the cut-out unit of the present embodiment.
Figure 9A:
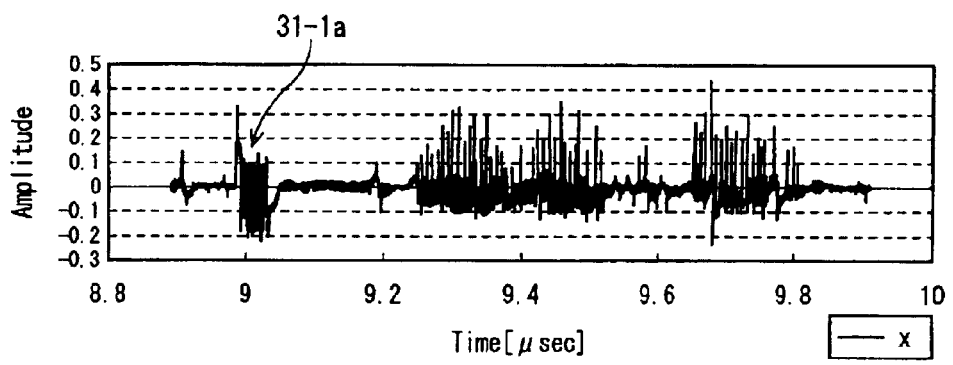
FIGS. 9(a) to 9(c) are diagrams each for explaining the modification of the cut-out unit of the present embodiment.
Figure 9B:
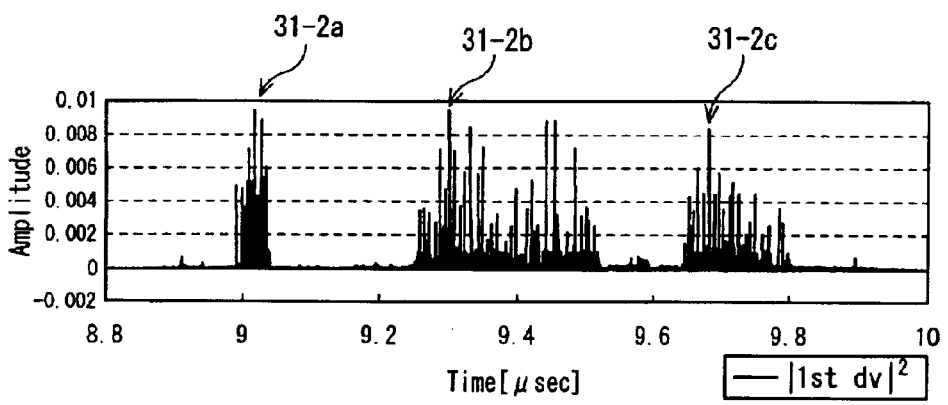
Figure 9C:
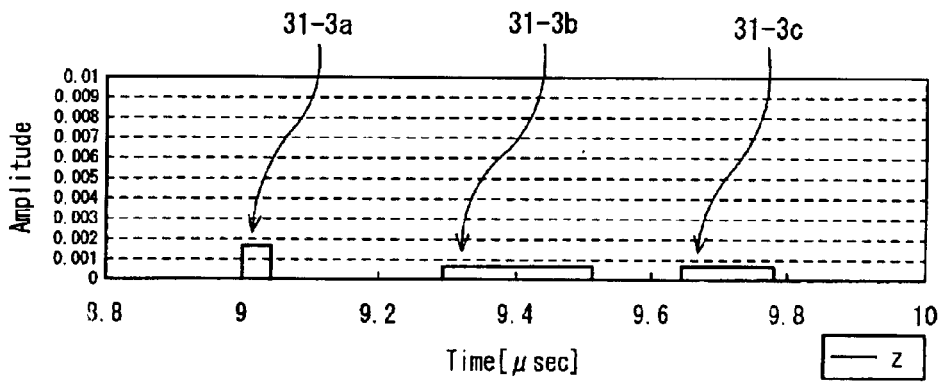

(B-2) Description of Cut-out Unit of Bar Code Reading Apparatus as Modification of Present Embodiment In addition to the arrangement shown in FIG. 5, the above-described cut-out unit 1e can be implemented by an arrangement shown in FIG. 8. That is, the cut-out unit 1e shown in FIG. 8 is arranged to include a feature extracting unit 31a, a determining unit 31b and a gate 31n. However, the main portions thereof are different from each other.

The feature extracting unit 31a is arranged to include a differentiation processing unit 31c, a squaring processing unit 31d, a moving average unit 31e, a first threshold value holding unit 31f, a first comparing unit 31g and a gate unit 31h. Each of the differentiation processing unit 31c, the squaring processing unit 31d, the moving average unit 31e, the first threshold value holding unit 31f, and the first comparing unit 31g has a function similar to that of corresponding one of components (see references 30c to 30g) in FIG. 5.

The gate unit 31h is a unit for carrying out cut-out processing on a signal squared by the squared processing unit 31d (squared signal) based on the result of comparison supplied from the first comparing unit 31g.

In more concretely, if the comparing unit 31g determines that the input signal is one deriving from conversion into the electric signal on a ray of light reflected on the bar code, the squaring processing unit 31d carries out cut-out processing on the differentiated squared signal corresponding to the signal component to supply to the determining unit 31b. Conversely, if the comparing unit 31g determines that the input signal is one deriving from conversion into an electric signal on the electric signal of a ray of light other than one reflected on the bar code, the squaring processing unit 31d excludes the differentiating squared signal corresponding to the signal component from a target of acquisition for the signal processing in the determining unit 31b.

The determining unit 31b is arranged to receive a signal supplied from the above-described feature extracting unit 31a and determines whether or not the electric signal from the light receiving unit 1b is one deriving from conversion on a ray of light reflected on the bar code. This determination can be made at an accuracy of noise signal removal higher than that of the determination in the arrangement shown in FIG. 7. The determining unit is arranged to include a mean value calculating unit 31i, a maximum value extracting unit 31j, a division processing unit 31k, a second threshold value holding unit 31l, and a second comparing unit 31m.

The mean value calculating unit 31i is a unit for calculating a mean value of the differentiated squared signal falling in a section cut out by the gate unit 31h of the feature extracting unit 31a. The maximum value extracting unit 31j is a unit for extracting the maximum value of the differentiated squared signal falling in the above-described cut-out section. The division processing unit 31k is a unit for dividing the maximum value supplied from the aforesaid maximum value extracting unit 31j by a mean value supplied from the mean value calculating unit 31i.

The second comparing unit 31m is a unit for examining whether or not the result of arithmetic operation from the division processing unit 31k stays under a threshold value held in the second threshold value holding unit 31l. If the result of arithmetic operation stays under the threshold value, then it is determined that the signal falling in the section is one deriving from conversion into an electric signal on a ray of light reflected on the bar code. Conversely, if the result of arithmetic operation does not stay under the threshold value, then it is determined that the signal falling in the section is an electric signal deriving from conversion on a ray of light other than one reflected on the bar code.

In other words, the aforesaid gate unit 31h carries out examination on a value deriving from dividing the maximum value of the signal falling in the cut-out section by the mean value. Then, the difference between the maximum value and the mean value is examined. If it is determined that the difference is smaller than the threshold value, then the signal is regarded as a bar code signal and cut out. That is, the signal of the bar code portion has a nature that an amplitude variation is relatively even as compared with other noise portions. Therefore, if the difference between the maximum value and the mean value is relatively small as compared with those of signals of other sections, then the signal can be regarded as a bar code signal.

Similarly to the corresponding component (one identified by reference 30h) in FIG. 5, the gate unit 31n responds to the result of comparing determination supplied from the second comparing unit 31m in such a manner that if the input signal is one deriving from the conversion into the electric signal on the ray of light reflected on the bar code, then the component of the signal falling in the section is acquired for the subsequent signal processing, and if the input signal is one deriving from the conversion into the electric signal on one other than the ray of light reflected on the bar code, then the component of the signal falling in the section is excluded from a target of acquisition for the subsequent signal processing.

When the above-described arrangement examines the ray of light received by the light receiving unit 1b to determine whether the ray of light is one scanning the bar code (mark) by the optical scanning section 1A, the following steps are carried out. That is, the wide band differentiation processing unit 31c effects differentiation processing on the optical signal containing a variation of intensity thereof, the squaring processing unit 31d squares the differentiated signal supplied from the wide band differentiation processing unit 31c, and thereafter the moving average unit 31e calculates a moving average on the differentiated squared signal supplied from the squaring unit 31d.

The first comparing unit 31g examines whether the calculated moving average value exceeds a predetermined first threshold value or not. The gate unit 31h responds to the result of determination supplied from the first comparing unit 31g in such a manner that if it is determined that the moving average value exceeds the first threshold value, then the differentiated squared signal is validated while if it is determined that the moving average value does not exceed the first threshold value, then the differentiated squared signal is invalidated.

The mean value calculating unit $31i$ is supplied from the gate unit $31h$ with the differentiated squared signal falling in the effective period, and calculates a mean value of the differentiated squared signal. The maximum value extracting unit $31j$ extracts the maximum value of the differentiated squared signal falling in the effective period supplied from the gate unit $31h$.

The dividing unit $31k$ divides the maximum value extracted by the aforesaid maximum value extracting unit $31j$ by the mean value calculated by the mean value calculating unit $31i$, so that calculation is made to determine difference between the mean value and the maximum value of the differentiated squared signal falling in the validated period.

The second comparing unit $31m$ compares a divided value representing the difference between the mean value and the maximum value calculated by the dividing unit $31k$ with a second threshold value held in the second threshold value holding unit $31l$, and outputs the result of comparing determination to the gate unit $31n$.

The gate unit $31n$ responds to the result of comparing determination supplied from the second comparing unit $31m$ in such a manner that if the divide value is smaller than the second threshold value, then a part of the intensity variation state detecting signal is cut out at the corresponding period and only the cut-out portion of the signal is acquired to feed it to the subsequent adaptive-type band limiting differentiating unit $1f$ while if the divide value is larger than the second threshold value, then the part of the intensity variation state detecting signal at the corresponding period is excluded from a target to be acquired.

For example, the AD converter $1d$ converts an analog waveform (x) such as one shown in FIG. $9(a)$ into a digital signal, and this digital signal is supplied to the wide band differentiation processing unit $31c$ and the squaring processing unit $31d$ in which the digital signal is subjected to corresponding steps of processing, respectively. Thus, a digital signal corresponding to an analog waveform shown in FIG. $9(b)$ is obtained. Further, this signal is subjected to the following processing. That is, a part of the signal falling in a section is cut out by the gate unit $31h$ and the maximum value is determined in the part of the signal falling in the section. Then, the maximum value is divided by a mean value calculated as shown in FIG. $9(c)$. In this way, it becomes possible to obtain a divided value representing the difference between the maximum value and the mean value.

In this case, of the differentiated squared signal portions in sections $31\text{-}2a$ to $31\text{-}2c$ cut out by the gate unit $31h$, if the second comparing unit $31m$ determines that the divided value stays under the threshold value only in the section $31\text{-}2a$ of the signal portion shown in FIG. $9(b)$, then the signal of the section $31\text{-}2a$ (see reference $31\text{-}1a$ of FIG. $9(a)$) is acquired as the bar code signal, and outputted to the subsequent stage (in more concretely, the adaptive-type band limiting differentiation processing unit $1f$).

In FIG. $9(b)$, as for the bar code signal portion of the differentiated squared signal falling in the section $31\text{-}2a$ and noise portions of the same falling in the sections $31\text{-}2b$ and $31\text{-}2c$, the maximum values are "0.009384", "0.009380", and "0.008213", respectively, and the mean values of the same are "0.00163", "0.000548", and "0.000455", respectively. Thus, the results of division in the division processing unit $31k$ are "5.757", "17.12" and "18.05", respectively.

In this case, the second comparing unit $31m$ may be set to have a comparing reference "10" as the second threshold value. With this setting, if the result of division made by the division processing unit $31k$ is equal to or smaller than "10" as in the case of section $31\text{-}2a$, then the signal falling in the section can be regarded as a bar code signal. Conversely, if the result of division made by the division processing unit $31k$ is larger than "10" as in the case of sections $31\text{-}2b$ and $31\text{-}2c$, then the signal falling in the sections can be regarded as not the bar code signal.

Accordingly, also in this case, the feature extracting unit $31a$ and the determining unit $31b$ can examine whether or not the electric signal supplied from the light receiving unit $1b$ is one deriving from conversion into the electric signal on the ray of light reflected on the medium. And the gate unit $31n$ responds to the result of examination in such a manner that a signal component determined as one deriving from conversion on the reflected ray of light into the electric signal is acquired as an acquired signal while a signal component determined as one deriving from conversion into the electric signal on any other ray of light than the reflected ray of light is excluded from a target to be acquired as an acquired signal. Accordingly, a signal portion other than one necessary for acquiring the binary digit information can be excluded from the target of subsequent signal processing in the information reading apparatus, and hence the processing load imposed on the apparatus can be decreased. In addition, the noise removal can be carried out at an accuracy higher than in the case of aforesaid FIG. 5. Therefore, load of signal processing imposed on the subsequent stage can be decreased.

According to the arrangement of the bar code reading apparatus of the present embodiment, the AD converter is provided, an electric signal supplied from the light receiving unit $1b$ is subjected to conversion from an analog signal to a digital signal and resulting signal is supplied to the feature extracting unit $30a$ and the determining unit $30b$. Then, it is examined whether or not the electric signal is one deriving from conversion into the electric signal on a ray of light reflected on the bar code based on the digital signal supplied from the AD converter $1d$. However, according to the present invention, arrangement can be made in such a manner that the AD converter is obviated and a circuit is provided so that an analog signal supplied from the analog processing section $1B$ can be subjected to the cut-out processing in a manner similar to one in the above-described case by using an analog signal.

(C) Detailed Description on Adaptive-Type Band Limiting Differentiating Unit of Bar Code Reading Apparatus According to Present Embodiment The adaptive-type band limiting differentiating unit If of the bar code reading apparatus according to the present embodiment will be hereinafter described in detail.

(C-1) Description of Main Portion of Adaptive-type Band Limiting Differentiating Processing According to Present Embodiment Initially, a main portion of the signal processing carried out in the adaptive-type band limited differentiating unit $1f$ will hereinafter be described with reference to FIGS. 10 and 11.

Figure 10:
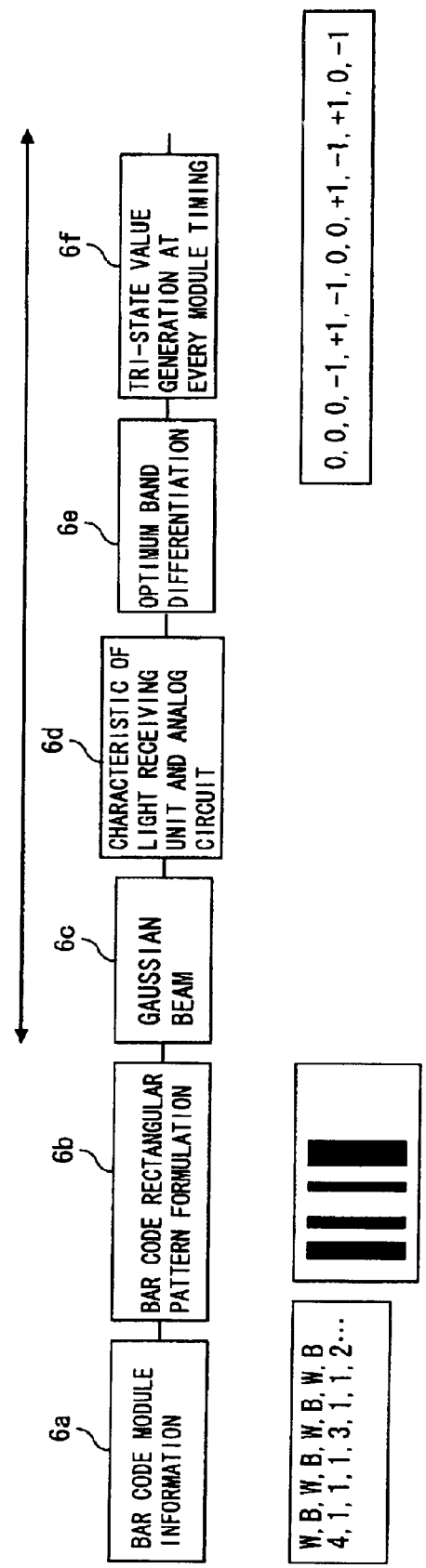

The bar code to be read by using the bar code reading apparatus shown in FIG. 1 can be obtained by creating a printed pattern $6b$ composed of white and black elements as shown in FIG. 10 based on the module information (binary digit information having a predetermined information length composed of information elements arrayed one-dimensionally) $6a$.

When the bar code reading apparatus reads the bar code arranged as described above, a laser beam (Gaussian beam)

6c is scanned on the bar code to make the scanning light beam be reflected thereon. The reflected light beam is collected by the light receiving unit 1b of the bar code reading apparatus in which the reflected light beam is converted in a photoelectric manner. The photoelectric converted signal is amplified by the amplifying unit 1c up to a level suitable for processing in the subsequent stage (see reference 6d in FIG. 10 and FIGS. 11(a) to 11(d)).

Figures 11A, 11B, 11C, 11D, 11E:
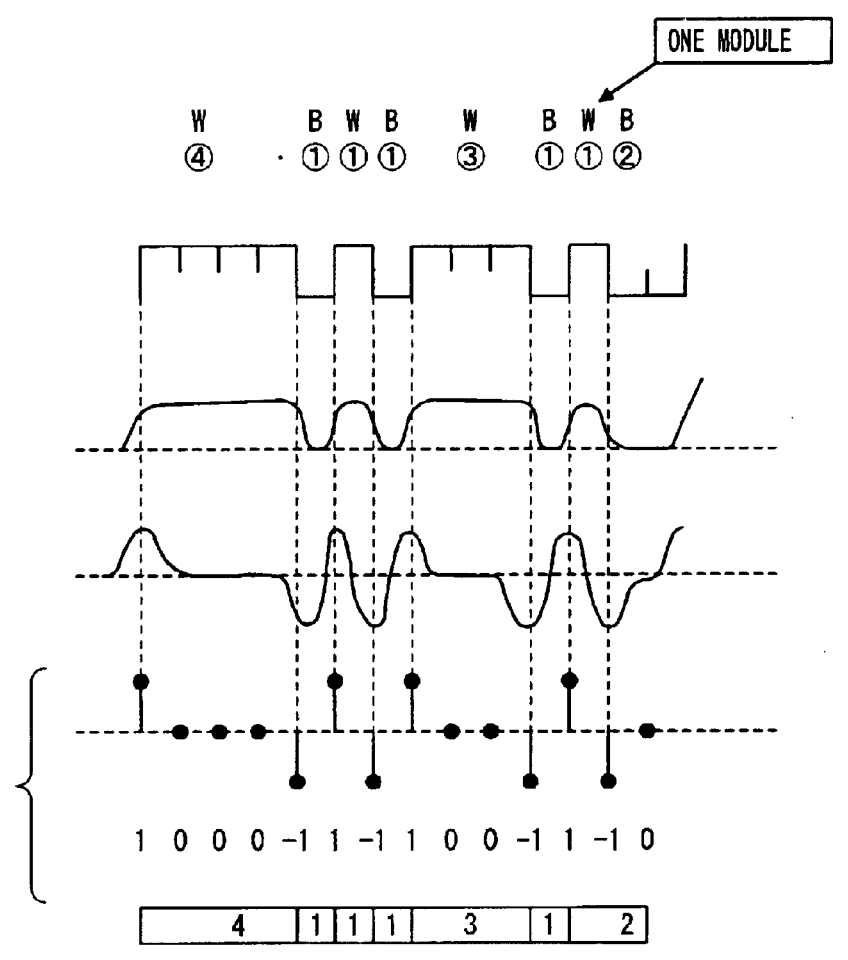

Further, the photoelectric converted signal amplified by the amplifying unit 1c is subjected to an optimum band differentiation processing based on a module frequency f mod (see reference 6e of FIG. 10 and FIG. 11(e)). A module timing is extracted from this signal, and an amplitude value is extracted based on the timing to convert the signal in to a series of tri-state values composed of "1", "0" and "−1" (see FIGS. 10 and 11(f)).

In other words, on the basis of the acquired signal acquired by the analog processing section 1B, information regarding an elemental unit length (module length) of the information length of the binary digit information is extracted. As the module length information, an elemental frequency (module frequency) corresponding to the module length is extracted. On the basis of the extracted module frequency information, the acquired signal is subjected to the band limiting processing and thereafter a ratio of the information length of the binary digit information (bar code information) is read.

Therefore, as a preprocessing for reading the ratio data of the information length of the binary digit information, an elemental frequency corresponding to the elemental unit length (module length) is extracted from the acquired signal, and the acquired signal is subjected to a process of frequency band limitation based on the extracted elemental frequency.

The characteristic of the optimum band differentiation processing in the above processes may be arranged in such a manner that the gain characteristic thereof is set to a cosine wave equivalent characteristic having a gain peak frequency which corresponds to the elemental width time of the white-black width information of the input signal or a frequency slightly larger than that frequency, and the phase characteristic thereof is set to one linearly variable with respect to the frequency.

The band limiting differentiation processing unit 1h carries out a digital filtering processing by using a transversal filter described with reference to FIG. 3. The gain characteristic of the filter is determined in accordance with the following Equations (2) to (4) depending on the module frequency and the phase characteristic thereof is determined in accordance with Equation (5).

In the discussion of Equations (2) to (4), if fs is set to the sampling frequency of the AD converter 1d, the AD converter 1d is not provided, and the aforesaid band limiting differentiation processing 1h is formed of an analog filter, the following Equation (3) becomes unnecessary. In the following Equations, f mod is set to half the module frequency.

$$\cos((f-f \text{ mod})\pi/(2^*f \text{ mod})):0 \leq f \leq 2^*f \text{ mod} \quad (2)$$

$$\cos(((f-(fs-f \text{ mod}))\pi/(2^*f \text{ mod})):fs-2^*f \text{ mod} \leq f \leq fs \quad (3)$$

$$0: 2^*f \text{ mod} \leq f \leq fs-2^*f \text{ mod} \quad (4)$$

$$\theta[\text{rad}]=-\pi/fs^*f+\pi/2(-fs/2<f<fs/2) \quad (5)$$

The characteristic values are determined as follows. That is, fs is divided equally by n (n is set to any second power number) and resulting numbers are identified by g0 to gn−1, respectively. When a filter characteristic is identified by the gain characteristic and the phase characteristic, the real part Re and the imaginary part Im are calculated as shown in the following Equations (6) and (7). Then, IFFT (Inverse Fast Fourier Transform) calculation processing is effected on the complex number to determine filter coefficients C0 to Cn−1.

$$Re(n)=gn^*\cos(\theta n) \quad (6)$$

$$Im(n)=gn^*\sin(\theta n) \quad (7)$$

Then, a convolution filter is arranged so that a coefficient Cn/2 of the obtained coefficients C0 to Cn−1 is set to the center of filter taps.

Figure 12:
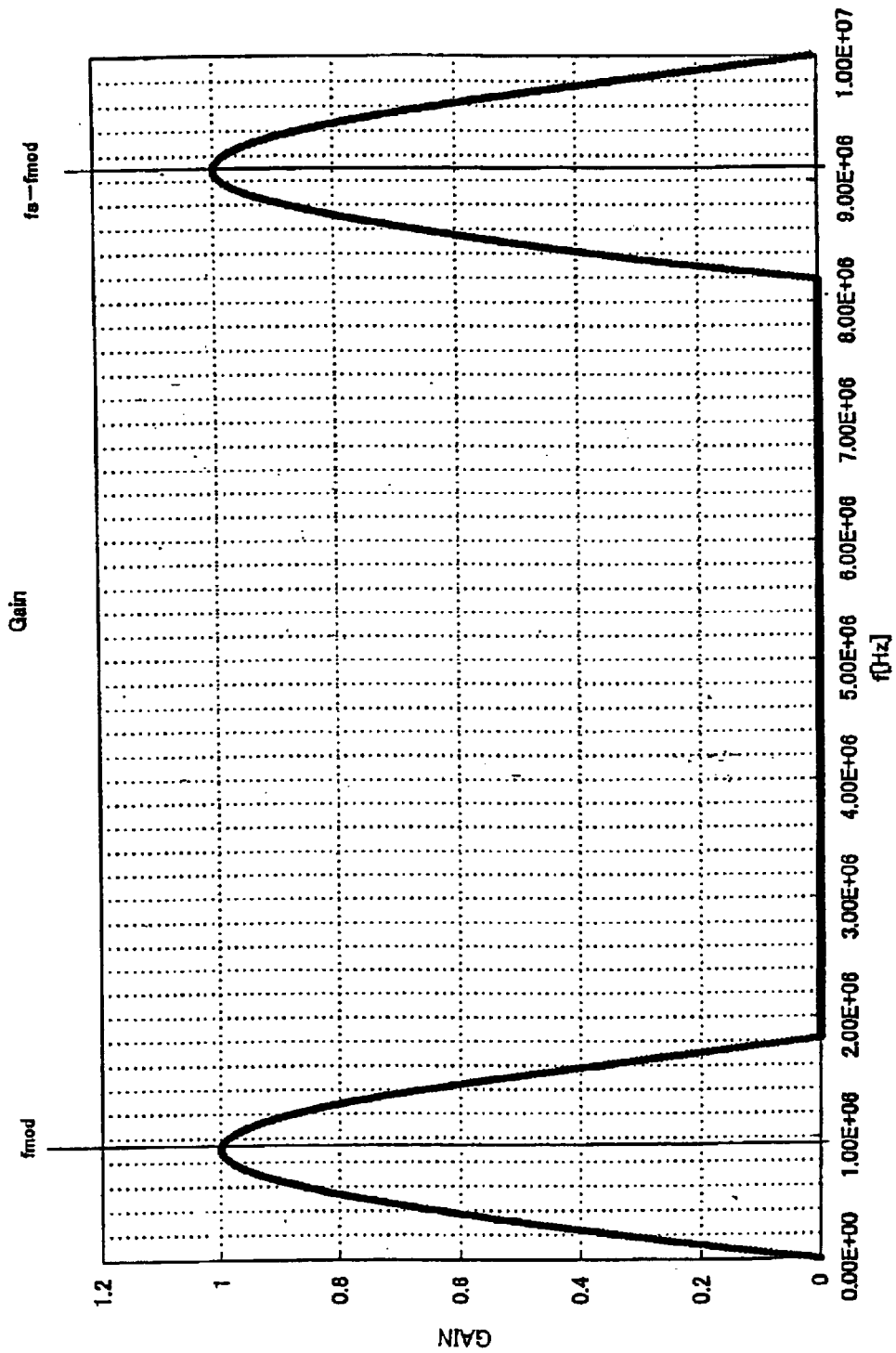
Figure 13:
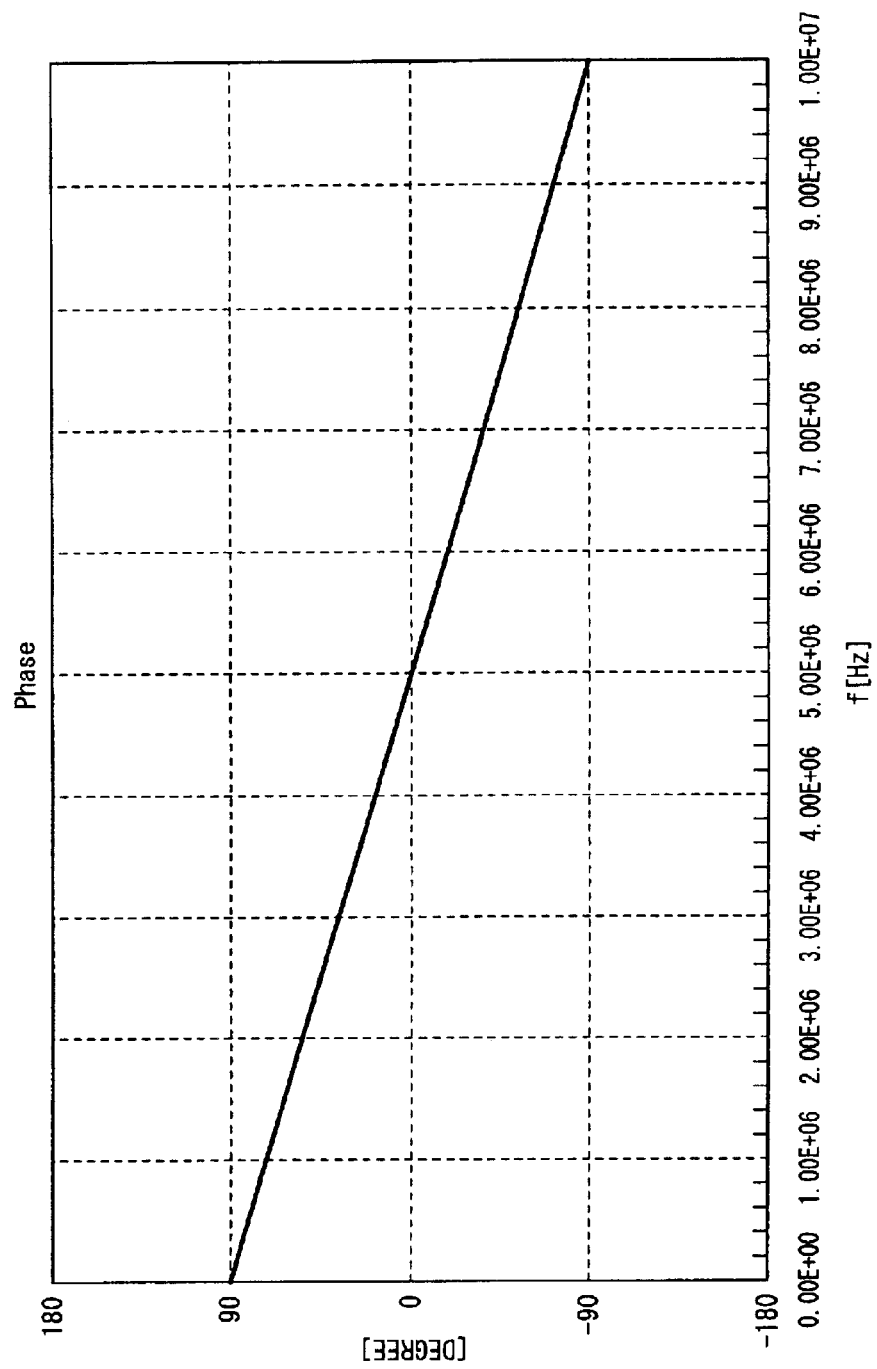
Figure 14:
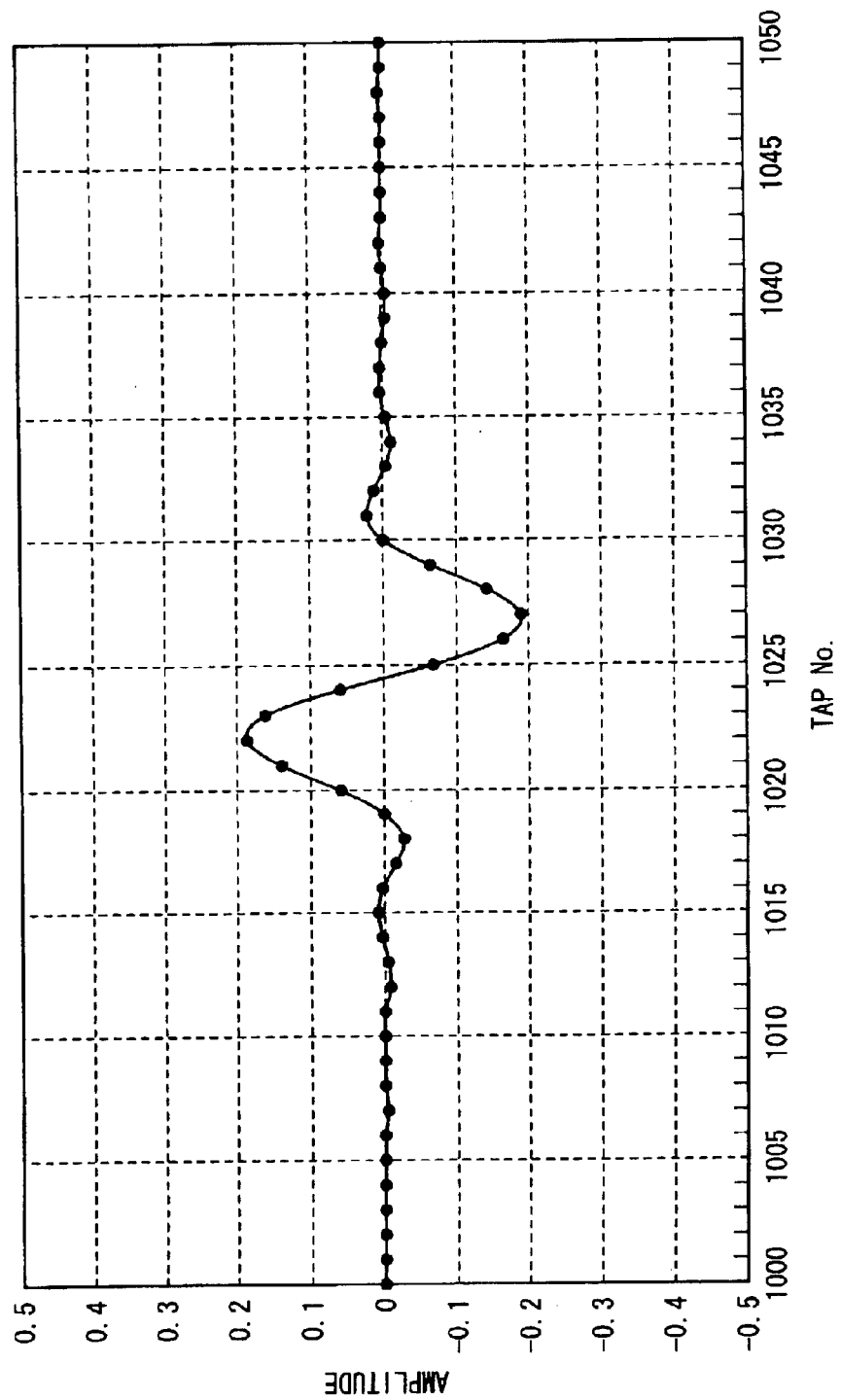
Figure 15:
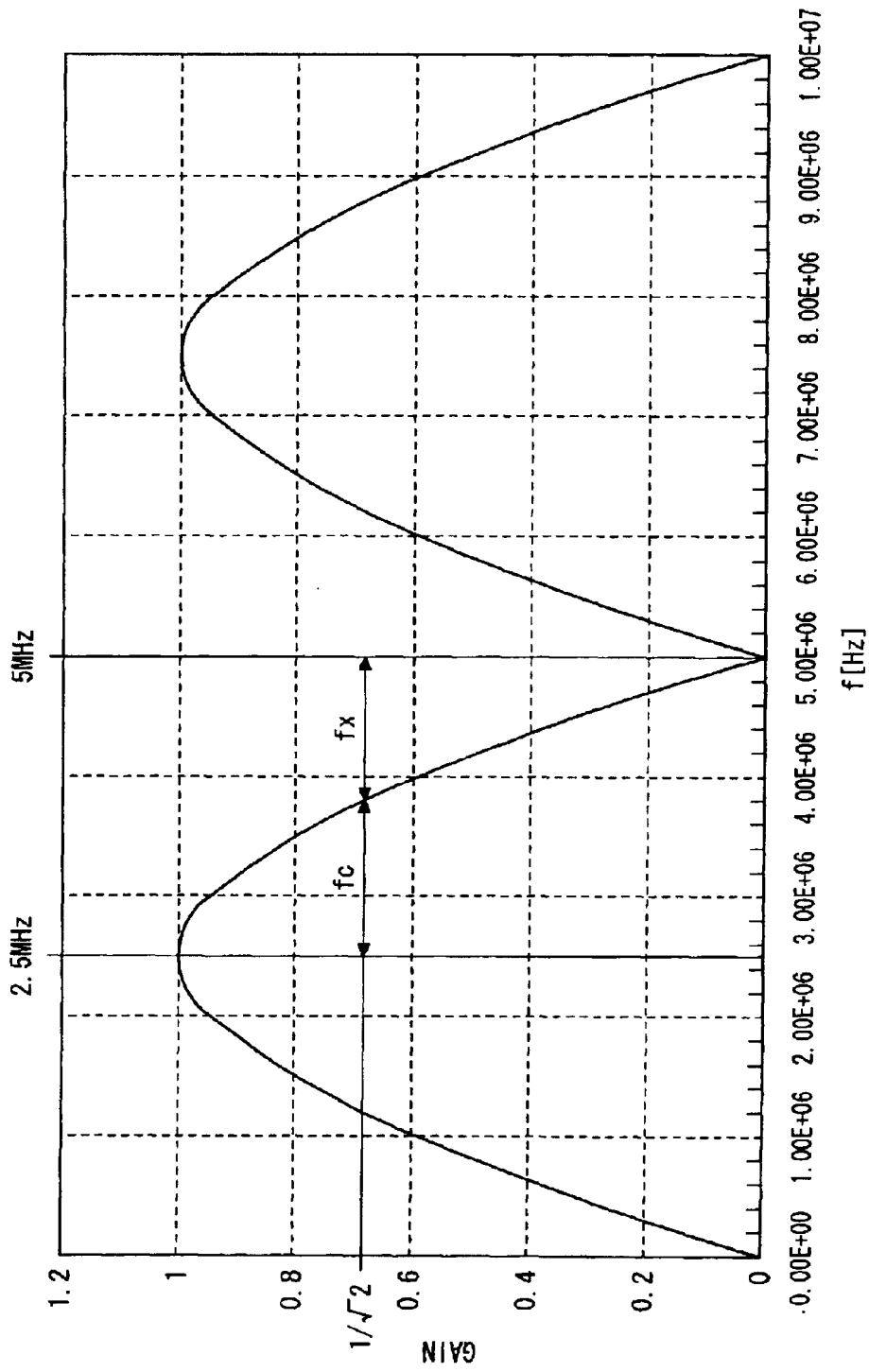
Figure 16:
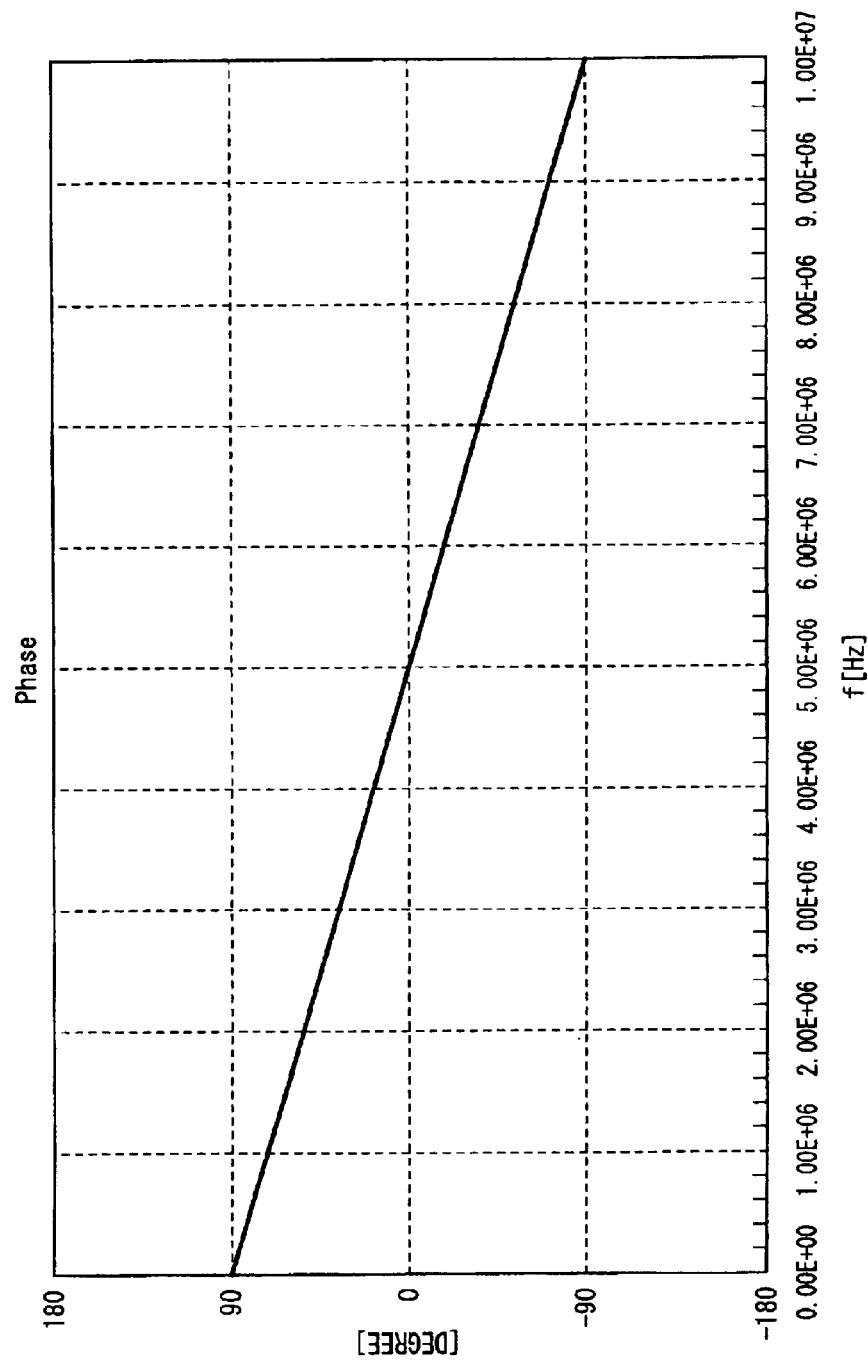
Figure 17:
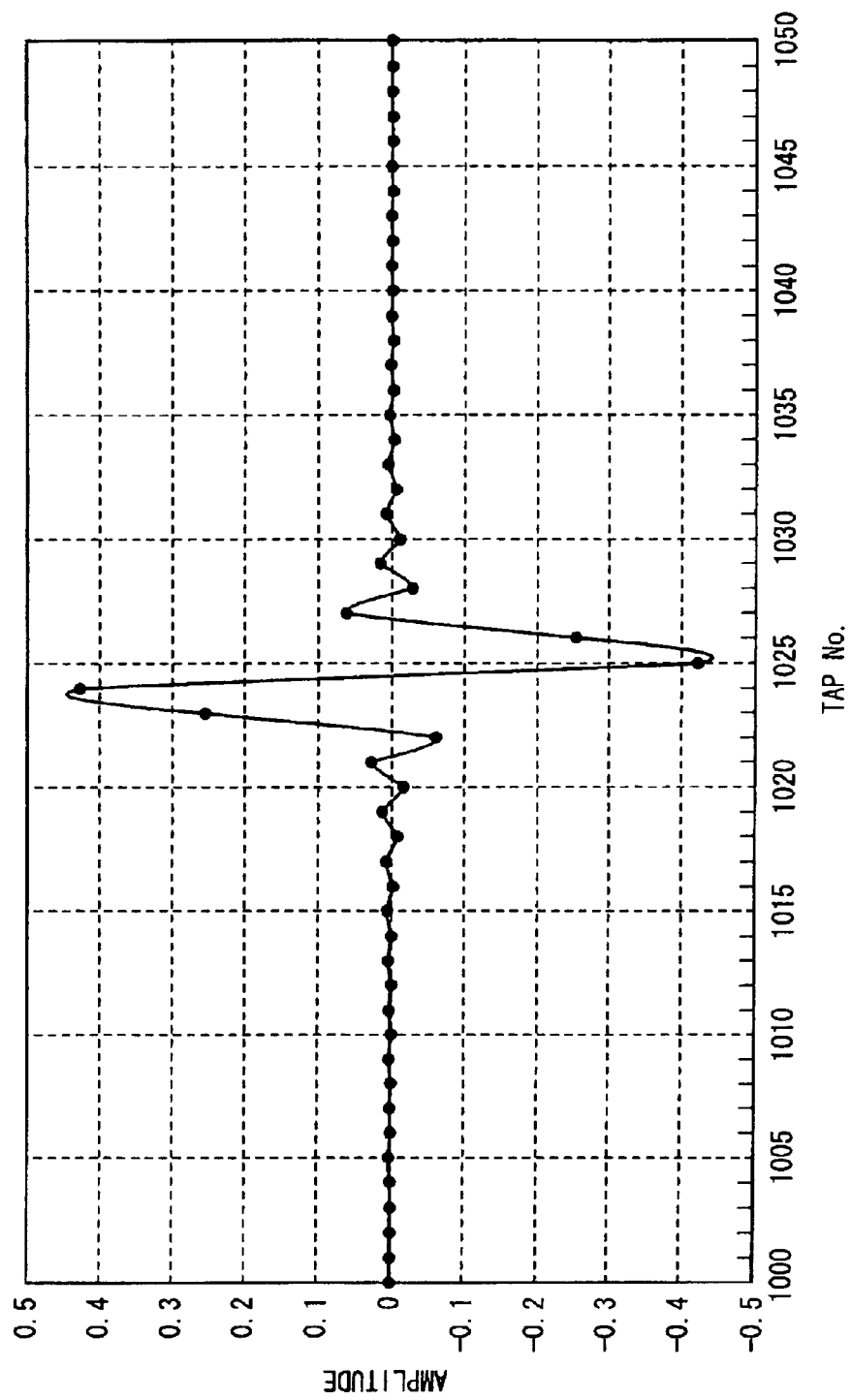

FIGS. 12 to 14 are diagrams showing a gain characteristic, a phase characteristic and a convolution characteristic to which reference is made to examine how these coefficients are determined if a frequency of f mod, or the half of the module frequency is 910 kHz. Also, FIGS. 15 to 17 are diagrams showing a gain characteristic, a phase characteristic and a convolution characteristic to which reference is made to examine how these coefficients are determined if f mod is set to 2.5 MHz.

Figure 18:
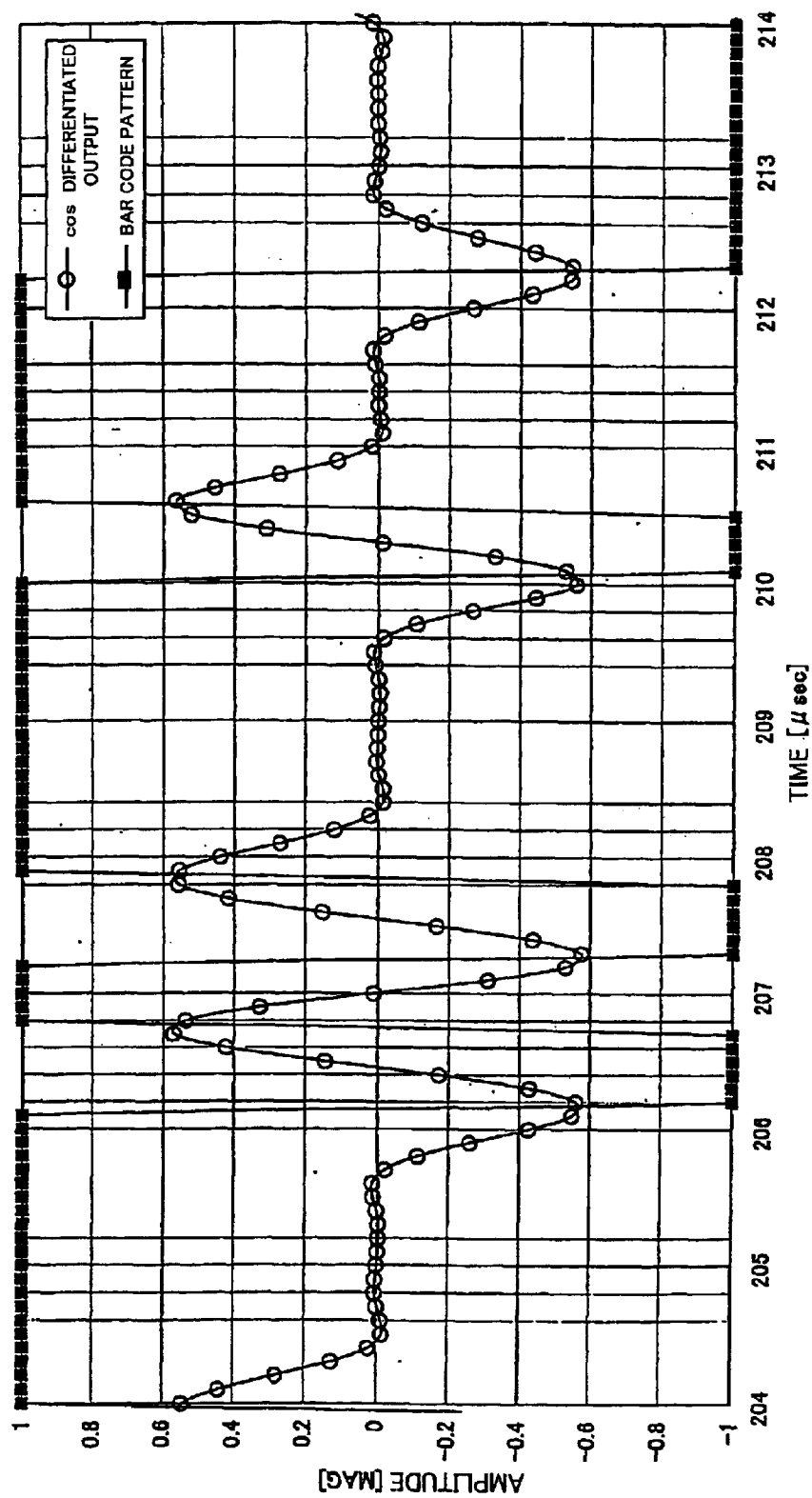

The photoelectric converted signal amplified by the amplifying unit 1c is converted into a series of discrete values by the AD converter 1d, and the resulting signal is subjected to the filter arithmetic operation (convolution operation) having the above-described characteristic. Then, an output signal comes to have a differentiated waveform as shown in FIG. 18. That is, this waveform becomes such one that when the scanning light beam shifts from a black bar to a white bar, the corresponding signal point takes the maximum value, when the scanning light beam shifts from a white bar to a black bar, the corresponding signal point takes the minimum value, and when the scanning light beam stays in a continuous region of a single black or white bar, the corresponding signal point converges on the zero point.

That is, as shown in FIG. 18, if the gain peak frequency of the filter is coincident with the frequency of half the module frequency of the input signal, the signal becomes optimum in which the edge information is reserved and a high frequency noise components are removed.

Figure 19:
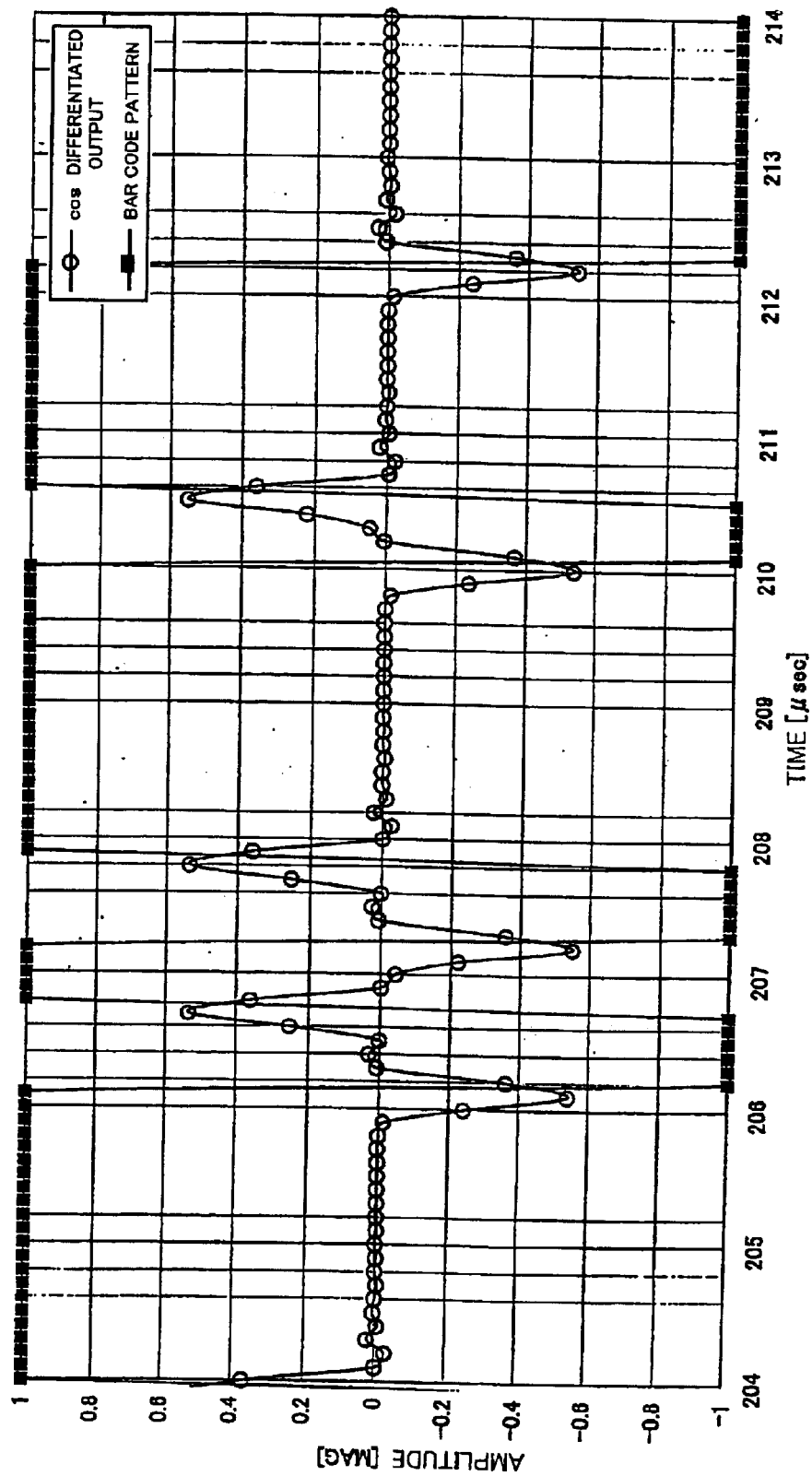

If the gain peak frequency of the filter is set to one larger than the frequency of half the module frequency of the input signal, as shown in FIG. 19, the output signal thereof comes to have a differentiated waveform in which the edge information is not deteriorated but a high frequency component is contained.

Figure 20:
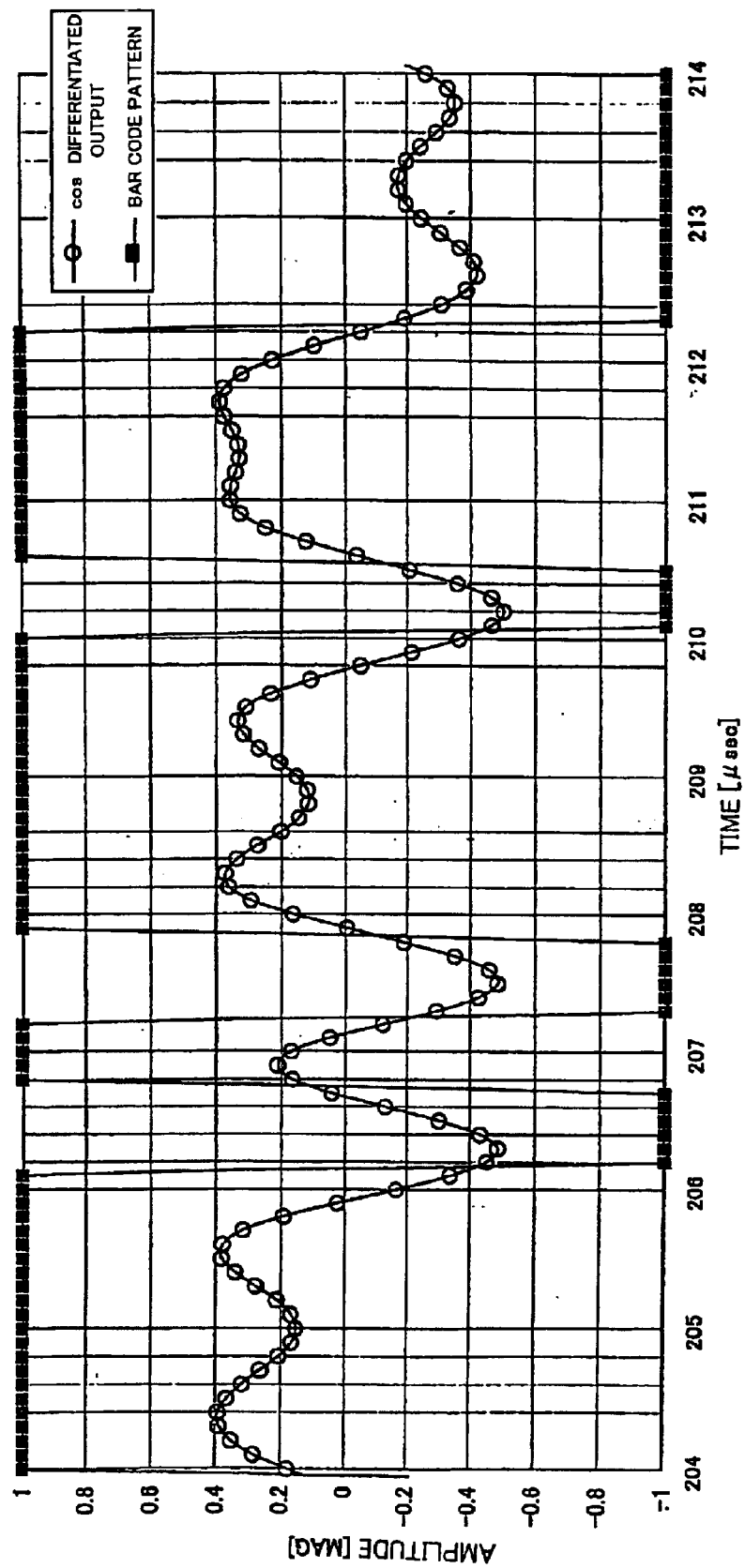

Conversely, if the gain peak frequency of the filter is set to one smaller than the frequency of half the module frequency of the input signal, as shown in FIG. 20, the edge information can be deteriorated due to inter symbol interference of the bar code pattern.

According to the present embodiment, respective steps stemming from one in which the intensity variation signal detecting signal of the reflected ray of light is acquired to one in which the integer number ratio between each width length data pair of the bar code have a differential processing characteristic of a time interval which is substantially equal to a time interval of the elemental width time (time corresponding to the elemental unit length) or a time interval slightly smaller than that time interval. For this reason, the above-described noise component can be prevented from being contained in the signal and the inter symbol interference can be prevented from being brought about.

As for the case of FIG. 12, the differentiating processing can be effected at a band characteristic of 2 MHz which is narrower than the band of the sampling frequency with respect to the acquired signal when the AD converter 1d has a sampling frequency of 10 MHz. Further, as for the case of FIG. 15, the differentiating processing can be effected at a band characteristic of 5 MHz which is narrower than the band of the sampling frequency. On the other hand, if the differentiation processing is carried out in a band of which frequency is equal to or more than the sampling frequency, the waveform comes to have a characteristic that a peak is created at 5 MHz point in FIG. 12 and no aliasing is included. Therefore, it is impossible to obtain a digital filter having a narrow band characteristic which can serve as the aforesaid band limiting differentiation processing unit 1f.

Accordingly, when acquisition is made on a signal containing binary digit information having a predetermined information length deriving from data elements arrayed on the medium one-dimensionally as values sampled at every equal time interval by the AD converter 1d, and a module length as the elemental unit length of the information length of the binary digit information is extracted from the acquired signal, the series of steps stemming up to one in which the binary digit information is extracted from the medium information take a band narrower than the band of the differentiation characteristic for the aforesaid sampling frequency.

Further, the module frequency extracting unit 1g extracts the aforesaid module length information as the elemental frequency information (module frequency information) corresponding to the elemental unit length, the band limiting differentiation processing unit 1h effects band limitation and differentiation processing on the read signal based on the extracted elemental frequency information, and thereafter the every module point amplitude extracting unit 1i and the module number calculating unit 1m read the ratio of the information length of the binary digit information.

Accordingly, when the elemental unit length of the information length of the binary digit information is extracted from the acquired signal, the signal portion in which the state of the binary digit information is extracted from the medium information can take a band narrower than that of the characteristic for differentiation of the equal time interval. Therefore, when at least the information length of the binary digit information is read, differentiation processing can be carried out for limiting the band to the optimum one.

The above explanation of the optimum band differentiation processing of the present embodiment is intended to describe the processes for acquiring an ideal differentiated waveform from the bar code pattern. Meanwhile, it is needless to say that, with the optimum band differentiation processing, factors such as influence from the Gaussian beam, a distortion characteristic due to a delay of circuit and so on can be removed.

Further, while the above explanation is made on a case in which the scanning is made by a Gaussian beam, the above explanation can be applied to a case in which the bar code pattern is acquired by a CCD (Charge Coupled Device) and the bar code character is demodulated, for example.

Furthermore, while the above explanation is made on a case in which the acquired signal is converted into discrete values by the AD converter 1d, the subject technology can be applied to a case in which an analog filter is introduced. Moreover, in the above description, the phase is set to one varying lineally, the way of varying the phase is not limited to the case, but the characteristic thereof may be set to one in which a phase shift of about 90 degrees may be introduced in the range of f=0 to fs/2, for example.

(C-2) Description of Main Portion of Optimum Band Differentiation Processing in Modification of Present Embodiment In the above case of (A-4), the optimum band differentiation processing effected by the band limiting differentiation processing unit 1h is implemented by a filtering processing by a filter having a gain characteristic of a cosine characteristic, the gain characteristic of the filter is not limited to the above one. That is, the filter may be arranged to have a characteristic approximated to the aforesaid cosine characteristic or a squared cosine characteristic expressed by the following Equations (8) to (10), for example, and the differentiation processing can be carried out by such a filter in a manner similar to that described above.

$$\cos^2((f-f \bmod)\pi/(2*f \bmod)): 0 \leq f \leq 2*f \bmod \quad (8)$$

$$\cos^2(((f-(fs-f \bmod))\pi/(2*f \bmod)): fs-2*f \bmod \leq f \leq fs \quad (9)$$

$$0: 2*f \bmod \leq f \leq fs-2*f \bmod \quad (10)$$

That is, the characteristic of the filter for carrying out the aforesaid optimum band differentiation processing is such one that the gain characteristic thereof is set to a squared cosine wave of which cosine function is equivalent to characteristic having a gain peak frequency corresponding to the elemental width time of the white-black width information of the input signal or a frequency slightly larger than that frequency, and the phase characteristic thereof is set to one linearly variable with respect to the frequency.

Also in the discussion of Equations (8) to (10), fs represents the sampling frequency of the AD converter 1d. Therefore, if the AD converter 1d is not provided and the aforesaid band limiting differentiation processing 1h is formed of an analog filter, then condition expressed by the above Equation (9) becomes unnecessary.

Description will be made for reference on a case in which the aforesaid filter characteristic is arranged so that the gain characteristic is set to a cosine characteristic and the phase characteristic takes 0 [rad] throughout the whole range of the frequency.

Figure 21:
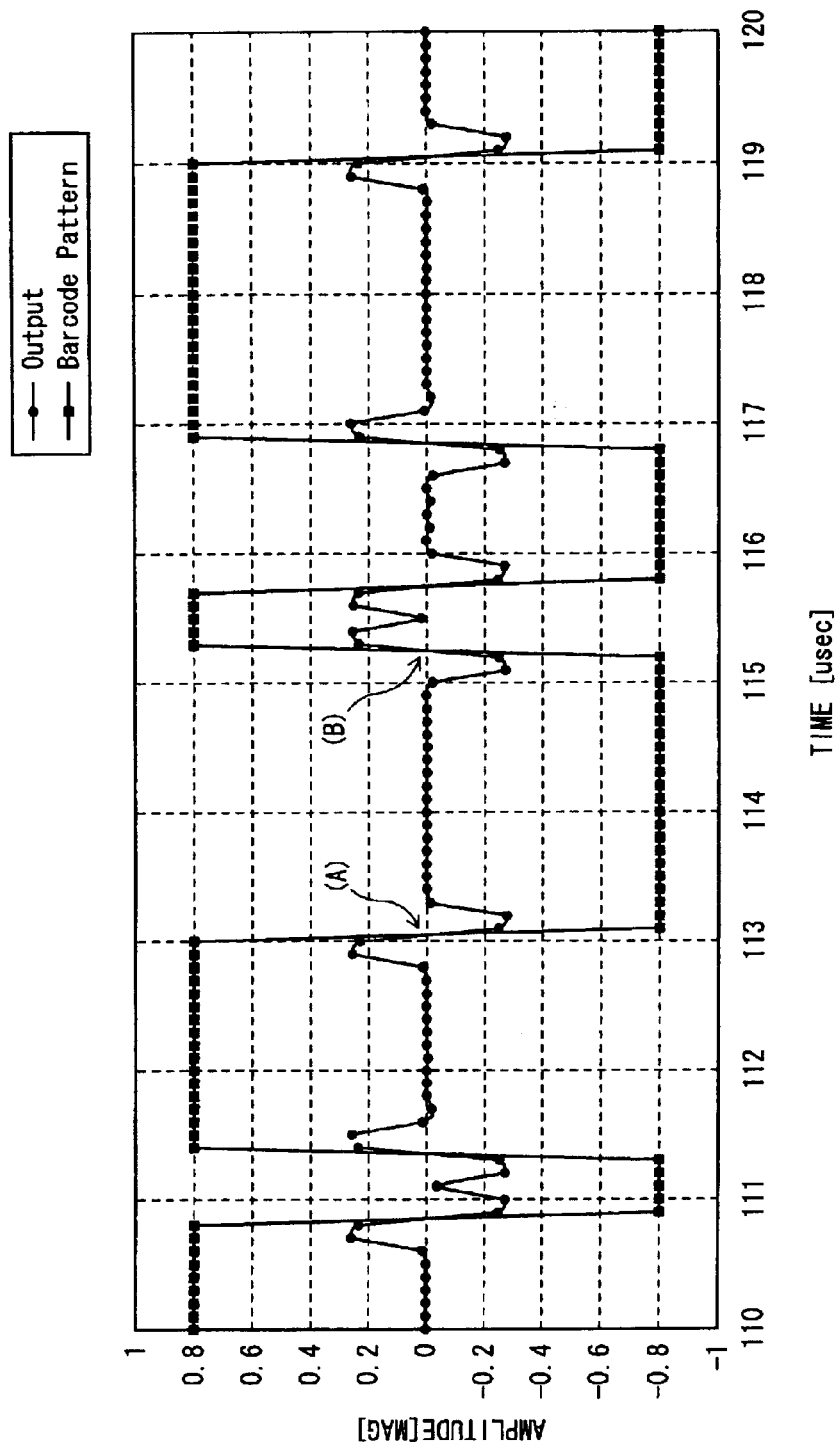

In this case, the module frequency is necessary to be set to the center frequency. FIG. 21 shows a resulting waveform of the signal having undergone the filter. As will be understood from the waveform, the edge information of the bar code signal resides in each zero-cross point (e.g., a point A or B in the figure).

Accordingly, if a circuit having the aforesaid filter characteristic is employed, the subsequent processing (e.g., a processing in the every module point amplitude extracting unit 1i) can employ a conventional system for extracting the zero-cross point in order to extract the bar code module number. Also in this case, the gain characteristic may be set not to the cosine characteristic but to a squared cosine characteristic.

Figure 22:
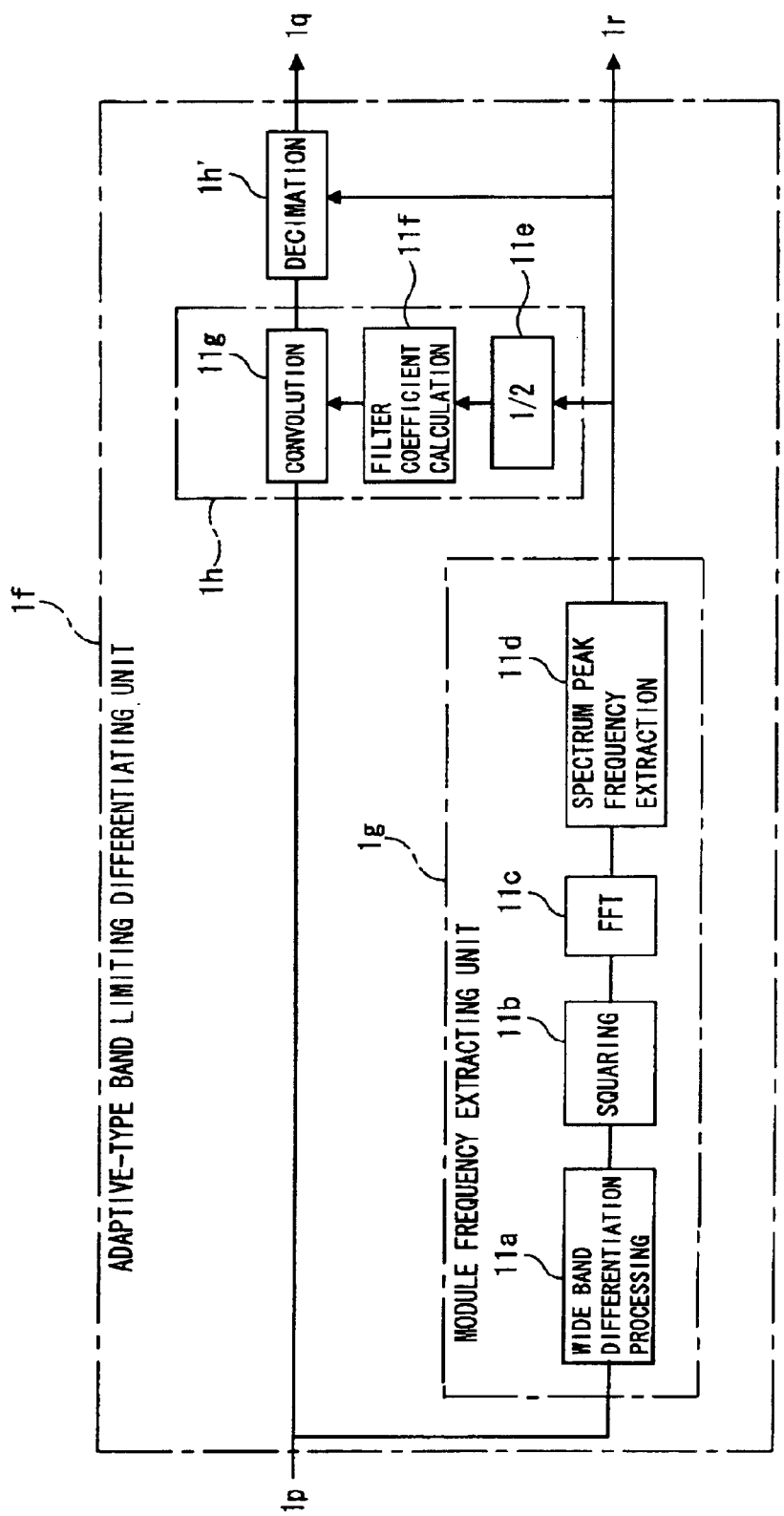
FIG. 22 is a block diagram showing an adaptive-type band limiting differentiating unit of the present embodiment.

(C-3) Description of Adaptive-Type Band Limiting Differentiating Unit of Bar Code Reading Apparatus According to Present Embodiment FIG. 22 is a block diagram showing the adaptive-type band limiting differentiating unit of the bar code reading apparatus according to the present embodiment. As shown in FIG. 22, the adaptive-type band limiting differentiating unit if is arranged to have the module frequency extracting unit 1g, the band limiting differentiation processing unit 1h and a decimation processing unit 1h'.

The module frequency extracting unit (elemental frequency extracting unit) 1g can be more fully broken down into components of a wide band differentiation processing unit 11a, a squaring processing unit 11b, an FFT processing unit 11c and a spectrum peak frequency extracting unit 11d. The module frequency extracting unit serves as a unit for extracting the module frequency information as the elemental frequency from the photoelectric converted signal (digital signal) which is cut out by the cut-out unit 1e.

The wide band differentiation processing unit 11a is a unit for effecting wide band differentiation processing on the photoelectric converted signal (digital signal) cut out by the cut-out unit 1e. In more concretely, the wide band differentiation processing unit carries out a filter processing with a filter having a characteristic in which a value larger than the maximum frequency of the acquire signal in a readable region is set to a gain peak frequency, in a manner described above in detail in (C-1).

The squaring unit 11b is a unit for squaring the signal having undergone the differentiation processing in the wide band differentiation processing unit 11a. The FFT processing unit 11c is a unit for effecting an FFT (Fast Fourier Transform) processing on the differentiated squared signal squared in the squaring processing unit 11b. The spectrum peak frequency extracting unit 11d is a unit for extracting information regarding the peak frequency from the frequency spectrum obtained as a result of the aforesaid FFT processing.

The band limiting differentiation processing unit (band limiting unit) 1h is arranged to have a ½ calculating unit 11e, a filter coefficient calculating unit 11f, and a convolution processing unit 11g. The band limiting differentiation processing unit is a unit for carrying out differentiation processing for limiting a band of the photoelectric converted signal (digital signal) cut out by the cut-out unit 1e based on the module frequency information extracted by the module frequency extracting unit 1g.

The ½ calculating unit 11e carries out calculation to determine a half the peak frequency of the frequency spectrum extracted by the spectrum peak frequency extracting unit 11d. The half frequency of the peak frequency is supplied to the subsequent convolution processing unit 11g in which the half frequency of the peak frequency is utilized as a gain peak frequency for the differentiation processing.

Meanwhile, the frequency obtained by calculation in the ½ calculating unit 11e to determine the half peak frequency extracted by the spectrum peak frequency extracting unit 11d serves as a frequency corresponding to the width of a pair of white bar and a black bar having the elemental unit length constituting the bar code.

Figure 23:
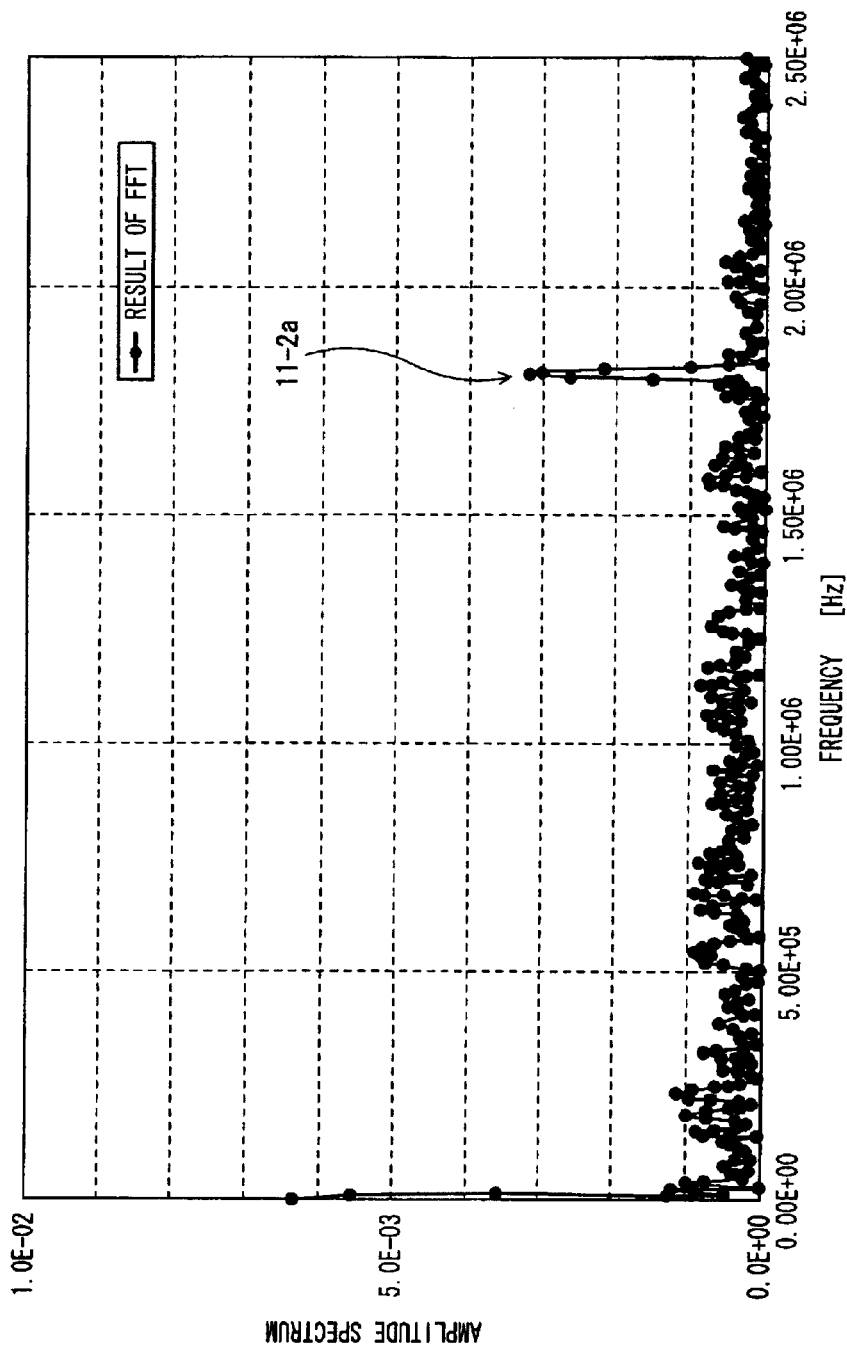
FIG. 23 is a block diagram for explaining an operation of the adaptive-type band limiting differentiating unit of the present embodiment.

For example, if the aforesaid FFT processing unit 11c carries out the FFT processing to obtain a spectrum such as one shown in FIG. 23, then the spectrum peak frequency extracting unit 11d extracts a frequency of a spectrum peak 11-2a. Thereafter, the ½ calculating unit 11e carries out calculation to determine the half frequency of the spectrum peak 11-2a extracted in the above manner and supplies the half frequency of the spectrum peak to the convolution processing unit 11g as a gain peak frequency for the differentiation processing.

Further, the filter coefficient calculating unit 11f determines convolution coefficients of the differentiating filter for the band limitation based on the frequency f mod which is the half module frequency information calculated by the aforesaid ½ calculating unit 11e, in accordance with the aforesaid scheme of (C-1). That is, the aforesaid Equations (2) to (5) are calculated by using the frequency f mod, or the half module frequency, to obtain the gain characteristic and the phase characteristic of the filter, and then the convolution coefficients (filter coefficients) of the filter are determined by way of the FFT calculation based on the gain characteristic and the phase characteristic thereof.

The convolution processing unit 11g is a unit for constructing a digital filter such as an FIR (Finite Impulse Response) filter by using the convolution filter coefficients calculated by the filter coefficient calculating unit 11f, and thereby effecting differentiation processing on the photoelectric converted signal (digital signal) in the optimized band supplied from the cut-out unit 1e.

The decimation processing unit 1h' is supplied with a signal (digital signal) having undergone the convolution processing in the convolution processing unit 11g and effects decimation on the digital signal so that number of data pieces are decimated depending on the aforesaid module frequency. The arrangement thereof will be more fully described later on.

With the above arrangement, when the module frequency (elemental frequency) is extracted by the module frequency extracting unit 1g of the adaptive-type band limiting differentiating unit if, the photoelectric converted signal (acquired signal) acquired by the cut-out unit 1e is subjected to the wide band differentiation processing unit 11a in which differentiation processing is effected so that the gain peak frequency is set to a value equal to or larger than the maximum frequency of the acquired signal in the readable region.

The squaring processing unit 11b effects squaring processing on the signal having undergone the differentiation processing in the wide band differentiation processing unit. The FFT processing unit carries out frequency spectrum analysis on the result having undergone the squaring processing. The spectrum peak frequency extracting unit 11d selects a significant frequency except for 0 Hz from the result of analysis based on the frequency spectrum and generates the frequency as the module frequency.

The band limiting differentiation processing unit 1h carries out filter arrangement by using the module frequency extracted in the above-described manner in such a manner that the gain characteristic is set to a cosine equivalent characteristic in which the gain peak frequency thereof is substantially a frequency corresponding to the half module frequency or a frequency slightly larger than the substantial half module frequency and the phase characteristic is set to one varying lineally with respect to the frequency. Further, the band limiting differentiation processing unit effects the convolution processing. In this way, it becomes possible to obtain a differentiated waveform of which band is optimized.

According to the present invention, information concerning the module length of the bar width length of the bar code information can be extracted from the acquired signal, and the ratio of the information length of the binary digit information can be read based on the extracted module length information. Therefore, it becomes possible to suppress a size of hardware and a price thereof and to improve the S/N ratio of the reading signal and reading resolution. Moreover, even if the depth of field for reading is enlarged or a concave/convex portion or a blurred portion is left on the reading face, reading precision can be improved.

Furthermore, the module frequency corresponding to the module length can be extracted and the frequency band of the acquired signal can be limited based on the extracted module frequency. Therefore, information concerning the elemental unit length of the information length of the binary digit can be extracted from the acquired signal, and on the basis of the extracted elemental unit length information, the ratio of the information length of the binary digit information can be read. Accordingly, advantages similar to those of the above-described one can be obtained.

Figure 24:
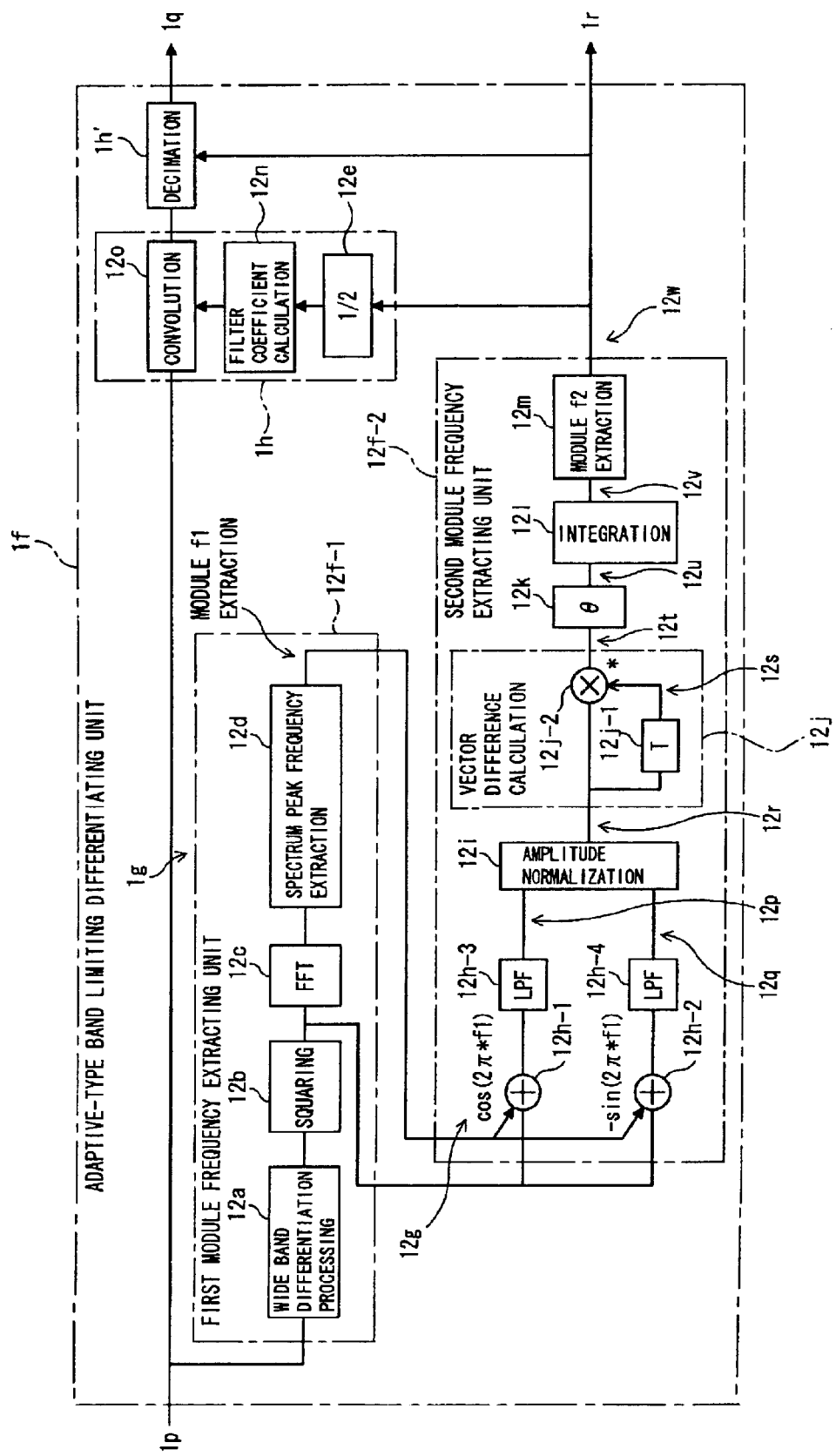
FIG. 24 is a block diagram showing a main portion of a first modification of the adaptive-type band limiting differentiating unit of the present embodiment.

(C-4) Description of Adaptive-Type Band Limiting Differentiating Unit of Bar Code Reading Apparatus According to Modification of Present Embodiment FIG. 24 is a block diagram showing an adaptive-type band limiting differentiating unit of the bar code reading apparatus according to one modification of the present embodiment. The adaptive-type band limiting differentiating unit if shown in FIG. 24 is arranged differently from the aforesaid one shown in FIG. 22. That is, since the FFT processing unit (see reference 11c) extracts frequency information by using a limited number of samples, the frequency information contains error. The subject adaptive-type band limiting differentiating unit is arranged to extract the module frequency in a more precise manner in order for handling the error.

The adaptive-type band limiting differentiating unit $1f$ shown in FIG. 24 includes a module frequency extracting unit $1g$ having an arrangement different from the aforesaid arrangement shown in FIG. 22. Further, the adaptive-type band limiting differentiating unit is arranged to have the band limiting differentiation processing unit $1h$ and the decimation processing unit $1h'$ having fundamentally the same arrangements as those of aforesaid FIG. 22.

The band limiting differentiation processing unit $1h$ includes a filter coefficient calculating unit $12n$ and a convolution processing unit $12o$ (see references $11f$ and $11g$ in FIG. 22) similar to those shown in aforesaid FIG. 22.

The module frequency extracting unit $1g$ is arranged to have a first module frequency extracting unit $12f$-$1$ capable of extracting a first module frequency from the photoelectric converted signal (digital signal) acquired by the cut-out unit $1e$ and a second module frequency extracting unit $12f$-$2$ for extracting a second module frequency based on the first module frequency.

The first module frequency extracting unit $12f$-$1$ is arranged to have a wide band differentiation processing unit $12a$, a squaring processing unit $12b$, an FFT processing unit $12c$ and a spectrum peak frequency extracting unit $12d$ corresponding to the aforesaid function components shown in FIG. 22 (see references $11a$ to $11e$). Therefore, the first module frequency extracted by the first module frequency extracting unit $12f$-$1$ is a module frequency extracted by a processing similar to that effected by the aforesaid module frequency extracting unit $1f$ shown in FIG. 22.

Further, the second module frequency extracting unit $12f$-$2$ is arranged to have multiplying units $12h$-$1$ and $12h$-$2$, an LPF (Low Pass Filter) $12h$-$3$, $12h$-$4$, an amplitude normalizing unit $12i$, a vector difference calculating unit $12j$, a phase calculating unit $12k$, an integrating unit $12l$, a module f2 extracting unit $12m$.

The multiplying unit $12h$-$1$ is a unit for multiplying the differentiated squared signal (Xn) supplied from the squaring processing unit $12b$ and a cosine function, $\cos(2\pi f1)$ of the first module frequency $f1$ obtained by the first module frequency extracting unit $12f$-$1$ together. The multiplying unit $12h$-$2$ is a unit for multiplying the differentiated squared signal (Xn) supplied from the squaring processing unit $12b$ and a sine function, $-\sin(2\pi f1)$ of the first module frequency $f1$ obtained by the first module frequency extracting unit $12f$-$1$ together.

Therefore, owing to the multiplying units $12h$-$1$ and $12h$-$2$, the module frequency $f1$ is applied to the differentiated squared signal to form a vector as expressed by the following Equations (11) and (12). In the following Equations (11) and (12), n represents a number sequentially attached to each sampled data based on a chronological sequence beginning with "1", and ts represents a sampling period thereof.

$$An(Re)=Xn^*\cos(2\pi^*f1^*n^*ts) \qquad (11)$$

$$An(Im)=Xn^*(-1)\sin(2\pi^*f1^*n^*ts) \qquad (12)$$

That is, the relationship between the true module frequency component (2*f0) having no error and the module frequency f1 extracted by the first module frequency extracting unit $12f$-$1$ can be expressed by the following Equation (13) owing to the aforesaid vector formation.

$$\Delta f=2^*f0-f1 \qquad (13)$$

The LPFs $12h$-$3$ and $12h$-$4$ are composed of an FIR filter or the like and arranged to extract only the aforesaid $\Delta f$ component. The amplitude normalizing unit $12i$ is a unit for normalizing the amplitudes of vector signals $12p$ and $12q$ passing through the aforesaid LPFs $12h$-$3$ and $12h$-$4$ in accordance with the following Equations (14) and (15).

$$Bn(Re)=1/\sqrt{(An(Re)2+An(Im)2)}*An(Re) \qquad (14)$$

$$Bn(Im)=1/\sqrt{(An(Re)2+An(Im)2)}*An(Im) \qquad (15)$$

The vector difference calculating unit $12j$ is a unit for calculating an opponent of the complex number pair of complex number data $12r$ which has been normalized by the amplitude normalizing unit $12i$ and delayed by one sample time amount as expressed by Equation (16), thereby determining a vector difference. The vector difference calculating unit is arranged to have a delaying unit $12j$-$1$ for delaying the complex data $12r$ by one sample time amount and multiplier $12j$-$2$. In the following Equation (16), references B and C represent vectors. However, vector expression is not introduced for convenience of notation. Further, (*) designates an opponent of the complex number pair.

$$Cn=Bn^*Bn-1(*) \qquad (16)$$

The phase calculating unit $12k$ is a unit for calculating respective phases of vector data series $12t$ as a result of calculation on the vector difference supplied from the vector difference calculating unit $12j$. The integrating unit $12l$ is a unit for integrating the phase difference data calculated by the phase calculating unit $12k$. This integrating operation is effected at the unit of cut-out action of the cut-out unit $1e$, whereby calculation is made on a phase variation amount $\theta$ sum.

That is, the phase of the vector calculated in difference by the vector difference calculating unit $12j$ is based on the frequency error of the first module frequency. Therefore, if integration is made on the phase difference data, the phase variation amount $\theta$ sum can be calculated at the unit of time sectioned by the cut-out unit $1e$.

Further, the module f2 extracting unit $12m$ is a unit for calculating the module frequency error $\Delta f$ based on the phase variation amount $\theta$ sum within a unit of cut-out section (t) supplied from the integrating unit $12l$ in accordance with the following Equations (17) and (18) and utilizing the error amount to correct the first module frequency f1 into an accurate second module frequency f2.

$$\Delta f=\theta sum/(2\pi t) \qquad (17)$$

$$f2=f1+\Delta f \qquad (18)$$

With the above arrangement, the first module frequency extracting unit $12f$-$1$ of the adaptive-type band limiting differentiating unit $1f$ shown in FIG. 24 effects a differentiation processing upon extracting the module frequency information (elemental frequency information) in such a manner that the wide band differentiation processing unit 12a effects the differentiation processing on the acquired signal supplied from the cut-out unit 1e so that the gain peak frequency is set to a value equal to or more than the maximum frequency of the acquired signal falling in a readable region.

Further, the squaring processing unit 12b effects squaring processing on the signal having undergone the differentiation processing. The FFT processing unit 12c carries out frequency spectrum analysis on the signal resulting from the squaring processing. The spectrum peak frequency extracting unit 12d extracts a significant frequency except for 0 Hz from the result of frequency spectrum analysis, determines the frequency as an already calculated elemental frequency corresponding to the elemental unit length, and supplies the frequency information as the first module frequency.

On the basis of the frequency obtained by the already calculated frequency supplied from the first module frequency extracting unit 12f-1, the second module frequency extracting unit 12f-2 effects demodulation processing on the signal having undergone the squaring processing in the squaring processing unit 12b. Further, the multiplying units 12h-1 and 12h-2 vectorize the signal, and the LPFs 12h-3 and 12h-4 remove a high frequency component from the demodulated and vectorized signal.

Further, the vector difference calculating unit 12j calculates a phase difference between the signal from which the high frequency component is removed by the LPFs 12h-3 and 12h-4 and a signal having undergone delaying process by one sample time amount. Thereafter, the phase calculating unit 12k and the integrating unit 12l calculates the frequency deviation Δf between the aforesaid first module frequency and the accurate module frequency based on the phase difference obtained by the vector difference calculating unit 12j. The module frequency f2 extracting unit 12m determines a result from addition of the calculated Δf and the aforesaid first module frequency f1 together as an error-corrected second module frequency.

Figure 25:
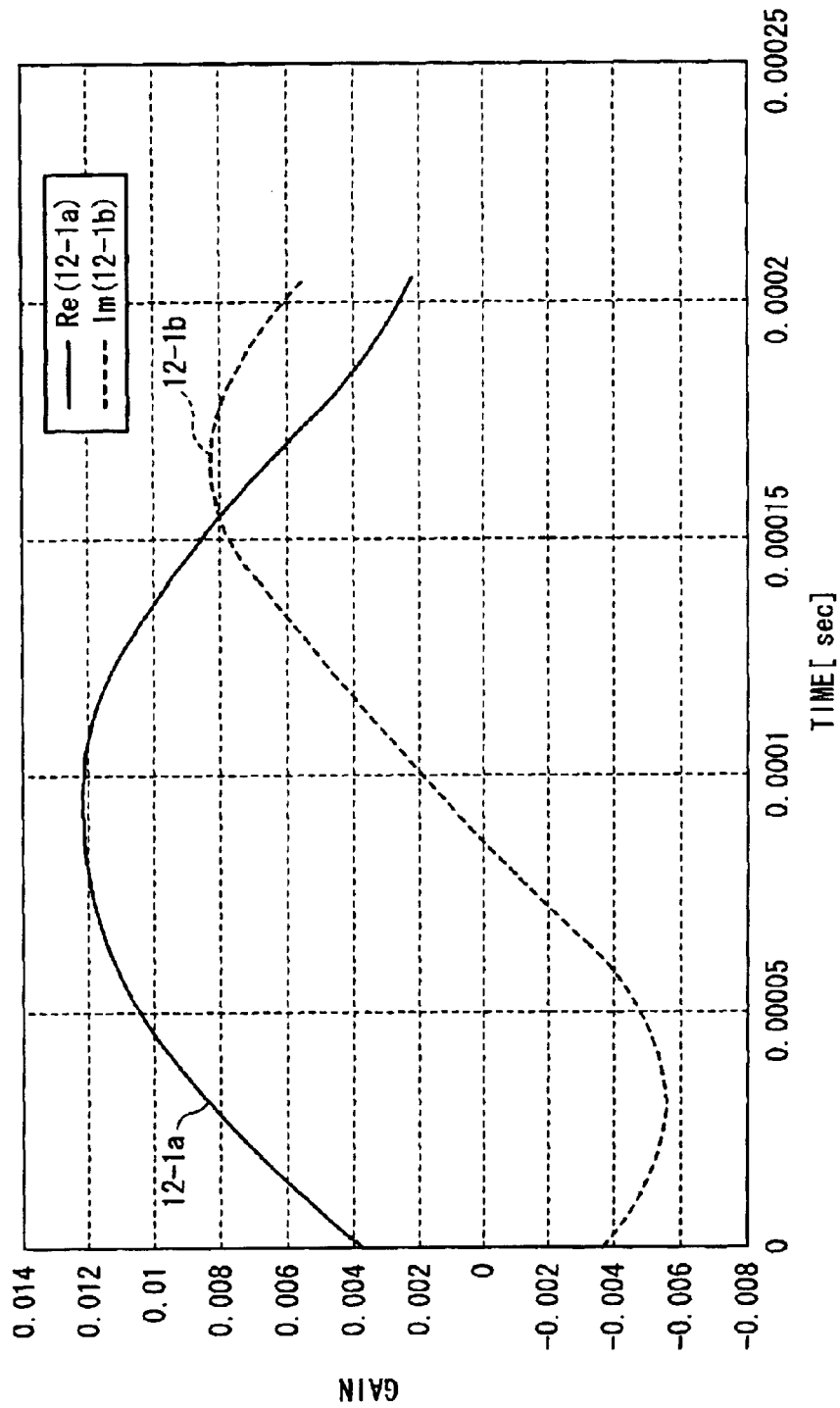
FIGS. 25 and 26 are diagrams each for explaining an operation of the first modification of the adaptive-type band limiting differentiating unit of the present embodiment.

For example, if the first module frequency f1 is determined as 454101 Hz, the output signal 12p from the LPF 12h-3 comes to have a waveform 12-1a shown in FIG. 25 while if the output signal 12q from the LPF 12h-4 comes to have a waveform 12-1b shown in FIG. 25. The phase variation in the cut-out period calculated by the integrating unit 12l becomes as shown in FIG. 26.

Figure 26:
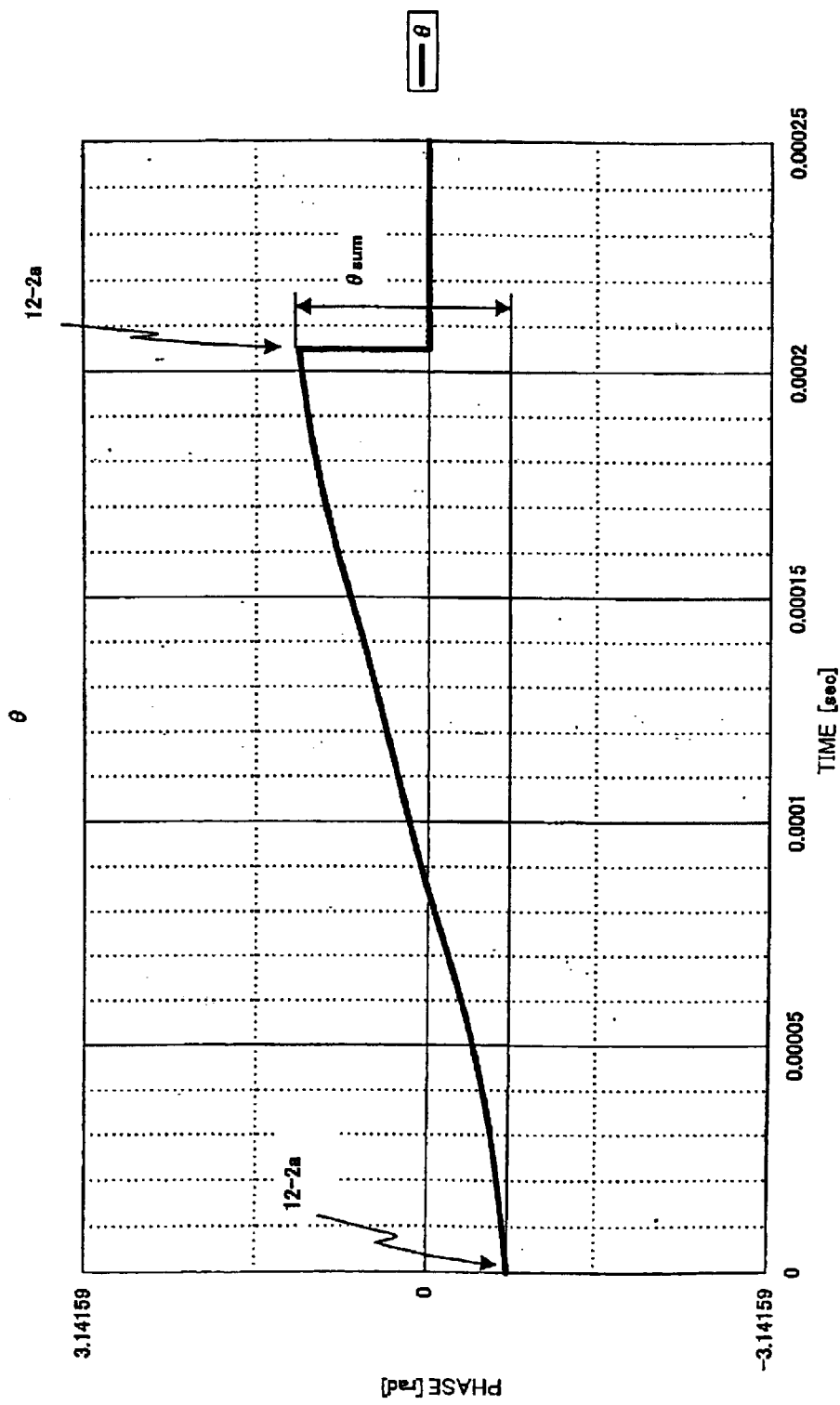

In the case of FIG. 26, at the cut-out start timing point (signal acquisition start timing point for the cut-out unit 1e; t=0[μs]), the phase thereof takes a value of "−0.76[rad]" while at the cut-out completion timing point (t=2047[μs]), the phase thereof takes a value of "1.18[rad]".

In this way, the integrating unit 121l calculates the phase variation θ sum in the unit cut-out section based on Equation (19) to yield "2.94[rad]". Further, the module f2 extracting unit 12m obtains a value of "229[Hz]" for the error amount frequency Δf as in the following Equation (20) (see Equation (17)). Also, the unit obtains a value of "454230[Hz]" for the corrected accurate module frequency f2 as in the following Equation (21) (see Equation (18)).

$$\theta sum = (1.18) - (-0.76) = 2.94 [\text{rad}] \quad (19)$$

$$\Delta f = 2.94 \text{ rad}/(2\pi * 2047 \text{ }\mu s) \quad (20)$$

$$= 229 \text{ Hz}$$

$$f2 = f1 + \Delta f \quad (21)$$

$$= 454101 \text{ Hz} + 229 \text{ Hz}$$

$$= 454330 \text{ Hz}$$

As described above, when the module frequency f2 having undergone the correcting process for correcting the frequency error is extracted, similarly to the aforesaid case of (C-3), the filter coefficient calculating unit 12n of the band sine differentiation processing unit 1h determines the convolution coefficients of the differentiating filter. The convolution processing unit 12o carries out the convolution processing on the signal supplied from the cut-out unit 1e by using the coefficients. Thus, a differentiated waveform of which band is optimized can be obtained.

Accordingly, also in this case, information concerning the module length of the bar width length of the bar code information can be extracted from the acquired signal, and the bar code information can be read based on the extracted module length information. Therefore, it becomes possible to suppress the size of hardware and a price thereof and to improve the S/N ratio of the reading signal and reading resolution. Moreover, even if the depth of field for reading is enlarged or a concave/convex portion or a blurred portion is left on the reading face, reading precision can be improved.

(C-5) Description of Decimation Processing after Adaptive-Type Band Limiting Differentiation Processing in Present Embodiment The decimation processing unit 1h' of the adaptive-type band limiting differentiation processing unit if will be hereinafter described in detail.

Figure 27:
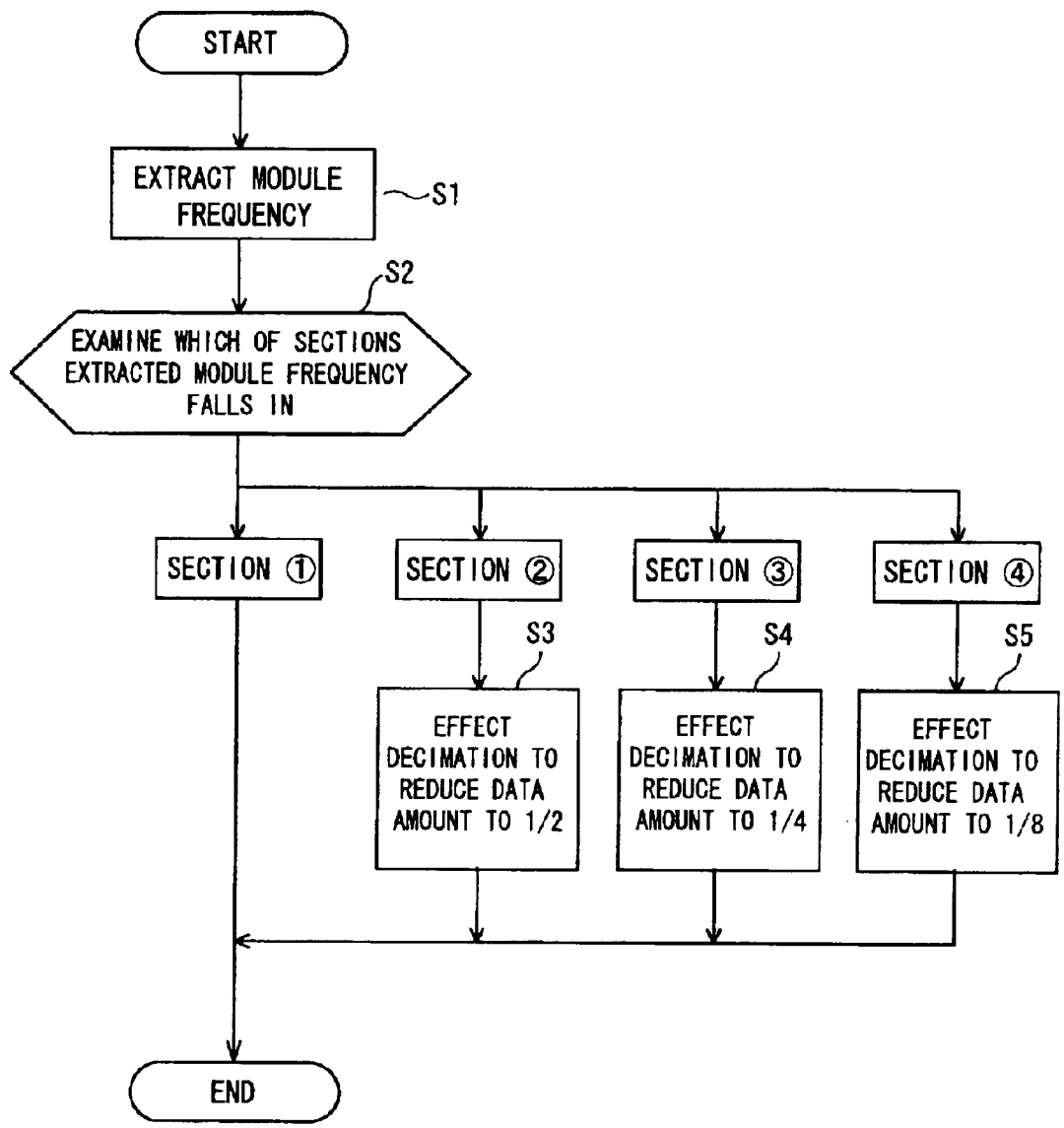
FIG. 27 is a flowchart for explaining the operation of a main portion of the adaptive-type band limiting differentiating unit of the present embodiment.
Figure 28:
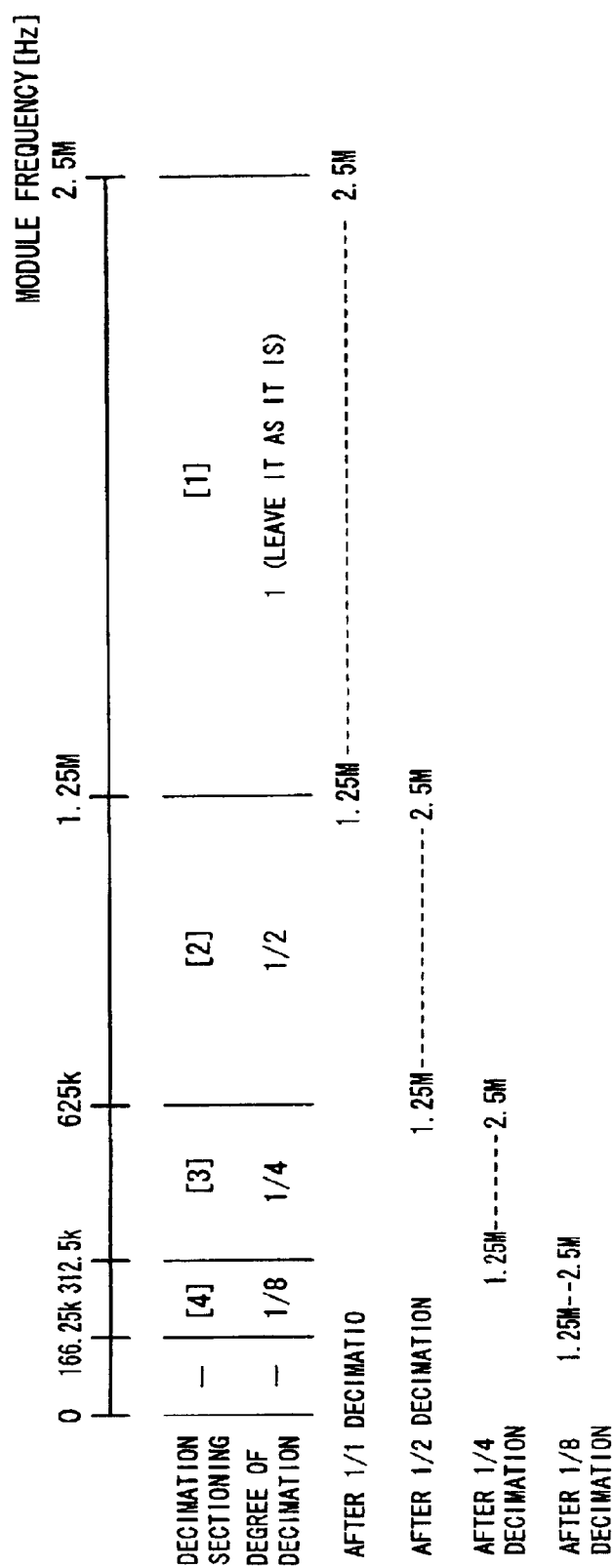
FIG. 28 is a diagram for explaining the operation of the main portion of the adaptive-type band limiting differentiating unit of the present embodiment.

FIGS. 27 and 28 are diagrams for explaining the processing carried out in the decimation processing unit 1h' of the aforesaid adaptive-type band limiting differentiation processing unit 1f. The decimation processing unit 1h' is composed of a digital filter or the like such as one shown in FIG. 3, for example. The decimation processing unit is supplied with a signal (digital signal) having undergone band limiting processing in the band limiting differentiation processing unit 1h, and decimates data piece number from the digital signal depending on the aforesaid module frequency. Thus, the amount of calculation task imposed on the subsequent stage can be reduced.

In other words, when a signal containing binary digit information is acquired, the signal is acquired as a digital signal deriving from a sampling process effected at a predetermined sampling interval. On the other hand, as a preprocessing for reading bar code information as an integer number ratio between width length data pair, the decimation processing unit 1h' can decimate the data number from the digital signal having undergone the signal band limitation process depending on the module frequency information.

That is, as shown in flowchart of FIG. 27, at step S1, the aforesaid module frequency extracting unit 1g extracts the module frequency, and it is examined which of the sections [1] to [4] shown in FIG. 28 the extracted module frequency falls in (step S2). Then, the decimation is effected on the signal having undergone the band limitation in the band limiting differentiation processing unit 1h to reduce the data amount thereof, and the resulting signal is supplied to the subsequent every module point amplitude extracting unit 1i.

The processing effected in the decimation processing unit 1h' will be described more concretely. That is, if the extracted module frequency falls in a region between a point of 625[kHz] to a point of 1.25[MHz] (see the region [2] in FIG. 28), then decimation is effected on the signal from the band limiting differentiation processing unit 1*h* to reduce the data amount thereof to ½ (step S3 of FIG. 27).

In a similar manner, if the module frequency falls in a region between a point of 312.5[kHz] to the point of 625[kHz] (see the region [3] in FIG. 28), then decimation is effected on the signal to reduce the data amount thereof to ¼ (step S4). And if the module frequency falls in a region between a point of 166.25[kHz] to the point of 312.5[kHz] (see the region [4] in FIG. 28), then decimation is effected on the signal to reduce the data amount thereof to ⅛ (step S5).

If the module frequency extracted by the module frequency extracting unit 1*g* is supplied to the decimation processing unit 1*h*' ranges from 1.25[MHz] to 2.5[MHz] (see region [1] of FIG. 28), the decimation for reducing the data amount is not carried out and the module frequency is directly supplied to the subsequent every module point amplitude extracting unit 1*i* (step S2).

Accordingly, owing to the function of the decimation processing unit 1*h* ', when the signal containing the bar code information is acquired, the signal can be acquired as a digital signal deriving from the sampling at the predetermined sampling frequency, and as a preprocessing for reading the integer ratio between each bar width length data pair, the digital signal having undergone the signal band limitation can be subjected to the data number decimation depending on the module frequency information. Therefore, the bar code information can be read without requiring a large number of sampling point of the signal depending on the decrease of the module frequency. That is, the signal can be subjected to the data decimation process for reducing the optimum data amount depending on the module frequency number, with the result that the amount of calculation task can be decreased.

(C-6) Description of Improvements of Second and Third Modification of Adaptive-Type Band Limiting Differentiating Unit According to Present Embodiment Improvement of second and third modifications of the adaptive-type band limiting differentiating unit according to the present embodiment is achieved in the above-described technology for extracting the elemental frequency illustrated in FIG. 22. That is, as will be described below, further countermeasure is taken against a cause of trouble in extracting the spectrum peak frequency accurately, whereby the spectrum peak frequency extracting unit 11*d* can be prevented from being deteriorated in accuracy of the elemental frequency extraction.

When a Gaussian beam is utilized as a ray of irradiation for scanning the bar code, the beam diameter thereof can be varied upon irradiating the beam on the bar code depending on the depth of field for reading. Also, the beam speed (scanning speed), values of bar width or the like will be varied depending on various regulation regarding the bar code. The aforesaid adaptive-type band limiting differentiating unit 1*f* shown in FIG. 22 provides an electric signal having an amplitude value varying in accordance with the light intensity obtained by the unit, and with the variations, this electric signal can be deteriorated in its high frequency component as shown in FIG. 72 (this phenomenon is known as Gaussian deterioration).

Figure 70A:
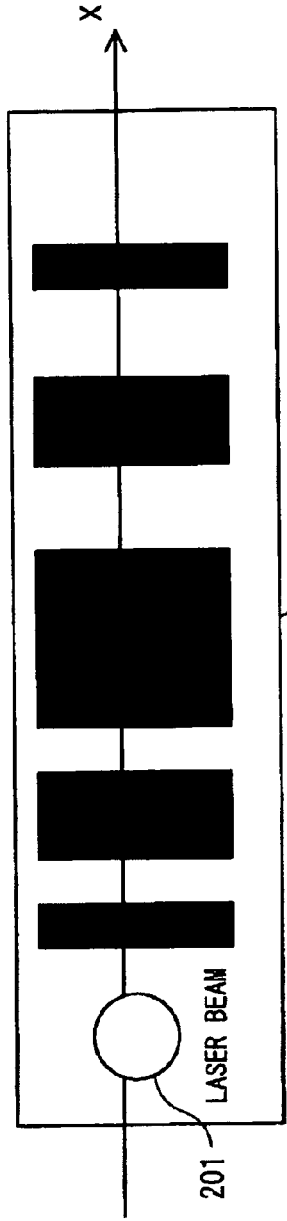
FIGS. 70(a) to 70(c) are diagrams each for explaining an operation of the conventional bar code reading apparatus.
Figure 70B:
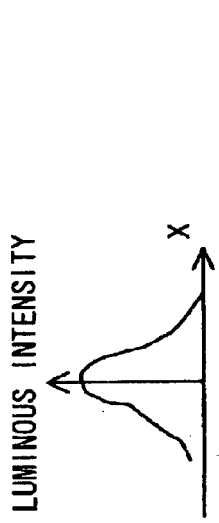
Figure 70C:
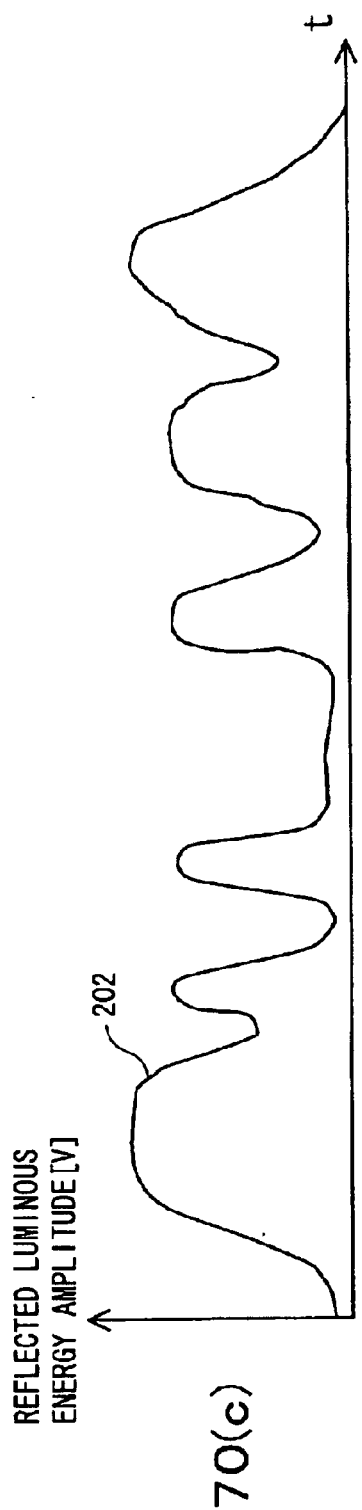

In general, a Gaussian beam having an intensity profile shown in FIG. 70(*b*) is utilized for the laser light beam irradiated from an LD. As shown in FIG. 70(*b*), the Gaussian beam has a characteristic that the luminous intensity thereof becomes strongest at the center of the profile and the luminous intensity becomes gradually small as the position is remote from the center to the outside thereof. Further, the characteristic has a nature that the beam is diffused as the depth of field for reading becomes large.

Figure 71:
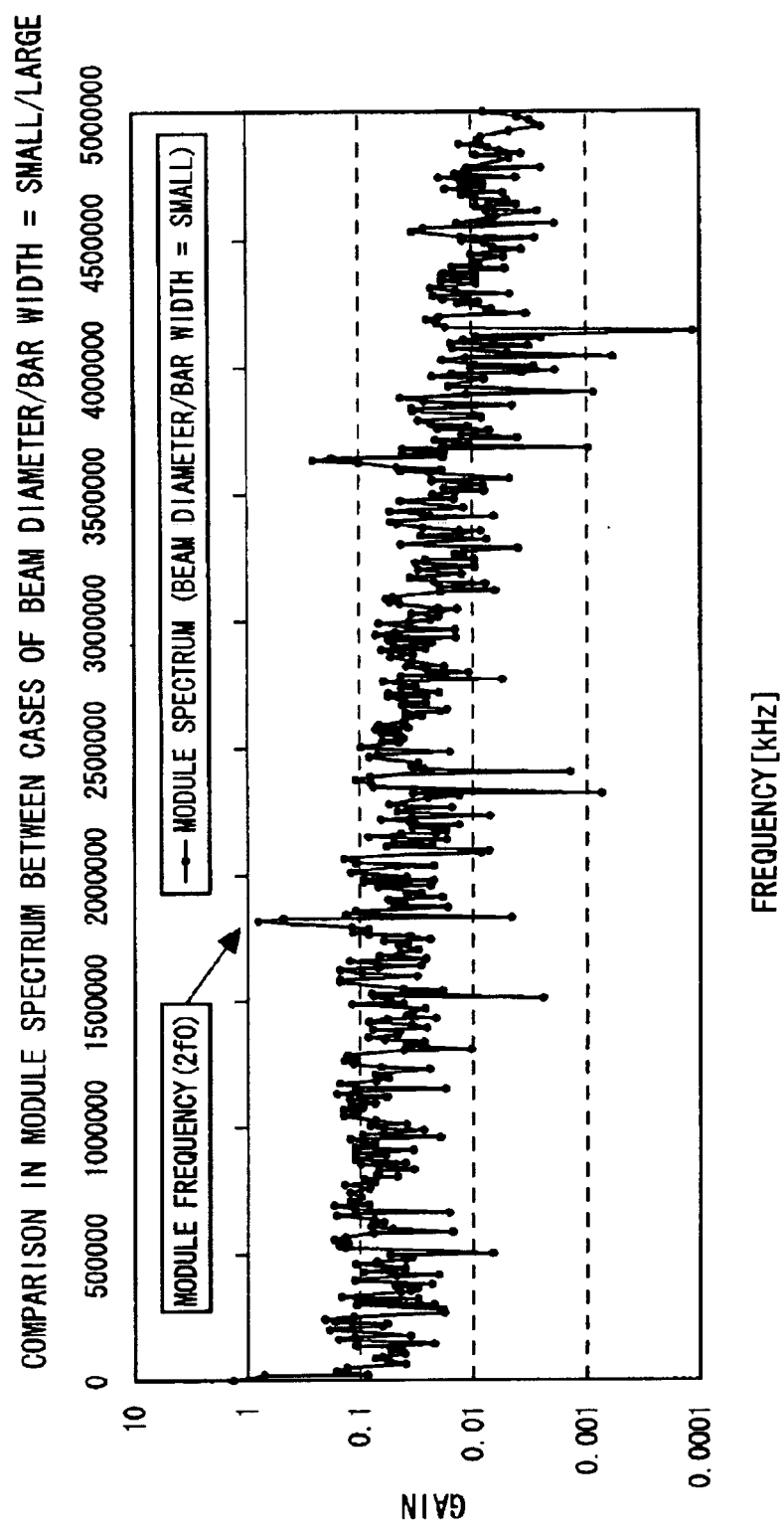
FIGS. 71 to 72 are diagrams each for explaining a problem that the present invention seeks to solve.

When the Gaussian beam having the above-described characteristic is utilized as a ray of irradiation for scanning a bar code 200 as shown in FIG. 70(*a*), the values of the aforesaid beam diameter, the beam speed, the bar width or the like will take proper values [(beam diameter/bar width)= small] under a proper condition of reading operation, and hence it is possible to obtain a characteristic suffering no deterioration in the high frequency component as shown in FIG. 71. However, for example, if a bar code to be read has a narrow bar width, or the beam incident on the bar code has a large diameter relative to the bar width due to the reading operation condition of the operator [(beam diameter/bar width)=large], the aforesaid Gaussian deterioration shown in FIG. 72 is brought about.

Figure 72:
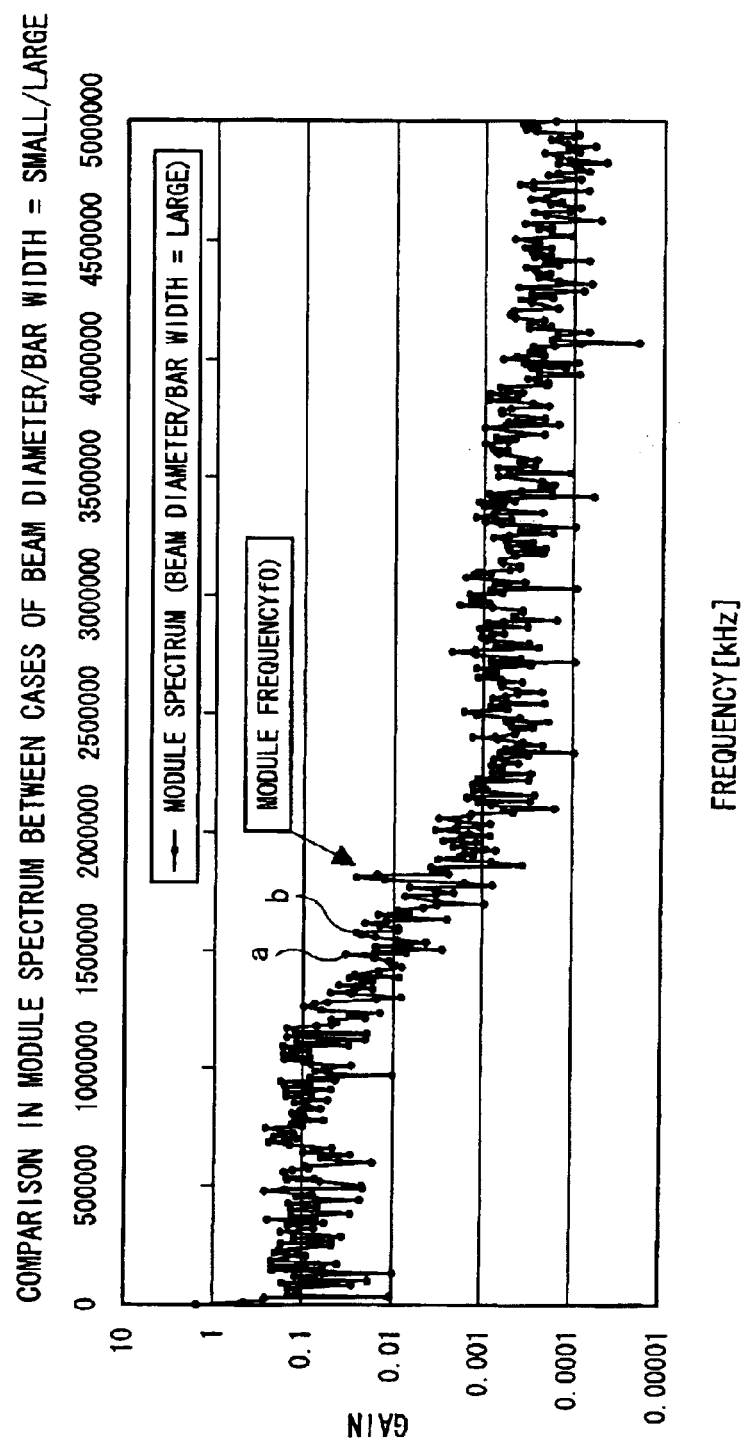

That is, the spectrum profile shown in FIG. 72 has a characteristic that the spectrum intensity (gain) is scattered and the high frequency component thereof is deteriorated. Therefore, it is difficult to extract a spectrum peak at the point of twice the module frequency by the scheme in which spectrum intensities at respective frequency points are simply compared with each other.

In more concretely, the gain peak value at the frequency (twice the elemental frequency) shown in FIG. 72 will not take the largest value as compared with the gain values in the neighboring frequency area in which it is desired to effect the frequency extraction. Therefore, the steps of detecting the elemental frequency will become more complicated for the spectrum peak extracting unit (see reference 11*d* in FIG. 22) to extract the frequency accurately from the region in which the frequency characteristic is attenuated.

The above-described deterioration in the high frequency component will be similarly brought about not only in the case of the bar code reading apparatus using the aforesaid Gaussian beam but also in a case of a type of bar code reading apparatus in which white and black bars of the bar code are detected by an external ray of light deriving from a device such as a CCD.

According to module frequency extracting units 1*g*-1 and 1*g*-2 as the second and third modifications of the adaptive-type band limiting differentiating unit 1*f* of the present embodiment, as will be described in detail in sections of (C-7) and (C-8), even if deterioration is brought about in the result of analysis on the frequency spectrum of the electric signal having a luminous dependent amplitude, such a deterioration can be corrected by a simple processing and the elemental frequency can be accurately extracted.

Figure 63:
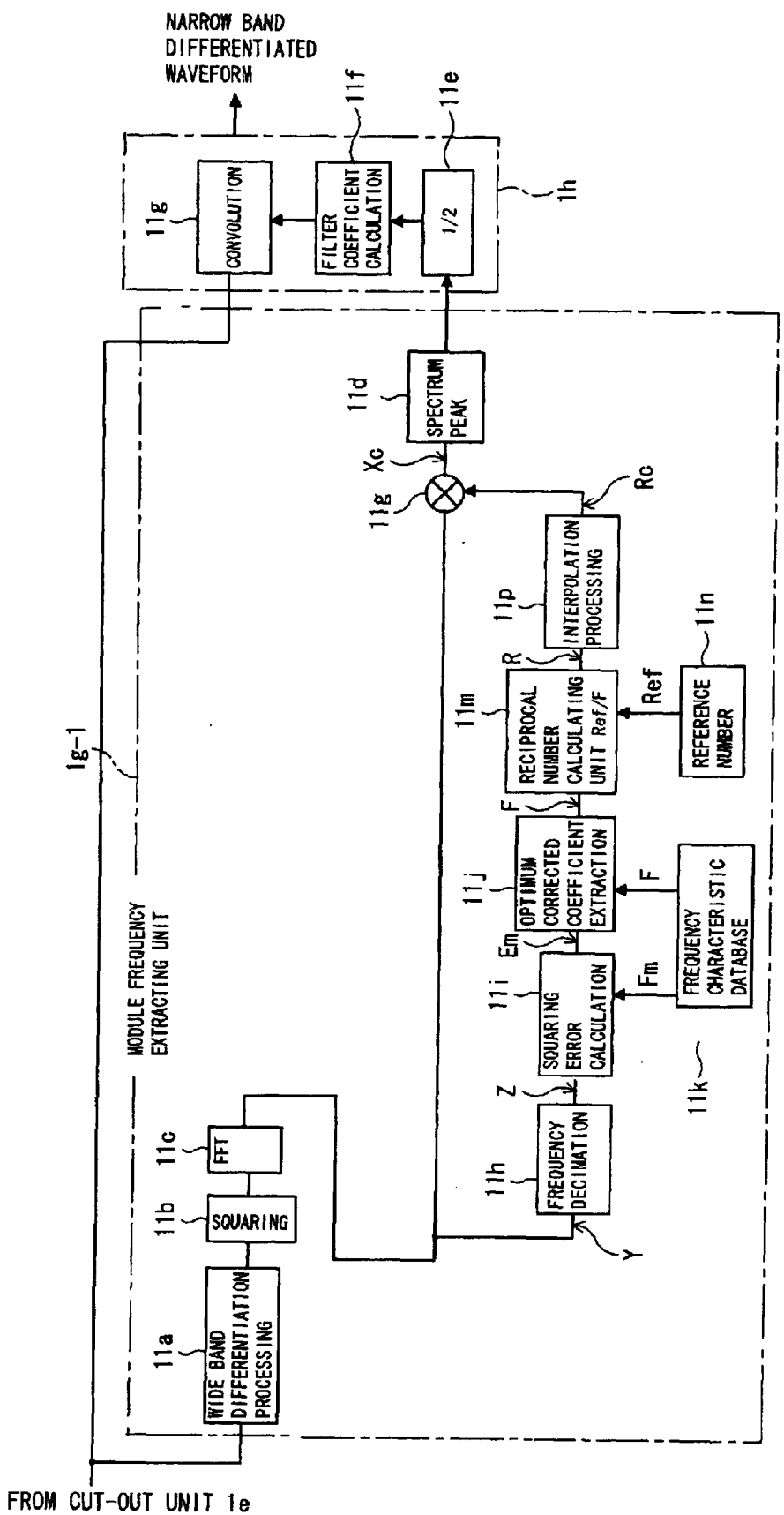
FIG. 63 is a block diagram showing a module frequency extracting unit as a second modification of the adaptive-type band limiting differentiating unit of the present embodiment.

(C-7) Description of Module Frequency Extracting Unit 1*g*-1 as Second Modification of Adaptive-Type Band Limiting Differentiating Unit 1*f* of Present Embodiment FIG. 63 is a block diagram of an adaptive-type band limiting differentiating unit of the bar code reading apparatus in which a module frequency extracting unit 1*g*-1 is employed in lieu of the module frequency extracting unit 1*g* of the adaptive-type band limiting differentiating unit 1*f* shown in FIG. 22. The module frequency extracting unit 1*g*-1 shown in FIG. 63 is constructed based on the following intension. That is, when a signal is subjected to the aforesaid arrangement shown in FIG. 22 and the signal causes a spectrum profile such as one shown at A in FIG. 66, an improvement can be achieved in the arrangement shown in FIG. 22 by effecting a processing (see reference B in FIG. 66) that can compensate the deterioration in the result of the frequency spectrum analysis so as to restore flatness there of in the following manner. Thus, owing to the improvement, it becomes possible to extract the spectrum peak to be extracted with ease and at high accuracy.

The module frequency extracting unit (elemental frequency extracting unit) 1g-1 is arranged to have the wide band differentiation processing unit 11a, the squaring processing unit 11b, the FFT processing unit 11c, the frequency decimating unit 11h, a squaring error calculating unit 11i, an optimum correcting coefficient extracting unit 11j, a frequency characteristic database 11k, a reciprocal number calculating unit 11m, a reference value holding unit 11n, an interpolation processing unit 11p, a multiplier 11q and a spectrum peak frequency extracting unit 11d.

Figure 66:
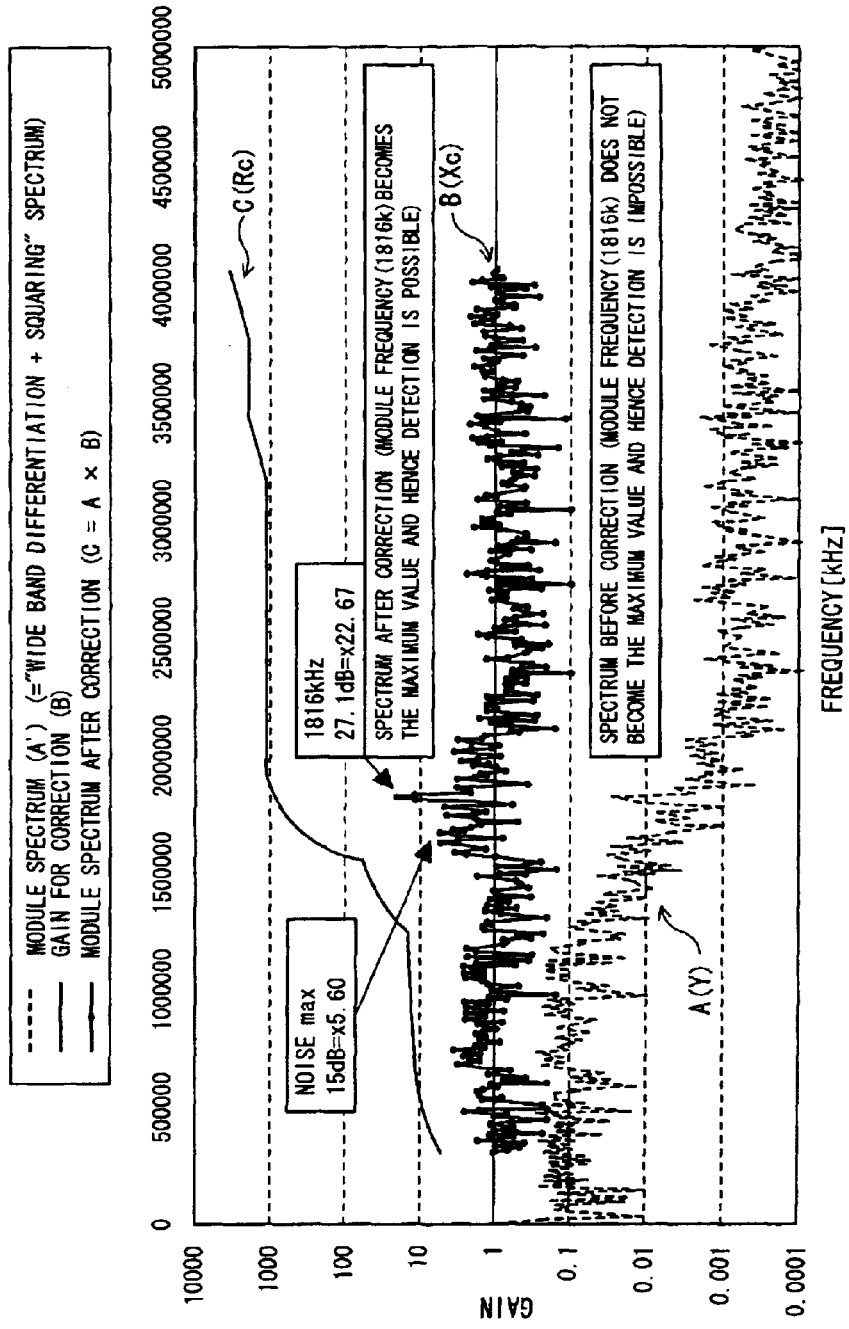
FIG. 66 is a diagram for explaining an operation of the module frequency extracting unit as the second modification of the adaptive-type band limiting differentiating unit of the present embodiment.

According to the module frequency extracting unit 1g-1 of the present embodiment, the frequency decimating unit 11h, the squaring error calculating unit 11i, and the optimum correcting coefficient extracting unit 11j, which will be described later on, extract a deterioration characteristic from a waveform having undergoing the squaring processing which may contain a cause of deterioration in the frequency characteristic such as one deriving from the aforesaid Gaussian deterioration shown at A in FIG. 66. The reciprocal number calculating unit 11m, the reference value holding unit 11n and the interpolation processing unit 11p take tasks of calculating the inverse characteristic data of the deterioration characteristic for correction, and the result of spectrum analysis is multiplied with the calculated inverse characteristic data, whereby the spectrum profile in gain (or spectrum intensity) can restore its flatness on the frequency axis. Thus, the aforesaid module frequency can be extracted at a high accuracy from the corrected result of the spectrum analysis.

The wide band differentiation processing unit (differentiation processing unit) 11a is a unit for effecting on the acquired signal supplied from the cut-out unit 1e constituting the signal acquiring unit, a differentiation processing so that a value equal to or more than the maximum frequency of the acquired signal in the readable region is set to the gain peak frequency. The squaring processing unit 11b is a unit for effecting squaring processing on the signal having undergone the differentiation processing in the wide band differentiation processing unit 11a.

The FFT processing unit (frequency spectrum analyzing unit) 11c is a unit for carrying out frequency spectrum analysis on the result having undergone the squaring processing in the squaring processing unit 11b. In more concretely, the FFT processing unit 11c is arranged to carry out Fast Fourier Transform (FFT; Fast Fourier Transform) on the calculation result supplied from the squaring processing unit 11b so as to obtain a spectrum.

For example, if the sampling frequency is set to 10 MHz or around the value, as shown in FIG. 64(a), the FFT processing unit 11c carries out Fast Fourier Transform (FFT; Fast Fourier Transform) of about 1024 points (if x0 is included, 1025 points) [see FIG. 64(b)] on sampled data at an interval of 0.1 $\mu$s (x0, x1, x2, ..., x1024) of the calculation result supplied from the squaring processing unit 11b. Thus, the spectrum can be obtained. In this case, the FFT processing unit 11c can obtain each of spectrums Y [see y0, y1, y2, ..., y1024 in FIG. 64(c)] at every frequency determined by dividing the frequency range of 10 MHz into 1024-sections.

The frequency decimating unit (decimating unit) 11h is a unit for carrying out frequency-decimation on the analyzed data T constituting the result of frequency spectrum analysis supplied from the FFT processing unit 11c and obtaining approximated characteristic data Z [see results of decimation z0, z1, z2, ..., z32 in FIG. 64(d)]. As for example shown in FIG. 64(d), the frequency decimating unit 11h decimates the 1024 frequency spectrum points at an interval of 32 points, for example, and supplies the decimation result Z to the squaring error calculating unit 11i. In this way, it becomes possible to obtain spectrum data (analyzed data left after the decimation) of every frequency interval (312.5 kHz) deriving from 32-division of the sampling frequency 10 MHz.

In the case of FIG. 64(d), the analyzed data y0, y1, y2, ..., y1024 as the result Y of FFT are subjected to the frequency decimation. Thus, data piece correspondence is determined in such a manner that data piece y0 corresponds to z0 after the decimation, y32 to z1, y64 to z2, y96 to z3. In the similar manner, z32 is determined (from y1024).

The above-described number of decimation (i.e., decimation interval) is set so that the spectrum intensity variation can be removed. The spectrum intensity variation in this case means that a spectrum profile contains a spectrum intensity projecting at a particular frequency point (e.g., points a and b in FIG. 72) with respect to other spectrum intensity variation on the frequency axis. Meanwhile, the frequency point at which such a spectrum intensity profile projects is referred to as a spike point.

The number of spike points is normally small as compared with other frequency points. Thus, the aforesaid frequency decimating unit 11h carries out decimation on the frequency points, and in cooperation with the subsequent interpolation processing unit 11p in the interpolation processing, elements of the spike points contained in the inverse characteristic data for correction are removed. In this way, fluctuation in the spectrum intensity in the inverse characteristic data is decreased.

Figure 65:
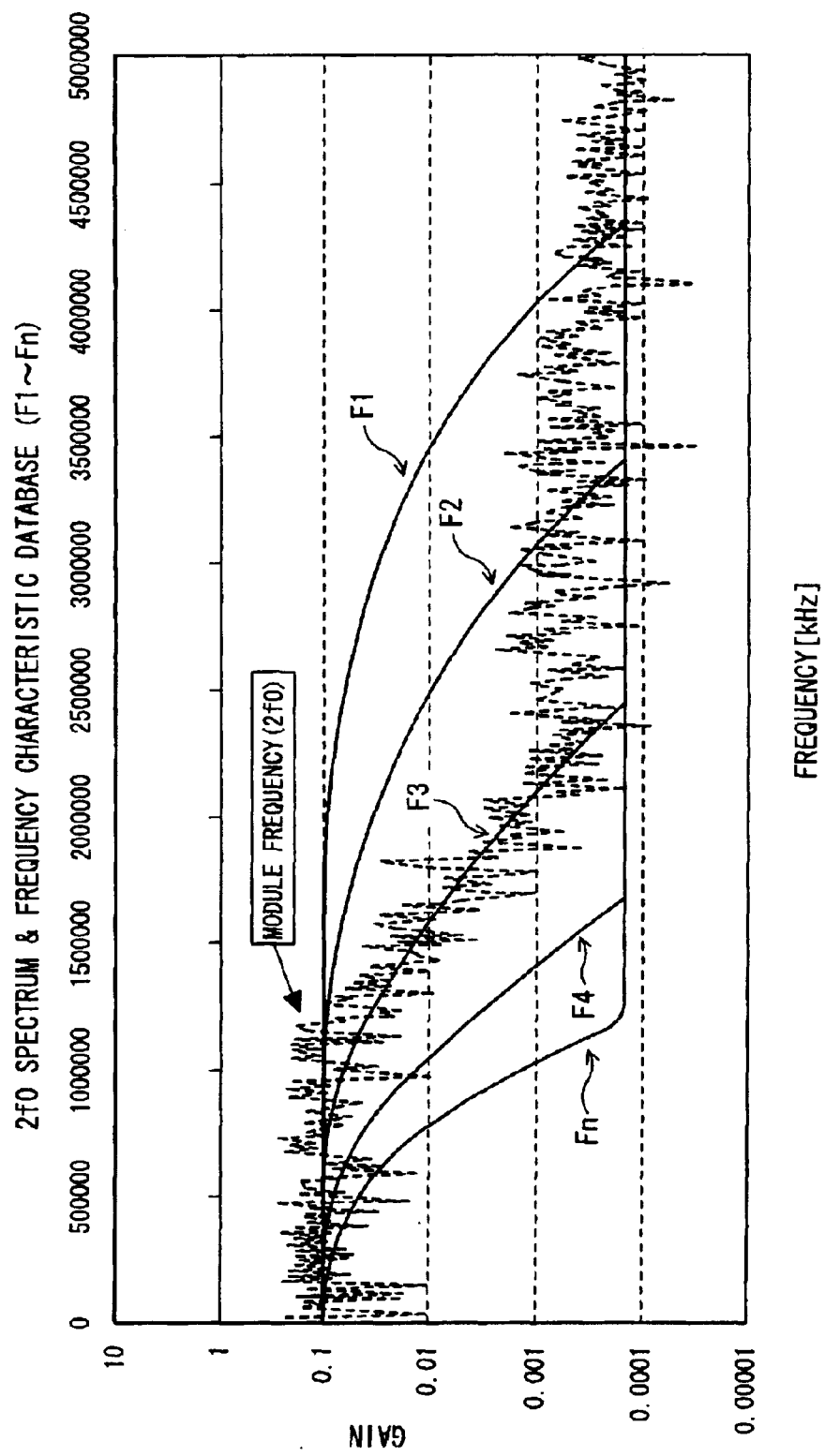
FIG. 65 is a diagram showing n-kinds of frequency characteristics F1 to Fn held in advance in a frequency characteristic database 11k.

The frequency characteristic database (reference frequency characteristic database) 11k is a unit for storing therein in advance n-kinds (n is a plural number) of groups of discrete data pieces having a reference frequency characteristic. In more concretely, as shown in FIG. 65, the unit holds groups of discrete data pieces f1 to fn having n-kinds of frequency characteristics F1 to Fn, respectively. Although the frequency characteristics F1 to Fn shown in FIG. 65 are illustrated as characteristics having continuous values on the frequency axis, these data groups may be stored in the following manner. That is, the groups of discrete data pieces f1, f2, ..., fn relating to the aforesaid frequency characteristics F1, F2, ..., Fn are associated with data numbers (33 pieces including z0) left after the analyzed data decimation in the aforesaid frequency decimating unit 11h in such a manner that the 33 pieces of discrete data f1 (0) to f1 (32), f2(0) to f2(32), ..., fn(0) to fn(32) correspond to frequency points that should be left after the decimation.

Further, the discrete data f1 to fn having the aforesaid frequency characteristics F1 to Fn are each supposed to be one having characteristic of an acquired signal acquired by the reading operation effected on at least the bar code. Alternatively, the frequency characteristic for the discrete data to be held may be set to a frequency characteristic of the acquired signal which is supposed depending on the characteristic of the Gaussian beam irradiated upon reading operation, the resolution of the CCD or the like.

The squaring error calculating unit 11i is a unit for calculating each squared error Em [m is an integer ranging from 1 to n, see Equation (47)] between the analyzed data z0, z1, ..., z32 left after the frequency decimation by the frequency decimating unit 11h and the n-kinds of reference frequency characteristic available from the aforesaid frequency characteristic database 11k. That is, as expressed in Equation (47), the squaring error calculating unit 11i calculates a sum of squared difference between each of the data z0, z1, . . . , z32 left after the frequency decimation and each of the 33 pieces of discrete data fm (0), . . . , fm(32) associated with respective frequency points.

$$Em = \sum_{k=0}^{32} [\{zk - fm(k)\}^2] \qquad (47)$$

The optimum correcting coefficient extracting unit 11j is a unit for examining the respective results of the squared error calculation deriving from the aforesaid squaring error calculating unit 11i by comparing one another, and selects a set of discrete data f(0) to f(32) having a characteristic F providing the smallest squared error as the optimum correcting coefficients to be applied to the result of frequency spectrum analysis from the frequency characteristic database 11k.

Owing to the cooperation of the above-described squaring error calculating unit 11i, the frequency characteristic database 11k and the optimum correcting coefficient extracting unit 11j, even if the characteristic data extraction is carried out from the noise base (i.e., data containing any deterioration cause) in a manner of approximation and hence even after the frequency decimation is effected a spike point is left unremoved, in particular, when a spectrum peak frequency point to be extracted by the subsequent spectrum peak frequency extracting unit 11d is left, the gain of the spectrum peak frequency can be prevented from influencing upon the inverse characteristic data calculated by the subsequent reciprocal number calculating unit 11m and the interpolation processing unit 11p.

Accordingly, the squaring error calculating unit 11i and the optimum correcting coefficient extracting unit 11j function as an optimum characteristic extracting unit for comparing the analyzed data Z left after the frequency decimation effected by the frequency decimating unit 11h with the reference frequency characteristic Fm held in the frequency characteristic database 11k, and extracting the discrete data F having a frequency characteristic closest to the left analyzed data as the approximated characteristic data.

The reciprocal number calculating unit (reciprocal number data calculating unit) 11m is a unit for calculating reciprocal number data R of the discrete data constituting the approximated characteristic data extracted by the optimum correcting coefficient extracting unit 11j. In more concretely, for the discrete data f(0) to f(32) extracted by the optimum correcting coefficient extracting unit 11j, the reciprocal number calculating unit calculates reciprocal number [Ref/f(0), Ref/f(1), . . . , Ref/f(n)] as reciprocal number data R based on a reference value Ref (e.g., "1") held in the reference value holding unit 11n.

The interpolation processing unit (interpolating unit) 11p is a unit for interpolating the reciprocal number data R calculated by the reciprocal number calculating unit 11m with a first order equation, for example, so as to generate an output thereof as a calculation result Rc having the inverse characteristic data shown at C in FIG. 4. In this way, the reciprocal number data R composed of discrete values on the frequency axis are converted into the data Rc having a value continuous on the frequency axis. In this case, the aforesaid interpolation processing unit 11p is constructed as a first order equation approximation interpolating unit in which interpolation processing is carried out by arithmetic operation of a small load.

In other words, owing to the interpolation processing unit 11p, it becomes possible to carry out calculation for generating reciprocal number data for correcting the analyzed data corresponding to a lost portion of the frequency points due to the frequency decimation by the frequency decimating unit 11h.

Accordingly, the aforesaid frequency decimating unit 11h, the squaring error calculating unit 11i and the optimum correcting coefficient extracting unit 11j as the optimum characteristic extracting unit, the frequency characteristic database 11k, the reciprocal number calculating unit 11m, the reference value holding unit 11n and the interpolation processing unit 11p function as an inverse characteristic data calculating unit for calculating inverse characteristic data of the approximated characteristic data of the result of frequency spectrum analysis supplied from the FFT processing unit 11c.

The aforesaid interpolation processing effected by the interpolation processing unit 11p may be any processing so long as the processing leads to a characteristic of monotonous increase or monotonous decrease through the discrete data pieces. For example, interpolation may be effected so that the frequency information between the frequency information pieces lost by the decimation is stuffed with gain information which is increased or decreased step by step. Alternatively, the interpolation may be effected by any known means.

The multiplier 11q is a unit for multiplying the analyzed data Y (see reference A in FIG. 4) constituting the result of frequency spectrum analysis supplied from the FFT processing unit 11c and the data calculated by the aforesaid interpolation processing unit 11p (see reference C in the same figure) together. With this multiplication, it becomes possible to supply the corrected result Xc of the frequency spectrum analysis (see reference B in the same figure) to the subsequent spectrum peak frequency extracting unit 11d. In other words, the multiplier 11q functions as an analyzed result correcting unit for correcting the aforesaid result of frequency spectrum analysis by using the inverse characteristic data calculated by the interpolation processing unit 11p.

The spectrum peak frequency extracting unit 11d is a unit for extracting a frequency point taking the maximum value (significant frequency on the frequency axis except for 0 Hz) as a spectrum peak from the frequency spectrum analysis result Xc corrected by the multiplier 11q. The extracted frequency concerning the spectrum peak is generated as the elemental frequency (module frequency).

Accordingly, the aforesaid spectrum peak frequency extracting unit 11d functions as an extracting unit for extracting the significant frequency except for 0 Hz from the frequency spectrum analysis result corrected by the multiplier 11q as the elemental frequency.

Figure 67:
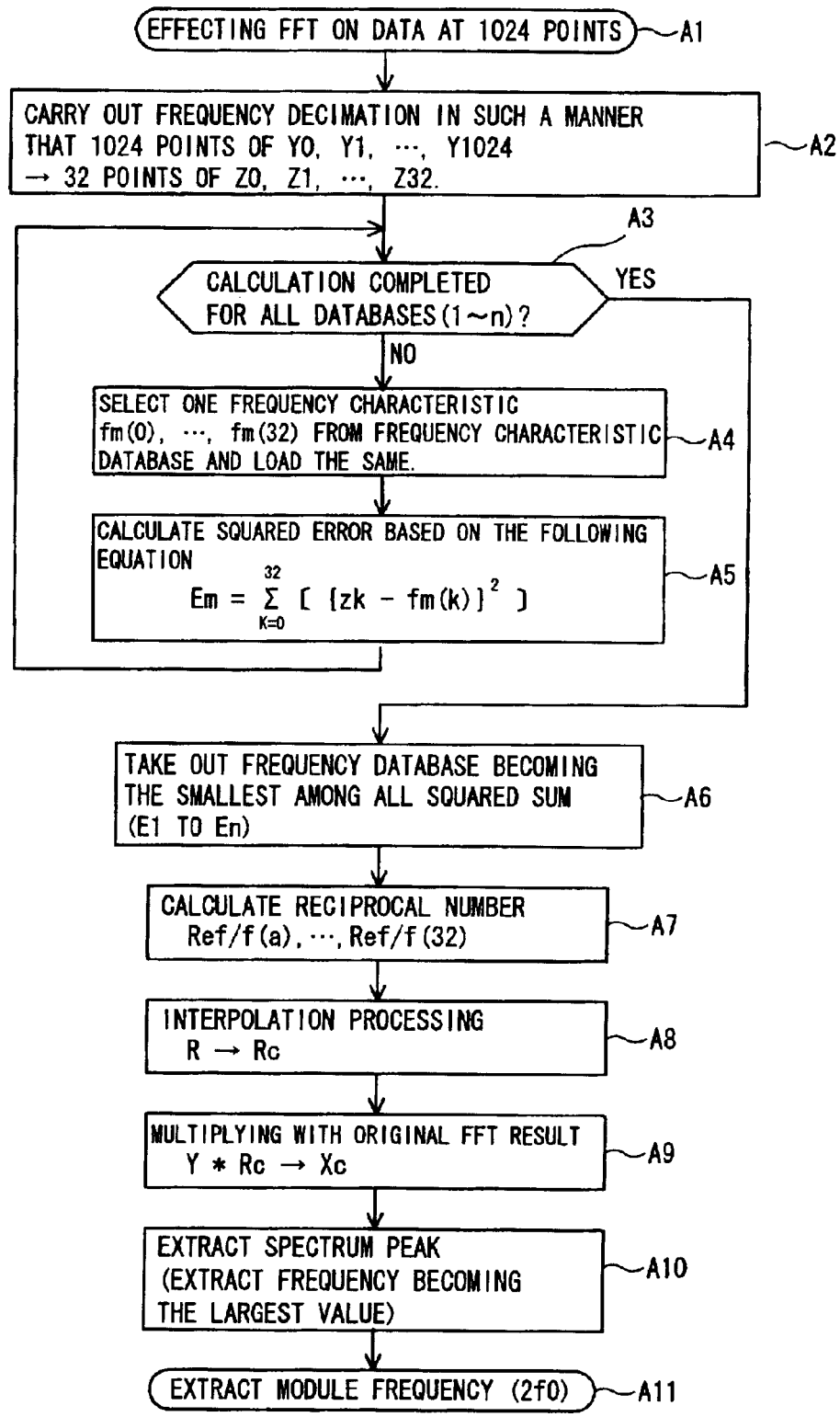
FIG. 67 is a flowchart for explaining the operation of the module frequency extracting unit as the second modification of the adaptive-type band limiting differentiating unit of the present embodiment.

Now description will be made on the processing operation carried out by the module frequency extracting unit 1g-1 constructed as described above with reference to a flowchart (step A1 to step A11) shown in FIG. 67.

Initially, the wide band differentiation processing unit 11a, the squaring processing unit 11b and the FFT processing unit 11c carry out the wide band differentiation processing, the squaring processing and the FFT processing on a bar code reading signal X acquired by the cut-out unit 1e in a manner similar to one described with reference to FIG. 1 (step A1). The result Y of the FFT processing is supplied to the multiplier 11q and the frequency decimating unit 11h.

The result Y of the FFT processing supplied to the frequency decimating unit 11h is sequentially subjected to each processing in the frequency decimating unit 11h, the squaring error calculating unit 11i, the optimum correcting coefficient extracting unit 11$j$, the inverse calculating unit 11$m$ and the interpolation processing unit 11$p$. Thus, the inverse characteristic data of the approximated characteristic data is calculated on the result Y of the FFT processing (step A2 to step A8).

The frequency decimating unit 11$h$ is supplied with the analyzed data y0, y1, y2, . . . , y1024 constituting the result Y (see reference A in FIG. 4) of the frequency spectrum analysis from the FFT processing unit 11$c$. The frequency decimating unit carries out the frequency decimation on the analyzed data y0, y1, y2, . . . , y1024, and supplies the data z0, z1, . . . , z32 after undergoing the decimation process as a result Z of the decimation to the squaring error calculating unit 11$i$ (step A2).

Subsequently, the squaring error calculating unit 11$i$ and the optimum correcting coefficient extracting unit 11$j$ compare the result Z having undergone the decimation process and the reference frequency characteristic Fm obtained from the frequency characteristic database 11$k$ with each other so as to determine the reference frequency characteristic closest to the result Z as the approximated characteristic data F.

In more detail, when the squaring error calculating unit 11$i$ is supplied with the data z0, z1, . . . , z32 after undergoing the decimation process, the squaring error calculating unit sequentially calculates each squared error Em [m is an integer ranging from 1 to n, see Equation (47)] between these data pieces z0, z1, . . . , z32 and the n-kinds of reference frequency characteristic obtained from the aforesaid frequency characteristic database 11$k$ (a loop beginning with NO route at step A3 through step A4 to step A5).

In more detail, the squaring error calculating unit 11$i$ selects one of the frequency characteristic Fm concerning the discrete data fm (0), . . . , fm(32), from the n-kinds of frequency characteristics F1 to Fn stored in the frequency database 11$k$ and loads the selected one (step A4). Then, the squaring error calculating unit calculates squared error by using the data pieces z0, z1, . . . , z32 and the loaded discrete data fm (0), . . . , fm(32) based on the aforesaid Equation (47) (step A5).

The squaring error calculating unit 11$i$ sequentially carries out the error squaring calculation for all of the frequency characteristics F1 to Fn stored in the frequency characteristic database 11$k$, and supplies the results of calculation to the subsequent optimum correcting coefficient extracting unit 11$j$. When the optimum correcting coefficient extracting unit 11$j$ receives the results of calculation from the squaring error calculating unit 11$i$, the optimum correcting coefficient extracting unit selects a set of discrete data f(0), . . . , f(32) corresponding to a frequency characteristic F providing the smallest calculation result from the frequency characteristic database 11$n$. Then the optimum correcting coefficient extracting unit takes out the selected discrete data as the optimum correcting coefficient (i.e., approximated characteristic data) (step A6).

The reciprocal number calculating unit 11$m$ calculates the reciprocal number R for the set of discrete data f(0), . . . , f(32) extracted by the optimum correcting coefficient extracting unit 11$j$ based on the reference value Ref held in the reference value holding unit 11$n$ (step A7). Subsequently, the interpolation processing unit 11$p$ interpolates discrete data Ref/f(0), . . . , Ref/f(32) as the reciprocal number data R calculated by the reciprocal number calculating unit 11$m$ by using a first order equation approximation. Thus, the interpolation processing unit constructs data Rc by calculation (see reference C in FIG. 66) so that the reciprocal number data R exhibits continuous variation on the frequency axis (step A8).

The multiplier 11$q$ multiplies the analyzed data y0, y1, . . . , y1024 as the result Y of the frequency spectrum analysis obtained by the aforesaid FFT processing unit 11$c$ (see reference A in FIG. 66) and the data Rc calculated by the interpolation processing unit 11$p$ in the above manner together. At this time, each analyzed data is corrected with the interpolating data Rc corresponding to the frequency point of the respective analyzed data y0, y1, . . . , y1024, whereby the result of frequency spectrum analysis containing the deterioration case can be corrected (step A9). In other words, also the analyzed data corresponding to the frequency point having undergone the decimation process in the frequency decimating unit 11$h$ can be corrected by the value of the interpolated data Rc at the corresponding frequency point.

The spectrum peak frequency extracting unit 11$d$ searches the result Xc (see reference B in FIG. 66) of the frequency spectrum analysis having undergone the process of correcting the loss caused by the above-described deterioration for the significant frequency except for 0 Hz, i.e., a frequency at a point having the largest spectrum value with respect to every frequency spectrum value, and the spectrum peak frequency extracting unit extracts the significant frequency as a spectrum peak frequency (step A10). Then, the frequency concerning the extracted spectrum peak is outputted as the elemental frequency (module frequency) (step A11).

As described above, according to the module frequency extracting unit 1$g$-1 of the present modifications, even if the bar code reading operation is effected on a bar code composed of small width bars or the beam diameter of the Gaussian beam irradiated on the bar code is relatively large as compared with the bar width due to the condition of the operator's reading action, or the result of frequency spectrum analysis is deteriorated due to the CCD resolution under the condition that the bar code reading is carried out by using the bar code reading apparatus employing the CCD, the elemental frequency can be extracted accurately by correcting the deterioration with an easy processing. Therefore, the following advantages can be obtained.

(1) It becomes possible to expand the range of bar code that can be read by the bar code reading apparatus. In more concretely, the depth of field for reading can be varied depending on how the reading action is made by the operator. However, it becomes possible to enlarge the extent of conditions that allow the bar code reading apparatus to read the bar code.

(2) A readable bar code width can be made narrower.

(3) If the resolution of the CCD is low, the spectrum peak can be extracted by an easy processing at a high accuracy. Therefore, the reading accuracy can be improved.

Moreover, in particular, when a spectrum peak frequency point to be extracted by the subsequent spectrum peak frequency extracting unit 11$d$ is left, owing to the above-described squaring error calculating unit 11$i$, the frequency characteristic database 11$k$ and the optimum correcting coefficient extracting unit 11$j$, the gain of the spectrum peak frequency point can be prevented from influencing upon the inverse characteristic data calculated by the subsequent reciprocal number calculating unit 11$m$ and the interpolation processing unit 11$p$. Accordingly, the spectrum peak frequency can be extracted by way of simple comparison among the spectrum intensities, with the result that it becomes possible to simplify the steps of extracting the module frequency and remarkably improve the accuracy of the steps of extraction.

Figure 68:
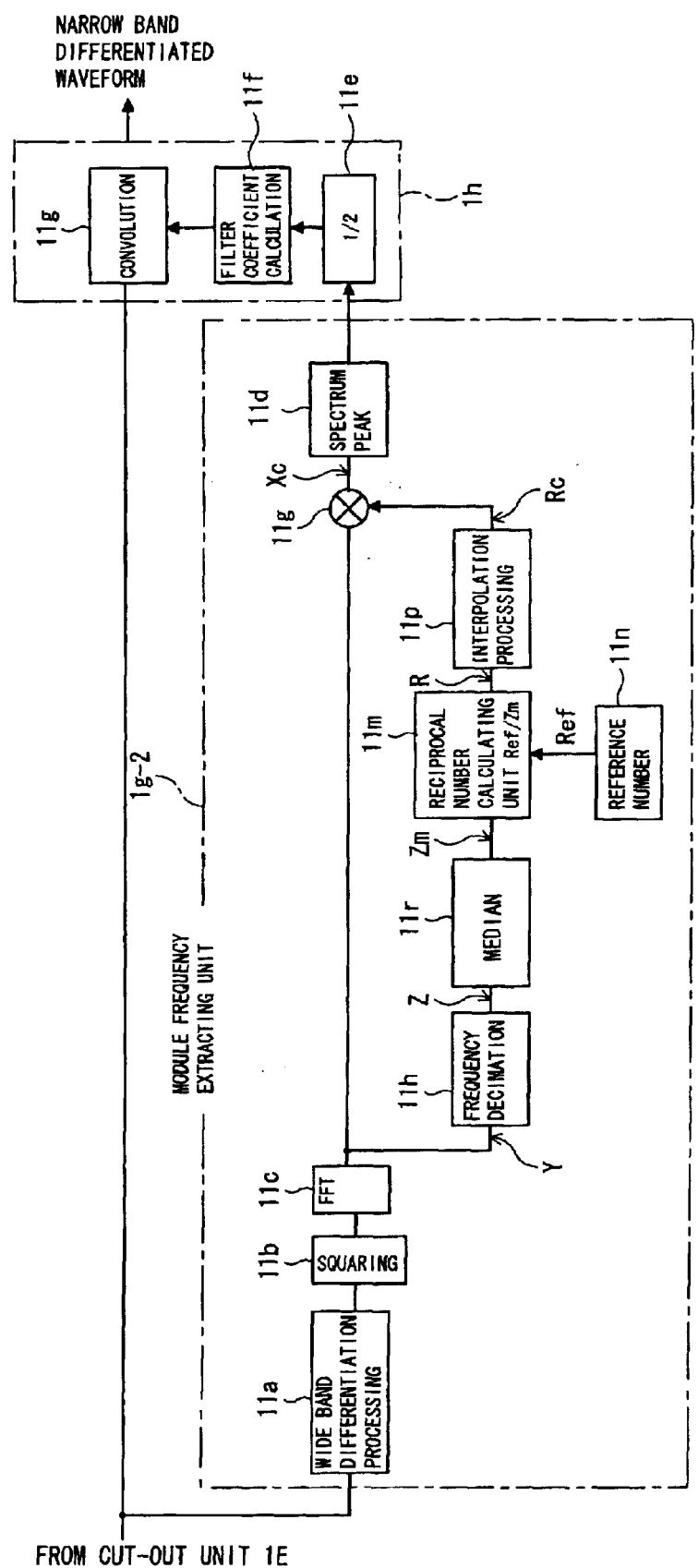
FIG. 68 is a block diagram of the adaptive-type band limiting differentiating unit of the present embodiment to which reference is made to illustrate how the module frequency extracting unit is applied to one mode of arrangement to construct a third modification thereof.

(C-8) Description of Module Frequency Extracting Unit 1g-2 as Third Modification of Adaptive-Type Band Limiting Differentiating Unit 1f of Present Embodiment FIG. 68 is a block diagram showing an example of an adaptive-type band limiting differentiating unit in which a module frequency extracting unit 1g-2 is employed in lieu of the module frequency extracting unit 1g of the adaptive-type band limiting differentiating unit 1f of the aforesaid bar code reading apparatus shown in FIG. 1. Also the module frequency extracting unit 1g-2 shown in FIG. 68 is arranged based on the following intension. That is, when a signal is subjected to the aforesaid arrangement and the signal causes a spectrum profile such as one shown at A in FIG. 66, as shown at C in FIG. 66, inverse characteristic data calculated based on the result of frequency spectrum analysis is introduced for correcting the result of frequency spectrum analysis, and as shown at C in FIG. 66, the spectrum peak to be extracted can be extracted with ease and at high accuracy.

The module frequency extracting unit 1g-2 shown in FIG. 68 is different from the aforesaid module frequency extracting unit 1g-1 shown in FIG. 63 in a point that the squaring error calculating unit 11i, the optimum correcting coefficient extracting unit 11j and the frequency characteristic database 11k are replaced with a median filter 11r. Other components (see references 11a to 11h, 11m to 11q) are similar to those of the second modification.

The median filter (median filter processing unit) 11r is interposed between the frequency decimating unit 11h and the reciprocal number calculating unit 11m. This median filter is a unit for further effecting a median filter processing on the analyzed data z0, z1, ..., z32 left after the frequency decimation in the frequency decimating unit 11h so as to obtain approximated characteristic data Zm. That is, the median filter 11r is arranged to select only a median of neighboring three points as frequency points and outputs the selected one. Owing to the unit, a spike point desired to be removed upon calculating the inverse characteristic data can be removed.

Figure 69A:
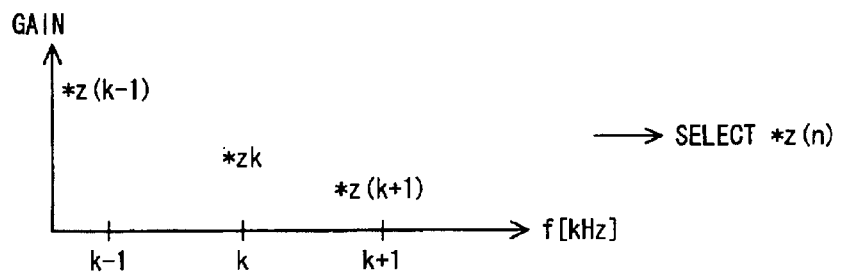
FIGS. 69(a) to 69(c) are diagrams each for explaining an operation of a median filter in the module frequency extracting unit as the third modification of the adaptive-type band limiting differentiating unit.
Figure 69B:
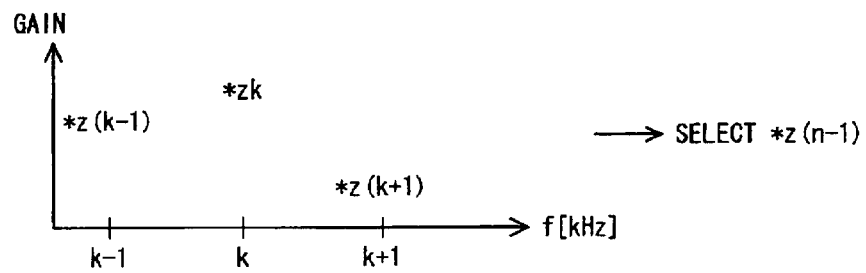
Figure 69C:
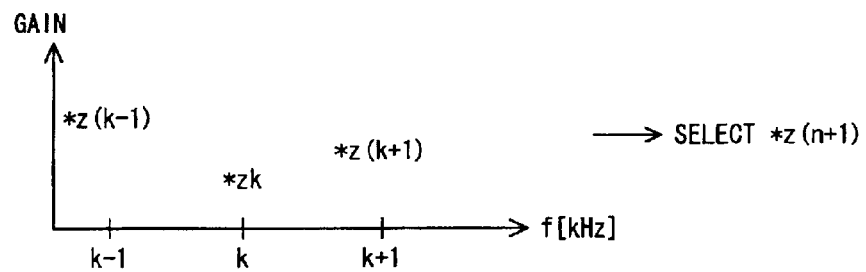

FIGS. 69(a) to 69(c) are diagrams for concretely explaining the filter processing of the above-described median filter 11r. In the diagrams of FIGS. 69(a) to 69(c), it is assumed that gain of each analyzed data takes a level shown at a mark "*".

When the median filter 11r outputs a value of zk (k ranges from 0 to 32), the median filter examines the values of gains (or spectrum intensity) of three frequency points including values of the adjacent two points on the frequency axis by comparing any two of the three. For example, in the case of FIG. 69(a), a value of z(k−1) is the largest, a value of z(k+1) is the smallest and a value of zk corresponds to the median of the values [see Equation (48)]. Therefore, the median filter 11r directly outputs the value of zk.

$$z(k-1) < zk < z(k+1) \quad (48)$$

In the case of FIG. 69(b), zk takes the largest value, z(k+1) takes the smallest value and z(k−1) takes the median value [see Equation (49)]. Thus, the median filter 11r selects the median value z(k−1) as the value of zk and out puts the same. In the case of FIG. 69(c), z(k−1) takes the largest value, zk takes the smallest value and z(k+1) takes the median value [see Equation (50)]. Thus, the median filter 11r selects the median value z(k+1) as the value of zk and out puts the same.

$$z(k+1) < z(k-1) < zk \quad (49)$$

$$zk < z(k+1) < z(k-1) \quad (50)$$

As described above, the median filter 11r removes particularly a spike point such as a spectrum peak frequency point which is desired to be extracted by the subsequent spectrum peak frequency extracting unit 11d. Thus, the inverse characteristic data calculated by the subsequent interpolation processing unit 11p can be prevented from containing the spectrum peak element. In this way, the spectrum peak can be extracted accurately and reliably based on the result Xc of the frequency spectrum analysis corrected by the multiplier 11q.

The reciprocal number calculating unit (reciprocal number data calculating unit) 11m is a unit for calculating reciprocal number data Ref/Zm of the analyzed data Zm constituting the approximated characteristic data obtained by the median filter based on the reference value Ref held by the reference value holding unit 11n. The interpolation processing unit (interpolating unit) 11p is a unit for interpolating the reciprocal number data calculated by the reciprocal number calculating unit 11m and outputting the result interpolation as calculation result of the inverse characteristic data. The reciprocal number calculating unit 11m, the reference value holding unit 11n and the interpolation processing unit 11p have fundamentally similar constructions as those shown in the aforesaid FIG. 63.

As described above, also according to the module frequency extracting unit 1g-2 of the present modifications, even if the bar code operation is effected on a bar code composed of small width bars or the beam diameter of the Gaussian beam irradiated on the bar code is relatively large as compared with the bar width due to the condition of the operator's reading action, or the result of frequency spectrum analysis is deteriorated due to the CCD resolution under the condition that the bar code reading is carried out by using the bar code reading apparatus employing the CCD, the elemental frequency can be extracted accurately by correcting the deterioration with an easy processing. Therefore, advantages similar to those itemized by (i) to (iii) described in [2-1] can be obtained.

Moreover, owing to the median filter 11r, in particular, when a spectrum peak frequency point to be extracted by the subsequent spectrum peak frequency extracting unit 11d is left, the gain of the spectrum peak frequency point can be prevented from influencing upon the inverse characteristic data calculated by the subsequent reciprocal number calculating unit 11m and the interpolation processing unit 11p. Accordingly, the spectrum peak frequency can be extracted by way of simple comparison among the spectrum intensities, with the result that the steps of extracting the module frequency can be simplified and the accuracy of the steps of extraction can be remarkably improve.

(D) Description of Every Module Point Amplitude Extracting Unit of Bar Code Reading Apparatus According to Present Embodiment Description will be hereinafter made on an every module point amplitude extracting unit of the bar code reading apparatus according to the present embodiment.

Figure 29:
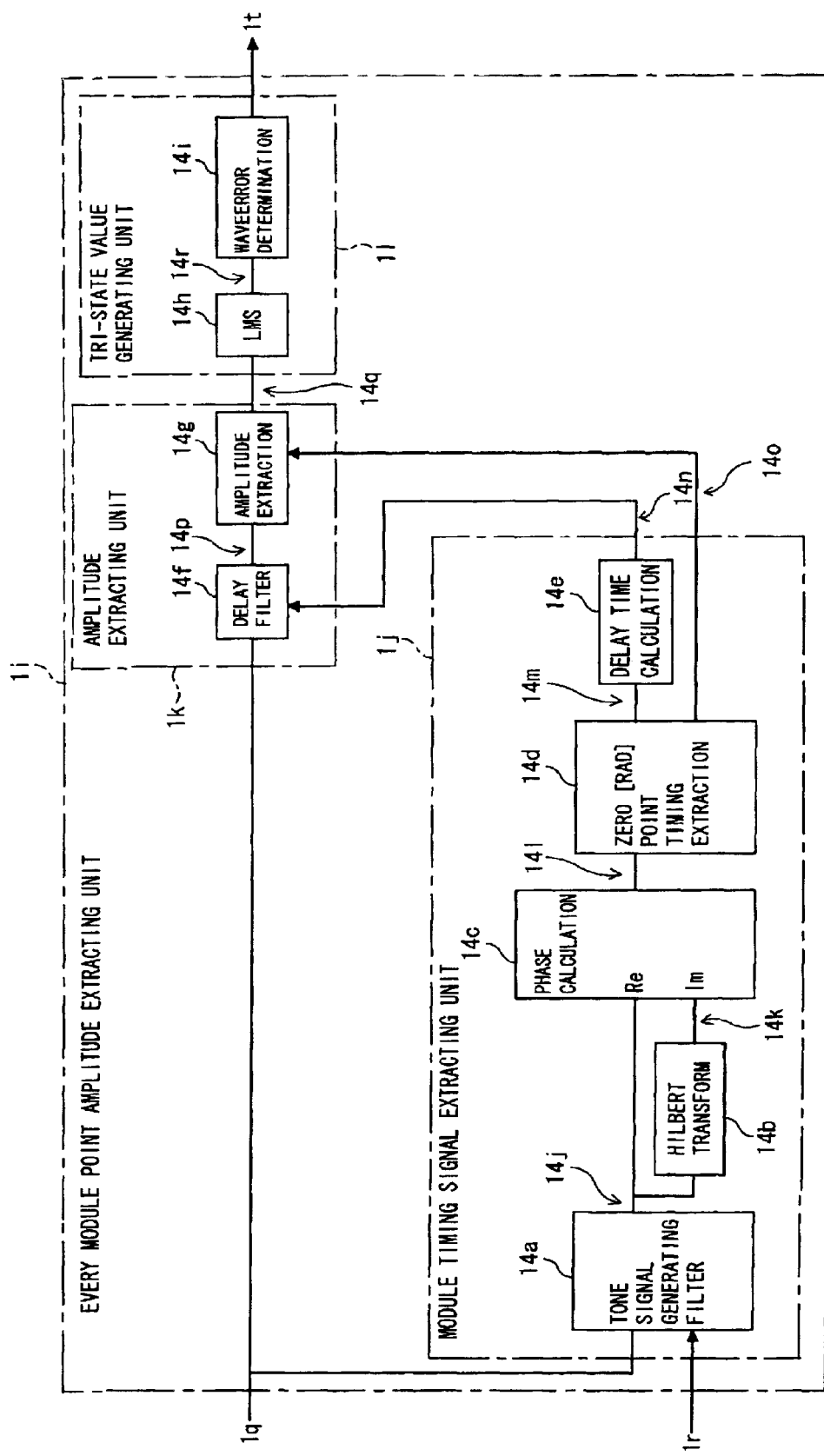
FIG. 29 is a block diagram showing an every module point amplitude extracting unit of the present embodiment.

(D-1) Description of Overall Arrangement of Every Module Point Amplitude Extracting Unit of Bar Code Reading Apparatus According to Present Embodiment FIG. 29 is a block diagram showing an arrangement of an every module point amplitude extracting unit 1i. As shown in FIG. 29, the every module point amplitude extracting unit 1i is arranged to have a module timing signal extracting unit 1j, an amplitude extracting unit 1k and a tri-state value generating unit 1l. The every module point amplitude extracting unit is a unit arranged for generating a periodic signal which is in synchronism with the acquired signal and has an elemental frequency corresponding to the module length. Thus, module information can be extracted.

The module timing signal extracting unit 1*j* is further arranged to have a tone signal generating filter 14*a*, a Hilbert transform unit 14*b*, a phase calculating unit 14*c*, a zero-radian point timing extracting unit 14*d* and a delay time calculating unit 14*e*.

The tone signal generating filter 14*a* is a unit for generating a timing signal as a tone signal (periodic signal) based on the acquired signal (photoelectric converted signal) having undergone band limitation in the aforesaid adaptive-type band limiting differentiating unit 1*f* and the extracted module frequency. This timing signal can be generated as a tone signal with a sine-wave-like waveform having a frequency corresponding to the unit module width of the bar code. The detail thereof will be described in (D-2).

The Hilbert transform unit 14*b* is a unit for effecting Hilbert transform on the tone signal supplied from the tone signal generating filter 14*a*. In this Hilbert transform unit, the tone signal from the tone signal generating filter 14*a* is set to a real part (Re) of the complex number and a signal having undergone the Hilbert transform processing is set to an imaginary part (Im) of the complex number, and the resulting complex number is supplied to the subsequent phase calculating unit 14*c*, whereby a signal of each sample point can be formed into a vector.

Further, the phase calculating unit 14*c* is a unit for calculating a phase of the sample point formed into a vector as described above. The zero-radian point timing extracting unit 14*d* is a unit for extracting a point at which the phase becomes zero-point based on the phase information calculated by the phase calculating unit 14*c* and deriving the module timing. The delay time calculating unit 14*e* is a unit for calculating, at every deriving module timing, the delay time of the sample point with respect to the point at which the phase extracted by the zero-radian timing extracting unit 14*d* becomes a zero-point.

Meanwhile, the amplitude extracting unit 1*k* is further arranged to have a delay filter 14*f* and an amplitude extracting unit 14*g*. The delay filter 14*f* serves as a delay filter based on the delay time calculated by the aforesaid delay time calculating unit 14*e*. The delay filter effects a delay processing on the acquired signal supplied from the adaptive-type band limiting differentiating unit 1*f* by a convolution processing. With this filtering operation, the sample point can be made coincident with the zero-radian timing point.

The tri-state value generating unit 1*l* is further arranged to have an LMS (Least Mean Square) 14*h* as an automatic equalizing unit and a wave error determining unit 14*i*. The LMS 14*h* is a unit for automatically equalizing the amplitude data (see reference 14*q* in FIG. 29) extracted at every module timing, thereby generating tri-state data composed of "1", "0" and "−1". The wave error determining unit 14*i* is a unit for examining the amplitude data formed into the tri-state data by the LMS 14*h* so as to determine whether there is error contained or not.

With the above arrangement, the every module point amplitude extracting unit 1*i* shown in FIG. 29 carries out the following steps as a preprocessing for reading the ratio (bar code information) of the information length of the binary digit information on the basis of the acquired signal having undergone the band limiting processing in the adaptive-type band limiting differentiating unit 1*f* and the module frequency information. That is, the every module point amplitude extracting unit extracts a timing point in synchronism with the acquired signal and having the module frequency, extracts an amplitude value of the signal supplied from the adaptive-type band limiting differentiating unit 1*f* in accordance with the extracted timing point, and leads the amplitude value in accordance with the extracted timing point as tri-state value data.

In other words, the every module point amplitude extracting unit 1*i* extracts the timing point at which module length data resides from the acquired signal. The subsequent module number calculating unit 1*m* reads the integer ratio between each width length data pair from the bar code as a mark in accordance with the extracted timing point.

When the timing point is extracted, the every module point amplitude extracting unit 1*i* utilizes the acquired signal having undergone the differentiating processing in the adaptive-type band limiting differentiating unit 1*f* as an input signal to extract a frequency component corresponding to the module width time (elemental width time) of the bar code data (width length data), generates a periodic signal corresponding to the elemental width time, and specifies the timing point corresponding to the point at which the bar code width information resides based on the generated periodic signal as an input signal. Meanwhile, the aforesaid adaptive-type band limiting differentiating unit 1*f* may be arranged to have a differentiation characteristic which has been described in the above-described sections of (C-1) or (C-2).

Figure 30:
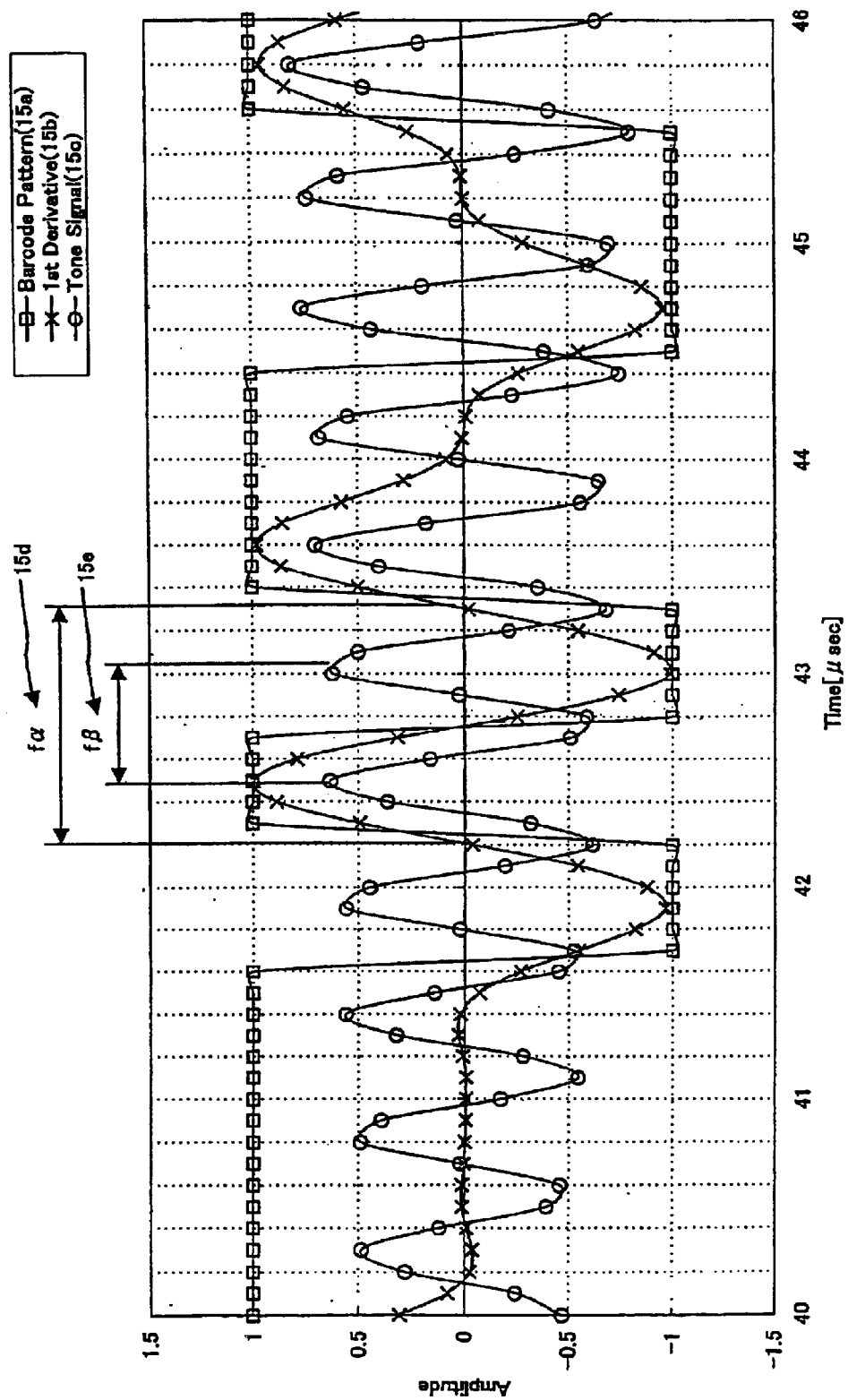
FIG. 30 is a diagram for explaining an operation of the every module point amplitude extracting unit of the present embodiment.

For example, if the aforesaid every module point amplitude extracting unit 1*i* is supplied with a digital signal having a differentiated waveform 15*b* shown in FIG. 30 (see sample points indicated by marks "X" on the waveform 15*b*) as the acquired signal having undergone the band limitation process, the tone signal generating filter 14*a* of the module timing signal extracting unit 1*j* generates a digital signal as a periodic signal corresponding to the tone signal waveform 15*c* (see sample points indicated by marks "○" on the waveform 15*c*) on the basis of the aforesaid digital signal 15*b* and the module frequency information extracted by the module frequency extracting unit 1*g*. The waveform 15*c* of the tone signal is synchronize with the waveform 15*b* of the acquired signal having undergone the band limitation process.

The phase calculating unit 14*c* is supplied with the tone signal generated from the aforesaid tone signal generating filter 14*a* and a signal deriving from the Hilbert transform effected by the Hilbert transform unit 14*b* on the tone signal. The phase calculating unit forms a vector based on the supplied signals and calculates phases of respective signal points of the vectored signal. Thus, phase data (digital signal) shown in FIG. 31(*a*) is generated as the result of calculation.

Figure 31A:
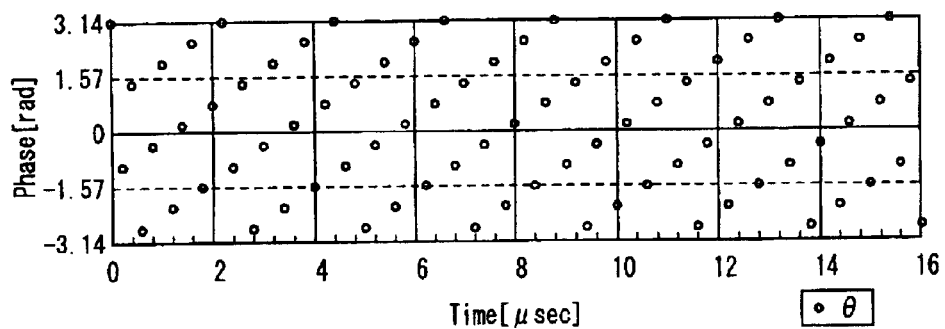
FIGS. 31(a) to 31(c) are diagrams each for explaining the operation of the every module point amplitude extracting unit of the present embodiment.
Figure 31B:
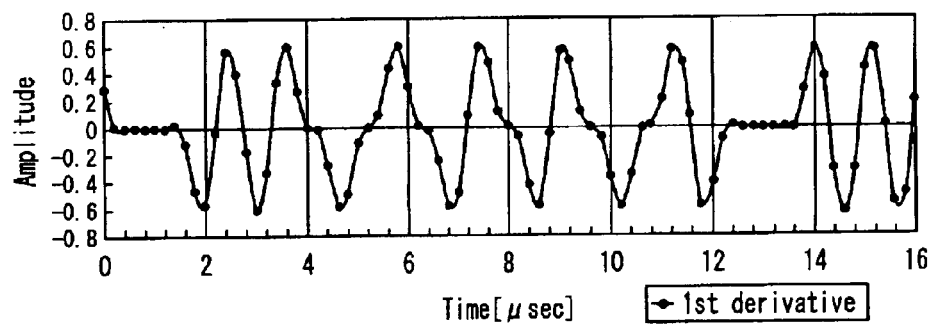
Figure 31C:
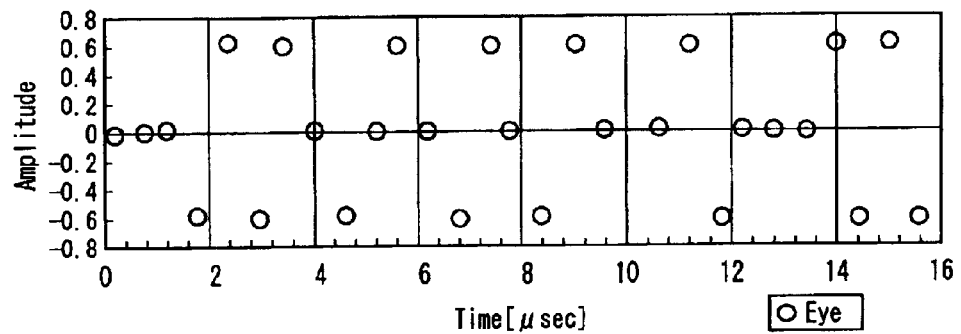

The zero-radian point timing extracting unit 14*d* extracts a point at which the phase becomes a zero-radian point based on the phase data calculated by the phase calculating unit 14*c*. Thus, the module timing can be led. As shown in FIG. 31(*a*), the phase of the sample point (see FIG. 31(*b*)) and the actual zero-radian point are different from each other (the sampling is not necessarily effected at the zero-radian point). Therefore, on the basis of the timing of the zero-radian point extracted by the zero-radian point timing extracting unit 14*d*, the delay time calculating unit 14*e* and the delay filter 14*f* corrects the deviation between the sample point and the zero-radian point.

That is, the delay time calculating unit 14*e* calculates the time difference between the sample point and the zero-radian point for every module timing. The delay filter 14*f* of the amplitude extracting unit 1*k* carries out the delay processing. In this way, sample data can be obtained for every module timing. Thereafter, the amplitude extracting unit 14*g* extracts the differentiated signal amplitude (digital data) as shown in FIG. 31(*c*).

In other words, when the timing point is extracted, the timing point for reading the information length of the binary digit recorded on the bar code is specified based on the differentiated signal of the acquired electric signal, and the digital information composed of tri-state values is extracted from the amplitude of the signal having undergone the differentiation processing at every specified timing point. In order for extracting the above-described digital information composed of the tri-state values, the amplitude value of the signal having undergone the differentiation processing is extracted at every specified timing point and the extracted amplitude value of the signal is converted into digital data composed of tri-state values.

The LMS 14h of the tri-state value generating unit 11 effects automatic equalizing processing on the amplitude value in accordance with the aforesaid timing point extracted by the amplitude extracting unit. Thus, the tri-state value data can be led. The wave error determining unit 14i generates a signal appropriate as a series of bar code reading data.

That is, when the amplitude value extracted at every timing point is converted into the digital signal composed of tri-state values, the tri-state value generating unit 11 determine which of the values "+1", "0" and "−1" the amplitude value of the extracted signal should take and generates the result of determination data composed of tri-state values. Thereafter, the module number calculating unit 1m interprets the data formed into the tri-state values in such a manner that the signal point having data of "+1" located thereat corresponds to a point at which an edge of one of white and black regions resides, the signal point having data of "−1" located thereat corresponds to a point at which an edge of the other of the white and black regions resides, and the signal point having data of "0" located thereat corresponds to a point at which no edge resides. In this way, the integer ratio between each width length data pair of the bar code can be read.

Therefore, according to the present embodiment, as a preprocessing for reading the bar width length ratio of the bar code information, the module timing signal extracting unit 1j extracts the timing point synchronous with the acquired signal and having the elemental frequency based on the acquired signal and the module frequency information, the amplitude extracting unit 1k extracts the amplitude value of the signal supplied from the adaptive-type band limiting differentiating unit 1f in accordance with the extracted timing point, and the amplitude value can be led as the tri-state value data in accordance with the extracted timing point. Therefore, the operation of the information reading can be free from disturbance caused by information deriving from points other than the module timing points, and the resolution in reading information can be improved together with the S/N ratio of the read signal. Furthermore, even if the depth of field for reading is enlarged or a concave/convex portions or a blurred portion are left on the reading face, the reading accuracy can be improved.

Moreover, the sampling frequency need not be set to a high frequency in order for measuring the module length of the bar code, and a clock of relatively low price may be sufficient for the sampling operation. Therefore, the cost for constructing the arrangement of the apparatus can be remarkably decreased.

(D-2) Description of Module Timing Signal Extracting Unit of Present Embodiment

Initially, an arrangement of the tone signal generating filter 14a will be described in detail.

The above-described tone signal generating filter 14a may be arranged to have a squared cosine characteristic of which gain peak frequency is set to the module frequency extracted by the module frequency extracting unit 1g and a phase characteristic which keeps constant at all.

The description thereof will be provided below.

That is, as shown in aforesaid FIG. 30, when the module timing is extracted from the differentiated signal having undergone the band limiting processing, the elemental frequency of the differentiated signal becomes fα because the signal is composed of one white module+one black module (see reference 15d in FIG. 30). On the other hand, the timing frequency becomes fβ because the signal is composed of unit modules of a white bar or black bar (see reference 15c in FIG. 30).

Accordingly, relationship between the module frequency f1 extracted by the aforesaid module frequency extracting unit 1g and the above-describe fα or fβ can be expressed by the following Equations (22) and (23).

$$f\alpha = f1/2 \quad (22)$$

$$f\beta = f1 \quad (23)$$

That is, the tone signal generating filter is arranged as a filter having a center frequency of fβ. Therefore, if an acquired signal 1q having undergone the band limiting processing is convolution-processed in the tone signal generating filter 14a, a tone signal having this module frequency component can be led.

For example, the characteristics of the tone signal generating filter 14a can be set to those expressed by the following Equations (24) to (26). In Equations (24) to (27), fs represents a sampling frequency of the AD converter 1d, and fw a band width (−6 dB) of the arranged filter.

$$\text{gain} = \cos^2(f-f\beta)\pi/2*fw): (f\beta - fw/2 \leq f < f\beta + fw/2) \quad (24)$$

$$\text{gain} = \cos^2((f-(fs-f\beta))\pi/2*fw): (fs-f\beta-fw/2 \leq f < fs-f\beta+fw/2) \quad (25)$$

gain=0: (frequency is other one except for a case of Equation (24) or Equation (25)) (26)

$$\text{phase}(\theta[\text{rad}]) = 0 (0 <= f <= fs) \quad (27)$$

The characteristic of band width represented by fw may be set to one proportional to a reciprocal number of a time length expressing the white-black width information. In more concretely, the band width fw can be calculated by extracting a time length (tbar) representing only the white-black signal (bar code signal) portion from the cut-out signal supplied from the adaptive-type band limiting differentiating unit 1f in accordance with the following Equation (28).

$$fw = 1/\text{tbar}*k \ (k \text{ is a fixed value}) \quad (28)$$

Figure 32:
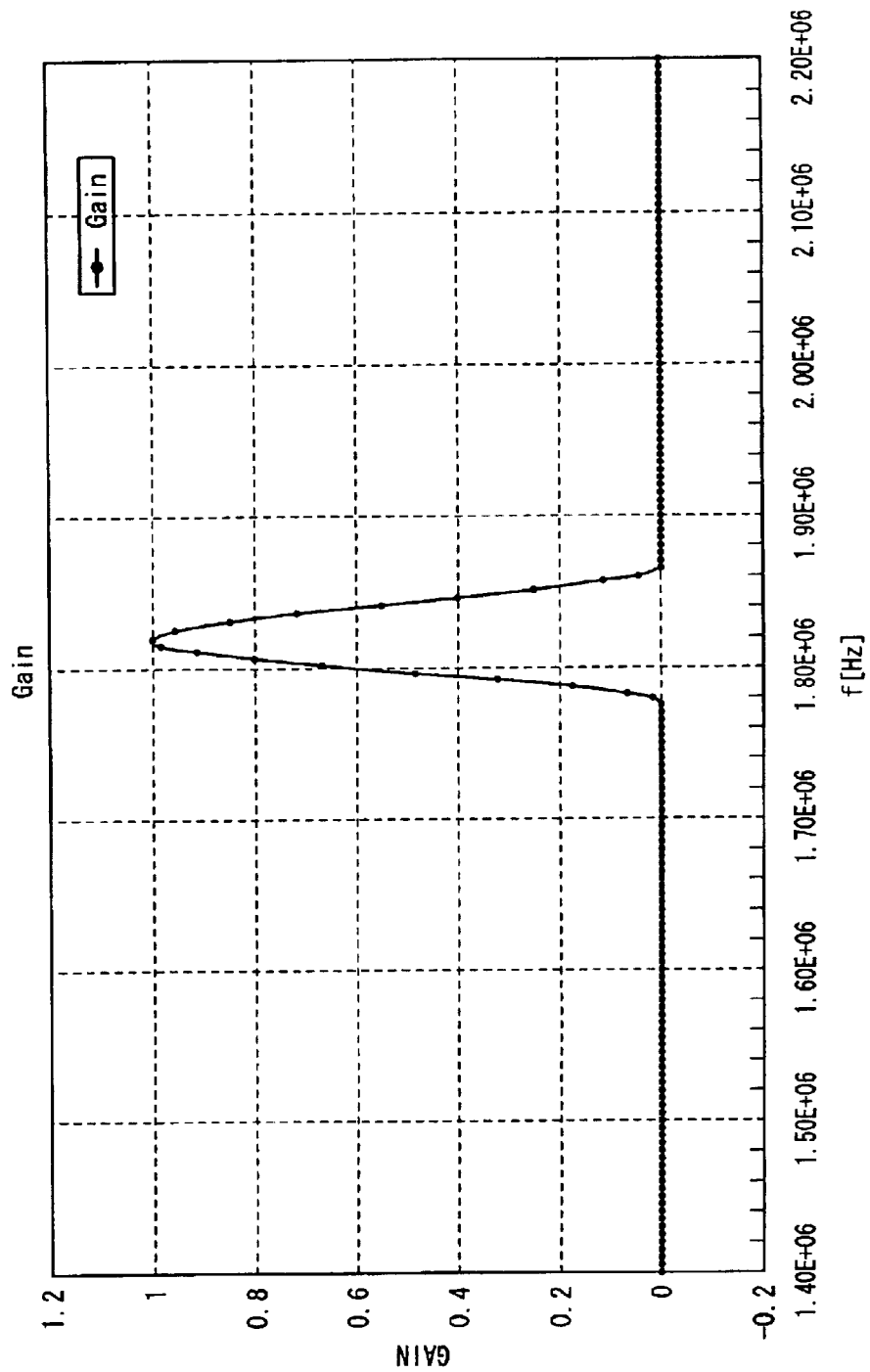
FIG. 32 is a diagram for explaining the operation of the every module point amplitude extracting unit of the present embodiment.
Figure 33:
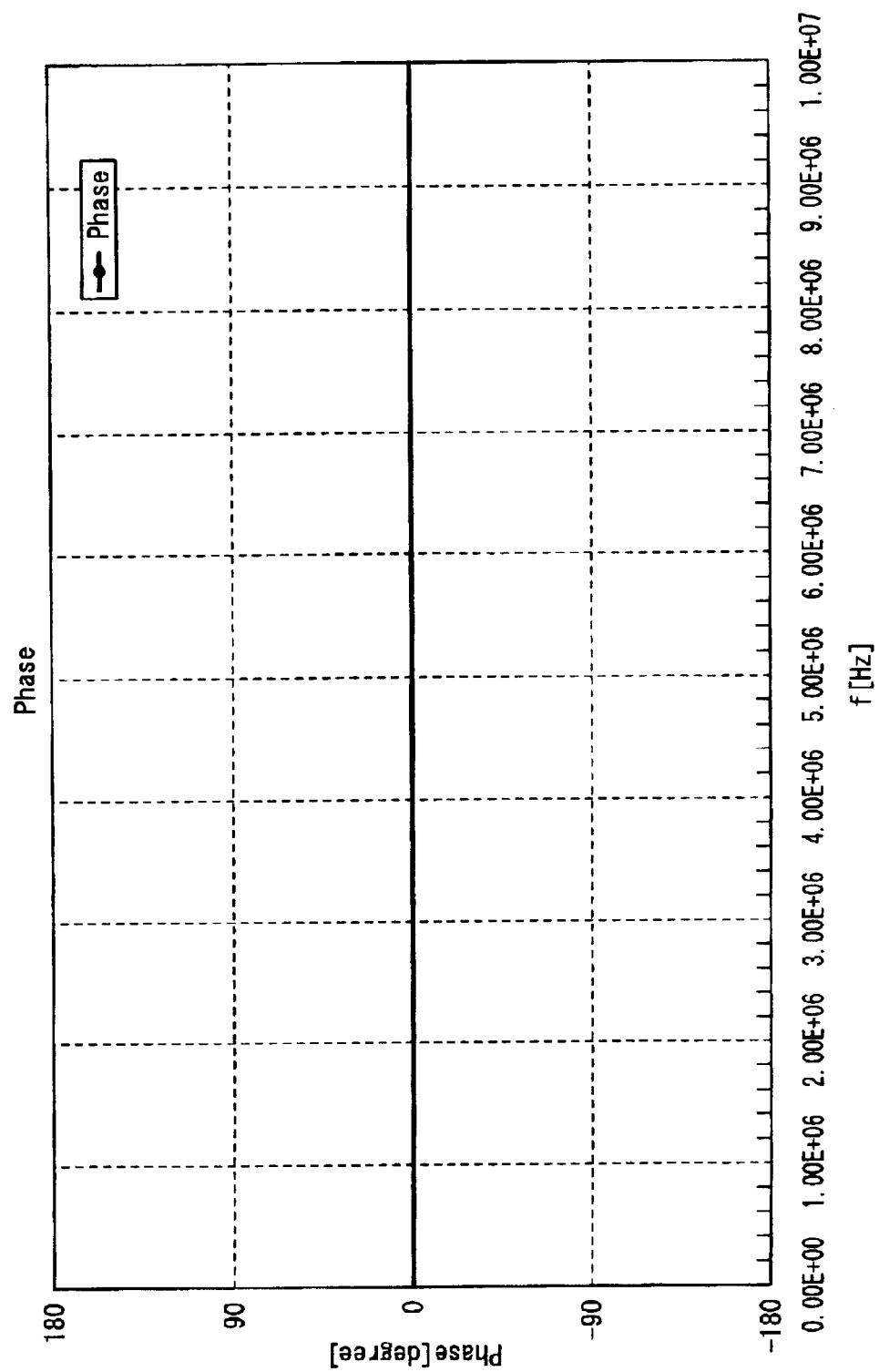
FIGS. 33 and 34 are diagrams each for explaining the operation of the every module point amplitude extracting unit of the present embodiment.
Figure 34:
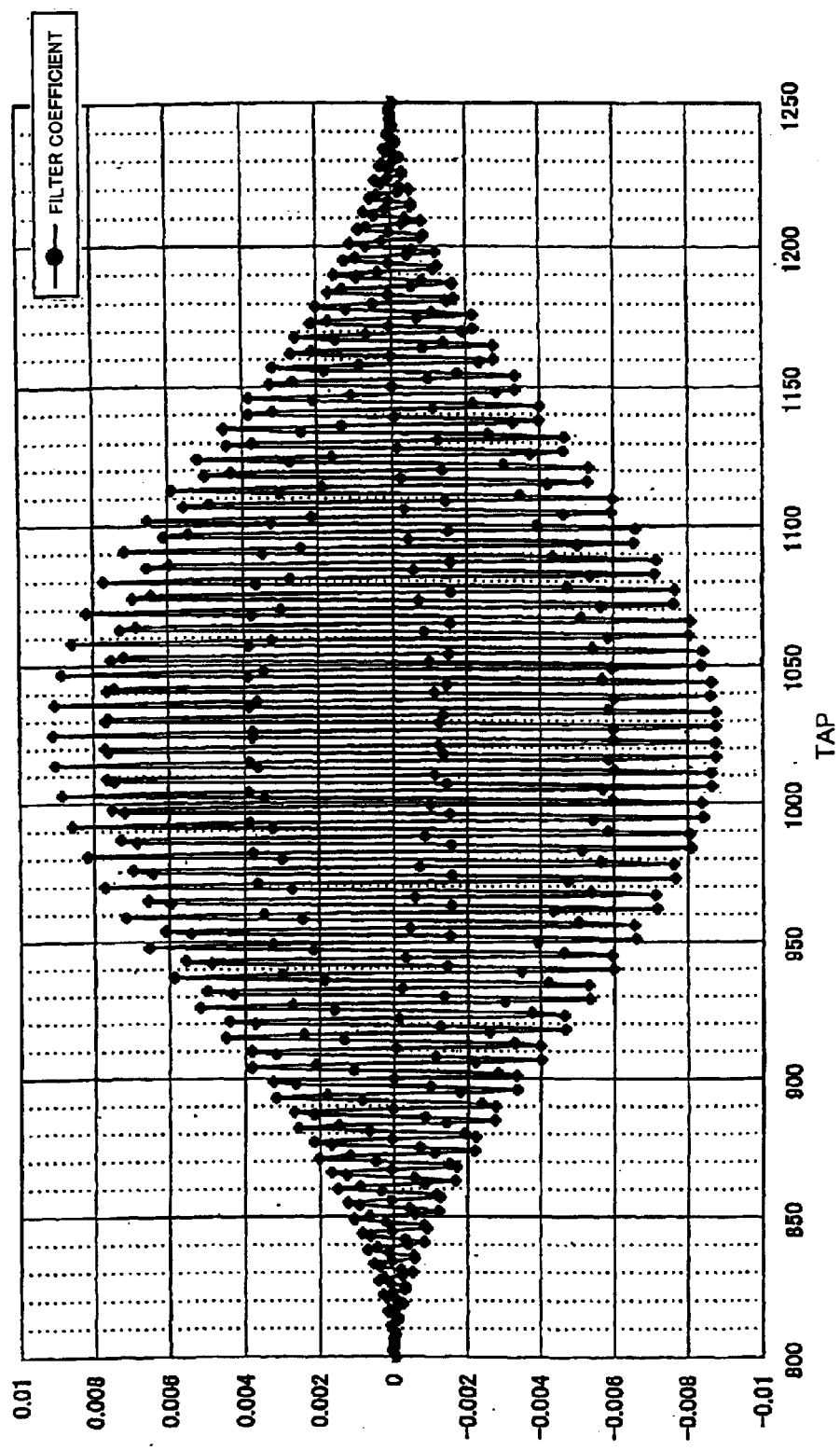

In more concretely, when the central frequency fβ is set to 1820 kHz, owing to a gain characteristic shown in FIG. 32 and a phase characteristic shown in FIG. 33, the tone signal generating filter 14a can be arranged to be a digital filter having a characteristic shown in FIG. 34. Thus, a signal supplied from the adaptive-type band limiting differentiating unit 1f may be subjected to the convolution processing in the filter 14a to obtain a tone signal.

The Hilbert transforming unit 14b and the phase calculating unit 14c will be hereinafter described in detail.

Figure 35:
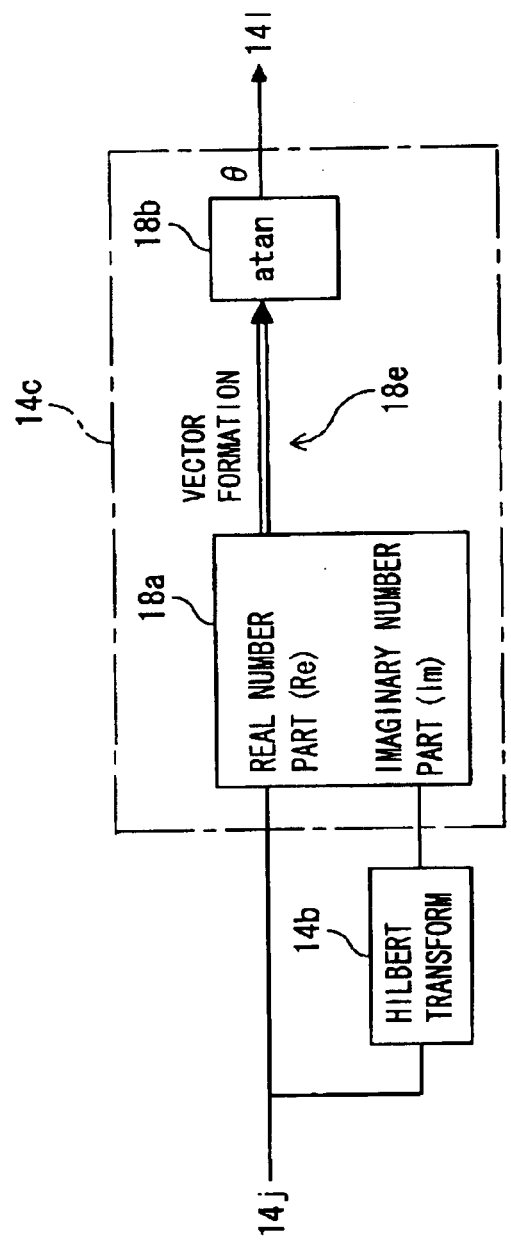
FIG. 35 is a block diagram showing a main portion of the every module point amplitude extracting unit of the present embodiment.

FIG. 35 is a block diagram showing the Hilbert transforming unit 14b and the phase calculating unit 14c of the present embodiment. As shown in FIG. 35, the phase calculating unit 14c is arranged to have a vectoring unit 18a and a calculating unit 18b.

Figure 36:
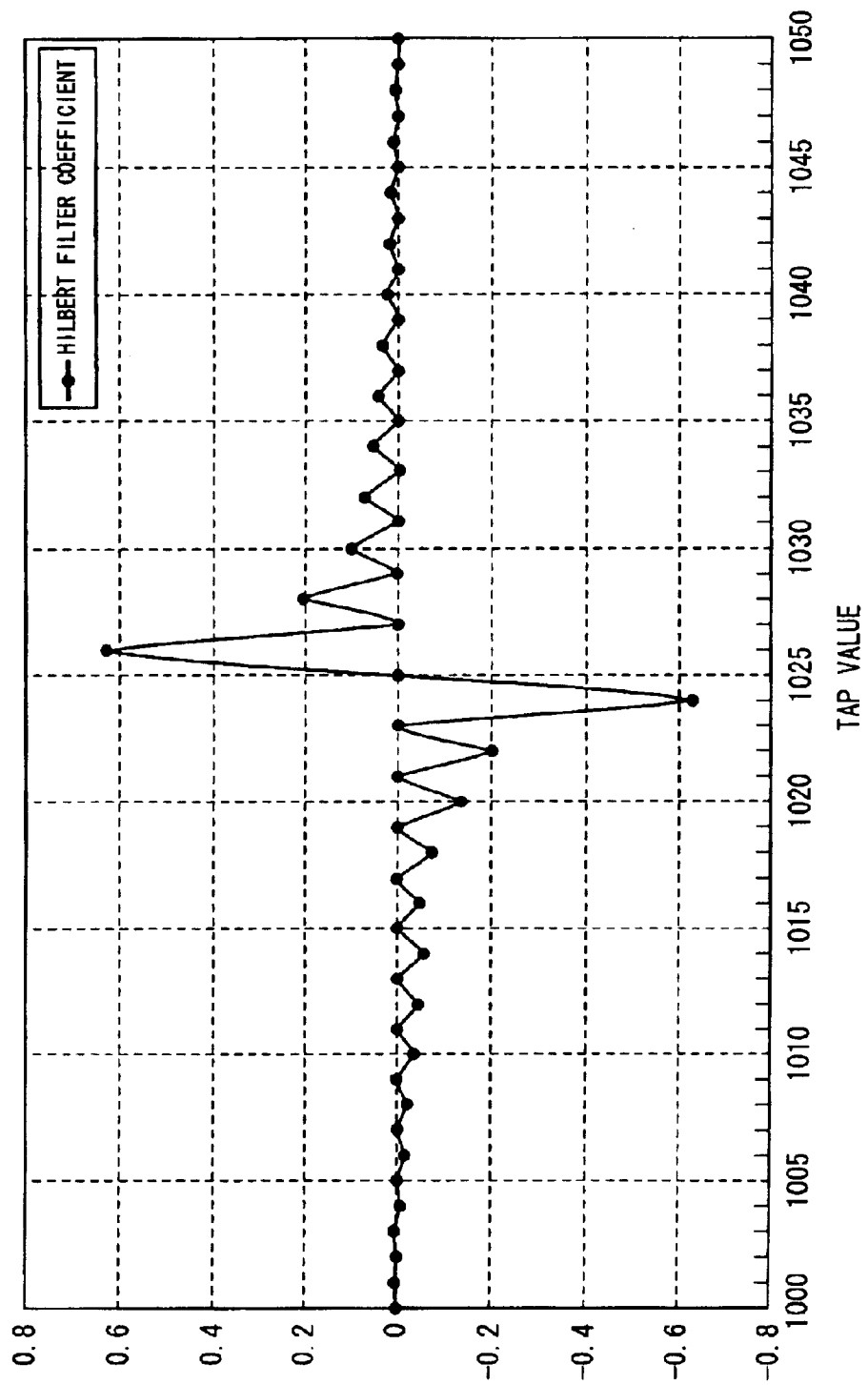
FIGS. 36, 37, 38(a) to 38(c), 40 and 41 are diagrams each for explaining the operation of the every module point amplitude extracting unit of the present embodiment.

As described above, the Hilbert transforming unit 14b is a unit for effecting Hilbert transform on the tone signal generated by the tone signal generating filter 14a. This Hilbert transforming unit 14b is composed of a digital filter having a characteristic as for example shown in FIG. 36. That is, the Hilbert transforming unit can be arranged to have a transversal filter (see FIG. 3) having a tap shown in FIG. 36.

Figure 37:
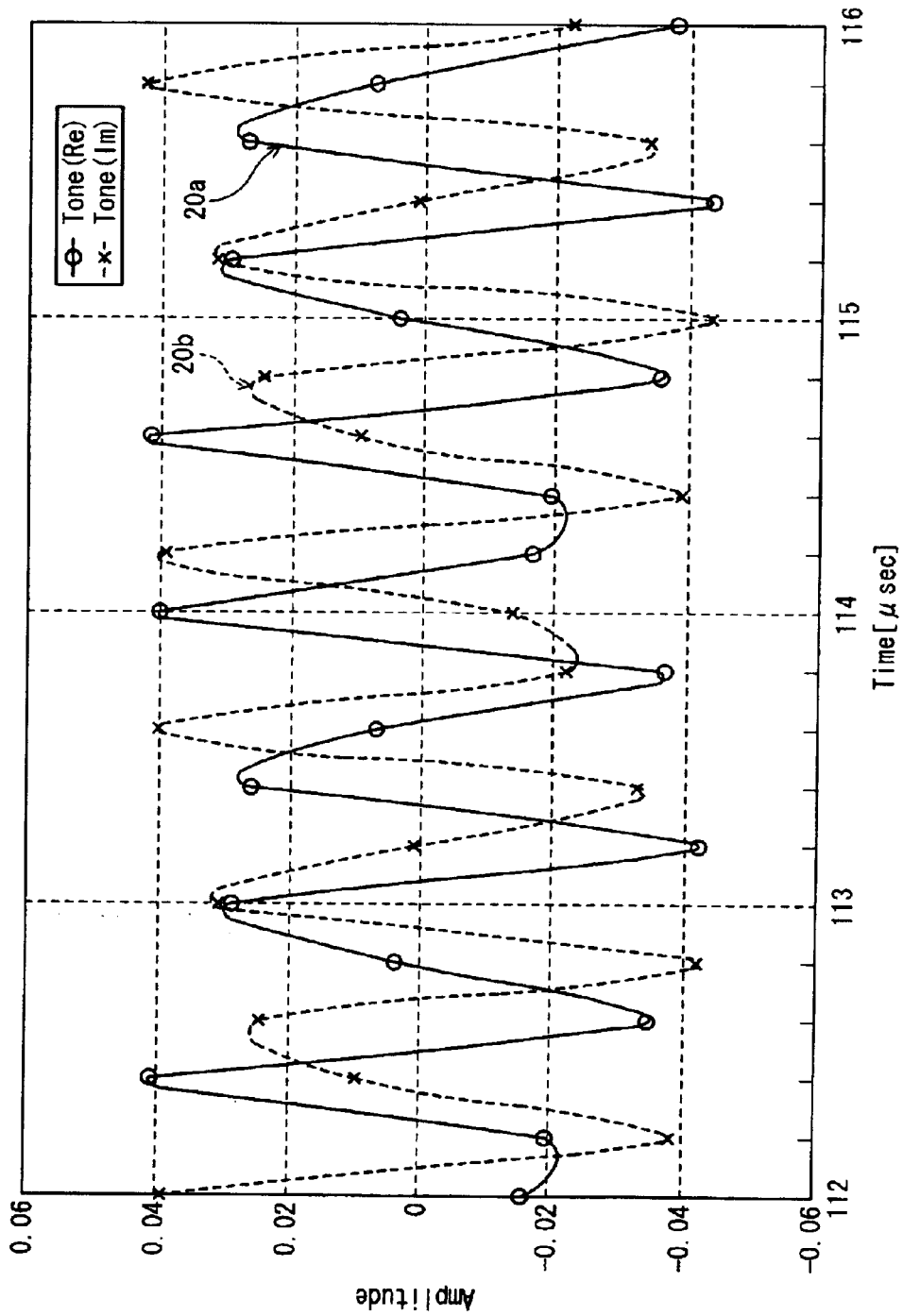

The vectoring unit 18a of the phase calculating unit 14c is supplied with a signal having a waveform 20a (sample points thereof are indicated by marks "○") shown in FIG. 37, for example, at the real part input port thereof (Re) from the tone signal generating filter 14a and a signal as a result of Hilbert transform having a waveform 20b (sample points thereof are indicated by marks "X") shown in FIG. 37, for example, at the imaginary part input port thereof (Im) from the Hilbert transforming unit 14b, wherein these signals are vectorized.

The calculating unit 18b is a unit for carrying out calculation on the signal vectorized by the vectoring unit 18a based on the following Equation (29) so as to determine the phase of the vectorized signal.

$$\theta = \tan^{-1}(Im/Re) \tag{29}$$

Subsequently, the arrangement of the zero-radian point timing extracting unit 14d will be described in detail.

Figure 38A:
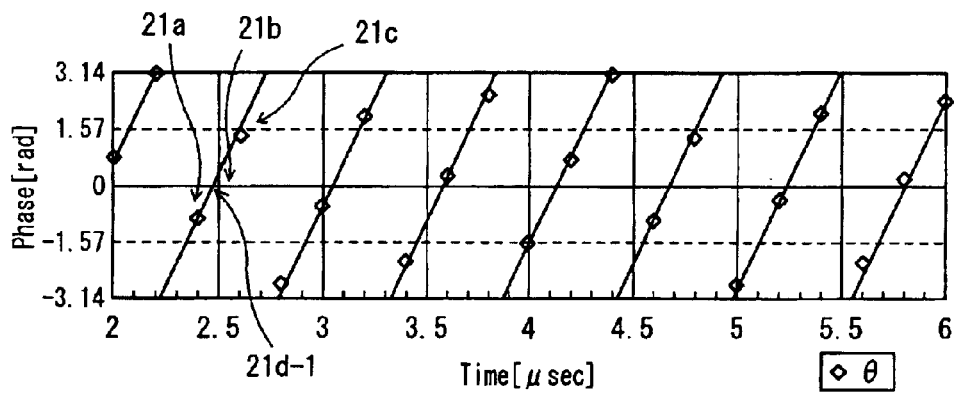

The zero-radian point timing extracting unit 14d is a unit for extracting a point at which the phase becomes zero radian, on the basis of phase information calculated by the phase calculating unit 14c and shown in FIG. 38(a), for example, so as to derive a module timing.

Figure 38B:
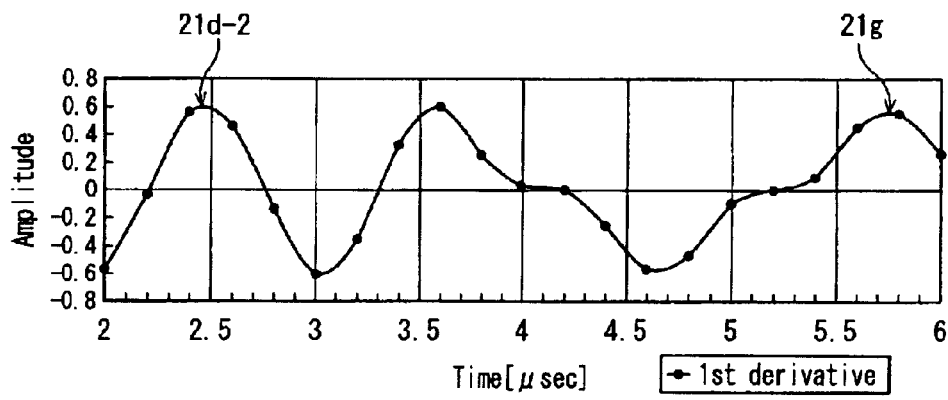
Figure 38C:
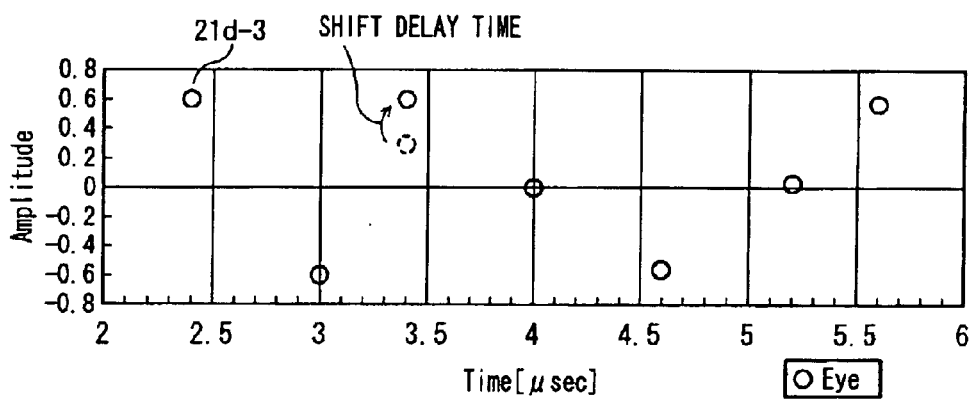

Since the tone signal generated by the tone signal generating filter 14a has a substantial uniform frequency with a period equivalent to the module frequency, the phase thereof will rotate at a constant rate. As shown in FIGS. 38(a) and 38(b), point 21d-1 at which the phase of the tone signal becomes zero-radian has the same timing as that of the module point 21d-2 of the differentiated signal. In this way, this zero-radian point is extracted and the zero-radian point is utilized as timing information for extracting the amplitude value of the differentiated signal 21g at every timing.

At this event, of the sample points, a point closest to the zero-radian is extracted and this point is utilized as a timing. For example, of the couple of sample points 21a and 21b neighboring the zero-radian point 21d-1 shown in FIG. 38(a), the sample point 21a is closer than the other to the zero-radian point and hence this pint is determined as the aforesaid module timing.

Further, the delay time calculating unit 14e is a unit for calculating the time difference of the module timing determined by the aforesaid zero-radian point timing extracting unit 14d with respect to the actual zero-radian point. The delay time calculating unit outputs the time difference as a delay time difference td.

With the above arrangement, according to the module timing signal extracting unit 1j of the present embodiment, the tone signal generating filter 14a is supplied with a signal having undergone the signal differentiation processing and generates a periodic signal corresponding to the elemental width time (module length time) of the width length data.

Subsequently, when examination is made to specify a timing point serving as a point at which the width information resides, the phase calculating unit 14c calculates a phase of tone signal as the periodic signal generated by the tone signal generating filter 14a. When the phase of the aforesaid periodic signal is calculated, this periodic signal is vectorized and calculation is made for determining the phase of the aforesaid periodic signal. In more concretely, when the aforesaid periodic signal is vectorized, the periodic signal from the tone signal generating filter 14a is set to the real part of the complex while the signal deriving from the periodic signal from the tone signal generating filter 14a and having undergone the Hilbert transform in the Hilbert transforming unit 14b is set to the imaginary part of the same.

The zero-radian point timing extracting unit 14d receives the result of calculation from the phase calculating unit 14c, extracts time information (timing information) of a point at which the phase of the tone signal as a periodic signal becomes zero degree, and specifies the extracted time information as a timing point. Further, the aforesaid zero-radian point extracting unit 14d responds to the result of the phase calculation from the phase calculating unit 14c in such a manner that, of a pair of signal points adjacent to each other and having signs opposite to each other, a point closer than the other to the zero-degree point is specified as the aforesaid timing point.

The delay time calculating unit 14e extracts the time error between the timing point specified by the zero-radian point timing extracting unit 14d and the point at which the tone signal generated by the tone signal generating filter 14a comes to have a phase of zero degree. The delay filter 14f of the amplitude extracting unit 1k provides an amount of delay corresponding to the aforesaid time error to the differentiated signal from the adaptive-type band limiting differentiating unit 1f at every timing point at which the time error is extracted.

(D-3) Description of Amplitude Extracting Unit of Present Embodiment

Figure 39:
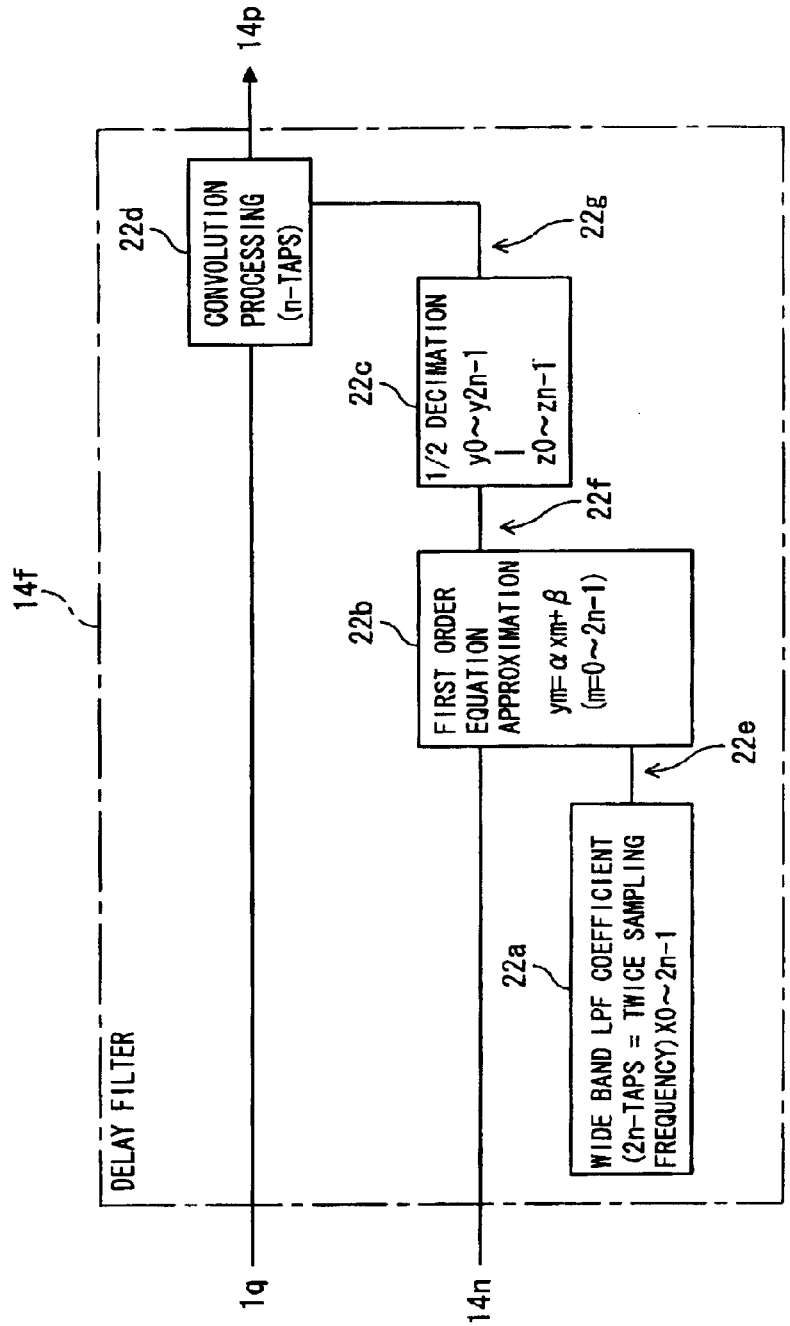
FIG. 39 is a block diagram showing a main portion of the every module point amplitude extracting unit of the present embodiment.

As more fully shown in FIG. 39, the delay filter 14f of the amplitude extracting unit 1k is arranged to have a tap coefficient memorizing unit 22a, a first-order equation approximating unit 22b, a ½ decimating unit 22c and a convolution processing unit 22d.

The tap coefficient memorizing unit 22a is a unit for holding filter coefficients (X0 to X2n−1) making it possible for the subsequent convolution processing unit 22d to carry out a filter processing which allows the photoelectric converted signal to pass through the filter satisfactorily and has a low-pass characteristic with twice the accuracy of the sampling frequency. The first-order equation approximating unit 22b introduces the delay time td supplied from the aforesaid delay time calculating unit 14e for interpolating the low-pass filter coefficients (X0 to X2n−1) by using a first-order equation approximation in a manner expressed by the following Equation (30).

$$Ym = (Xm+1 - Xm)td/(ts/2) + Xm (m=0 \text{ to } 2n-1) \tag{30}$$

Figure 40:
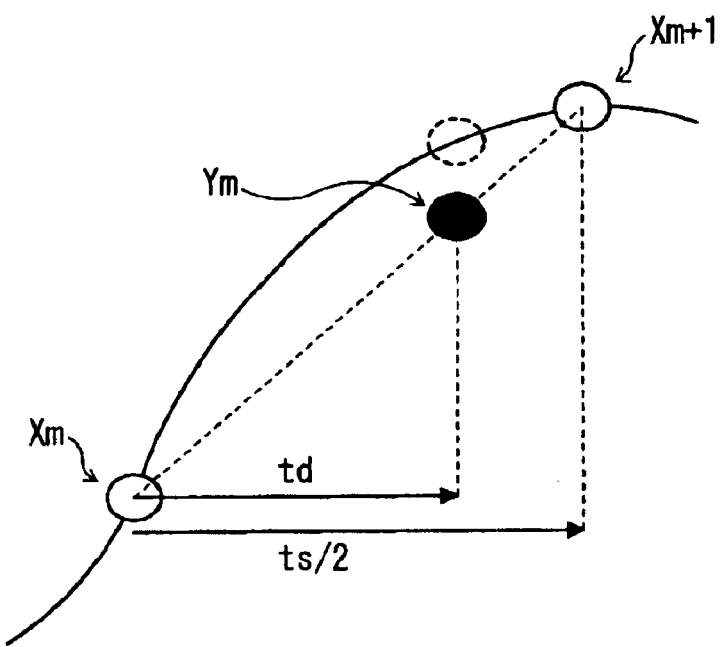

As shown in FIG. 40, an y-axis is set in to indicate the filter coefficient value and an x-axis is set in to indicate time, and of the filter coefficient values X0 to X2n−1, a couple of filter coefficients adjacent to each other are selected so that the couple of filter coefficients lie on a first-order equation. In this assumption, the time distance between Xm+1 to Xm corresponds to half the sampling interval ts of the AD converter 1d. Thus, the difference between Xm+1 to Xm can be utilized to determine the aforesaid first-order equation.

Therefore, a value delayed by the delay time td relative to the filter coefficient Xm can be led as expressed by the aforesaid Equation (30). In this way, each of the filter coefficient values held in the filter coefficient holding unit 21a can be determined so that these filter coefficient can construct a filter having a delaying characteristic of the delay time td calculated by the delay time calculating unit 14e.

The ½ decimating unit 22c decimates the filter coefficients after undergoing the delay processing at a rate of ½, whereby the filter coefficients of the sampling frequency, which was set to twice that of the AD converter 1d to improve accuracy thereof, is made equivalent to that of the photoelectric converted signal.

Figure 41:
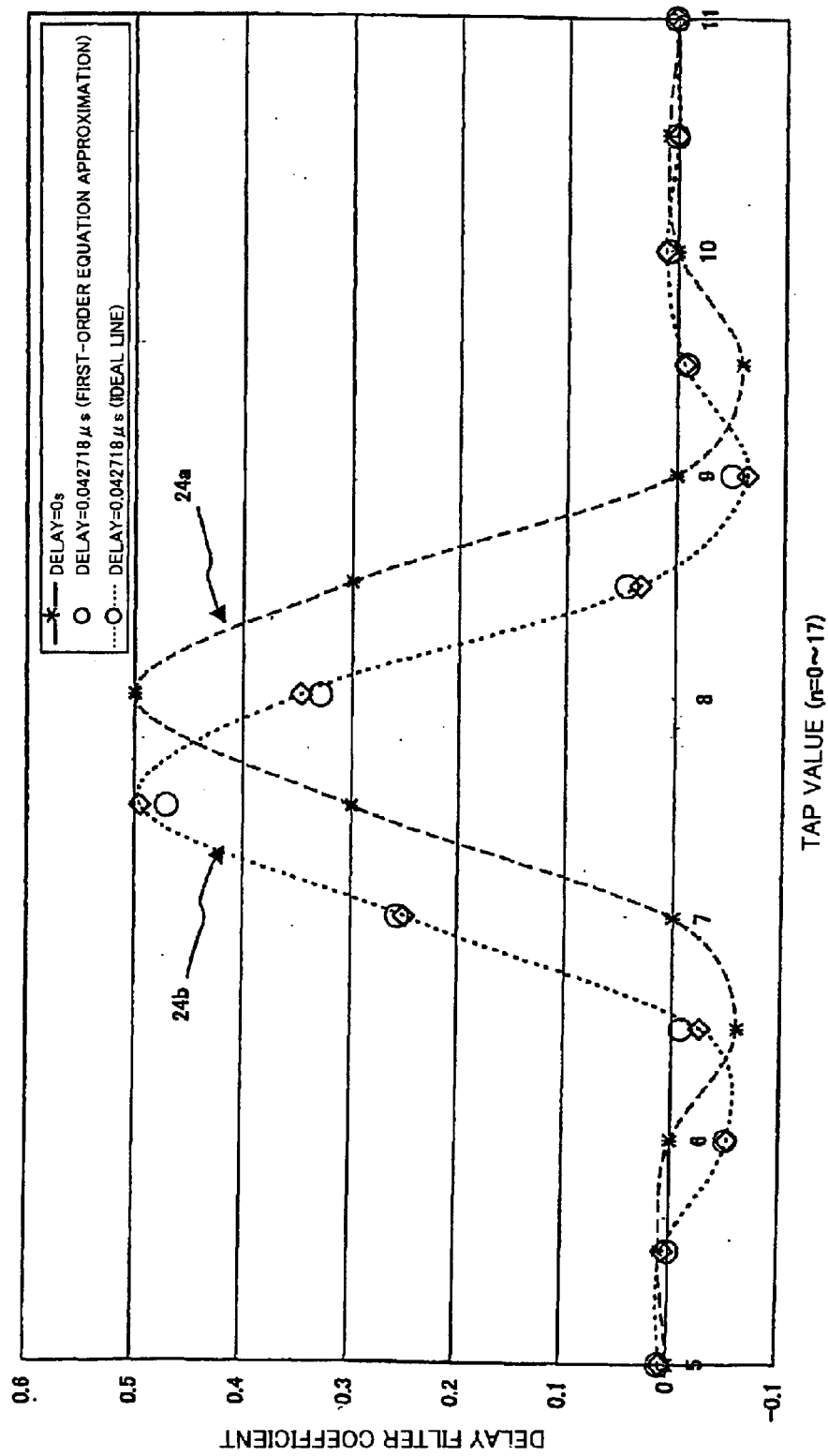

For example, if the filter coefficients are not subjected to the delaying process, the sample points thereof will be plotted on points of mark "X" lying on a waveform 24a of FIG. 41. Conversely, if the filter coefficients are subjected to the processing of the aforesaid first-order equation approximating unit 22b and the ½ decimating unit 22c, the sample points thereof will be corrected so as to lie on the points of mark "○" on a waveform 24b of FIG. 41. Points of mark "◇" represent a set of filter coefficients having an ideal delay characteristic.

The above-described processing of the first-order equation approximating unit 22b and the ½ decimating unit 22c is effected at every module timing.

The convolution processing unit 22d is composed of a digital filter such as a transversal filter having an aforesaid system shown in FIG. 3, for example. The convolution processing unit effects a convolution processing on the differentiated signal 1q having undergone the band limiting processing supplied from the adaptive-type band limiting differentiating unit 1f by using the filter coefficients provided by the ½ decimating unit 22c.

As described above, the amplitude extracting unit 14g is supplied from the delay filter 14f with a signal containing information of the sample point extracted at the true module timing, and the amplitude extracting unit extracts the amplitude value at the sample point. Thus, the amplitude information can be outputted at the true module timing to the subsequent tri-state value generating unit 1l.

In the above arrangement of the delay filter 14f shown in FIG. 39, convolutional filtering processing can be carried out in such a manner that the gain thereof is set to one until the signal falls within the maximum input signal band in which the signal is allowed to be read as the intensity variation detecting signal, the gain thereof is gradually attenuated as the band thereof is remote from the maximum input signal band, and the signal is delayed in accordance with the amount of time error calculated by the delay time calculating unit 14e. In this way, the signal can undergo the differentiating processing effected at every timing point at which the time error is calculated, and this signal having undergone the differentiating processing can be delayed by an amount corresponding to the aforesaid time error.

In the above-described delay filter 14f, when the coefficients for the filter processing are determined, impulse response data is calculated based on a filter characteristic function in which the gain thereof is set to one until the signal falls within the maximum input signal band allowing the signal to be read as the intensity variation detecting signal and the gain thereof is gradually attenuated as the band thereof is remote from the maximum input signal band. Then, in the first-order equation approximating unit 22b, the aforesaid impulse response data is interpolated by using the first-order equation approximation depending on the amount of the extracted time error, and the resulting data is determined as the filter coefficients.

While in the present embodiment filter coefficients of the sampling interval twice that of the AD converter 1d is considered, from the standpoint of improving the accuracy in interpolating the delay time, it is desired for the rate of sampling to be set to one larger than the twice sampling rate.

Further, while in the present embodiment the approximation method is based on a first-order equation, other approximation system such as one based on a second-order equation, a spline interpolation can be employed.

Figure 42:
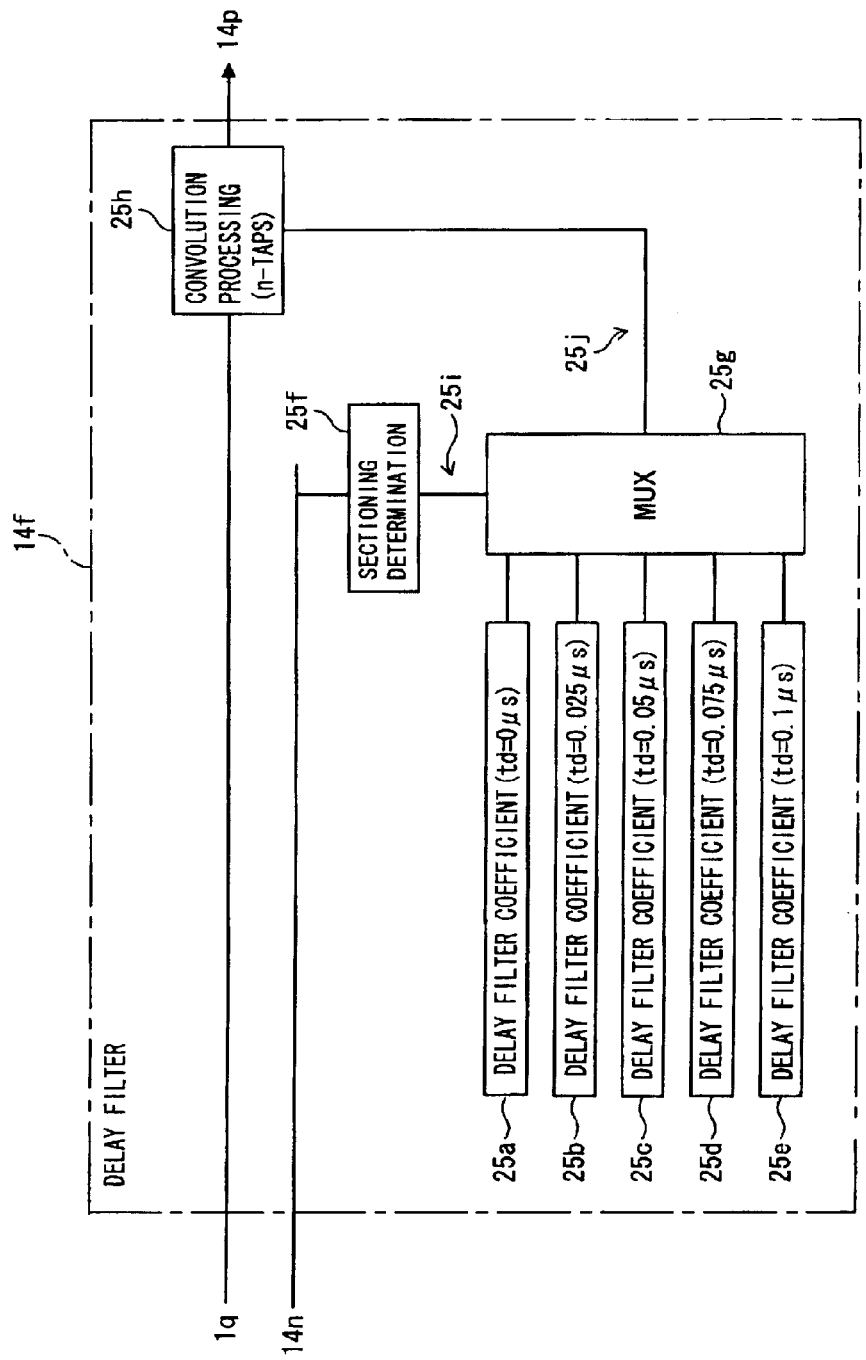
FIGS. 42 and 43 are block diagrams each for showing a main portion of a modification of the every module point amplitude extracting unit of the present embodiment.

(D-4) Description of First Modification of Delay Filter in Amplitude Extracting Unit According to Present Embodiment While in the above-described delay filter 14f of the amplitude extracting unit the first-order equation approximation is utilized to calculate the filter coefficients having the delay characteristic, other arrangement such as one shown in FIG. 42, for example, can be applied to the delay filter 14f.

The delay filter 14f shown in FIG. 42 is arranged to have delay filter coefficient holding units 25a to 25e, a sectioning determining unit 25f an MUX 25g and a convolution processing unit 25h.

Each of the delay filter coefficient holding units 25a to 25e is a unit for holding filter coefficients for effecting a predetermined amount of delay. That is, the filter coefficient holding unit 25a holds a coefficient for constituting a filter having a characteristic of a delay time, td=0. The filter coefficient holding unit 25b holds a coefficient for constituting a filter having a delay time of td=0.025 μs.

Further, the filter coefficient holding unit 25c holds a coefficient for constituting a filter having a delay time of td=0.05 μs. The filter coefficient holding unit 25d holds a coefficient for constituting a filter having a delay time of td=0.075 μs. And the filter coefficient holding unit 25e holds a coefficient for constituting a filter having a delay time of td=0.1 μs.

The sectioning determining unit 25f is supplied with the delay time information td from the delay time calculating unit 14e and examines which of the following five sections the value of the delay time td falls into.

That is, if the delay time td is equal to or larger than 0 ns and smaller than 12.5 ns, the section to fall into is determined be "0". If the delay time td is equal to or larger than 12.5 ns and smaller than 37.5 ns, the section to fall into is determined be "1". If the delay time td is equal to or larger than 37.5 ns and smaller than 62.5 ns, the section to fall into is determined be "2". If the delay time td is equal to or larger than 62.5 ns and smaller than 87.5 ns, the section to fall into is determined be "3". And if the delay time td is equal to or larger than 87.5 ns and smaller than 100 ns, the section to fall into is determined be "4".

The MUX 25g is a unit for taking out filter coefficients from a desired delay filter coefficient holding unit 25a to 25e in accordance with the delay time section determined by the section determining unit 25f and outputting the coefficients to the subsequent convolution processing unit 25h.

For example, the MUX 25g selects coefficients from the section determining unit 25f in such a manner that if it is determined that the delay time section is "0", then filter coefficients are taken out from the delay filter coefficients holding unit 25a, if it is determined that the delay time section is "1", then filter coefficients are taken out from the delay filter coefficients holding unit 25b, if it is determined that the delay time section is "2", then filter coefficients are taken out from the delay filter coefficients holding unit 25c, if it is determined that the delay time section is "3", then filter coefficients are taken out from the delay filter coefficients holding unit 25d, and if it is determined that the delay time section is "4", then filter coefficients are taken out from the delay filter coefficients holding unit 25e. Then, the selected coefficients are supplied to the convolution processing unit 25h.

Further, the convolution processing unit 25h is a unit for taking out the coefficients from the MUX 25g and executes the delay processing on the acquired signal (photoelectric converted signal) from the adaptive-type band limiting differentiating unit 1f.

Also in the above arrangement of the delay filter 14f shown in FIG. 42, convolutional filtering processing can be carried out in such a manner that the gain thereof is set to one until the signal falls within the maximum input signal band in which the signal is allowed to be read as the intensity variation detecting signal, the gain thereof is gradually attenuated as the band thereof is remote from the maximum input signal band, and the signal is delayed in accordance with the amount of time error calculated by the delay time calculating unit 14e. In this way, the signal can undergo the differentiating processing effected at every timing point at which the time error is calculated, and this signal having undergone the differentiating processing can be delayed by an amount corresponding to the aforesaid time error.

In more concretely, when the coefficients for the filter processing are determined, a plurality of filter coefficient sets are prepared in advance in the delay filter coefficient holding units 25a to 25e so as to implement a plurality of delay filter characteristics corresponding to the time error amounts extracted (calculated) by the delay time calculating unit 14e. The sectioning determining unit 25f determines which filter processing characteristic of the plurality of filter characteristics is appropriate for the extracted time error amount. Then, the MUX 25g selects a set of filter coefficients implementing the filter characteristic suitable for the result of determination made by the sectioning determining unit 25f.

Figure 43:
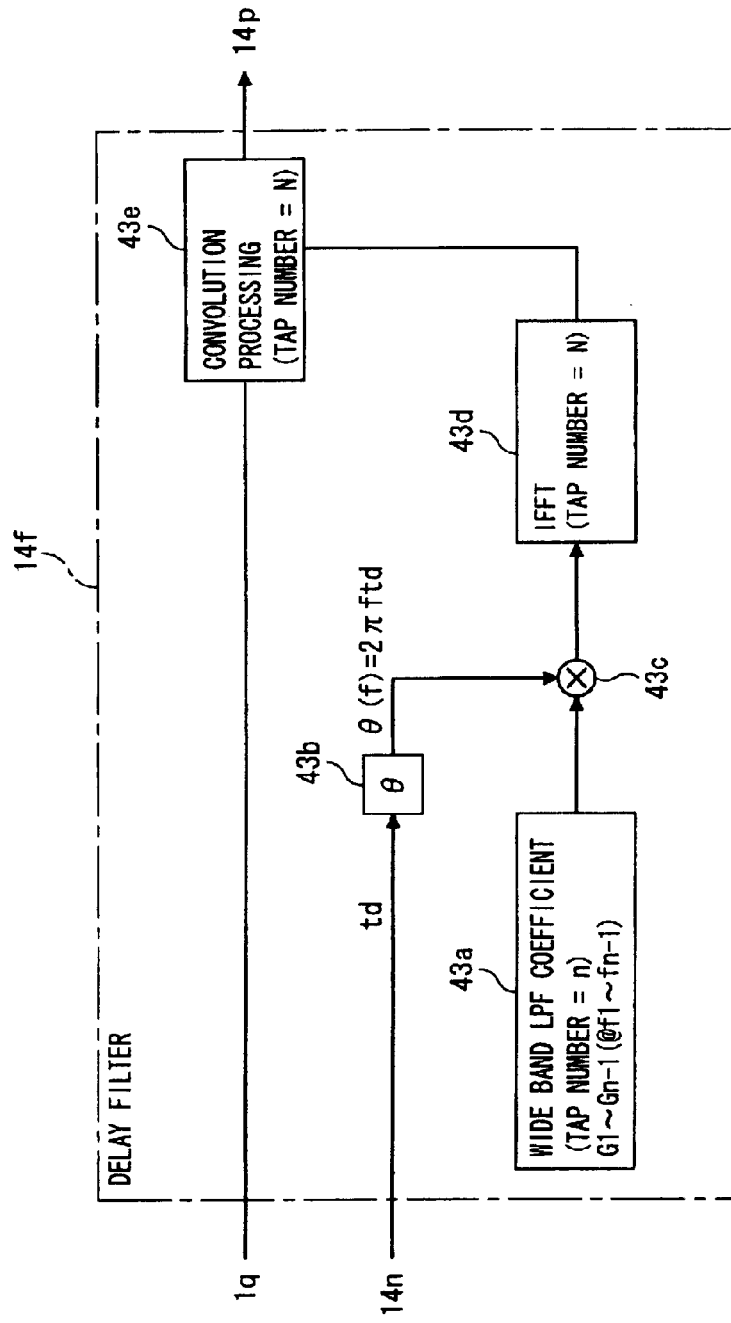

(D-5) Description of Second Modification of Delay Filter in Amplitude Extracting Unit of Present Embodiment In addition to the arrangements shown in FIGS. 39 and 42, an arrangement shown in FIG. 43 may be employed for the delay filter 14f. That is, this delay filter arrangement is composed of a wide band LPF characteristic coefficient holding unit 43a, a phase characteristic giving unit 43b, a multiplying unit 43c, an IFFT 43d and a convolution processing unit 43e. In this arrangement, an IFFT processing may be employed for calculating filter coefficients having a delay characteristic in accordance with the delay time calculated by the delay time calculating unit 14e.

The wide band LPF characteristic coefficient holding unit 43a is a unit for holding filter coefficients having an LPF gain characteristic in which the signal of the inputted maximum frequency of the photoelectric converted bar code signal is passed at a gain of=1 and signals of frequencies equal to or smaller than that frequency are passed at an attenuated gain. The characteristic to be held in this unit may be set to one shown in FIG. 44, for example.

Figure 44:
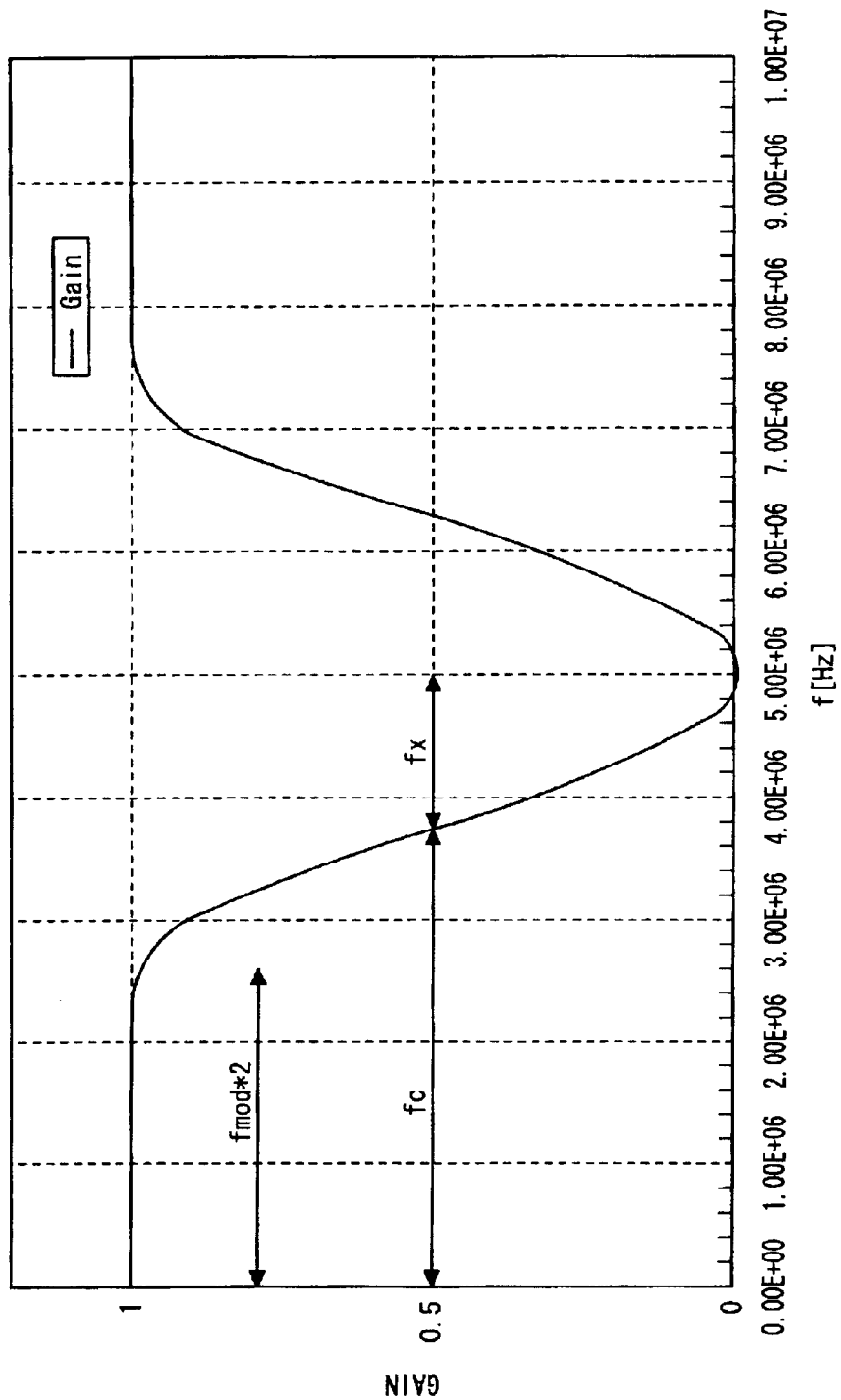
FIGS. 44 to 46 are diagrams for explaining the operation of the modification of the every module point amplitude extracting unit of the present embodiment.

The aforesaid filter characteristic shown in FIG. 44 can be expressed as a gain characteristic of the following Equations (31) to (33).

$$1: 0 \leq f \leq 2.5 \text{ MHz}, 7.5 \text{ MHz} \leq f \leq fs \quad (31)$$

$$\cos^2((f-(fc-fx))\pi/(4*fx)): 2.5 \text{ MHz} \leq f < 5 \text{ MHz} \quad (32)$$

$$\cos^2((f-(fc'-fx'))\pi/(4*fx')): 5 \text{ MHz} \leq f < 7.5 \text{ MHz} \quad (33)$$

In the above Equations (31) to (33), fc=3.75 MHz, fx=1.25 MHz, fc'=3.75 MHz, fx'=1.25 MHz. This characteristic value is equally divided into n sections at the sampling frequency fs, and resulting respective values are denoted G=g0 to gn−1 (n is a number of exponent for two).

Figure 45:
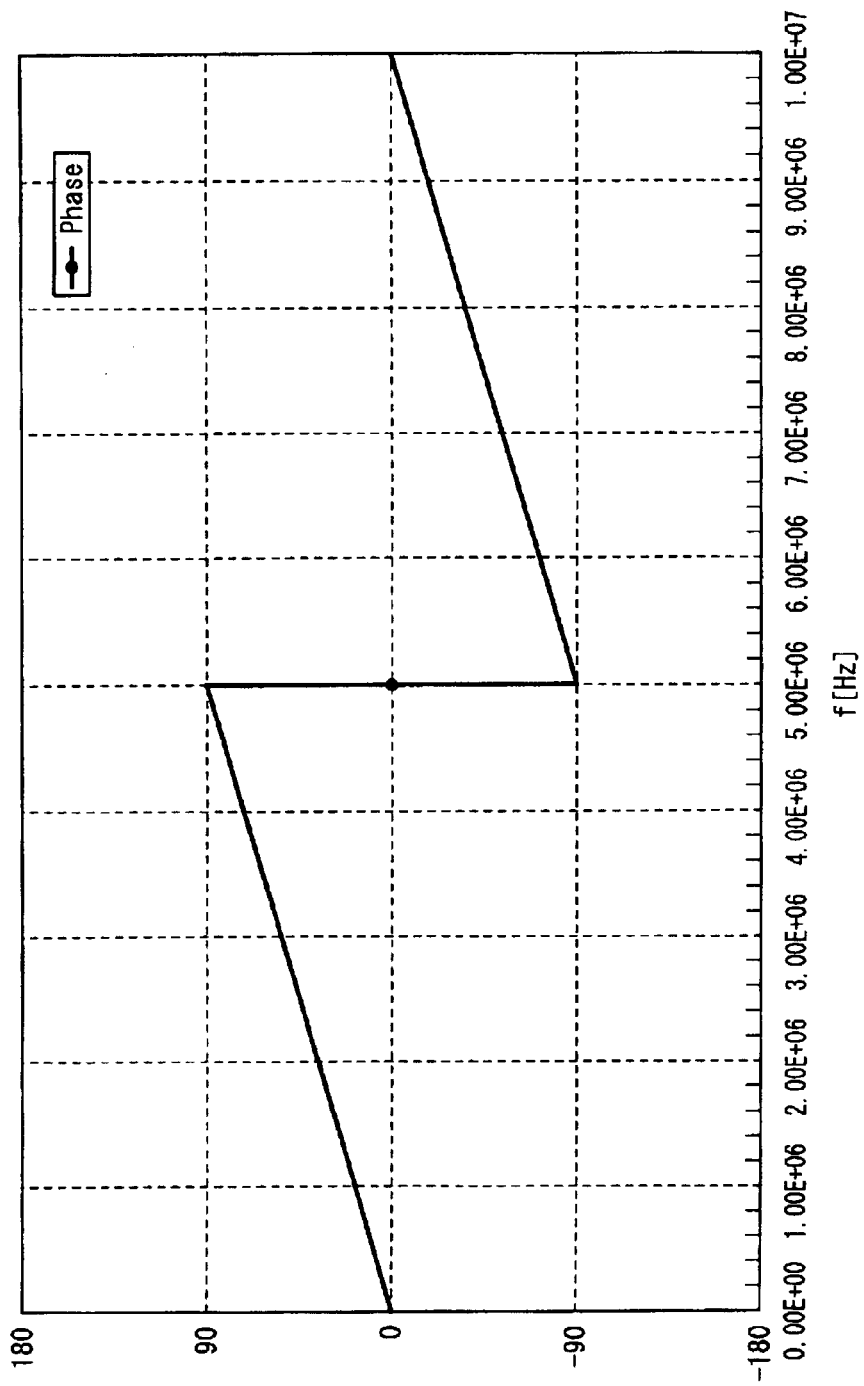

The phase characteristic giving unit 43b is a unit for giving a delay phase characteristic for the subsequent convolution processing unit 43e in accordance with the delay time td calculated by the delay time calculating unit 14e. For example, the phase characteristic giving unit gives a phase characteristic delay expressed by the following Equation (34) on the basis of the delay time td supplied from the delay time calculating unit 14e. For example, the phase characteristic giving unit can give a phase characteristic shown in FIG. 45 to a signal supplied to the subsequent convolution processing unit 43e.

$$\theta = 2\pi f * td : 0 \leq f \leq fs/2 \quad (34)$$

The multiplying unit 43c is supplied with the gain characteristic (see FIG. 44) from the aforesaid wide band LPF holding unit 43a and a phase characteristic (see FIG. 45) from the phase characteristic giving unit 43b, whereat a real part (Re) and the imaginary part (Im) are calculated based on the following Equations (35) and (36) to form the numbers into a complex vector.

$$Re = G * \cos \theta \quad (35)$$

$$Im = G * \sin \theta \quad (36)$$

Figure 46:
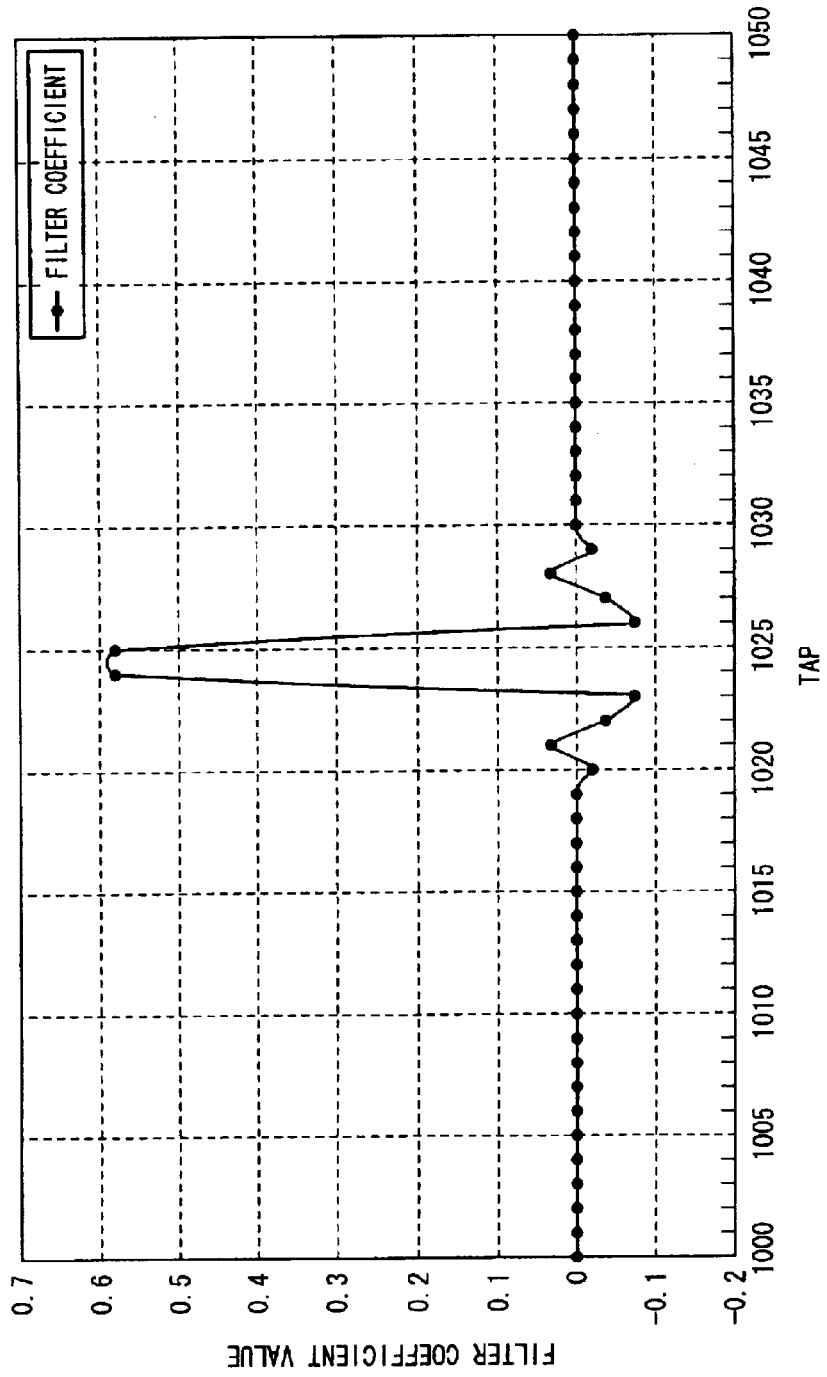

The IFFT processing unit 43d is a unit for carrying out IFFT calculation processing based on the values of Re and Im calculated by the aforesaid multiplying unit 43c. If a signal subjected to the unit has a gain characteristic and a phase characteristic shown in FIGS. 44 and 45, filter coefficients having a characteristic shown in FIG. 46 can be obtained.

Further, the convolution processing unit 43e is a unit for effecting convolution processing on the signal supplied from the adaptive-type band limiting differentiating unit 1f by using the filter coefficients obtained by the IFFT processing unit 43d. This convolution processing unit may be composed of a digital filter such as a transversal filter as one shown in FIG. 3, for example.

Also in the above arrangement of the delay filter 14f shown in FIG. 43, convolutional filtering processing can be carried out in such a manner that the gain thereof is set to one until the signal falls within the maximum input signal band in which the signal is allowed to be read as the intensity variation detecting signal, the gain thereof is gradually attenuated as the band thereof is remote from the maximum input signal band, and the signal is delayed in accordance with the amount of time error calculated by the delay time calculating unit 14e. In this way, the signal can undergo the differentiation processing effected at every timing point at which the time error is calculated, and this signal having undergone the differentiation processing can be delayed by an amount corresponding to the aforesaid time error.

In more concretely, when the coefficients for the filter processing are determined, a filter characteristic function is determined so that the gain thereof is set to one until the signal falls within the maximum input signal band allowing the signal to be read as the intensity variation detecting signal and the gain thereof is gradually attenuated as the band thereof is remote from the maximum input signal band. Then, a function delaying a signal in proportion to the amount of extracted time error is added. The result thereof is subjected to the inverse Fourier transform in the IFFT processing unit 43d. Thus, the coefficients are calculated.

Figure 47:
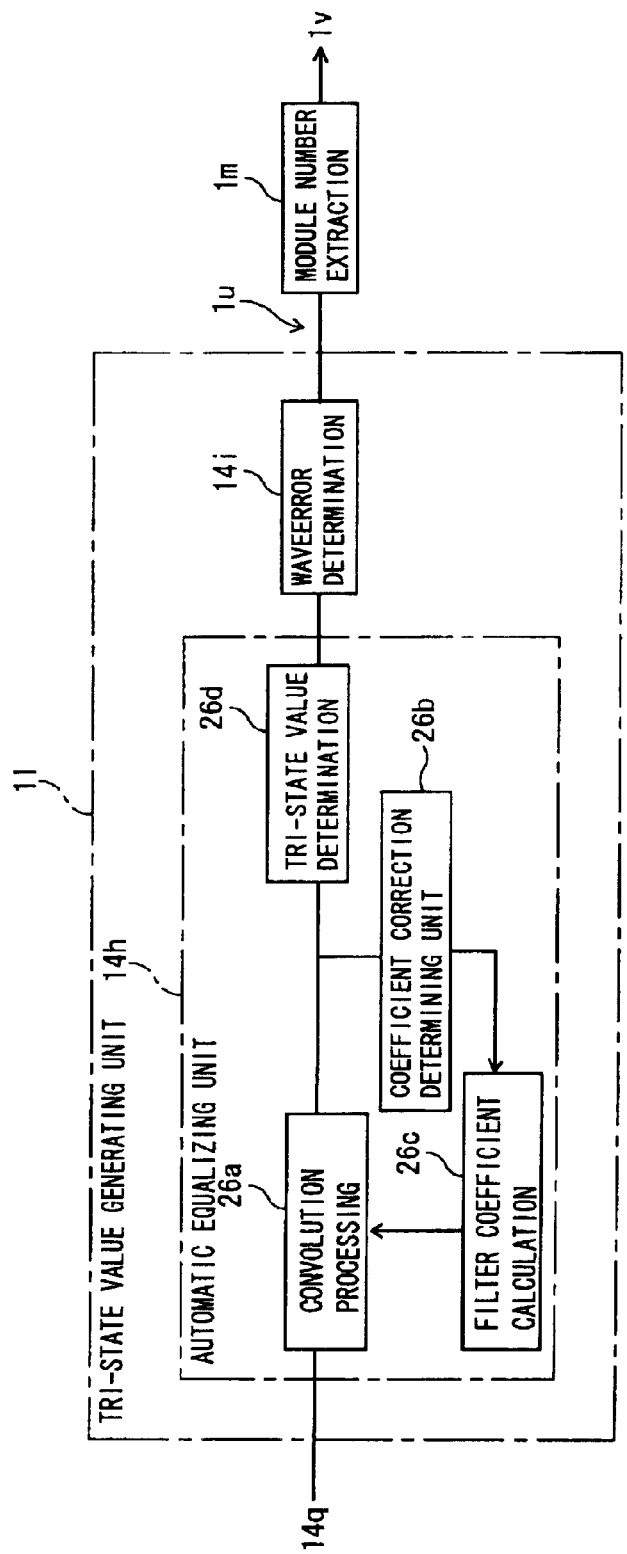
FIG. 47 is a block diagram showing a main portion of the every module point amplitude extracting unit of the present embodiment.

(D-6) Description of Tri-State Value Generating Unit According to Present Embodiment FIG. 47 is a block diagram showing the tri-state value generating unit 1l according to the present embodiment.

As described above, the tri-state value generating unit 1l is arranged to have the LMS 14h for outputting the tri-state value data composed of "1", "0" and "−1" by automatically equalizing the amplitude data 14q extracted at every module timing. The tri-state value generating unit also is arranged to have the wave error determining unit 14i for carrying out data error determination on the amplitude data which is formed into the tri-state values by the LMS 14h.

In other words, the LMS 14h can automatically equalize the amplitude data extracted by the amplitude extracting unit 1k at every module timing so as to make it possible to correct the amplitude distortion or the phase distortion caused by the bar code state (concave/convex portions, blurred portion or the like) or the analog circuits containing elements such as a pin-photo diode employed in the photo receiving section 1b. The LMS 14h is further arranged to have a convolution processing unit 26a, a coefficient correction determining unit 26b, a filter coefficient calculating unit 26c and a tri-state value determining unit 26d.

The convolution processing unit 26a is a unit for effecting the convolution processing by using filter coefficients calculated by the filter coefficient calculating unit 26c, which will be described later on. As shown in more detail in FIG. 48, the arrangement thereof is composed of a digital filter having five tap coefficients X0 to X4.

Figure 48:
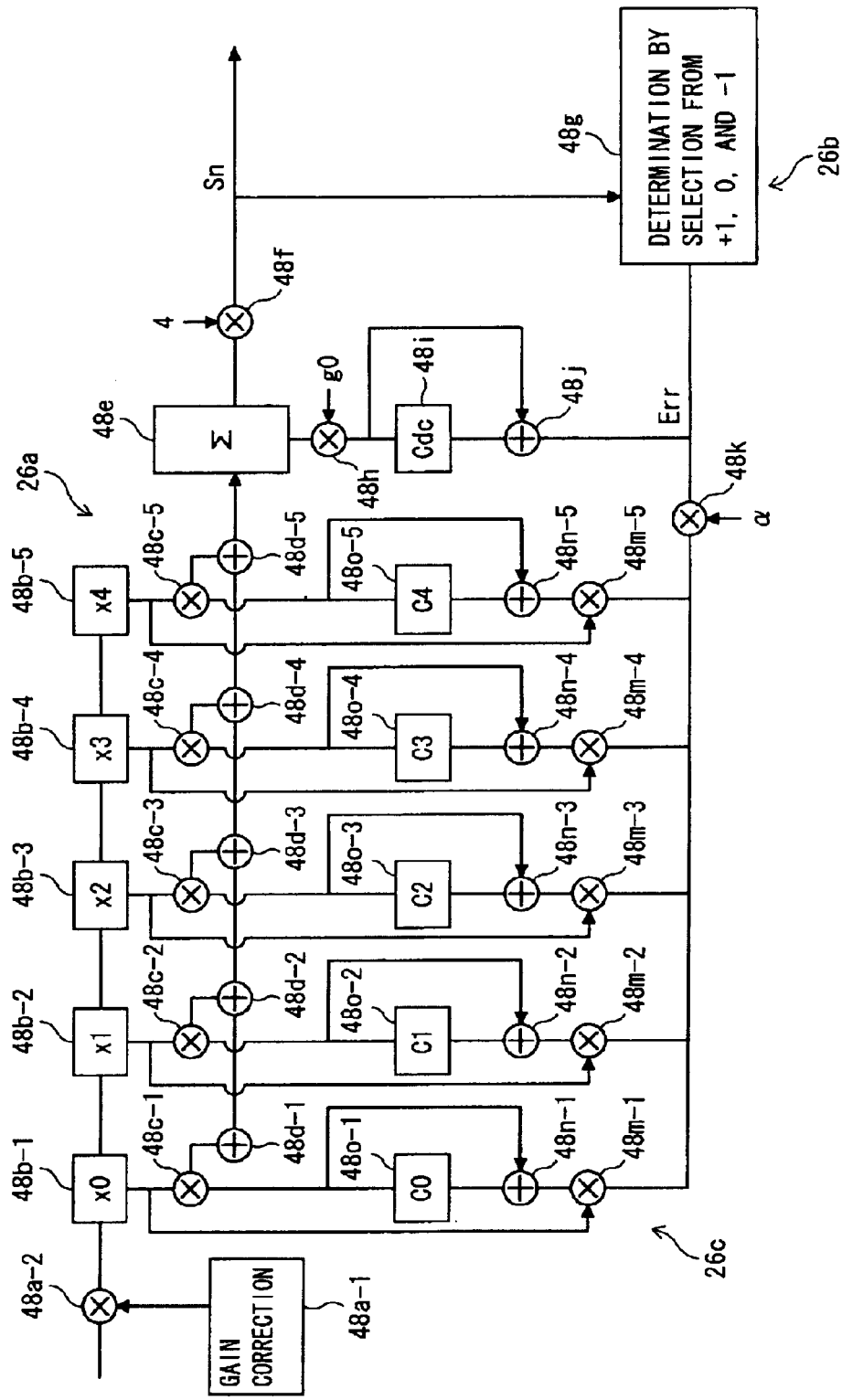
FIG. 48 is a block diagram showing in detail an arrangement of the main portion of the every module point amplitude extracting unit of the present embodiment.

As shown in FIG. 48, the convolution processing unit 26a is arranged to have a gain corrected coefficient holding unit 48a-1, a multiplying unit 48a-2, delaying units 48b-1 to 48b-5, multiplying units 48c-1 to 48c-5, adding units 48d-1 to 48d-5, a sum calculating unit 48e and a multiplying unit 48a-2.

The multiplying unit 48a-2 is a unit for multiplying the amplitude value data supplied from the amplitude extracting unit 1k at every module timing with a coefficient held in the gain corrected coefficient holding unit 48a-1. The delaying units 48b-1 to 48b-5 are connected to one another in a cascade fashion. Each of the delaying units is supplied with the amplitude value data from the multiplying unit 48a-2 and responds to the module timing as a clock to shift the data for the subsequent delaying unit.

That is, the delaying units 48b-1 to 48b-5 function as a shift register. For example, of the data pieces shown in FIG. 49, the amplitude value data piece at an older timing is sequentially shifted for the subsequent stage as the amplitude value data in response to the module timing as a clock.

Figure 49:
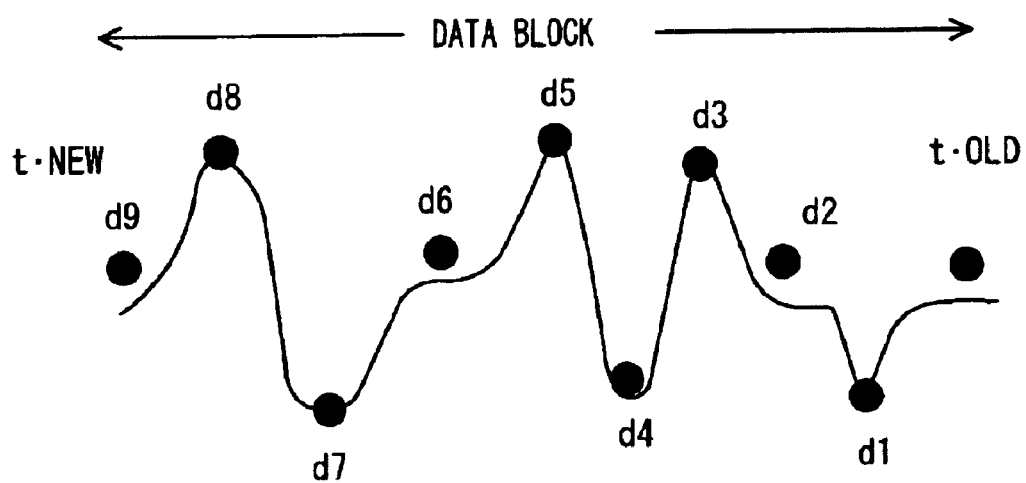

For example, the amplitude value data pieces d4 to d0 shown in FIG. 49 are held at the taps X0 to X4 of the delaying units 48b-1 to 48b-5, and after one module timing elapses from that timing point, the data pieces are shifted. At this timing point, the amplitude value data pieces d5 to d1 are held at the delaying units 48b-1 t0 48b-5 in series.

The multiplying units 48c-1 to 48c-5, the adding units 48d-1 to 48d-5 and the sum calculating unit 48e are collectively arranged to calculate the sum of multiples each of which derives from multiplying the tap stored in each delaying unit 48b-1 to 48b-5 and a tap coefficient supplied from a tap coefficient holding unit 48o-1 to 48o-5, which will be described later on, together. The multiplying unit 48f is a unit for multiplying the data supplied from the sum calculating unit 48e by the coefficient k (in the case of FIG. 48, k=4).

Accordingly, it follows that the delaying units 48b-1 to 48b-5, the multiplying units 48c-1 to 48c-5, the adding units 48d-1 to 48d-5, the sum calculating unit 48e, and the multiplying unit 48f are in the convolution processing unit 26a are arranged to collectively carry out a convolution calculation expressed in the following Equation (37).

$$Sn=k*(X0*C0+X1*C1+X2*C2+X3*C3+X4*C^*) \quad (37)$$

Further, the coefficient correction determining unit 26b is a unit for carrying out least-squares method for correcting the distortions of the amplitude and the phase contained in the width length data when the amplitude values extracted by the amplitude extracting unit 1i are examined as the tri-state value data and outputted therefrom.

In more concretely, the coefficient correction determining unit 26b examines which of the three numbers, or "+1", "0", "−1", the result Sn of the convolution processing corresponds to. Only if it is determined that the result of convolution processing obviously corresponds to any of the three numbers, "+1", "0", "−1", then the coefficient correction determining unit outputs an error Err indicating an error relative to a reference value. Conversely, if it is determined that there is no value in any of the three numbers to which the result of convolution processing obviously corresponds, the value of Err is set to zero and this value is generated therefrom. The coefficient correction determining unit is arranged to have a corresponding number determining unit 48g, a g0 multiplying unit 48h, a Cdc coefficient holding unit 48i and an adding unit 48j.

The filter coefficient calculating unit 26c is a unit for calculating tap coefficients C0 to C5 utilized for the convolution processing in the aforesaid convolution processing unit 26a based on the error value Err supplied from the aforesaid determining unit 26b. The filter coefficient calculating unit is arranged to have an α-multiplying unit 48k, multiplying units 48m-1 to 48m-5, adding units 48n-1 to 48n-5, and the tap coefficient holding units 48o-1 to 48o-5.

Owing to the operations of the α-multiplying unit 48k, the multiplying units 48m-1 to 48m-5, the adding units 48n-1 to 48n-5, and the tap coefficient holding units 48o-1 to 48o-5, the tap coefficients C0 to C4 can be determined based on the following Equations (38) to (42). In the following Equations (38) to (42), α represents a convergence factor and the value thereof is selected from a range of 0<α<1.

$$C0=C0+\alpha*\text{Err} \quad (38)$$

$$C1=C1+\alpha*\text{Err} \quad (39)$$

$$C2=C2+\alpha*\text{Err} \quad (40)$$

$$C3=C3+\alpha*\text{Err} \quad (41)$$

$$C4=C4+\alpha*\text{Err} \quad (42)$$

The tri-state value determining unit 26d shown in FIG. 47 is a unit for carrying out tri-state value determination on the amplitude value data having undergone the convolution processing in the convolution processing unit 26a based on an operation of comparison relative to a fixed slice level. That is, the multiplying unit 48a-2 provided in the convolution processing unit 26a, which is disposed on the preceding stage with respect to the tri-state value determining unit, carries out correction of comparison by using the fixed slice level ("±0.5"), whereby the tri-state value determination can be effected.

In more concretely, if the amplitude value data supplied from the convolution processing unit 26a and the fixed slice level "+0.5" are compared with each other, and as a result, it is determined that the amplitude value data is larger than the fixed slice level, then the amplitude value is determined as "+1" and the value is outputted therefrom. Conversely, if the amplitude value data and the fixed slice level "−0.5" are compared with each other, and as a result, it is determined that the amplitude value data is smaller than the fixed slice level, then the amplitude value is determined as "−1" and the value is outputted therefrom. Further, if it is determined that the amplitude value data falls within a range between the aforesaid two fixed slice levels, or "−0.5" and "+0.5", then the amplitude value is determined as "0" and the value is outputted therefrom.

Further, the wave error determining unit 14*i* shown in FIG. 47 is a unit for determining an error of the amplitude value data having undergone the tri-state value determination in the LMS 14*h* in a manner concretely illustrated in FIG. 50. In more concretely, when the amplitude value of the signal taken out by the amplitude extracting unit 1*k* is determined as a data piece of "+1" or "−1" and outputted therefrom, of amplitude values of signal points having the same sign and neighboring one another, the largest point is determined as a point of "+1" and the smallest point is determined as a point of "−1". Further, an amplitude value other than those determined as a point of "+1" or "−1" is determined as a point of "0".

In a general case, the differentiated signal (see a waveform shown at reference 29*b* in FIG. 50) having undergone the band limiting in the adaptive-type band limiting differentiating unit 1*f* takes a value of "+1" or "−1" at the boundary point 29*g* and a value of "0" at a flat portion 29*h* having no color change of the white or black region of the bar code.

However, if the bar code printed face has a concave/convex portion or a blurred portion causing a noise or other factors causing reading error, a wave error (Wave Error) can be bought about in the aforesaid tri-state value determining unit 26*d*. That is, the aforesaid tri-state value determining unit can erroneously determine "+1" for a true determination "0", "0" for a true determination "+1", or "0" for a true determination "−1", and so on.

In this case, according to the wave error determining unit 14*i* of the present embodiment, if the amplitude value data pieces of the signal points adjacent to each other have the same sign (Eye values such as signal points A1 and A2 on the waveform 29*c* shown in FIG. 50, for example), these two amplitude values of the signal points are compared with each other. Then, correction is made in such a manner that a signal point having the larger amplitude value is determined as "+1" and the remaining point is determined as "0".

In the case of the diagram of FIG. 50, the signal points A1 and A2 adjacent to each other are assigned with "+1" as a result of determination of the tri-state value determining unit 26*d*. However, the wave error determining unit 14*i* compares the magnitude of the amplitude values of the signal points A1 and A2 with each other, and correction is made in such a manner that a signal point having the larger amplitude value is determined as "+1", and the remaining point is determined as "0" (see reference 29*f* in FIG. 50).

According to the above-described arrangement of the LMS 14*h* of the tri-state value generating unit 11, in the convolution processing unit 26*a*, respective amplitude values extracted at every module timing are stored in the delaying units (taps X0 to X4) 48*b*-1 to 48*b*-5, and the amplitude values stored in the delaying units 48*b*-1 to 48*b*-5 are shifted in response to the module timing serving as a clock, respectively.

In the convolution processing unit 26*a*, the amplitude values stored in the delaying units 48*b*-1 to 48*b*-5 and the filter coefficients calculated by the filter coefficient calculating unit 26*c* are utilized for carrying out the convolution calculation expressed by the aforesaid Equation (37) in response to each module timing, for example. The tri-state value determining unit 26*d* examines which of the values "+1", "0", "−1" the result Sn of the convolution processing corresponds to.

When the aforesaid convolution processing unit 26*a* and the tri-state determining unit 26*d* carry out determination on the data having undergone the tri-state data forming process and output the resultant data therefrom, the coefficient correction determining unit 26*b* effects the least-squares method to correct the distortion in the amplitude and the phase contained in the width length data signal. In more concretely, a certain value ranges are prepared and only if it is determined that the result obviously corresponds to any of the three numbers, "+1", "0", "−1", then the coefficient correction determining unit outputs an error Err as an error with respect to the reference value. Conversely, if it is determined that there is no value obviously corresponding to any of the three numbers, the value of Err is set to zero and this value is generated therefrom.

The value of Err is subjected to the aforesaid calculation processing expressed by equations (38) to (42) concerning the respective filter coefficient values C0 to C5. In response to the subsequent module timing, the convolution calculation using the tap coefficients calculated as described above is carried out in the convolution processing unit 26*a*. However, also the coefficient correction determining unit 26*b* carries out the filter coefficient calculation using the new convergence factor $\alpha$.

Figure 51A:
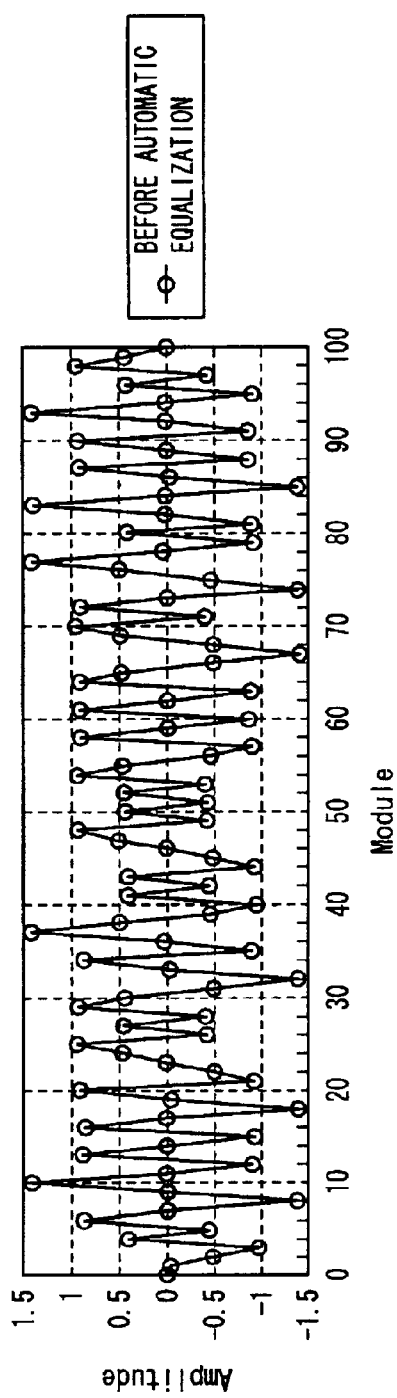
Figure 51B:
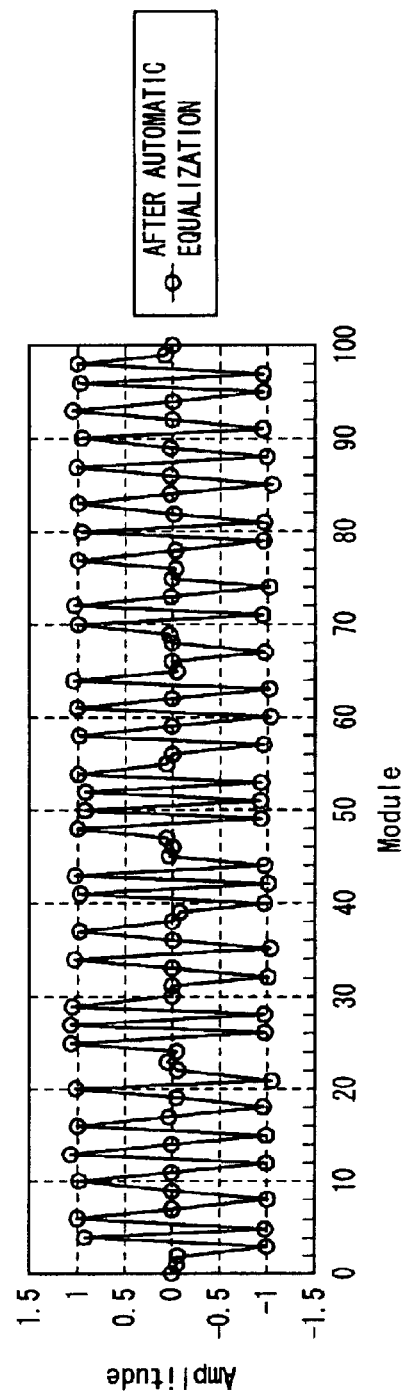

If the value of Err is equal to or smaller than a certain value, or the processing goes through a predetermined number of processing routines, the processing in the LMS 14*h* is closed. Then, the finally obtained filter coefficients are utilized to carry out the convolution processing together with the amplitude data series at every module timing obtained in the initial step. In this way, inter symbol interference distortion due to the Gaussian beam or the like can be corrected and an eye pattern can be widely opened (see FIG. 51(*b*)) as compared with a case in which the above-described automatic equalizing processing is not carried out (see FIG. 51(*a*)).

Further, when the amplitude value of the signal taken out by the amplitude extracting unit 1*k* is determined as a data piece of "+1" or "−1" and outputted therefrom, the wave error determining unit 14*i* carries out determination in such a manner that, of amplitude values of signal points having the same sign and neighboring one another, the largest point is determined as a point of "+1", the smallest point is determined as a point of "−1", and an amplitude value other than those determined as a point of "+1" or "−1" is determined as a point of "0".

As described above, according to the present embodiment, owing to the tri-state value generating unit 1*l*, the amplitude values extracted in accordance with the timing point can be led as tri-state value formulated data. Therefore, it becomes possible to suppress the size of hardware and a price thereof and to improve an S/N ratio of a reading signal and reading resolution. Moreover, even if depth of field for reading is enlarged or a concave/convex portion or a blurred portion is left on the reading face, reading precision can be improved.

Moreover, the LMS 14*h* brings advantages particularly when photoelectric converted signal of a reflected ray of a Gaussian beam is acquired as an acquired signal. That is, owing to this unit, delay or distortion due to a group of circuits can be corrected together with the distortion due to the inter symbol interference caused by the Gaussian beam or the like, with the result that the aforesaid reading resolution can be remarkably improved.

Figure 52:
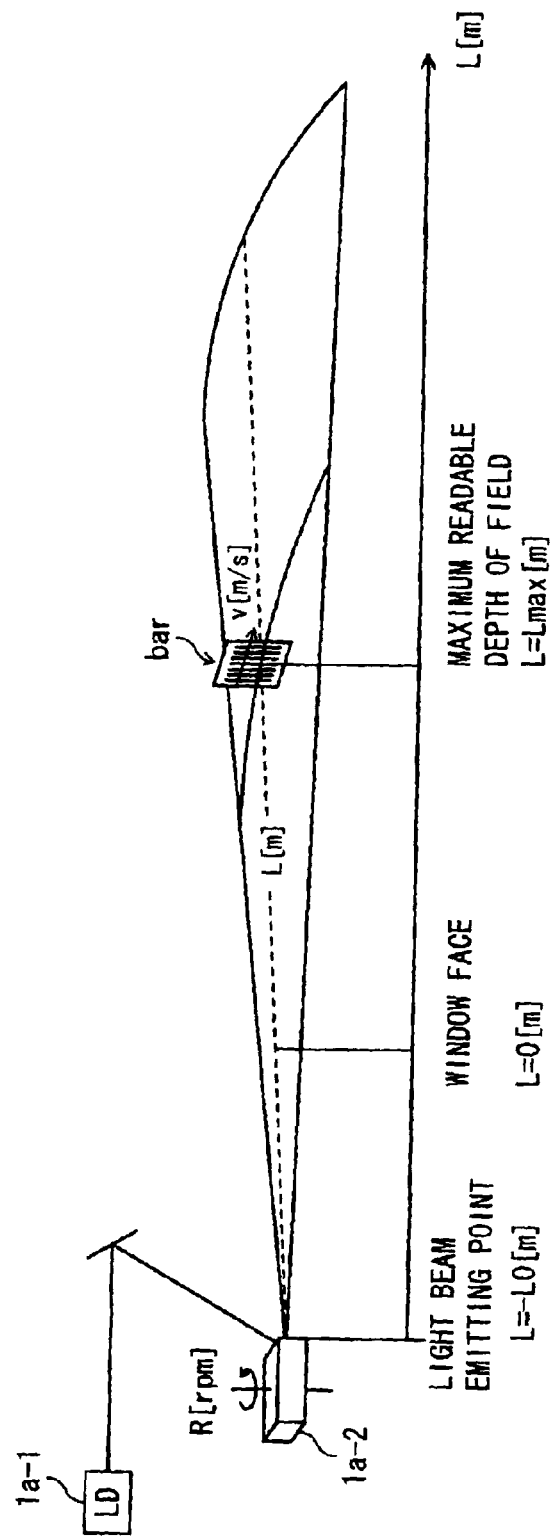

(E) Description of Example of Characteristic of Bar Code Reading Apparatus According to Present Embodiment According to the above-described bar code reading apparatus of the present embodiment, as shown in FIGS. 1 or 52, a light beam emitted from the laser diode 1*a*-1 is refracted by a mirror or the like, although not shown, so as to lead into the polygon mirror 1*a*-2.

The polygon mirror 1a-2 can be rotated at a rate of R[rpm] so that the light beam refracted by the polygon mirror 1a-2 can be led as a scanning beam to the outside of the apparatus housing. A plural number of mirrors may be provided so that a multi-pattern scanning is created by the scanning beam.

In this case, as shown in FIG. 52, L0[m] is taken as a distance from a glass window, which serves as a boundary between the internal space of the apparatus housing and the outside thereof, to the polygon mirror 1a-2 as an emitting point. L1[m] is taken as a distance (depth of field for reading) from the glass window to the bar code as a target of reading. Then, a beam speed v[m/s] upon scanning the bar code can be expressed by the following Equation (43).

$$v = (L0 + L1) * \omega \quad (43)$$
$$= (L0 + L1) * (R[\text{rpm}] * 1/60 * 2\pi)$$

Figure 53:
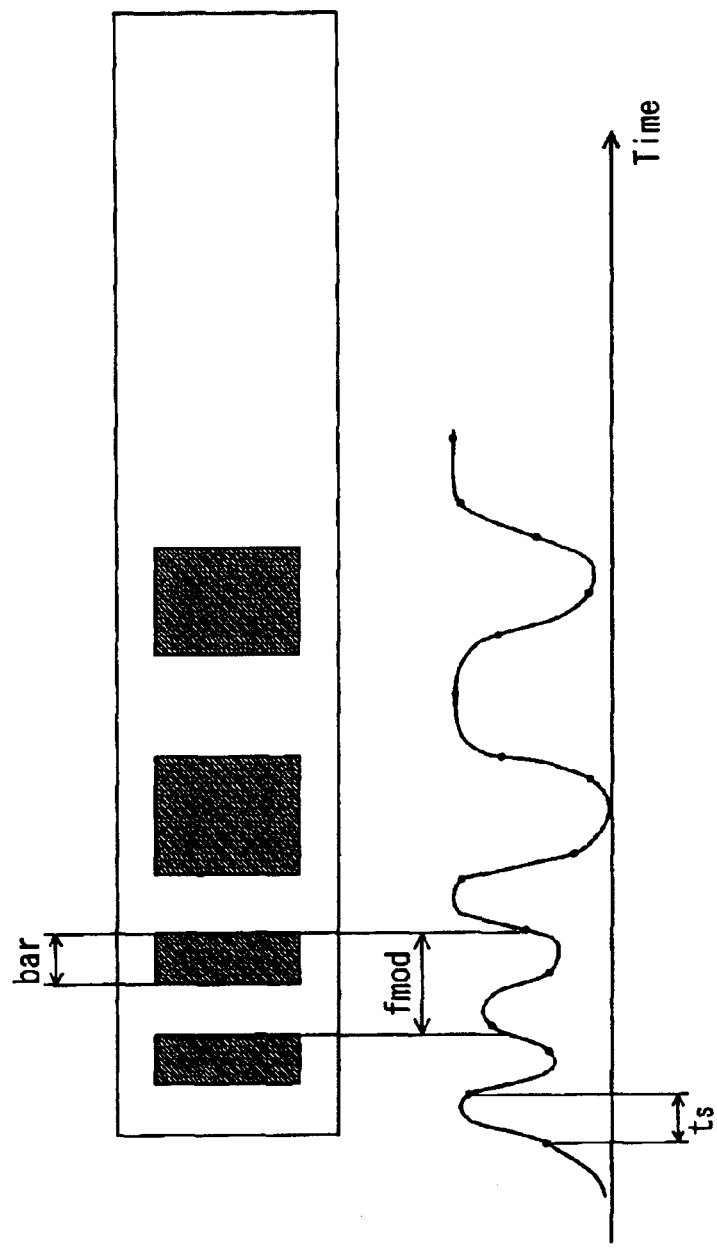

Then, as shown in FIG. 53, if one module width of the minimum readable bar code is set to bar[m], the depth of field for reading thereat L1max[m], and the beam speed thereof vmax[m/s], then the beam speed can be given as Equation (44). Thus the frequency f mod, which is half the elemental frequency (module frequency), can be expressed by Equation (45).

$$v\text{max} = (L0 + L1\text{max}) * (R * 2\pi/60) \quad (44)$$

$$f \text{ mod} = 2 * \text{bar}/v\text{max} \quad (45)$$
$$= 2 * \text{bar}/((L0 + L1\text{max}) * (R * 2\pi/60))$$

As a consequence, by using f mod obtained by the above Equation (45) and the sampling frequency fs of the AD converter 1d, fs/f mod can be calculated. This value serves as an index expressing the fineness of sampling.

FIG. 54(a) is a table showing values of f mod obtained by using the aforesaid Equation (45) under the variable conditions of mag, bar and the beam speed v. The values of f mod obtained by the above process are applied to the bar code reading apparatus according to the present embodiment. FIGS. 54(b), 54(c) and 54(d) are each table showing the result of calculation on the fs/f mod under the condition that the sampling frequency fs is set to any of 5 MHz, 10 MHs and 20 MHz, respectively.

If it is desired to achieve bar code reading performance with the values of mug, bar listed in FIG. 54(b) to 54(d) by a conventional type of bar code reading apparatus, a sampling frequency fs of 40 MHz is requested. In this case, values of fs/f mod become as shown in FIG. 54(e). That is, as shown in FIG. 54(e), about ten times or more fineness in the sampling frequency is requested under all value setting conditions.

Conversely, according to the bar code reading apparatus of the present embodiment, if the reading conditions composed of the values of mug, bar and so on are set in the same manner as those shown in FIG. 54(e), reading can be executed at a relatively low frequency. Therefore, even if the value of fs/fmod is set in accordance with the following Equation (46), the required bar code reading accuracy will be satisfactorily secured.

$$2 < fs/f\text{mod} \leq 10 \quad (46)$$

The above equation can be held in the present invention.

Accordingly, also in this case, the reading apparatus is not requested to have a circuit capable of handling a wide band characteristic on the receiving side thereof. Moreover, if the signal-to-noise ratio (S/N) is improved, the reading area can be enlarged, the reading resolution can be improved and the reading accuracy can be improved even when the medium itself contains a cause of reading noise. Furthermore, the reading apparatus can be free from being equipped with a clock operated at a high rate in order for measuring the elemental unit length of the information length of the binary digit information. Therefore, even if the sampling accuracy is lowered, the reading accuracy of the binary digit information can be kept high, and cost performance in hardware constituting the apparatus will be improved while the performance of the apparatus is enhanced.

A bar code reading apparatus having the aforesaid value of fs/fmod set to "10", "20" or more can be realized without any difficulty as an implementation of the present invention.

(F) Other Disclosure

The above-described bar code reading apparatus belongs to a type in which a light beam is generated by an LD (Laser Diode) and scanned on the bar code so that the reflected light beam deriving therefrom is utilized to detect the white and black bar code. However, the present invention can be similarly applied to another type of bar code reading apparatus in which a ray of light generated by a CCD (Charge Coupled Device) and traveling from the outside is utilized to detect the white and black bar code. In this case, the arrangement of the optical scanning section 1A may be obviated and a function unit as an analog processing unit is provided with the CCD.

While the above-described embodiment is concerned with a bar code reading apparatus for reading bar code information contained in a bar code, the present invention can be applied to a case in which reading is effected on a medium having recorded thereon a mark other than the bar code having a data group expressed by information elements with a width length data composed of a white region and a black region, the white region and the black region being alternately disposed to construct a predetermined pair of information elements, and the information composed of the data groups are read as an integer ratio between each width length data pair.

Further, the present invention does not require an assumption that the information of data group is read from the above-described medium as an integer ratio of each width length data pair. That is, the present invention can be applied to a case in which acquisition is made on a signal containing binary digit information simply deriving from information elements having a predetermined information length and arrayed one-dimensionally, and information reading is executed on the ratio of information length of the binary digit information.

Further, as described above, the bar code reading apparatus according to the above-described present embodiment is provided with the AD converter 1d on the input side of the reading processing section 1C and the reading processing section 1C is arranged to carry out the cut-out processing by using a digital signal processing. However, particularly, the function unit for carrying out the digital signal processing may be composed of firmware or the like. Also, it is reasonable choice to construct the function unit with software or hardware.

Further, if an arrangement is made on the reading processing section 1C shown in FIG. 1 so as to omit the AD converter 1d on the input side thereof, an analog signal processing may be introduced so as to replace for the aforesaid cut-out unit 1e, the module frequency extracting unit 1g and the band limiting differentiation processing unit 1h. In this case, an option can be selected in such a manner that a function for carrying out the A/D conversion processing is provided in the decimation processing unit 1h'.

Furthermore, processing imposed on respective processing units of the bar code reading apparatus according to the present embodiment may be separately imposed on a plurality of printed board modules, card modules and so on which are operated by firmware, hardware circuit and so on. Also, the same processing may be imposed on an information processing apparatus operated in accordance with a software.

Figure 55:
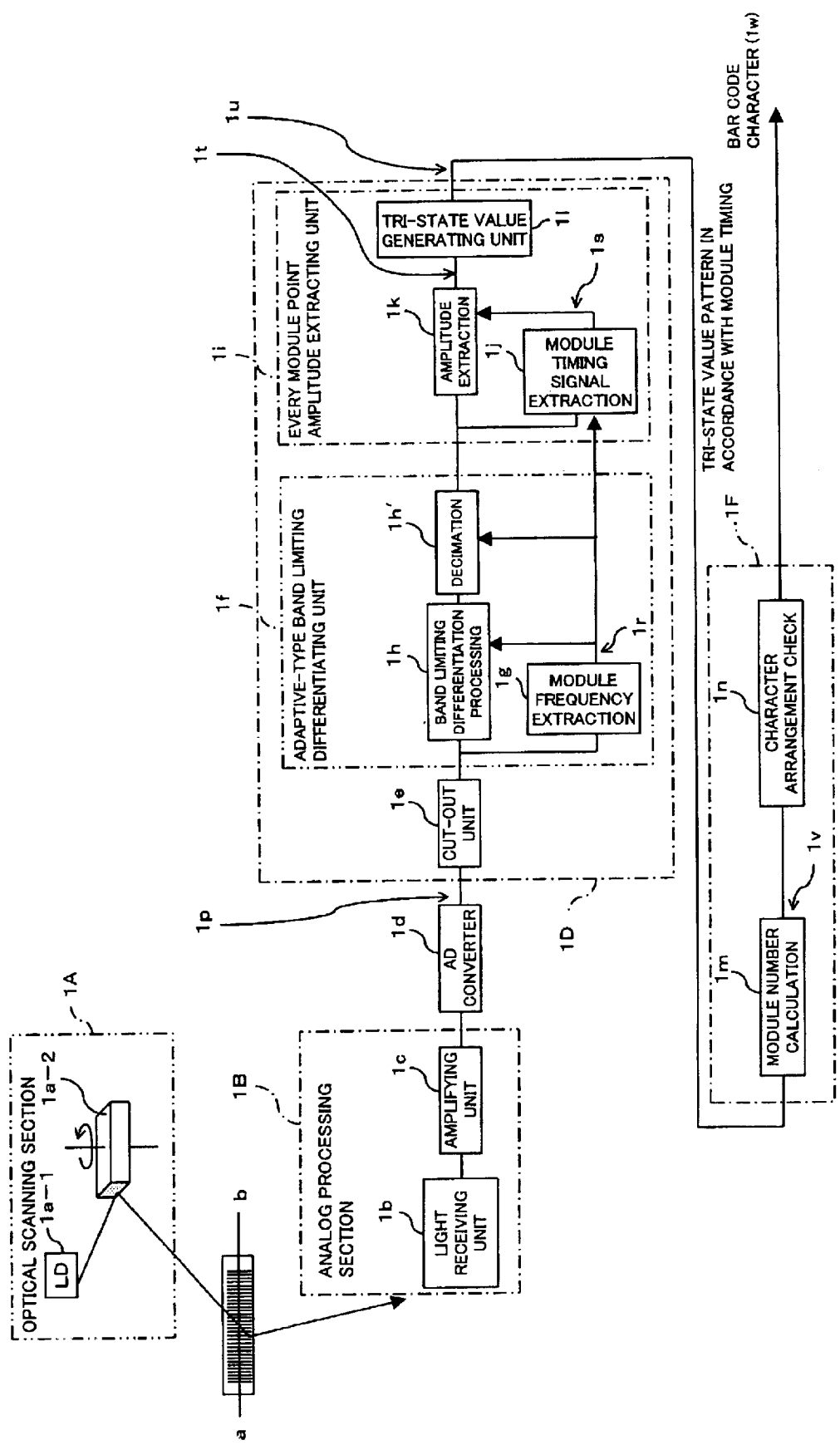
FIGS. 55 and 56 are diagrams each showing another embodiment of the present invention.

For example, as shown in FIG. 55, a printed board module 1D may be introduced and this printed board module 1D is connected to an information processing terminal 1F. Thus, the whole system is made to serve as the aforesaid bar code reading apparatus shown in FIG. 1.

That is, the printed board module 1D is made to have functions of the cut-out unit 1e, the adaptive-type band limiting differentiating unit 1f and the every module point amplitude extracting unit 1i shown in FIG. 1. Also, the information processing terminal operated in accordance with a software may be made to have functions of the module number calculating unit 1m and the character arrangement checking unit 1n.

In other words, the printed board module 1D shown in FIG. 55 can function as a read signal processing unit having the module frequency extracting unit 1g, the band limiting differentiation processing unit 1h and the every module point amplitude extracting unit 1i, the module frequency extracting unit acquiring a signal (see "W" or "B" shown at reference 6a in FIG. 10) containing the binary digit information of information elements having a predetermined information length and arrayed in a one-dimensional manner and also serving as means for extracting the elemental frequency (module frequency) corresponding to the elemental unit length (module length) of the information length of the binary digit information from the acquired signal, the band limiting differentiation processing unit and the every module point amplitude extracting unit serving as units for effecting the band limiting processing on the acquired signal based on the extracted elemental frequency information and thereafter extracting boundary information of the binary digit information.

Figure 56:
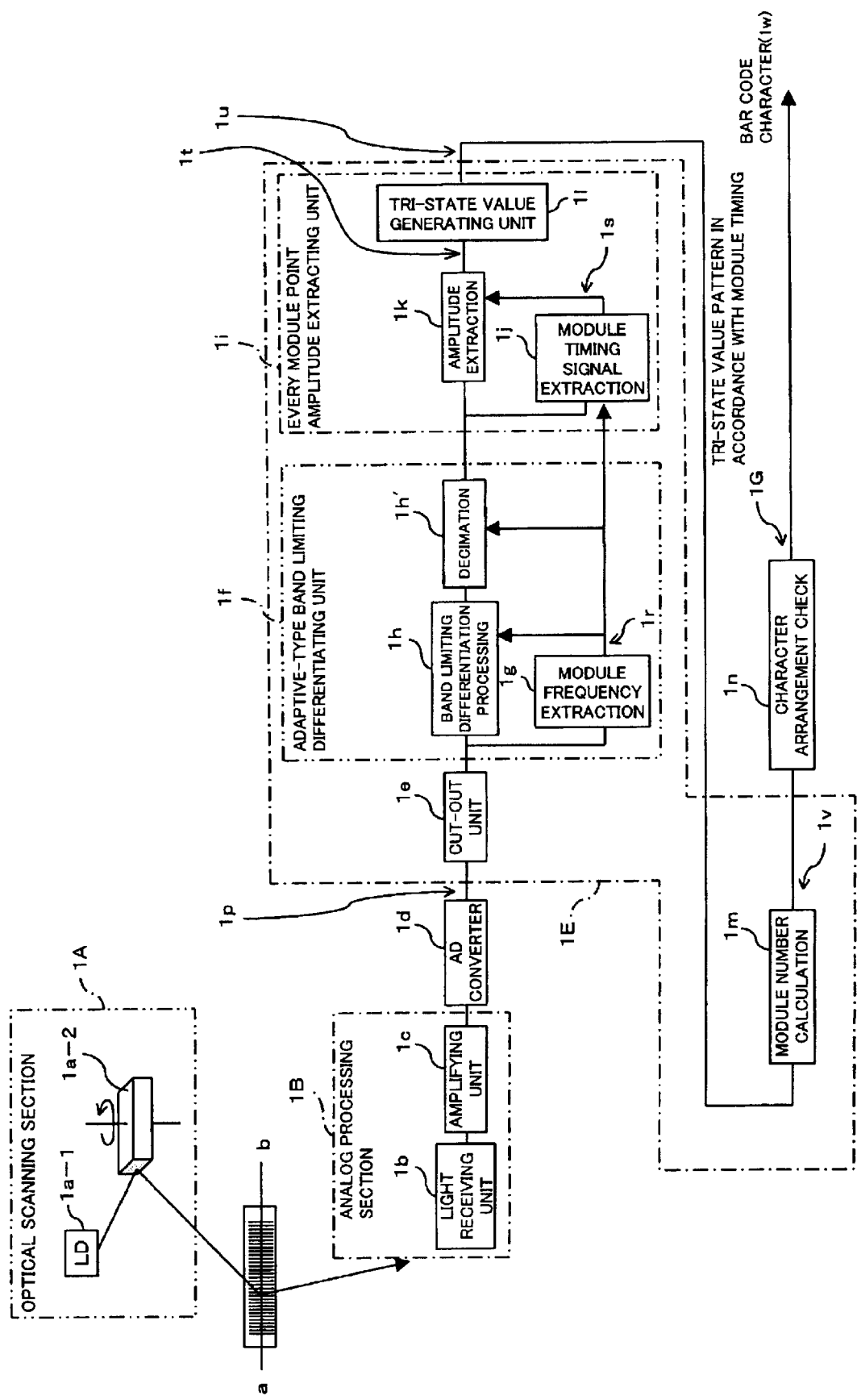

In addition to the aforesaid example of FIG. 55, an arrangement can be made as shown in FIG. 56. That is, as shown in FIG. 56, a printed boar module 1E as a read signal processing unit and an information processing terminal 1G connected with the printed board module 1D will function as the bar code reading apparatus.

That is, the printed board module 1E is made to have functions of the cut-out unit 1e, the adaptive-type band limiting differentiating unit 1f, the every module point amplitude extracting unit 1i and the module number calculating unit 1m shown in FIG. 1. Also, the information processing terminal operated in accordance with a software may be made to have a function of the character arrangement checking unit in.

In other words, the printed board module 1E shown in FIG. 56 can function as a read signal processing unit having the module frequency extracting unit 1g, the band limiting differentiation processing unit 1h, the every module point amplitude extracting unit 1i and the module number calculating unit 1m, the module frequency extracting unit acquiring a signal containing the binary digit information of information elements having a predetermined information length and arrayed in a one-dimensional manner and also serving as means for extracting the elemental frequency (module frequency) corresponding to the elemental unit length of the information length of the binary digit information from the acquired signal, the band limiting differentiation processing unit, the every module point amplitude extracting unit and the module number calculating unit serving as units for effecting the band limiting processing on the acquired signal based on the extracted elemental frequency information and thereafter extracting a ratio of information length of the binary digit information.

Accordingly, the read signal processing unit is arrange to have the module frequency extracting unit 1g as means for extracting the elemental frequency and the every module point amplitude extracting unit 1i as means for extracting the boundary information of the binary digit information. Therefore, at least a function carrying out the processes of from the band limitation to the tri-state value generation can be separately provided from other function units. Thus, the portion of the read signal processing unit can independently find extensive application field of processing in other information processing apparatus, with the result that the apparatus can be more generally utilized and the apparatus arrangement comes to have a large variation.

The present invention is not limited to the above-described embodiments but various changes maybe effected without departing from the gist of the present invention.

Moreover, persons skilled in the art can construct the apparatus of the present invention based on the disclosure of respective embodiments of the present invention.

INDUSTRIAL APPLICABILITY

As described above, the method of reading information according to the present invention is useful in a case where signal acquisition is made on a signal containing binary digit information deriving from information elements having a predetermined information length and arrayed one-dimensionally on a medium, and width information represented by binary digit amplitude information contained in the acquired signal is read particularly applicable to a bar code scanner.

What is claimed is:

1. An information reading apparatus comprising:
   a signal acquiring unit for acquiring from a medium, a signal containing binary digit information having a predetermined information length and an arrangement;
   an elemental frequency extracting unit for extracting an elemental frequency corresponding to an elemental unit length of the binary digit information of the information length from the acquired signal;
   a band limiting unit for limiting a frequency band of the acquired signal based on the extracted elemental frequency information;
   a timing point extracting unit for extracting a timing point which is in synchronism with the acquired signal and has the elemental frequency, based on the acquired signal and the elemental frequency information;
   an amplitude extracting unit for extracting an amplitude value of a signal from the band limiting unit in accordance with the timing point extracted by the timing point extracting unit;
   a tri-state value generating unit for generating tri-state value data from the amplitude value extracted by the amplitude extracting unit in accordance with the timing point; and
   a reading unit for reading a ratio of the binary digit information to the information length by calculating the tri-state value data generated by the tri-state value generating unit.

2. An information reading apparatus according to claim 1, wherein the signal acquiring unit comprises a photoelectric converting unit for receiving a ray of incident light and converting the received ray of light into an electric signal based on a photoelectric conversion, a determining unit for determining whether the electric signal supplied from the photoelectric converting unit derives from photoelectric conversion effected on the ray of light reflected on the medium or not, and a gate unit arranged to respond to a result of determination of the determining unit in such a manner that if it is determined that the a signal component derives from photoelectric conversion effected on the reflected ray of light then the signal component is acquired as the acquired signal while if it is determined that the signal component derives from photoelectric conversion effected on any ray of light other than the reflected ray of light then the signal component is excluded from an object of a signal to be acquired.

3. An information reading apparatus according to claim 2, wherein the determining unit is supplied with a signal deriving from conversion from an analog signal status to a digital signal status effected on the electric signal from the photoelectric converting unit, and the determining unit determines whether the signal derives from photoelectric conversion effected on the ray of light reflected on the medium or not.

4. An information reading apparatus comprising:
means for acquiring from a medium, a signal containing binary digit information having a predetermined information length and an arrangement;
means for extracting an elemental frequency corresponding to an elemental unit length of the binary digit information of the information length from the acquired signal;
means for limiting a frequency band of the acquired signal based on the extracted elemental frequency information;
means for extracting a timing point which is in synchronism with the acquired signal and has the elemental frequency, based on the acquired signal and the elemental frequency information;
mean for extracting an amplitude value of a signal from said means for limiting in accordance with the timing point extracted by said means for extracting a timing point;
means for generating tri-state value data from the amplitude values extracted by said means for extracting an amplitude value; and
means for reading a ratio of the binary digit information to the information length by calculating the tri-state value data generated by said means for generating tri-state value data.

5. An information reading apparatus according to claim 4, wherein said means for acquiring comprises
means for receiving a ray of incident light and for converting the received ray of light into an electric signal based on a photoelectric conversion,
means for determining whether the electric signal derives from photoelectric conversion effected on the ray of light reflected on the medium or not, and
a gate unit arranged to respond to a result of said means for determining in such a manner that if it is determined that the electric signal derives from photoelectric conversion effected on the reflected ray of light then the electric signal is acquired as the acquired signal while if it is determined that the electric signal derives from photoelectric conversion effected on any ray of light other than the reflected ray of light then the electric component is excluded from an object of a signal to be acquired.

6. An information reading apparatus according to claim 5, wherein the means for determining is supplied with a signal deriving from conversion from an analog signal status to a digital signal status effected on the electric signal from the means for receiving and for converting, and the means for determining determines whether the signal derives from photoelectric conversion effected on the ray of light reflected on the medium or not.

7. An apparatus comprising:
a signal acquiring unit acquiring, from a medium, a signal containing binary digit information having a predetermined information length and an arrangement;
an elemental frequency extracting unit extracting an elemental frequency corresponding to an elemental unit length of the binary digit information of the information length from the acquired signal;
a band limiting unit limiting a frequency band of the acquired signal based on the extracted elemental frequency information;
a timing point extracting unit extracting a timing point which is in synchronism with the acquired signal and has the elemental frequency, based on the acquired signal and the elemental frequency information;
an amplitude extracting unit extracting an amplitude value the frequency band limited, acquired signal in accordance with the extracted timing point;
a tri-state value generating unit generating tri-state value data from the extracted amplitude value in accordance with the extracted timing point; and
a reading unit reading a ratio of the binary digit information to the information length by calculating the generated tri-state value data.

8. A method comprising:
acquiring, from a medium, a signal containing binary digit information having a predetermined information length and an arrangement;
extracting an elemental frequency corresponding to an elemental unit length of the binary digit information of the information length from the acquired signal;
limiting a frequency band of the acquired signal based on the extracted elemental frequency information;
extracting a timing point which is in synchronism with the acquired signal and has the elemental frequency, based on the acquired signal and the elemental frequency information;
extracting an amplitude value the frequency band limited, acquired signal in accordance with the extracted timing point;
generating tri-state value data from the extracted amplitude value in accordance with the extracted timing point; and
reading a ratio of the binary digit information to the information length by calculating the generated tri-state value data.

9. An apparatus comprising:
means for acquiring, from a medium, a signal containing binary digit information having a predetermined information length and an arrangement;
means for extracting an elemental frequency corresponding to an elemental unit length of the binary digit information of the information length from the acquired signal;

means for limiting a frequency band of the acquired signal based on the extracted elemental frequency information;

means for extracting a timing point which is in synchronism with the acquired signal and has the elemental frequency, based on the acquired signal and the elemental frequency information;

means for extracting an amplitude value the frequency band limited, acquired signal in accordance with the extracted timing point;

means for generating tri-state value data from the extracted amplitude value in accordance with the extracted timing point; and means for reading a ratio of the binary digit information to the information length by calculating the generated tri-state value data.

* * * * *

UNITED STATES PATENT AND TRADEMARK OFFICE
CERTIFICATE OF CORRECTION

PATENT NO. : 6,978,937 B2  Page 1 of 1
DATED : December 27, 2005
INVENTOR(S) : Isao Iwaguchi et al.

It is certified that error appears in the above-identified patent and that said Letters Patent is hereby corrected as shown below:

<u>Column 67,</u>
Line 11, before "a" delete "the".
Line 42, delete "mean" and insert -- means --.
Line 54, afer "comprises" insert -- : --.

Signed and Sealed this

Ninth Day of May, 2006

JON W. DUDAS
*Director of the United States Patent and Trademark Office*